(12) United States Patent
Nakayama et al.

(10) Patent No.: US 12,391,070 B2
(45) Date of Patent: Aug. 19, 2025

(54) TIRE

(71) Applicant: Sumitomo Rubber Industries, Ltd., Hyogo (JP)

(72) Inventors: Hiroyuki Nakayama, Kobe (JP); Miyu Ozawa, Kobe (JP); Ryuta Kitora, Kobe (JP); Kohei Hayama, Kobe (JP); Shigeki Nishijima, Kobe (JP); Masahiro Nagase, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 126 days.

(21) Appl. No.: 18/451,774

(22) Filed: Aug. 17, 2023

(65) Prior Publication Data

US 2024/0066922 A1 Feb. 29, 2024

(30) Foreign Application Priority Data

Aug. 26, 2022 (JP) .................... 2022-134575
Aug. 26, 2022 (JP) .................... 2022-134577
(Continued)

(51) Int. Cl.
*B60C 11/00* (2006.01)
*B60C 3/04* (2006.01)
(Continued)

(52) U.S. Cl.
CPC ............ *B60C 3/04* (2013.01); *B60C 11/0083* (2013.01); *B60C 13/02* (2013.01);
(Continued)

(58) Field of Classification Search
CPC ....... B60C 11/0083; B60C 3/00; B60C 13/00; B60C 13/02; B60C 13/023; B60C 2009/2214
See application file for complete search history.

(56) References Cited

U.S. PATENT DOCUMENTS

2016/0193874 A1    7/2016  Asano et al.

FOREIGN PATENT DOCUMENTS

DE         4209817      *  9/1993
JP      2000-079808 A      3/2000
(Continued)

OTHER PUBLICATIONS

The extended European search report issued by the European Patent Office on Jan. 5, 2024, which corresponds to European Patent Application No. 123191869.9-1012 and is related to U.S. Appl. No. 18/451,774.

*Primary Examiner* — Justin R Fischer
(74) *Attorney, Agent, or Firm* — Studebaker Brackett PLLC

(57) ABSTRACT

A tire has an outer diameter smaller than a value obtained by subtracting 4 mm from an outer diameter maximum value of new product dimensions defined by a JATMA standard or an ETRTO standard, and has a total width smaller than a value obtained by subtracting 5 mm from a maximum total width of the new product dimensions. The tire includes an outer surface including a tread surface and a pair of side surfaces. The tread surface includes an equator. Each of the side surfaces includes a maximum width position. In a normal state, a ratio of a length of the shoulder line segment to a length of the reference line segment is 85.9% or more and 89.3% or less, and a ratio of the radius of the center arc to the radius of the middle arc is 1.85 or more and 2.00 or less.

15 Claims, 40 Drawing Sheets

(30) Foreign Application Priority Data

Aug. 26, 2022 (JP) ................................ 2022-134632
Aug. 26, 2022 (JP) ................................ 2022-134635
Aug. 26, 2022 (JP) ................................ 2022-134637

(51) Int. Cl.
*B60C 9/22* (2006.01)
*B60C 13/02* (2006.01)

(52) U.S. Cl.
CPC ................ *B60C 2009/2214* (2013.01); *B60C 2009/2228* (2013.01); *B60C 2200/04* (2013.01)

(56) References Cited

FOREIGN PATENT DOCUMENTS

| | | | |
|---|---|---|---|
| JP | 2013-060129 A | | 4/2013 |
| JP | 2015-033984 A | | 2/2015 |
| JP | 6214490 | * | 10/2017 |

* cited by examiner

United States Patent US 12,391,070 B2

TIRE

CROSS-REFERENCE TO RELATED APPLICATIONS

This application claims priority to Japanese Patent Application No. 2022-134575, Japanese Patent Application No. 2022-134577, Japanese Patent Application No. 2022-134632, Japanese Patent Application No. 2022-134635, and Japanese Patent Application No. 2022-134637, filed on Aug. 26, 2022, which are incorporated by reference herein in their entirety.

BACKGROUND

Technical Field

Certain embodiments of the present invention relate to a tire. In detail, the present invention relates to a tire mounted on a passenger vehicle.

Description of Related Art

As shown in FIG. 39, a tire T is accommodated in a wheel house H. A shape of the tire T is set such that the tire T does not interfere with the wheel house H.

The shape of the tire T affects the performance, such as the steering stability, the comfort of the vehicle, the rolling resistance, and the uneven abrasion resistance. For example, in order to improve the uneven abrasion resistance, a contour line of a tread surface in a meridional cross section is adjusted (for example, refer to the related art).

The shape of the tire T also affects a resistance force to air. A tire having large air resistance deteriorates the fuel efficiency of the vehicle. Various studies have been carried out to reduce the air resistance of the tire (for example, refer to the related art).

SUMMARY

According to an embodiment of the present invention, there is provided a tire having an outer diameter smaller than a value obtained by subtracting 4 mm from an outer diameter maximum value of new product dimensions defined by a JATMA standard or an ETRTO standard, and having a total width smaller than a value obtained by subtracting 5 mm from a maximum total width of the new product dimensions. The tire includes an outer surface including a tread surface that is in contact with a road surface, and a pair of side surfaces that are continuous with the tread surface. The tread surface includes an equator that is an intersection point with an equatorial plane. Each of the side surfaces includes a maximum width position indicating a maximum width of the tire. In a meridional cross section of the tire, an intersection point of a bead baseline and the equatorial plane is a first reference point, an intersection point of a straight line passing through the equator and extending in an axial direction and a straight line passing through the maximum width position and extending in a radial direction is a second reference point, a line segment connecting the first reference point and the second reference point is a reference line segment, an intersection point of the reference line segment and the outer surface of the tire is a shoulder reference point, and a line segment connecting the first reference point and the shoulder reference point is a shoulder line segment. A contour line of the tread surface is formed by a plurality of arcs arranged in the axial direction. The plurality of arcs include a center arc passing through the equator, a pair of shoulder arcs each of which is positioned on an outermost side in the axial direction and has a smallest radius, a pair of middle arcs each of which is positioned adjacent to the center arc and has a radius smaller than a radius of the center arc, and a pair of side arcs each of which is positioned between the middle arc and the shoulder arc and has a radius smaller than the radius of the middle arc. In a normal state in which the tire is assembled on a normal rim, an internal pressure of the tire is adjusted to a normal internal pressure, and no load is applied to the tire, a ratio of a length of the shoulder line segment to a length of the reference line segment is 85.9% or more and 89.3% or less, and a ratio of the radius of the center arc to the radius of the middle arc is 1.85 or more and 2.00 or less.

DETAILED DESCRIPTION

Figure 1:
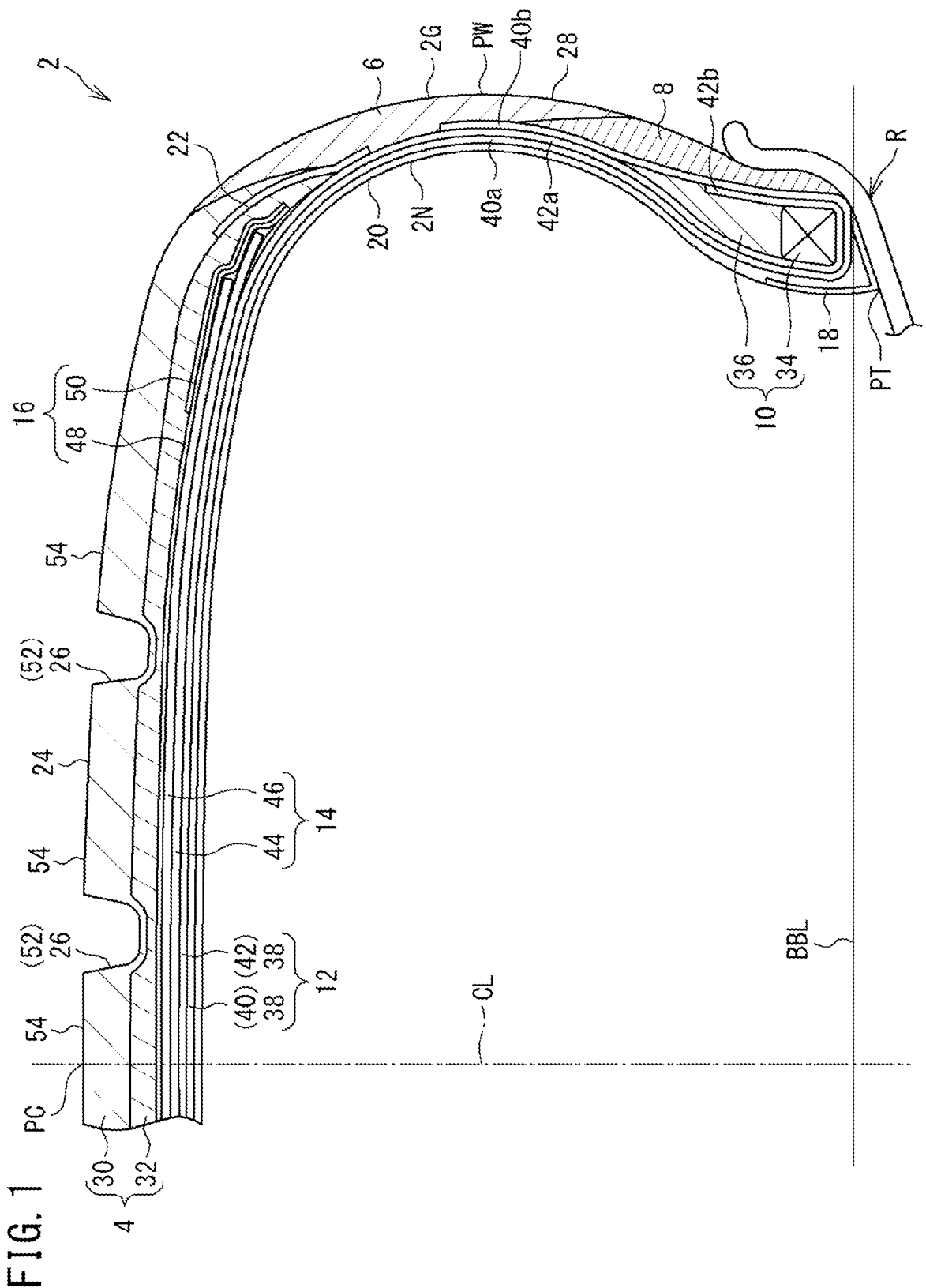
FIG. 1 is a cross-sectional view showing a part of a tire according to an embodiment of the present invention.

In recent years, in the passenger vehicle, the appearance is also emphasized in addition to the performance. In particular, with regard to the appearance, it is required to improve a visual aspect of the vehicle and the tire as one unit.

As described above, the tire T is accommodated in the wheel house H of a vehicle B. A clearance (reference numeral G in FIG. 40) is provided between the wheel house H and the tire T such that the tire T does not interfere with the wheel house H. The clearance G is a distance from an outer surface of the tire T to the wheel house, which is measured along a straight line passing through a first reference point PB1 and a second reference point PB2, which will be described below.

As the clearance G is reduced, the sense of unity between the vehicle B and the tire T is enhanced. The enhancement in the sense of unity contributes to the improvement in the visual aspect.

Figure 40:
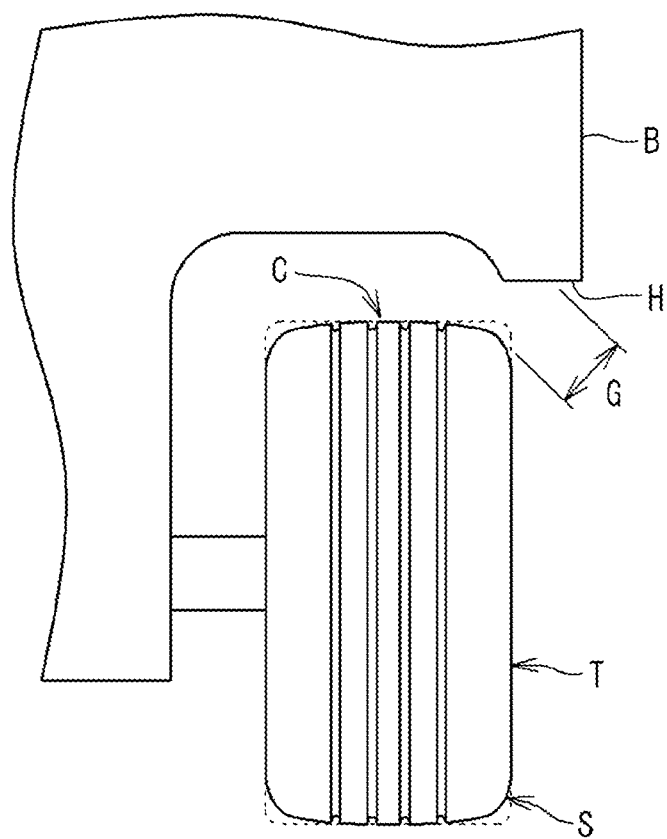
FIG. 40 is a cross-sectional view taken along a line VII-VII of FIG. 39.

As shown by a dotted line in FIG. 40, in a case where a contour line of a tread surface is modified such that a shoulder portion S has an angular shape, the clearance G is reduced, and the sense of unity between the vehicle B and the tire T is enhanced.

However, the modification involves a change in the contour line of the tread surface. As a result of the shoulder portion S protruding, a ground contact pressure of the shoulder portion S is increased, and there is a concern that the uneven abrasion occurs.

In order to improve the visual aspect, it is required to enhance the sense of unity between the vehicle B and the tire T in consideration of the influence on the uneven abrasion resistance.

In addition, in a case where the contour line of the tread surface is simply modified, the shoulder portion S protrudes, and the volume of the shoulder portion S is increased. The increase in the volume increases the mass of the tire. Therefore, it is also required to enable to achieve the improvement in the visual aspect while suppressing the increase in the mass.

Further, a projection area of the tire when the tire is viewed from the front of the vehicle is increased. The increase in the projection area leads to the increase in the air resistance. Therefore, it is also required to enable to achieve the improvement in the visual aspect while suppressing the increase in the air resistance. The modification of the contour line of the tread surface involves a change in a contour line of a carcass. As in the contour line of the tread surface, in a case where the contour line of the carcass is also modified to an angular shape, when the tire is inflated, the tire is deformed such that a crown portion C pops out and the shoulder portion S retracts. Since an outer diameter growth in the crown portion C is promoted, the contour line of the tread surface is rounded, and an effect of improving the visual aspect may not be sufficiently obtained.

In the tire, the deformation and the restoration are repeated. The increase in the outer diameter growth in the crown portion C leads to the increase in an amount of deformation in a tread portion. Therefore, the rolling resistance may also be increased. Therefore, it is also required to enable to achieve the improvement in the visual aspect while suppressing the increase in the rolling resistance.

In a case where the contour line of the tread surface is simply modified to protrude the shoulder portion S, a force that acts on the shoulder portion S when being in contact with the ground is increased, and there is a concern that compressive strain is increased. The increase in the compressive strain increases the rolling resistance. In a radially outer portion of a side surface at a maximum width position, the roundness of the side surface is gentle, and there is a concern that the volume of the rubber of a sidewall portion is increased. The increase in the volume of the rubber increases the rolling resistance. In a radially inner portion of the side surface at the maximum width position, the roundness of the side surface is tight, and there is a concern that the volume of the rubber of a portion being in contact with a flange of a rim is insufficient. The insufficient volume of the rubber promotes the exposure of the carcass cord, which should originally be covered with rubber. The exposure of the carcass cord deteriorates an appearance quality. Therefore, it is also required to enable to achieve the improvement in the visual aspect while suppressing the influence on the rolling resistance or the appearance quality.

The present invention has been made in view of these circumstances. It is desirable to provide a tire that can achieve the improvement in the visual aspect.

The tire may further include a pair of beads, and a carcass that bridges between the pair of beads. A ratio of a length of the shoulder line segment from the carcass to the shoulder reference point to the length of the shoulder line segment may be 6% or more and 12% or less.

The tire may further include a pair of beads, a carcass that bridges between the pair of beads, a tread that is positioned radially outside the carcass, a pair of sidewalls that are positioned axially outside the carcass, and a pair of clinches that are positioned radially inside the sidewall. A protrusion that protrudes outward from the outer surface of the tire and extends in a circumferential direction may be provided at a boundary portion between the tread and the sidewall. The outer surface of the tire may include a serration region between the shoulder reference point and the maximum width position. The serration region may include a plurality of narrow grooves that extend in the circumferential direction, and a ridge that is positioned between the narrow grooves adjacent to each other. The serration region may be positioned radially inside the protrusion. A total of a height of the protrusion and a maximum depth of the narrow groove may be 0.5 mm or more and 0.9 mm or less.

The tire may further include a pair of beads, a carcass that bridges between the pair of beads, a tread that is positioned radially outside the carcass, and a band that is positioned between the carcass and the tread. The tread may include the tread surface. The band may include a band cord that extends substantially in a circumferential direction. The band may include a center portion that intersects with the equatorial plane, and a pair of side portions that are positioned axially outside the center portion. The center portion may have stiffness higher than stiffness of the side portion.

In the tire, a ratio of a radial distance from the bead baseline to the maximum width position to a cross-sectional height of the tire may be 51% or more and 62% or less.

Hereinafter, the present invention will be described in detail based on a preferred embodiment while referring to the drawings as appropriate.

A tire is assembled on a rim. An inside of the tire is filled with air, and an internal pressure of the tire is adjusted. In the present invention, the tire assembled on the rim is a tire-rim assembly. The tire-rim assembly includes the rim and the tire assembled on the rim.

In the present invention, a state in which the tire is assembled on a normal rim, the internal pressure of the tire is adjusted to a normal internal pressure, and no load is applied to the tire is referred to as a normal state.

In the present invention, unless otherwise specified, the dimensions and the angles of each portion of the tire are measured in the normal state.

The dimensions and the angles of each portion in a meridional cross section of the tire, which cannot be measured in a state in which the tire assembled on the normal rim, are measured in a cross section (hereinafter, a reference cut surface) of the tire, which is obtained by cutting the tire along a plane including a rotation axis. In this measurement, a distance between left and right beads is set to match a distance between beads in the tire assembled on the normal rim.

The normal rim means a rim determined in a standard on which the tire depends. A "Standard Rim" in a JATMA standard, a "Design Rim" in a TRA standard, and a "Measuring Rim" in an ETRTO standard are the normal rims.

The normal internal pressure means an internal pressure determined in a standard on which the tire depends. A "maximum air pressure" in the JATMA standard, a "maximum value" published in "TIRE LOAD LIMITS AT VARIOUS COLD INFLATION PRESSURES" in the TRA standard, and an "INFLATION PRESSURE" in the ETRTO standard are the normal internal pressures.

A normal load means a load determined in the standard on which the tire depends. A "maximum load capacity" in the JATMA standard, a "maximum value" published in "TIRE LOAD LIMITS AT VARIOUS COLD INFLATION PRESSURES" in the TRA standard, and a "LOAD CAPACITY" in the ETRTO standard are the normal loads.

In the present invention, a "designation of the tire" is a "Designation of the tire" defined in JIS D4202 "Automobile tires-Designation and dimensions". The "designation of the tire" is also referred to as a tire size.

In the present invention, a rubber composition is a composition containing base material rubber in an uncrosslinked state, which is obtained by mixing the base material rubber and a chemical in a kneading machine, such as a Banbury mixer. Crosslinked rubber is a crosslinked product of the rubber composition which is obtained by pressurizing and heating the rubber composition. The crosslinked rubber includes a crosslinked product of the base material rubber. The crosslinked rubber is also referred to as vulcanized rubber, and the rubber composition is also referred to as unvulcanized rubber.

Examples of the base material rubber include natural rubber (NR), butadiene rubber (BR), styrene-butadiene rubber (SBR), isoprene rubber (IR), ethylene-propylene rubber (EPDM), chloroprene rubber (CR), acrylonitrile-butadiene rubber (NBR), and isobutylene-isoprene rubber (IIR). Examples of the chemical include a reinforcing agent, such as carbon black or silica, a plasticizing agent, such as aromatic oil, a filler, such as zinc oxide, a lubricant, such as stearic acid, an anti-aging agent, a processing aid, sulfur, and a vulcanization accelerator. The selection of the base material rubber and the chemical, the content of the selected chemical, and the like are determined as appropriate according to the specifications of each element, such as a tread and a sidewall to which the rubber composition is applied.

In the present invention, a tread portion of the tire is a portion of the tire, which is in contact with a road surface. A bead portion is a portion of the tire, which is fitted into the rim. A sidewall portion is a portion of the tire, which bridges between the tread portion and the bead portion. The tire includes the tread portion, a pair of bead portions, and a pair of sidewall portions as the portions. A central portion of the tread portion is also referred to as a crown portion. A portion of an end of the tread portion is also referred to as a shoulder portion. A boundary portion between the tread portion and the sidewall portion is also referred to as a buttress.

In the present invention, the number of cords that are included per a width of 5 cm of an element of the tire and that include cords arranged in parallel, is represented as the density (unit: ends/5 cm) of cords included in the element. Unless otherwise specified, the density of the cord is obtained in a cross section of an element obtained by cutting the tire in a surface perpendicular to a length direction of the cord.

In the present invention, an intermediate elongation of an organic fiber cord conforms to "8.7 elongation rate under a constant load" of "JIS L1017 (Test methods for chemical fiber tire cords)", and is expressed by an elongation (%) when a constant load determined by the standard is applied in a "load-elongation" curve of the organic fiber cord, which is obtained in an atmosphere adjusted to a temperature of 20° C.±2° C. and a humidity of 65±4%. The intermediate elongation is controlled as appropriate by adjusting the material, the fineness, the number of twists, and the like of a filament.

Outline of First Embodiment of Present Invention

Configuration 1

A tire according to an aspect of the present invention is a tire having an outer diameter smaller than a value obtained by subtracting 4 mm from an outer diameter maximum value of new product dimensions defined by a JATMA standard or an ETRTO standard, and having a total width smaller than a value obtained by subtracting 5 mm from a maximum total width of the new product dimensions, the tire including an outer surface including a tread surface that is in contact with a road surface, and a pair of side surfaces that are continuous with the tread surface, in which the tread surface includes an equator that is an intersection point with an equatorial plane, each of the side surfaces includes a maximum width position indicating a maximum width of the tire, in a meridional cross section of the tire, an intersection point of a bead baseline and the equatorial plane is a first reference point, an intersection point of a straight line passing through the equator and extending in an axial direction and a straight line passing through the maximum width position and extending in a radial direction is a second reference point, a line segment connecting the first reference point and the second reference point is a reference line segment, an intersection point of the reference line segment and the outer surface of the tire is a shoulder reference point, and a line segment connecting the first reference point and the shoulder reference point is a shoulder line segment, a contour line of the tread surface is formed by a plurality of arcs arranged in the axial direction, the plurality of arcs include a center arc that is an arc passing through the equator, a pair of shoulder arcs each of which is positioned on an outermost side in the axial direction and has a smallest radius, a pair of middle arcs each of which is positioned adjacent to the center arc and has a radius smaller than a radius of the center arc, and a pair of side arcs each of which is positioned between the middle arc and the shoulder arc and has a radius smaller than the radius of the middle arc, and in a normal state in which the tire is assembled on a normal rim, an internal pressure of the tire is adjusted to a normal internal pressure, and no load is applied to the tire, a ratio of a length of the shoulder line segment to a length of the reference line segment is 85.9% or more and 89.3% or less, and a ratio of the radius of the center arc to the radius of the middle arc is 1.85 or more and 2.00 or less.

By arranging the tire in this way, in the tire, a clearance with the wheel house can be made close to an interference limit clearance amount. Since the clearance is reduced, the sense of unity between the vehicle and the tire is enhanced. The enhancement in the sense of unity can contribute to the improvement in the visual aspect. In the tire, a difference between the radius of the center arc and the radius of the side arc positioned adjacent to the middle arc can be suppressed to a small extent. Since the slippage of the shoulder portion is effectively suppressed, the occurrence of the uneven abrasion is suppressed. The tire can achieve the improvement in the visual aspect while suppressing the deterioration in the uneven abrasion resistance.

Configuration 2

It is preferable that, in the tire according to Configuration 1, a ratio of the radius of the middle arc to the radius of the side arc is 2.08 or more and 2.74 or less.

By arranging the tire in this way, the tread surface is formed, which can effectively contribute to the formation of the clearance that is close to the interference limit clearance amount in consideration of the interference with the wheel house. The tire can effectively enhance the sense of unity with the vehicle. Since the slippage of the shoulder portion is effectively suppressed, the occurrence of the uneven abrasion is suppressed. The tire can achieve the improvement in the visual aspect while suppressing the deterioration in the uneven abrasion resistance.

Configuration 3

It is preferable that, in the tire according to Configuration 1 or Configuration 2, a ratio of a ground contact width of a ground contact surface of the tire, which is obtained by assembling the tire on the normal rim, adjusting the internal pressure of the tire to the normal internal pressure, applying a load of 70% of a normal load to the tire, and bringing the tire into contact with a plane, to a cross-sectional width of the tire is 74% or more and 84% or less.

By arranging the tire in this way, the ground contact surface having an appropriate size is formed, and a local increase in the ground contact pressure is suppressed. The slippage of the shoulder portion is also effectively suppressed. The tire can suppress the occurrence of the uneven abrasion.

Details of First Embodiment of Present Invention

FIG. 1 shows a part of a tire 2 according to the first embodiment. The tire 2 is a pneumatic tire for a passenger vehicle.

FIG. 1 shows a part of a cross section (hereinafter, a meridional cross section) of the tire 2 along a plane including a rotation axis of the tire 2. In FIG. 1, a left-right direction is an axial direction of the tire 2, and an up-down direction is a radial direction of the tire 2. A direction perpendicular to the paper surface of FIG. 1 is a circumferential direction of the tire 2. A one-point chain line CL represents an equatorial plane of the tire 2.

In FIG. 1, the tire 2 is assembled on a rim R (normal rim). An inside of the tire 2 is filled with air, and an internal pressure of the tire 2 is adjusted.

In FIG. 1, a solid line BBL extending in the axial direction is a bead baseline. The bead baseline is a line that defines a rim diameter (see JATMA or the like) of the rim R.

In FIG. 1, a position indicated by a reference numeral PC is an intersection point of an outer surface (specifically, a tread surface which will be described below) of the tire 2 and the equatorial plane. The intersection point PC is an equator of the tire 2. In a case where a groove is positioned on the equatorial plane, the equator PC is specified based on a virtual outer surface obtained on the assumption that there is no groove. The equator PC is a radially outer end of the tire 2.

In FIG. 1, a position represented by a reference numeral PW is an axially outer end (hereinafter, an outer end PW) of the tire 2. In a case where a decoration, such as a pattern or a character, is present on the outer surface, the outer end PW is specified based on a virtual outer surface obtained on the assumption that there is no decoration.

An axial distance from a first outer end PW to a second outer end PW obtained in the normal state is a cross-sectional width of the tire 2 (see JATMA or the like). The outer end PW is also referred to as a maximum width position. The maximum width position is a position at which the tire 2 indicates a maximum width. The maximum width obtained in the normal state matches the cross-sectional width.

In FIG. 1, a position indicated by a reference numeral PT is a toe of the tire 2. The toe PT is a boundary between an outer surface 2G and an inner surface 2N of the tire 2.

The tire 2 includes a tread 4, a pair of sidewalls 6, a pair of clinches 8, a pair of beads 10, a carcass 12, a belt 14, a band 16, a pair of chafers 18, an inner liner 20, and a pair of fixing layers 22.

The tread 4 is in contact with a road surface on a tread surface 24. The tread 4 includes the tread surface 24 that is in contact with the road surface. A groove 26 is carved in the tread 4.

The tread surface 24 is a part of the outer surface 2G of the tire 2. A side surface 28 is continuous with the tread surface 24. The outer surface 2G of the tire includes the tread surface 24 and a pair of side surfaces 28. The tread surface 24 includes the equator PC. Each of the side surfaces 28 includes the maximum width position PW.

The tread 4 includes a cap portion 30 and a base portion 32. The cap portion 30 includes the tread surface 24. The cap portion 30 is made of the crosslinked rubber in which the abrasion resistance and the grip performance are taken into consideration. The base portion 32 is positioned radially inside the cap portion 30. The base portion 32 is entirely covered with the cap portion 30. The base portion 32 is made of the crosslinked rubber having a low heat generation property.

Each of the sidewalls 6 is continuous with the tread 4. The sidewall 6 is positioned radially inside the tread 4. The sidewall 6 is made of the crosslinked rubber in consideration of the cut resistance. The sidewall 6 forms a part of the side surface 28.

Each of the clinches 8 is positioned radially inside the sidewall 6. The clinch 8 comes into contact with the rim R. The clinch 8 is made of the crosslinked rubber in which the abrasion resistance is taken into consideration. The clinch 8 forms a part of the sidewall portion.

Each of the beads 10 is positioned axially inside the clinch 8. The bead 10 is positioned radially inside the sidewall 6.

The bead 10 includes a core 34 and an apex 36. The core 34 extends in the circumferential direction. Although not shown, the core 34 includes a wire made of steel. The apex 36 is positioned radially outside the core 34. The apex 36 is tapered radially outward. The apex 36 is made of the crosslinked rubber having high stiffness.

The carcass 12 is positioned inside the tread 4, the pair of sidewalls 6, and the pair of clinches 8. The carcass 12 bridges between a first bead 10 and a second bead 10 of the pair of beads 10. The carcass 12 includes at least one carcass ply 36.

The carcass 12 of the tire 2 is formed by two carcass plies 38. Although not shown, each of the carcass plies 38 includes a large number of carcass cords arranged in parallel. These carcass cords intersect with the equatorial plane. The carcass 12 of the tire 2 has a radial structure. In the tire 2, a cord made of an organic fiber is used as the carcass cord. Examples of the organic fiber include a nylon fiber, a rayon fiber, a polyester fiber, and an aramid fiber.

Among the two carcass plies 38, the carcass ply 38 positioned inside the tread 4 on an inner side in the radial direction is a first carcass ply 40. The carcass ply 38 positioned inside the tread 4 and radially outside the first carcass ply 40 is a second carcass ply 42.

The first carcass ply 40 includes a first ply main body 40a and a pair of first folded-back portions 40b. The first ply main body 40a bridges the beads on both sides. Each of the first folded-back portions 40b is continuous with the first ply main body 40a, and is folded back from the inner side to the outer side in the axial direction by each of the beads 10.

The second carcass ply 42 includes a second ply main body 42a and a pair of second folded-back portions 42b. The second ply main body 42a bridges the beads 10 on both sides. Each of the second folded-back portions 42b is continuous with the second ply main body 42a, and is folded back from the inner side to the outer side in the axial direction by each of the beads 10.

In the tire 2, an end of the first folded-back portion 40b is positioned radially outside the maximum width position PW. An end of the second folded-back portion 42b is positioned radially inside the maximum width position PW. The end of the second folded-back portion 42b is positioned between an outer end of the apex 36 and the core 34 in the radial direction.

The second folded-back portion 42b is positioned axially inside the first folded-back portion 40b. The end of the second folded-back portion 42b is positioned between the apex 36 and the first folded-back portion 40b.

The belt 14 is positioned radially inside the tread 4. The belt 14 is laminated on the carcass 12. The equatorial plane described above intersects with the belt 14 at the center of an axial width of the belt 14.

In the tire 2, the axial width of the belt 14 is 70% or more and 90% or less of the cross-sectional width of the tire 2.

The belt 14 includes a first layer 44 and a second layer 46. The first layer 44 is positioned radially outside the second ply main body 42a, and is laminated on the second ply main body 42a. The second layer 46 is positioned radially outside the first layer 44, and is laminated on the first layer 44.

As shown in FIG. 1, an end of the second layer 46 is positioned axially inside an end of the first layer 44. The second layer 46 is narrower than the first layer 44. A length from the end of the second layer 46 to the end of the first layer 44 is 3 mm or more and 10 mm or less. The axial width of the belt 14 is represented by the axial width of the wide first layer 44.

Although not shown, each of the first layer 44 and the second layer 46 includes a large number of belt cords arranged in parallel. These belt cords are covered with topping rubber. Each of the belt cords is inclined with respect to the equatorial plane. A material of the belt cord is steel.

The band 16 is positioned between the tread 4 and the belt 14 in the radial direction. The band 16 is laminated on the belt 14.

An end of the band 16 is positioned axially outside an end of the belt 14. A length from the end of the belt 14 to the end of the band 16 is 3 mm or more and 7 mm or less.

Although not shown, the band 16 includes a band cord spirally wound. The band cord is covered with topping rubber. The band cord extends substantially in the circumferential direction. In detail, an angle formed by the band cord with respect to the circumferential direction is 5° or less. The band 16 has a jointless structure.

The band cord is an organic fiber cord. Examples of the organic fiber include a nylon fiber, a rayon fiber, a polyester fiber, and an aramid fiber.

The band 16 includes a full band 48 and a pair of edge bands 50.

The full band 48 is laminated on the belt 14. The full band 48 covers the entire belt 14. Each end of the full band 48 is positioned axially outside the end of the belt 14.

The pair of edge bands 50 are disposed axially apart from each other with the equatorial plane interposed therebetween. Each of the edge bands 50 is laminated on the full band 48. The edge band 50 covers a portion of an end of the full band 48.

The band 16 may be formed by only the full band 48. The band 16 may be formed by only the pair of edge bands 50.

Each of the chafers 18 is positioned radially inside the bead 10. The chafer 18 comes into contact with the rim R. The chafer 18 of the tire 2 is made of a cloth and rubber impregnated in the cloth.

The inner liner 20 is positioned inside the carcass 12. The inner liner 20 forms the inner surface 2N of the tire 2. The inner liner 20 is made of the crosslinked rubber having an excellent air shielding property. The inner liner 20 retains the internal pressure of the tire 2.

The respective fixing layers 22 are disposed axially apart from each other. The fixing layer 22 is positioned axially outside the belt 14. An inner end of the fixing layer 22 is positioned between the cap portion 30 and the base portion 32. An outer end of the fixing layer 22 is positioned between the sidewall 6 and the carcass 12. The fixing layer 22 is made of the crosslinked rubber in which the adhesive force is taken into consideration.

Figure 2:
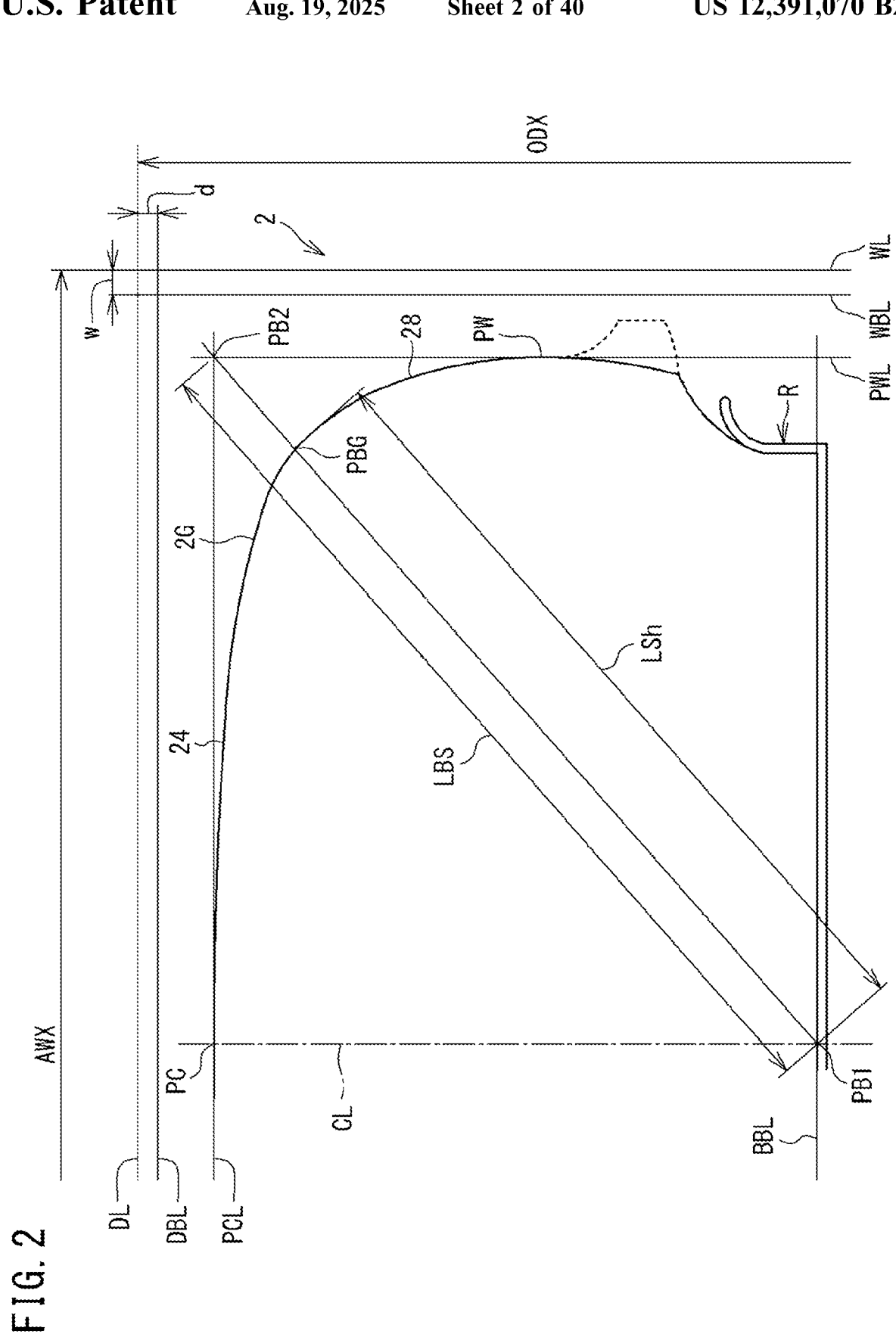
FIG. 2 is a cross-sectional view for describing a reference line segment and a shoulder line segment.

FIG. 2 schematically shows the meridional cross section of the tire 2. FIG. 2 shows a contour line of the outer surface 2G. The contour line is represented by a virtual outer surface obtained on the assumption that there is no decoration, such as a groove, a pattern, or a character. A dotted line in FIG. 2 is a rim guard as an example of the decoration.

Although not described in detail, in the present invention, the contour line of the outer surface 2G is obtained by measuring an outer surface shape of the tire 2 in the normal state by using, for example, a displacement sensor.

In FIG. 2, a length represented by a reference numeral ODX is an outer diameter maximum value of new product dimensions defined in the JATMA standard. A solid line DL extending in the axial direction is a dimension line indicating the outer diameter maximum value ODX. In a case where the designation of the tire is "235/55R19", the outer diameter maximum value ODX of the new product dimensions is 749 mm.

In FIG. 2, a straight line DBL extending in the axial direction is an outer diameter reference line indicating an outer diameter that is smaller than the outer diameter maximum value ODX of the new product dimensions by 4 mm. A bidirectional arrow d is a radial distance from the dimension line DL to the outer diameter reference line DBL. In the present invention, the radial distance d is 2.0 mm. In a case where the designation of the tire is "235/55R19", the radial distance from a first outer diameter reference line DBL to a second outer diameter reference line DBL (not shown) is 745 mm.

As the outer diameter maximum value ODX, an outer diameter maximum value of the new product dimensions defined in the ETRTO standard may be used.

In FIG. 2, a length represented by a reference numeral AWX is a maximum total width of the new product dimensions defined in the JATMA standard. A solid line WL extending in the radial direction is a dimension line indicating the maximum total width AWX. In a case where the designation of the tire is "235/55R19", the maximum total width of the new product dimensions is 255 mm.

In FIG. 2, a straight line WBL extending in the radial direction is a total width reference line indicating a total width that is smaller than the maximum total width AWX of the new product dimensions by 5 mm. A bidirectional arrow w is an axial distance from the dimension line WL to the total width reference line WBL. In the present invention, the axial distance w is 2.5 mm. In a case where the designation of the tire is "235/55R19", an axial distance from a first total width reference line WBL to a second total width reference line WBL (not shown) is 250 mm.

As the maximum total width AWX, a maximum total width of the new product dimensions defined in the ETRTO standard may be used.

The tire 2 is entirely within a region surrounded by the first outer diameter reference line DBL and the second outer diameter reference line DBL, and the first total width reference line WBL and the second total width reference line WBL. Stated another way, the tire 2 has an outer diameter smaller than a value obtained by subtracting 4 mm from the outer diameter maximum value of the new product dimensions defined by the JATMA standard or the ETRTO standard, and has a total width smaller than a value obtained by subtracting 5 mm from the maximum total width of the new product dimensions.

In FIG. 2, a position indicated by a reference numeral PB1 is an intersection point of the bead baseline and the equatorial plane. In the present invention, the intersection point PB1 is a first reference point.

In FIG. 2, a solid line PCL is a straight line passing through the equator PC and extending in the axial direction. A solid line PWL is a straight line passing through the maximum width position PW and extending in the radial direction. A position indicated by a reference numeral PB2 is an intersection point of the straight line PCL and the straight line PWL. In the present invention, the intersection point PB2 is a second reference point. A line segment connecting the first reference point PB1 and the second reference point PB2 is a reference line segment, and a length indicated by a reference numeral LBS in FIG. 2 is a length of the reference line segment.

In FIG. 2, a reference numeral PBG is an intersection point of the reference line segment and the outer surface 2G. In the present invention, the intersection point PBG is a shoulder reference point. A line segment connecting the first reference point PB1 and the shoulder reference point PBG is the shoulder line segment, and a length indicated by a reference numeral LSh in FIG. 2 is a length of the shoulder line segment.

In the present invention, a distance from the outer surface 2G of the tire 2 to the wheel house (not shown), which is measured along a straight line passing through the first reference point PB1 and the second reference point PB2, is a clearance G formed between a tire T and a wheel house H of a vehicle B shown in FIG. 40. In a case where the clearance G is less than 22 mm, the tire 2 interferes with the wheel house. Stated another way, the interference limit clearance amount in the vehicle is 22 mm.

In the tire 2, a ratio (LSh/LBS) of the length LSh of the shoulder line segment to the length LBS of the reference line segment is 85.9% or more and 89.3% or less in the normal state.

Since the ratio (LSh/LBS) is 89.3% or less, the tire 2 is appropriately disposed apart from the wheel house. In the tire 2, the interference with the wheel house is prevented. Since the protruding of the shoulder portion is appropriately maintained, the occurrence of the uneven abrasion is effectively suppressed.

In the tire in the related art, the ratio (LSh/LBS) is less than 85.9%. On the contrary, the ratio (LSh/LBS) of the tire 2 is 85.9% or more. The tire 2 has a larger ratio (LSh/LBS) as compared with the tire in the related art. Since the percentage of the shoulder line segment occupied in the reference line segment is large, in the tire 2, the clearance G that is close to the interference limit clearance amount is formed. Stated another way, in the tire 2, the clearance G can be reduced.

Since the clearance G is reduced, the sense of unity between the vehicle and the tire 2 is enhanced. The enhancement in the sense of unity can contribute to the improvement in the visual aspect.

Increasing the ratio (LSh/LBS) in the tire involves the modification of the contour line of the tread surface. The ground contact pressure of the shoulder portion S is increased, and there is a concern that the uneven abrasion occurs. It is necessary to arrange the contour line of the tread surface in consideration of the influence on the uneven abrasion resistance.

Figure 3:
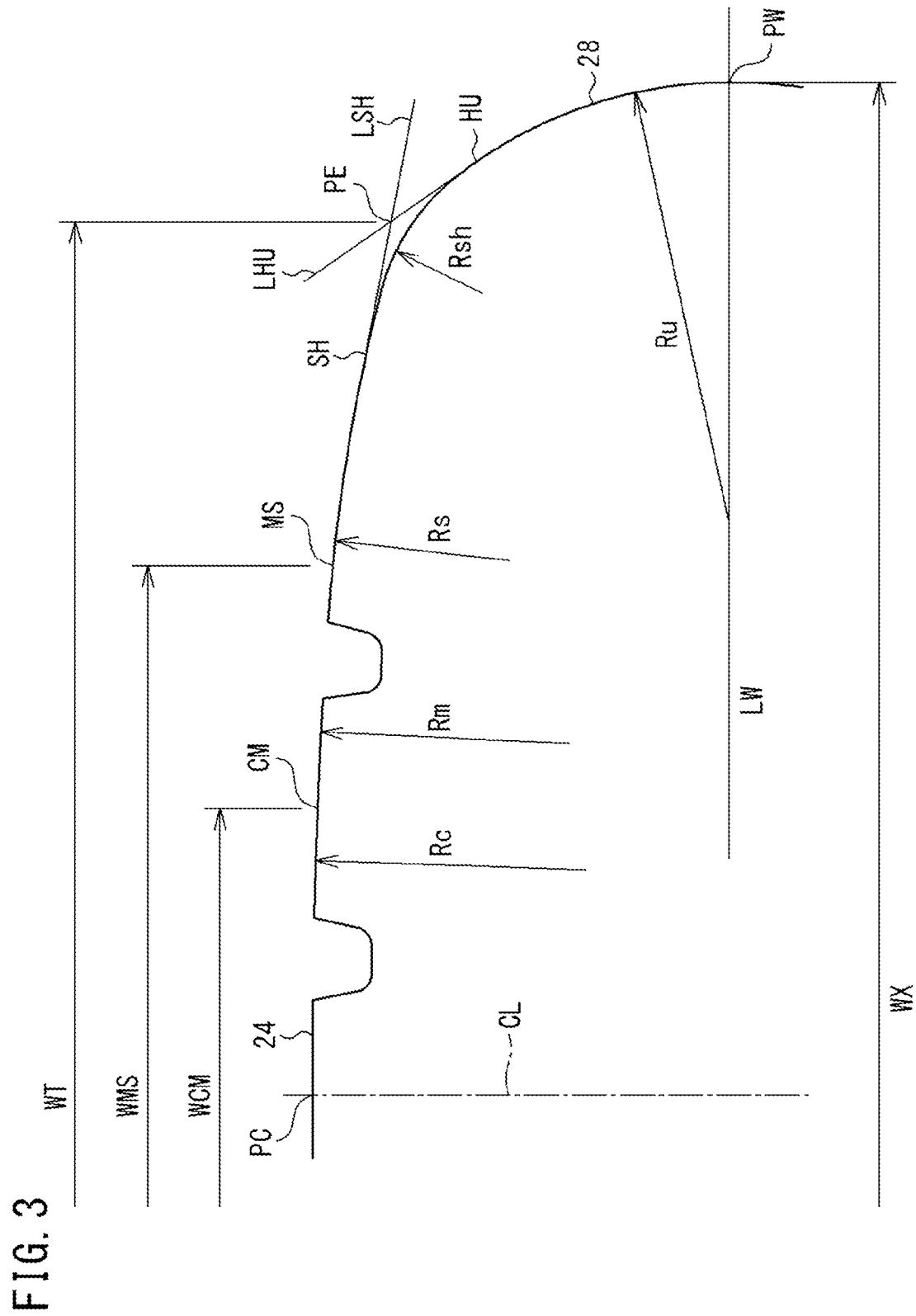
FIG. 3 is a cross-sectional view for describing a contour line of a tread surface.

FIG. 3 shows a part of the contour line shown in FIG. 2.

In the meridional cross section, the contour line of the tread surface 24 is formed by a plurality of arcs arranged in the axial direction.

Among the plurality of arcs, an arc positioned at the center in the axial direction is a center arc. In FIG. 3, an arrow indicated by a reference numeral Rc is a radius of the center arc. The center arc passes through the equator PC. The center of the center arc is positioned on the equatorial plane.

Among the plurality of arcs, an arc positioned on an outer side in the axial direction is a shoulder arc. In FIG. 3, an arrow indicated by a reference numeral Rsh is a radius of the shoulder arc. The shoulder arc has the smallest radius Rsh among the plurality of arcs forming the contour line of the tread surface 24.

The contour line of the tread surface 24 of the tire 2 includes two arcs between the center arc and the shoulder arc. Among these two arcs, an arc positioned on the center arc side is a middle arc, and an arc positioned on the shoulder arc side is a side arc. In FIG. 3, an arrow indicated by a reference numeral Rm is a radius of the middle arc, and an arrow indicated by a reference numeral Rs is a radius of the side arc. The radius Rm of the middle arc is smaller than the radius Rc of the center arc. The radius Rs of the side arc is smaller than the radius Rm of the middle arc.

In the tire 2, the plurality of arcs forming the contour line of the tread surface 24 include the center arc passing through the equator PC, a pair of shoulder arcs each of which is positioned on an outermost side in the axial direction and has the smallest radius Rsh, a pair of middle arcs each of which is positioned adjacent to the center arc and has the radius Rm smaller than the radius Rc of the center arc, and a pair of side arcs each of which is positioned between the middle arc and the shoulder arc and has the radius Rs smaller than the radius Rm of the middle arc. Specifically, the plurality of arcs includes the center arc, the pair of middle arcs, the pair of side arcs, and the pair of shoulder arcs.

In FIG. 3, a position indicated by a reference numeral CM is a boundary between the center arc and the middle arc. The middle arc is in contact with the center arc at the boundary CM. A position indicated by a reference numeral MS is a boundary between the middle arc and the side arc. The side arc is in contact with the middle arc at the boundary MS. A position indicated by a reference numeral SH is a boundary between the side arc and the shoulder arc. The shoulder arc is in contact with the side arc at the boundary SH. A position indicated by a reference numeral HU is a boundary between the shoulder arc and a contour line of the side surface 28. The contour line of the side surface 28 is in contact with the shoulder arc at the boundary HU.

In FIG. 3, a length represented by a reference numeral WCM is an axial distance from a first boundary CM to a second boundary CM. The center of the axial distance WCM matches a position of the equatorial plane. A length represented by a reference numeral WMS is an axial distance from a first boundary MS to a second boundary MS. The center of the axial distance WMS matches a position of the equatorial plane. A length represented by a reference numeral WX is the cross-sectional width of the tire 2.

In the tire 2, a ratio (WCM/WX) of the axial distance WCM to the cross-sectional width WX is 25% or more and 40% or less. A ratio (WMS/WX) of the axial distance WMS to the cross-sectional width WX is 45% or more and 60% or less.

In FIG. 3, a straight line LSH is a tangent line in contact with the shoulder arc at the boundary SH. A straight line LHU is a tangent line in contact with the shoulder arc at the boundary HU. A reference numeral PE is an intersection point of the tangent line LSH and the tangent line LHU. In the present invention, the intersection point PE is a reference end of the tread 4. A length represented by a reference numeral WT is an axial distance from a first reference end PE to a second reference end PE. In the present invention, the axial distance WT is a width of the tread 4.

In the tire 2, a ratio (Rc/Rm) of the radius Rc of the center arc to the radius Rm of the middle arc is 1.85 or more and 2.00 or less.

Since the ratio (Rc/Rm) is 1.85 or more, a difference between the radius Rc of the center arc and the radius Rs of the side arc positioned adjacent to the middle arc can be suppressed to a small extent. Since the slippage of the shoulder portion S is effectively suppressed, the occurrence of the uneven abrasion is suppressed. Good uneven abrasion resistance is obtained in the tire 2.

Since the ratio (Rc/Rm) is 2.00 or less, the shoulder arc can be formed by an arc having a larger radius Rs. The tread surface 24 can be made closer to a flat surface. The tread surface 24 of the tire 2 can effectively contribute to the formation of the clearance G that is close to the interference limit clearance amount. In the tire 2, the clearance G can be reduced.

In the tire 2, the clearance G formed between the tire 2 and the wheel house H when the tire 2 is mounted on the vehicle is small. The tire 2 can enhance the sense of unity with the vehicle. The tire 2 can contribute to the improvement in the visual aspect. In the tire 2, as described above, the contour line of the tread surface 24 is arranged in consideration of the influence on the uneven abrasion resistance. The tire 2 can enhance the sense of unity with the vehicle while maintaining good uneven abrasion resistance.

As described above, the ratio (Rc/Rm) is 1.85 or more and 2.00 or less. In this tire 2, from the point of view of obtaining good uneven abrasion resistance, the ratio (Rc/Rm) is preferably 1.90 or more. From the point of view of enhancing the sense of unity between the tire 2 and the vehicle, the ratio (Rc/Rm) is preferably 1.95 or less.

In the tire 2, a ratio (Rm/Rs) of the radius Rm of the middle arc to the radius Rs of the side arc is preferably 2.08 or more and 2.74 or less.

By setting the ratio (Rm/Rs) to 2.08 or more, the tread surface 24 is formed, which can effectively contribute to the formation of the clearance G that is close to the interference limit clearance amount in consideration of the interference with the wheel house. The tire 2 can effectively enhance the sense of unity with the vehicle. From this point of view, the ratio (Rm/Rs) is more preferably 2.30 or more.

By setting the ratio (Rm/Rs) to 2.74 or less, a difference between the radius Rc of the center arc positioned adjacent to the middle arc and the radius Rs of the side arc can be suppressed to a small extent. Since the slippage of the shoulder portion S is effectively suppressed, the occurrence of the uneven abrasion is suppressed. Good uneven abrasion resistance is obtained in the tire 2. From this point of view, the ratio (Rm/Rs) is more preferably 2.50 or less.

In this tire 2, a ratio (WT/WX) of the width WT of the tread 4 to the cross-sectional width WX is preferably 87% or more and 92% or less.

By setting the ratio (WT/WX) to 87% or more, the ground contact surface having an appropriate size is formed. Since a local increase in the ground contact pressure is suppressed, the occurrence of the uneven abrasion is suppressed. From this point of view, the ratio (WT/WX) is more preferably 88% or more.

By setting the ratio (WT/WX) to 92% or less, the slippage of the shoulder portion S is effectively suppressed. In this case as well, the occurrence of the uneven abrasion is suppressed. From this point of view, the ratio (WT/WX) is more preferably 91% or less.

In the tire 2, a ratio (Rc/WT) of the radius Rc of the center arc to the width WT of the tread 4 is preferably 3.90 or more and 4.30 or less.

By setting the ratio (Rc/WT) to 3.90 or more, the tread surface 24 can be made closer to a flat surface. The tread surface 24 of the tire 2 can effectively contribute to the formation of the clearance G that is close to the interference limit clearance amount. In the tire 2, the clearance G can be reduced. From this point of view, the ratio (Rc/WT) is more preferably 3.95 or more, and still more preferably 4.00 or more.

By setting the ratio (Rc/WT) to 4.30 or less, the interference between the tire 2 and the wheel house is suppressed. Since the slippage of the shoulder portion S is effectively suppressed, the occurrence of the uneven abrasion is suppressed. From this point of view, the ratio (Rc/WT) is more preferably 4.25 or less, and still more preferably 4.20 or less.

In the tire 2, in the contour line of the side surface 28, a portion between the boundary HU and the maximum width position PW is represented by an arc. The contour line of the side surface 28 includes an upper arc that is an arc that is continuous with the shoulder arc and passes through the maximum width position PW. In FIG. 3, an arrow indicated by a reference numeral Ru is a radius of the upper arc. The center of the upper arc is positioned on a straight line LW passing through the maximum width position PW and extending in the axial direction.

In the tire 2, a ratio (Ru/WT) of the radius Ru of the upper arc to the width WT of the tread 4 is preferably 0.22 or more and 0.28 or less.

By setting the ratio (Ru/WT) to 0.22 or more, the tread surface 24 can be made closer to a flat surface. The tread surface 24 of the tire 2 can effectively contribute to the formation of the clearance G that is close to the interference limit clearance amount. In the tire 2, the clearance G can be reduced. From this point of view, the ratio (Ru/WT) is more preferably 0.23 or more, and still more preferably 0.24 or more.

By setting the ratio (Ru/WT) to 0.28 or less, it is possible to suppress the interference of the tire 2 with the wheel house. Since the slippage of the shoulder portion S is effectively suppressed, the occurrence of the uneven abrasion is suppressed. From this point of view, the ratio (Ru/WT) is more preferably 0.27 or less, and still more preferably 0.26 or less.

Figure 4:
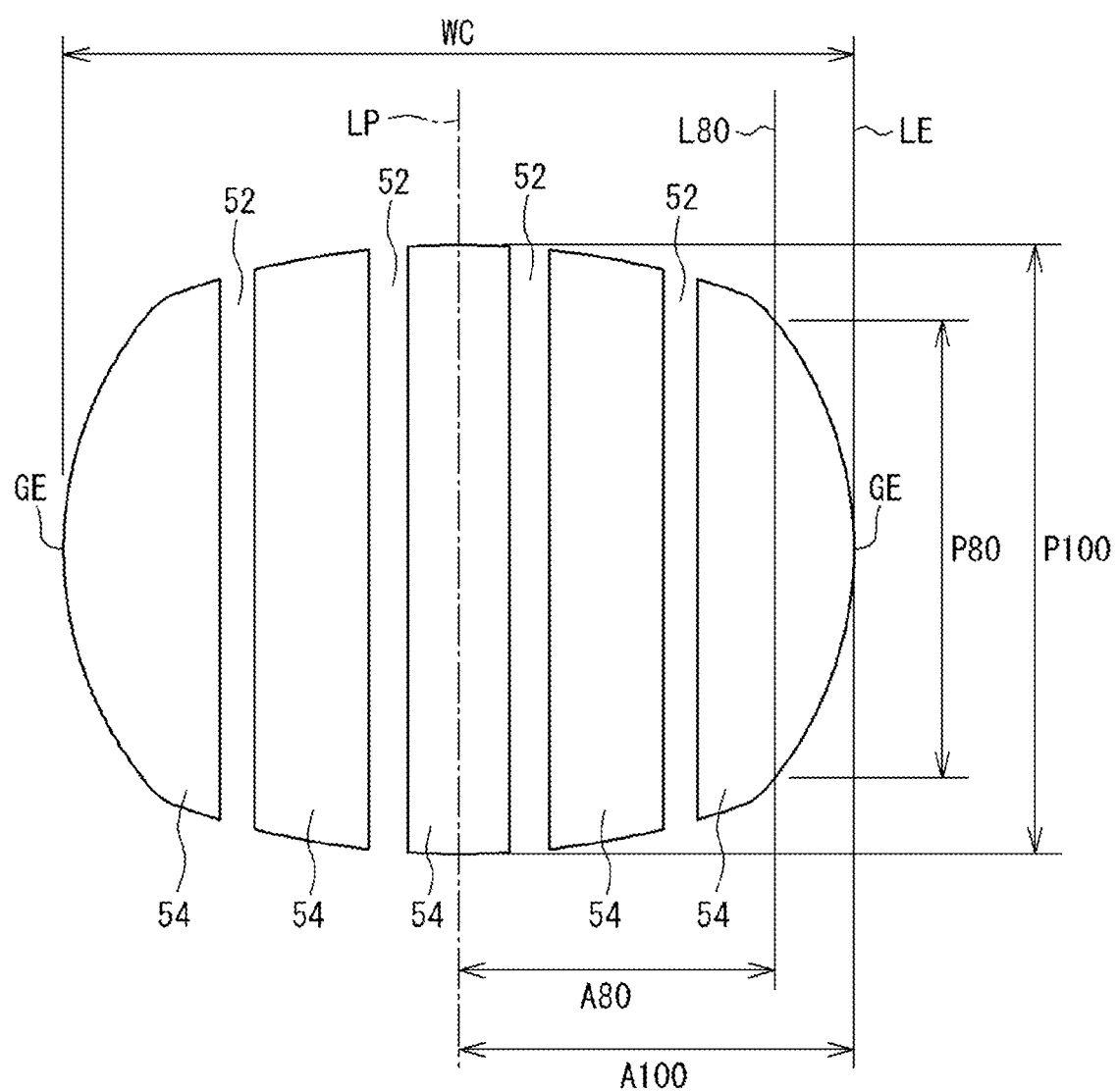
FIG. 4 is a schematic view showing a ground contact surface shape of the tire.

FIG. 4 shows a ground contact surface shape of the tire 2. In FIG. 4, a left-right direction corresponds to the axial direction of the tire 2. An up-down direction corresponds to the circumferential direction of the tire 2.

As described above, the groove 26 is carved in the tread 4. The groove 26 includes a groove (hereinafter, a circumferential groove 52) extending in the circumferential direction. In the tire 2, four circumferential grooves 52 are carved in the tread 4, and five land portions 54 are formed. The ground contact surface shape shown in FIG. 4 includes contours of the five land portions 54.

The ground contact surface is obtained by applying a load of 70% of the normal load to the tire 2 in the normal state by using a tire ground contact surface shape measurement device (not shown) and bringing the tire 2 into contact with the plane. By tracing the contour of each of the land portions 54 included in the ground contact surface, the ground contact surface shape shown in FIG. 4 is obtained. In a case of obtaining the ground contact surface, the tire 2 is disposed such that the axial direction of the tire 2 is parallel to the road surface, and the load described above is applied to the tire 2 in a direction perpendicular to the road surface.

In FIG. 4, a position indicated by a reference numeral GE is an axially outer end of the ground contact surface. A length represented by a reference numeral WC is an axial distance from a first axially outer end GE to a second axially outer end GE of the ground contact surface. In the present invention, the axial distance WC is a ground contact width of the ground contact surface of the tire 2, which is obtained by applying the load of 70% of the normal load to the tire 2 in the normal state and bringing the tire 2 into contact with the plane.

In this tire 2, a ratio (WC/WX) of the ground contact width WC to the cross-sectional width WX of the tire 2 is preferably 74% or more and 84% or less.

By setting the ratio (WC/WX) to 74% or more, a ground contact surface having an appropriate size is formed. Since a local increase in the ground contact pressure is suppressed, the occurrence of the uneven abrasion is suppressed. From this point of view, the ratio (WC/WX) is more preferably 79% or more.

By setting the ratio (WC/WX) to 84% or less, the slippage of the shoulder portion S is effectively suppressed. In this case as well, the occurrence of the uneven abrasion is suppressed. From this point of view, the ratio (WC/WX) is more preferably 81% or less.

In FIG. 4, a one-point chain line LP is a straight line corresponding to the equator PC of the tire 2 on the ground contact surface. In a case where it is difficult to specify the equator PC on the ground contact surface, an axial center line of the ground contact width WC is used as the straight line corresponding to the equator PC. A bidirectional arrow P100 is a length of an intersection line between the plane including the straight line LP and the ground contact surface. In the tire 2, the length P100 of the intersection line is an equatorial contact length which is measured along the equator PC on the ground contact surface.

In FIG. 4, a solid line LE is a straight line passing through the axially outer end PE of the ground contact surface and being parallel to the straight line LP. A solid line L80 is a straight line that is positioned between the straight line LE and the straight line LP and is parallel to the straight line LE and the straight line LP. A bidirectional arrow A100 represents an axial distance from the straight line LP to the straight line LE. The distance A100 corresponds to half of the ground contact width WC. The bidirectional arrow A80 represents an axial distance from the straight line LP to the straight line L80. In FIG. 4, a ratio of the distance A80 to the distance A100 is set to 80%. In other words, the straight line L80 represents a position corresponding to a width of 80% of the ground contact width WC of the ground contact surface. A bidirectional arrow P80 is a length of an intersection line between the plane including the straight line L80 and the ground contact surface. In the tire 2, the length P80 of the intersection line is a reference ground contact length at the position corresponding to the width of 80% of the ground contact width on the ground contact surface.

In the tire 2, the equatorial contact length P100 and the reference ground contact length P80 are specified on the ground contact surface shown in FIG. 4, and a shape index F represented by a ratio (P100/P80) of the equatorial contact length P100 to the reference ground contact length P80 is obtained.

In this tire 2, the shape index F is preferably 1.05 or more and 1.35 or less.

By setting the shape index F to 1.05 or more, the slippage of the shoulder portion is effectively suppressed, and the occurrence of the uneven abrasion is suppressed.

By setting the shape index F to 1.35 or less, the ground contact surface having an appropriate size is formed. Since the local increase in the ground contact pressure is suppressed, the occurrence of the uneven abrasion is suppressed in this case as well.

The tire 2 described above is manufactured in the following manner. Although not described in detail, in the manufacture of the tire 2, the unvulcanized rubber is prepared for the elements that form the tire 2, such as the tread 4, the sidewall 6, and the bead 10.

In the manufacture of the tire 2, in a rubber molding machine (not shown), such as an extruder, a shape of the unvulcanized rubber is arranged to prepare a premolded body of the tire component. In a tire molding machine (not shown), the tire 2 in an unvulcanized state (hereinafter, also referred to as a raw tire) is prepared by combining the premolded bodies, such as the tread 4, the sidewall 6, and the bead 10.

In the manufacture of the tire 2, the raw tire is put into a mold of a vulcanizer (not shown). The tire 2 is obtained by pressurizing and heating the raw tire in the mold. The tire 2 is a vulcanized molded product of the raw tire.

A method of manufacturing the tire 2 includes a step of preparing the raw tire, and a step of pressurizing and heating the raw tire by using the mold. It should be noted that, although not described in detail, in the manufacture of the tire 2, vulcanization conditions, such as temperature, pressure, and time, are not limited, and general vulcanization conditions are adopted.

Figure 5:
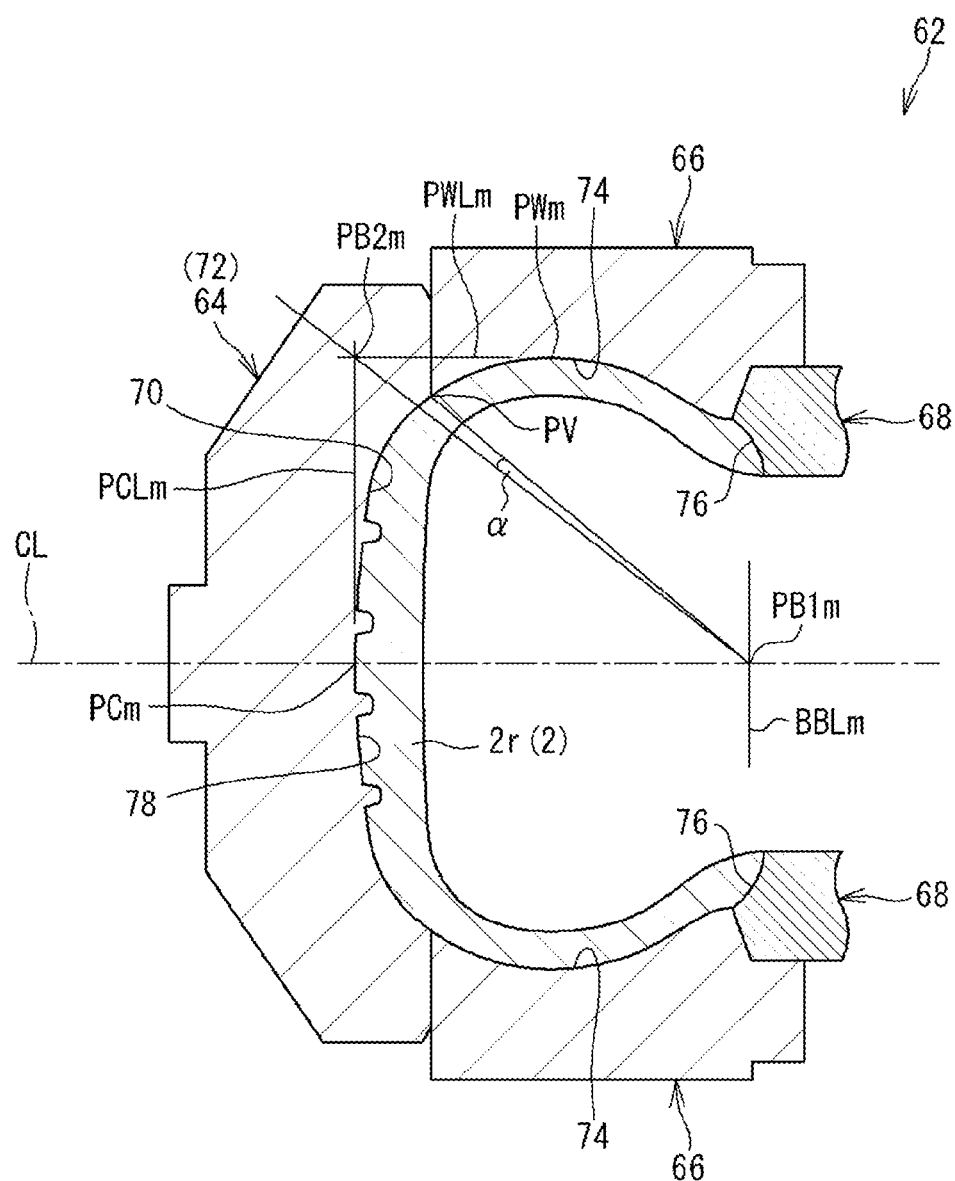
FIG. 5 is a cross-sectional view showing a part of a mold used for manufacturing the tire.

FIG. 5 shows a part of a cross section of a mold 62 for the tire along the plane including the rotation axis of the tire 2. In FIG. 5, a left-right direction is the radial direction of the tire 2, and an up-down direction is the axial direction of the tire 2. A direction perpendicular to the paper surface is a circumferential direction of the tire 2. A one-point chain line CL is the equatorial plane of the tire 2. Hereinafter, for convenience of description, a dimension of the mold 62 is represented by a dimension of the tire 2.

The mold 62 includes a tread ring 64, a pair of side plates 66, and a pair of bead rings 68. In FIG. 5, the mold 62 is in a state in which the tread ring 64, the pair of side plates 66, and the pair of bead rings 68 are combined, that is, in a closed state. The mold 62 is a split mold.

The tread ring 64 forms a radially outer portion of the mold 62. The tread ring 64 includes a tread formation surface 70 on an inner surface thereof. The tread formation surface 70 shapes the tread surface 24 of the tire 2. The tread ring 64 of the mold 62 is formed by a large number of segments 72. These segments 72 are disposed in a ring shape.

Each of the side plates 66 is positioned radially inside the tread ring 64. The side plate 66 is continuous with an end of the tread ring 64. The side plate 66 includes a sidewall formation surface 74 on an inner surface thereof. The sidewall formation surface 74 shapes the side surface 28 of the tire 2.

Each of the bead rings 68 is positioned radially inside the side plate 66. The bead ring 68 is continuous with an end of the side plate 66. The bead ring 68 includes a bead formation surface 76 on an inner surface thereof. The bead formation surface 76 shapes a portion of the bead 10 of the tire 2, specifically, a portion fitted into the rim R.

In the mold 62, a large number of segments 72, the pair of side plates 66, and the pair of bead rings 68 are combined to form a cavity surface 78 that shapes the outer surface of the tire 2. The cavity surface 78 is formed by the tread formation surface 70, a pair of sidewall formation surfaces 74, and a pair of bead formation surfaces 76.

Although not shown, a raw tire 2r is pressed against the cavity surface 78 of the mold 62 by an inflated bladder in a pressurizing and heating step (hereinafter referred to as a vulcanization step). As a result, the outer surface of the tire 2 is shaped.

In the tire 2, as described above, the ratio (LSh/LBS) of the length LSh of the shoulder line segment to the length LBS of the reference line segment is 85.9% or more and 89.3% or less.

In the vulcanization step, the bladder presses the raw tire 2r against the cavity surface 78, but a portion with which the shoulder portion of the raw tire 2r comes into contact is positioned deeper than a portion with which the crown portion comes into contact, and thus this shoulder portion is pressed against to the cavity surface 78 by the bladder with a slightly weaker force than the equatorial portion. In order to sufficiently vulcanize the shoulder portion, it is necessary to set the vulcanization time longer than the vulcanization time of the equatorial portion or the bead portion. In a case where the segment 72, the side plate 66, and the bead ring 68 are made of the same material, there is a concern that the vulcanization proceeds excessively in the equatorial portion or the bead portion, and the performance, such as the rolling resistance, is deteriorated.

In the mold 62, the side plate 66 has the thermal conductivity higher than the thermal conductivity of the segment 72. Heat is effectively supplied to the shoulder portion through the side plate 66. Since the vulcanization is promoted in the shoulder portion, over-vulcanization in the equatorial portion is prevented. With the mold 62, the tire 2 having low rolling resistance is obtained. From this point of view, it is preferable that the side plate 66 has the thermal conductivity higher than the thermal conductivity of the segment 72. Specifically, a ratio of the thermal conductivity of the side plate 66 to the thermal conductivity of the segment 72 is preferably 2.0 or more, and more preferably 2.5 or more. The ratio is preferably 4.0 or less, and more preferably 3.5 or less.

In the mold 62, the side plate 66 has the thermal conductivity higher than the thermal conductivity of the bead ring 68. Heat is effectively supplied to the shoulder portion through the side plate 66. Since the vulcanization is promoted in the shoulder portion, over-vulcanization in the bead portion is prevented. With the mold 62, the tire 2 having low rolling resistance is obtained. From this point of view, it is preferable that the side plate 66 has the thermal conductivity higher than the thermal conductivity of the bead ring 68. Specifically, a ratio of the thermal conductivity of the side plate 66 to the thermal conductivity of the bead ring 68 is preferably 2.0 or more, and more preferably 2.5 or more. The ratio is preferably 4.0 or less, and more preferably 3.5 or less.

In FIG. 5, a reference numeral CLm is an equatorial plane of the mold 62. The equatorial line CLm corresponds to the equatorial plane CL shown in FIG. 1. A reference numeral BBLm is a baseline of the mold 62. The baseline BBLm corresponds to the bead baseline BBL shown in FIG. 1. A reference numeral PCm is an equator of the cavity surface 78. The equator PCm corresponds to the equator PC shown in FIG. 1. A reference numeral PWm is a maximum width position of the cavity surface 78. The maximum width position PWm corresponds to the maximum width position PW shown in FIG. 1. A reference numeral PB1$m$ is an intersection point of the equatorial plane CLm and the baseline BBLm. The intersection point PB1$m$ corresponds to the first reference point PB1, and is also referred to as a first mold reference point. A reference numeral PB2$m$ is an intersection point of a straight line PCLm passing through the equator PCm and extending in the axial direction and a straight line PWLm passing through the maximum width position PWm and extending in the radial direction. The intersection point PB2$m$ corresponds to the second reference point PB2, and is also referred to as a second mold reference point.

In FIG. 5, a position indicated by a reference numeral PV represents a boundary between the segment 72 and the side plate 66 on the cavity surface 78. The boundary PV is a split position of the mold 62. An angle represented by a reference numeral α represents an angle formed by a straight line passing through a first mold reference point PB1$m$ and a second mold reference point PB2$m$ and a straight line passing through the first mold reference point PB1$m$ and the boundary PV. In a case where the boundary PV is positioned on the equator PC side with respect to the straight line passing through the first mold reference point PB1$m$ and the second mold reference point PB2$m$, the angle α is represented as positive. In a case where the boundary PV is positioned on the maximum width position PW side with respect to the straight line passing through the first mold reference point PB1$m$ and the second mold reference point PB2$m$, the angle α is represented as negative.

In the mold 62, as described above, the shoulder portion of the raw tire 2$r$ is pressed against the cavity surface 78 by the bladder with a slightly weak force. In the vulcanization step, there is a concern that air remains in a portion between the cavity surface 78 and the shoulder portion.

In the mold 62, the boundary PV between the segment 72 and the side plate 66 is provided in a portion with which the shoulder portion comes into contact. The boundary PV, that is, the split position functions as a discharge route of air. In this mold, air is effectively discharged even in a portion with which the shoulder portion with a weak pressing force against the cavity surface 78 comes into contact. With the mold 62, the tire 2 having excellent appearance quality is obtained. From this point of view, it is preferable that the split position between the segment 72 and the side plate 66 is provided in the portion with which the shoulder portion comes into contact. In detail, the angle α is preferably −5 degrees or more and 5 degrees or less, and more preferably −3 degrees or more and 3 degrees or less.

As described above, the tire 2 can achieve the improvement in the visual aspect.

Outline of Second Embodiment of Present Invention

Configuration 1

A tire according to an aspect of the present invention is a tire having an outer diameter smaller than a value obtained by subtracting 4 mm from an outer diameter maximum value of new product dimensions defined by a JATMA standard or an ETRTO standard, and having a total width smaller than a value obtained by subtracting 5 mm from a maximum total width of the new product dimensions, the tire including a pair of beads, and a carcass that bridges between the pair of beads, in which the tire includes an outer surface including a tread surface that is in contact with a road surface, and a pair of side surfaces that are continuous with the tread surface, the tread surface includes an equator that is an intersection point with an equatorial plane, each of the side surfaces includes a maximum width position indicating a maximum width of the tire, in a meridional cross section of the tire, an intersection point of a bead baseline and the equatorial plane is a first reference point, an intersection point of a straight line passing through the equator and extending in an axial direction and a straight line passing through the maximum width position and extending in a radial direction is a second reference point, a line segment connecting the first reference point and the second reference point is a reference line segment, an intersection point of the reference line segment and the outer surface of the tire is a shoulder reference point, and a line segment connecting the first reference point and the shoulder reference point is a shoulder line segment, and in a normal state in which the tire is assembled on a normal rim, the internal pressure of the tire is adjusted to a normal internal pressure, and no load is applied to the tire, a ratio of a length of the shoulder line segment to a length of the reference line segment is 85.9% or more and 89.3% or less, and a ratio of a length of the shoulder line segment from the carcass to the shoulder reference point to the length of the shoulder line segment is 6% or more and 12% or less.

By arranging the tire in this way, in this tire, the clearance can be reduced. As the clearance is reduced, the sense of unity between the vehicle and the tire is enhanced. The enhancement in the sense of unity contributes to the improvement in the visual aspect.

In the tire, the interference with the wheel house can be prevented. Since the protruding of the shoulder portion is appropriately maintained, the occurrence of the uneven abrasion is effectively suppressed.

In a case where the tire is inflated, a carcass line can maintain a natural equilibrium shape. A uniform tension acts on the carcass. The deformation of the tire is suppressed to a small extent. The tire can maintain good uneven abrasion resistance.

The volume of the rubber in the shoulder portion is appropriately maintained. Since the increase in the volume of the shoulder portion is suppressed, the increase in the mass of a tire 202 is suppressed even in a case where the contour line of the tread surface is modified to improve the visual aspect and the shoulder portion is arranged to an angular shape.

The tire can achieve the improvement in the visual aspect while suppressing the increase in the mass. Also, good uneven abrasion resistance is also maintained in this tire.

Configuration 2

It is preferable that, in the tire according to Configuration 1, an axially outer end of a ground contact surface, which is obtained by applying a load of 70% of a normal load to the tire in the normal state and bringing the tire into contact with a plane, is a reference ground contact end, and a position corresponding to the reference ground contact end on the outer surface of the tire is a reference ground contact position, and in the normal state, a ratio of an axial distance from the equator to the reference ground contact position to an axial distance from the equator to the shoulder reference point is 79% or more and 86% or less.

By arranging the tire in this way, in this tire, the clearance can be effectively reduced. The tire can contribute to the improvement in the visual aspect.

Since the local increase in the ground contact pressure in the shoulder portion is suppressed, good uneven abrasion resistance is maintained.

Configuration 3

It is preferable that, in the tire according to Configuration 1 or Configuration 2, in the normal state, a ratio of an axial distance from the equator to the maximum width position to an axial distance from the equator to the shoulder reference point is 1.07 or more and 1.13 or less.

By arranging the tire in this way, a change in the contour of the outer surface of the tire between the shoulder reference point and the maximum width position can be suppressed to a small extent. Since the occurrence of peculiar distortion in the sidewall portion is suppressed, good durability is maintained.

The volume of the rubber in the sidewall portion is appropriately maintained. In the tire, the increase in the mass is suppressed.

Configuration 4

It is preferable that, in the tire according to any one of Configuration 1 to Configuration 3, a contour line of the side surface includes an upper arc, the upper arc is an arc that extends from the maximum width position toward the shoulder reference point, and in the normal state, a ratio of a radial distance from the shoulder reference point to an outer end of the upper arc to a radial distance from the shoulder reference point to the maximum width position is 50% or more and 60% or less.

By arranging the tire in this way, in the tire, the volume of the rubber in the region from the shoulder reference point to the maximum width position can be reduced. In the tire, the increase in the mass can be suppressed.

The outer end of the upper arc is disposed at an appropriate distance from the shoulder reference point. Since the occurrence of peculiar distortion in the sidewall portion is suppressed, good durability is maintained.

Details of Second Embodiment of Present Invention

Figure 6:
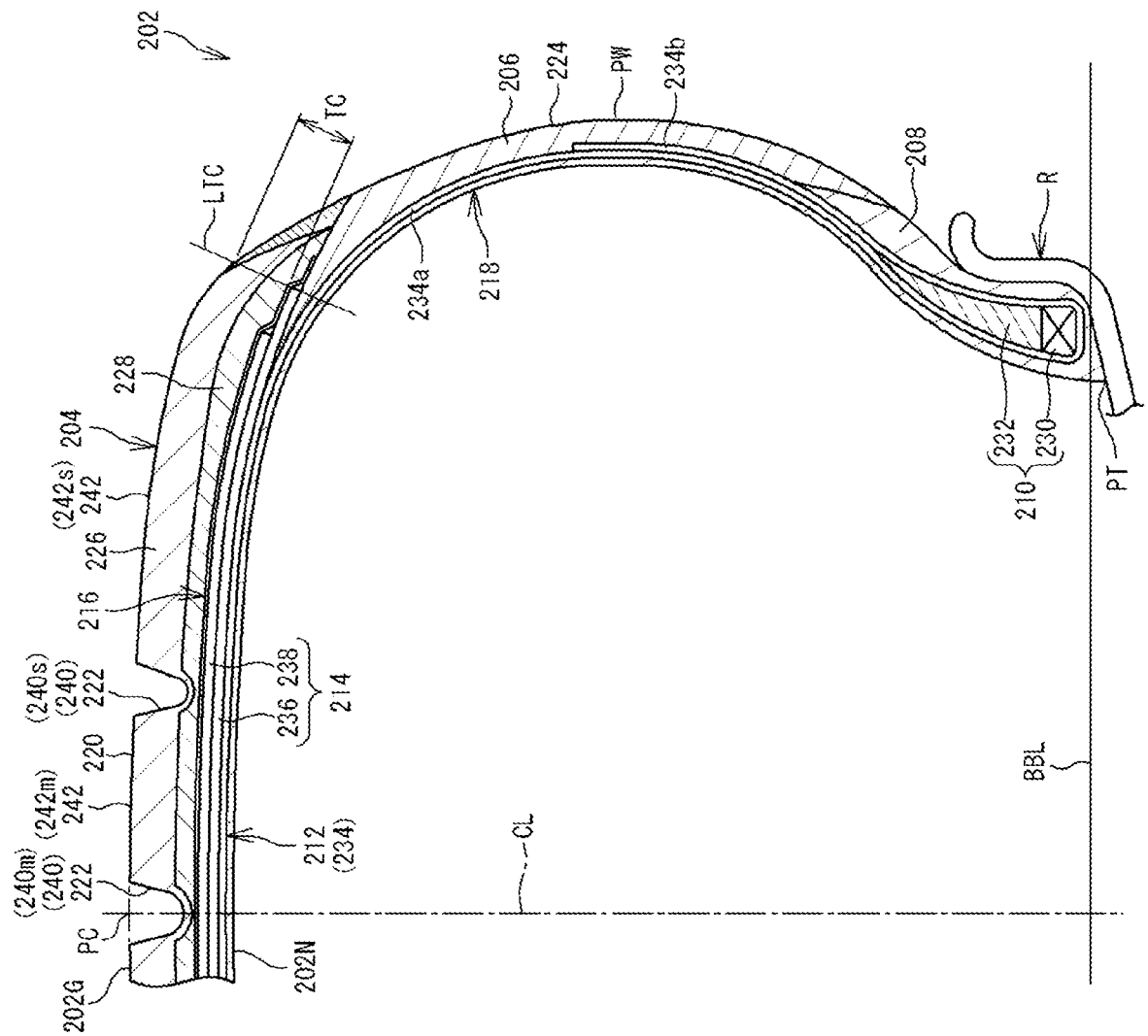
FIG. 6 is a cross-sectional view showing a part of a tire according to another embodiment of the present invention.

FIG. 6 shows a part of the tire 202 according to the second embodiment. The tire 202 is a pneumatic tire for a passenger vehicle.

FIG. 6 shows a part of a cross section (hereinafter, a meridional cross section) of the tire 202 along a plane including a rotation axis of the tire 202. In FIG. 6, a left-right direction is an axial direction of the tire 202, and an up-down direction is a radial direction of the tire 202. A direction perpendicular to the paper surface in FIG. 6 is a circumferential direction of the tire 202. A one-point chain line CL represents an equatorial plane of the tire 202.

In FIG. 6, the tire 202 is assembled on a rim R (normal rim). An inside of the tire 202 is filled with air, and an internal pressure of the tire 202 is adjusted.

In FIG. 6, a solid line BBL extending in the axial direction is a bead baseline. The bead baseline is a line that defines a rim diameter (see JATMA or the like) of the rim R.

In FIG. 6, a position indicated by a reference numeral PC is an intersection point of an outer surface 202G (specifically, a tread surface which will be described below) of the tire 202 and the equatorial plane. The intersection point PC is an equator of the tire 202. As will be described below, a groove is positioned on the equatorial plane of the tire 202. In this case, the equator PC is specified based on a virtual outer surface obtained on the assumption that there is no groove. The equator PC is a radially outer end of the tire 202.

In FIG. 6, a position represented by a reference numeral PW is an axially outer end (hereinafter, an outer end PW) of the tire 202. In a case where a decoration, such as a pattern or a character, is present on the outer surface, the outer end PW is specified based on a virtual outer surface obtained on the assumption that there is no decoration.

An axial distance from a first outer end PW to a second outer end PW obtained in the normal state is a cross-sectional width of the tire 202 (see JATMA or the like). The outer end PW is also referred to as a maximum width position. The maximum width position is a position at which the tire 202 indicates a maximum width.

In FIG. 6, a position indicated by a reference numeral PT is a toe of the tire 202. The toe PT is a boundary between an outer surface 202G and an inner surface 202N of the tire 202.

The tire 202 includes a tread 204, a pair of sidewalls 206, a pair of clinches 208, a pair of beads 210, a carcass 212, a belt 214, a band 216, and an inner liner 218.

The tread 204 is in contact with a road surface on a tread surface 220. The tread 204 includes the tread surface 220 that is in contact with the road surface. A groove 222 is carved in the tread 204. The tread 204 is positioned radially outside the carcass 212, which will be described below.

The tread surface 220 is a part of the outer surface 202G of the tire 202. A side surface 224 is continuous with the tread surface 220. The outer surface 202G of the tire 202 includes the tread surface 220 and a pair of side surfaces 224.

The tread surface 220 includes the equator PC, and each of the side surfaces 224 includes a maximum width position PW.

The tread 204 includes a cap portion 226 and a base portion 228. The cap portion 226 includes the tread surface 220. The cap portion 226 is made of the crosslinked rubber in which the abrasion resistance and the grip performance are taken into consideration. The base portion 228 is positioned radially inside the cap portion 226. The base portion 228 is entirely covered with the cap portion 226. The base portion 228 is made of the crosslinked rubber having a low heat generation property.

Each of the sidewalls 206 is continuous with the tread 204. The sidewall 206 is positioned radially inside the tread 204. The sidewall 206 is positioned axially outside the carcass 212. The sidewall 206 is made of the crosslinked rubber in consideration of the cut resistance. The sidewall 206 forms a part of the side surface 224.

Each of the clinches 208 is positioned radially inside the sidewall 206. The clinch 208 comes into contact with the rim R. The clinch 208 is made of the crosslinked rubber in which the abrasion resistance is taken into consideration. The clinch 208 forms a part of the sidewall portion.

Each of the beads 210 is positioned axially inside the clinch 208. The bead 210 is positioned radially inside the sidewall 206.

The bead 210 includes a core 230 and an apex 232. The core 230 extends in the circumferential direction. Although not shown, the core 230 includes a wire made of steel. The apex 232 is positioned radially outside the core 230. The apex 232 is tapered radially outward. The apex 232 is made of the crosslinked rubber having high stiffness.

The carcass 212 is positioned inside the tread 204, the pair of sidewalls 206, and the pair of clinches 208. The carcass 212 bridges between the pair of beads 210, that is, between a first bead 210 and a second bead 210 (not shown). The carcass 212 includes at least one carcass ply 234.

The carcass 212 of the tire 202 is formed by one carcass ply 234. Although not shown, the carcass ply 234 includes a large number of carcass cords arranged in parallel. These carcass cords intersect with the equatorial plane. The carcass 212 of the tire 202 has a radial structure. In the tire 202, a cord made of an organic fiber is used as the carcass cord. Examples of the organic fiber include a nylon fiber, a rayon fiber, a polyester fiber, and an aramid fiber.

The carcass ply 234 includes a ply main body 234a and a pair of folded-back portions 234b. The ply main body 234a bridges between the pair of beads 210. Each of the folded-back portions 234b is continuous with the ply main body 234a, and is folded back from the inner side to the outer side in the axial direction by each of the beads 210. In the tire 202, an end of the folded-back portion 234b is positioned radially outside the maximum width position PW. An end of the folded-back portion 234b may be positioned radially inside the maximum width position PW.

The belt 214 is positioned radially inside the tread 204. The belt 214 is laminated on the carcass 212. The equatorial plane described above intersects with the belt 214 at the center of an axial width of the belt 214.

In the tire 202, the axial width of the belt 214 is 70% or more and 90% or less of the cross-sectional width of the tire 202.

The belt 214 includes a first layer 236 and a second layer 238. The first layer 236 is positioned radially outside the ply main body 234a, and is laminated on the ply main body 234a. The second layer 238 is positioned radially outside the first layer 236, and is laminated on the first layer 236.

As shown in FIG. 6, an end of the second layer 238 is positioned axially inside an end of the first layer 236. The second layer 238 is narrower than the first layer 236. A length from the end of the second layer 238 to the end of the first layer 236 is 3 mm or more and 10 mm or less. The axial width of the belt 214 is represented by the axial width of the wide first layer 236.

Although not shown, each of the first layer 236 and the second layer 238 includes a large number of belt cords arranged in parallel. These belt cords are covered with topping rubber. Each of the belt cords is inclined with respect to the equatorial plane. A material of the belt cord is steel.

The band 216 is positioned between the carcass 212 and the tread 204 in the radial direction. The band 216 is laminated on the belt 214 inside the tread 204.

An end of the band 216 is positioned axially outside an end of the belt 214. A length from the end of the belt 214 to the end of the band 216 is 3 mm or more and 7 mm or The equatorial plane described above intersects with the band 216 at the center of an axial width of the band 216. Both ends of the band 216 are disposed to face each other with the equatorial plane interposed therebetween. The band 216 bridges between a first end and a second end. The band 216 is a full band. In the tire 202, a pair of edge bands that cover the ends of the band 216 and are disposed axially apart from each other may be further provided.

Although not shown, the band 216 includes a band cord spirally wound. The band cord is covered with topping rubber. In band 216, the band cord extends substantially in the circumferential direction. In detail, an angle formed by the band cord with respect to the circumferential direction is 5° or less. The band 216 has a jointless structure. A cord made of an organic fiber is used as the band cord. Examples of the organic fiber include a nylon fiber, a rayon fiber, a polyester fiber, and an aramid fiber.

The inner liner 218 is positioned inside the carcass 212. The inner liner 218 forms the inner surface 202N of the tire 202. The inner liner 218 is made of the crosslinked rubber having an excellent air shielding property. The inner liner 218 retains the internal pressure of the tire 202.

Figure 7:
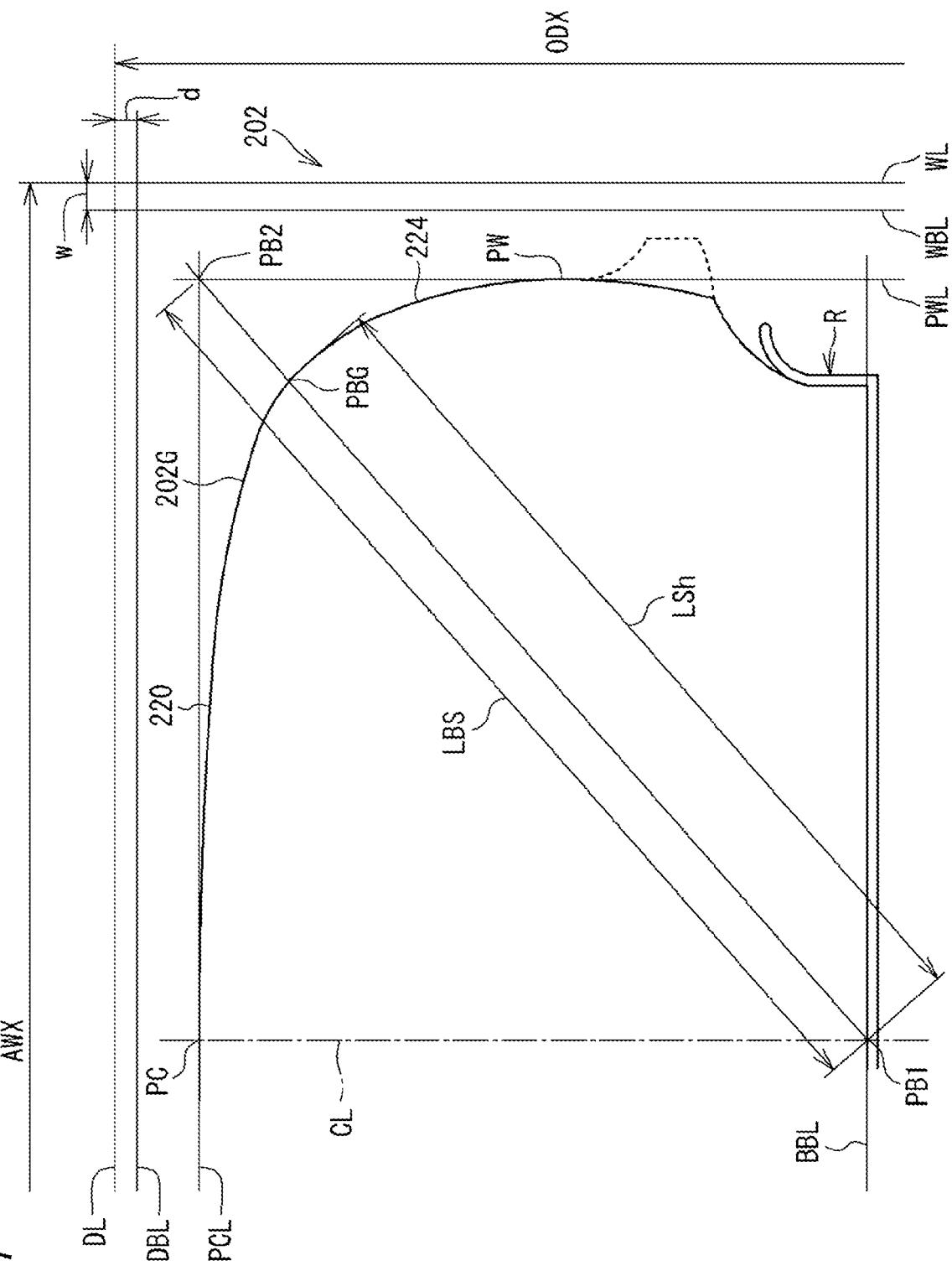
FIG. 7 is a cross-sectional view for describing a reference line segment and a shoulder line segment.

FIG. 7 schematically shows the meridional cross section of the tire 202. FIG. 7 shows a contour line of the outer surface 202G. The contour line is represented by a virtual outer surface obtained on the assumption that there is no decoration, such as a groove, a pattern, or a character. A dotted line in FIG. 7 is a rim protector as an example of the decoration.

Although not described in detail, in the present invention, the contour line of the outer surface 202G is obtained by measuring an outer surface shape of the tire 202 in the normal state by using, for example, a displacement sensor.

In FIG. 7, a length represented by a reference numeral ODX is an outer diameter maximum value of new product dimensions defined in the JATMA standard. A solid line DL extending in the axial direction is a dimension line indicating the outer diameter maximum value ODX. In a case where the designation of the tire 202 is "195/65R15", the outer diameter maximum value ODX of the new product dimensions is 643 mm.

In FIG. 7, a straight line DBL extending in the axial direction is an outer diameter reference line indicating an outer diameter that is smaller than the outer diameter maximum value ODX of the new product dimensions by 4 mm. A bidirectional arrow d is a radial distance from the dimension line DL to the outer diameter reference line DBL. In the present invention, the radial distance d is 2.0 mm. In a case where the designation of the tire 202 is "195/65R15", the radial distance from a first outer diameter reference line DBL to a second outer diameter reference line DBL (not shown) is 639 mm.

As the outer diameter maximum value ODX, an outer diameter maximum value of the new product dimensions defined in the ETRTO standard may be used.

In FIG. 7, a length represented by a reference numeral AWX is a maximum total width of the new product dimensions defined in the JATMA standard. A solid line WL extending in the radial direction is a dimension line indicating the maximum total width AWX. In a case where the designation of the tire 202 is "195/65R15", the maximum total width of the new product dimensions is 209 mm.

In FIG. 7, a straight line WBL extending in the radial direction is a total width reference line indicating a total width that is smaller than the maximum total width AWX of the new product dimensions by 5 mm. A bidirectional arrow w is an axial distance from the dimension line WL to the total width reference line WBL. In the present invention, the axial distance w is 2.5 mm. In a case where the designation of the tire 202 is "195/65R15", an axial distance from a first total width reference line WBL to a second total width reference line WBL (not shown) is 204 mm.

As the maximum total width AWX, a maximum total width of the new product dimensions defined in the ETRTO standard may be used.

The tire 202 is entirely within a region surrounded by the first outer diameter reference line DBL and the second outer diameter reference line DBL, and the first total width reference line WBL and the second total width reference line WBL. Stated another way, the tire 202 has an outer diameter smaller than a value obtained by subtracting 4 mm from the outer diameter maximum value of the new product dimensions defined by the JATMA standard or the ETRTO standard, and has a total width smaller than a value obtained by subtracting 5 mm from the maximum total width of the new product dimensions.

As described above, the outer surface 202G of the tire 202 includes the tread surface 220 that is in contact with the road surface, and the pair of side surfaces 224 that are continuous with the tread surface 220. The tread surface 220 includes the equator PC, and each of the side surfaces 224 includes the maximum width position PW.

In FIG. 7, a position indicated by a reference numeral PB1 is an intersection point of the bead baseline and the equatorial plane. In the present invention, the intersection point PB1 is a first reference point.

In FIG. 7, a solid line PCL is a straight line passing through the equator PC and extending in the axial direction. A solid line PWL is a straight line passing through the maximum width position PW and extending in the radial direction. A position indicated by a reference numeral PB2 is an intersection point of the straight line PCL and the straight line PWL. In the present invention, the intersection point PB2 is a second reference point. A line segment connecting the first reference point PB1 and the second reference point PB2 is a reference line segment, and a length indicated by a reference numeral LBS in FIG. 7 is a length of the reference line segment.

In FIG. 7, a reference numeral PBG is an intersection point of the reference line segment and the outer surface 202G. In the present invention, the intersection point PBG is a shoulder reference point. A line segment connecting the first reference point PB1 and the shoulder reference point PBG is the shoulder line segment, and a length indicated by a reference numeral LSh in FIG. 7 is a length of the shoulder line segment.

In the present invention, a distance from the outer surface 202G of the tire 202 to the wheel house (not shown), which is measured along a straight line passing through the first reference point PB1 and the second reference point PB2, is a clearance G formed between a tire T and a wheel house H of a vehicle B shown in FIG. 40. In a case where the clearance G is less than 22 mm, the tire 202 interferes with the wheel house. Stated another way, the interference limit clearance amount in the vehicle is 22 mm.

Figure 8:
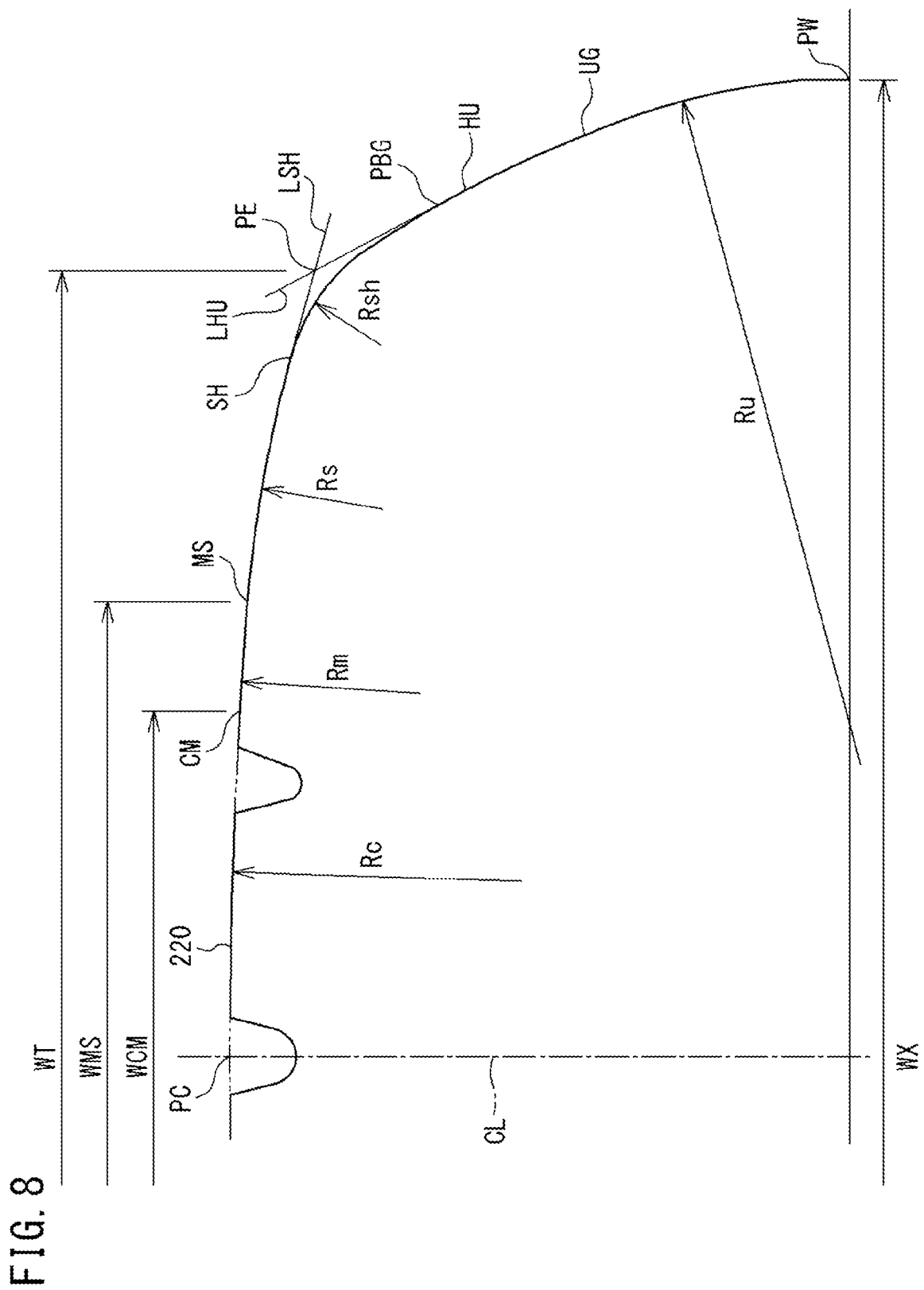
FIG. 8 is a cross-sectional view for describing a contour line of a tread surface.

FIG. 8 shows a part of the contour line of the outer surface 202G of the tire 202 in the meridional cross section.

In the meridional cross section, the contour line of the tread surface 220 is formed by a plurality of arcs arranged in the axial direction. Stated another way, the contour line of the tread surface 220 includes a plurality of arcs arranged in the axial direction.

Among the plurality of arcs, an arc positioned at the center in the axial direction is a center arc. In FIG. 8, an arrow indicated by a reference numeral Rc is a radius of the center arc. The center arc passes through the equator PC. The center of the center arc is positioned on the equatorial plane.

Among the plurality of arcs, an arc positioned on an outer side in the axial direction is a shoulder arc. In FIG. 8, an arrow indicated by a reference numeral Rsh is a radius of the shoulder arc. The shoulder arc has the smallest radius Rsh among the plurality of arcs forming the contour line of the tread surface 220.

The contour line of the tread surface 220 of the tire 202 includes two arcs between the center arc and the shoulder arc. Among these two arcs, an arc positioned on the center arc side is a middle arc, and an arc positioned on the shoulder arc side is a side arc. In FIG. 8, an arrow indicated by a reference numeral Rm is a radius of the middle arc, and an arrow indicated by a reference numeral Rs is a radius of the side arc. The radius Rm of the middle arc is smaller than the radius Rc of the center arc. The radius Rs of the side arc is smaller than the radius Rm of the middle arc.

In the tire 202, the plurality of arcs forming the contour line of the tread surface 220 include the center arc that is an arc passing through the equator PC, a pair of shoulder arcs that are arcs each of which is positioned on an outermost side in the axial direction and has the smallest radius Rsh, a pair of middle arcs that are arcs each of which is positioned adjacent to the center arc and has the radius Rm smaller than the radius Rc of the center arc, and a pair of side arcs each of which is positioned between the middle arc and the shoulder arc and has the radius Rs smaller than the radius Rm of the middle arc. Specifically, the plurality of arcs includes the center arc, the pair of middle arcs, the pair of side arcs, and the pair of shoulder arcs.

In FIG. 8, a position indicated by a reference numeral CM is a boundary between the center arc and the middle arc. The middle arc is in contact with the center arc at the boundary CM. A position indicated by a reference numeral MS is a boundary between the middle arc and the side arc. The side arc is in contact with the middle arc at the boundary MS. A position indicated by a reference numeral SH is a boundary between the side arc and the shoulder arc. The shoulder arc is in contact with the side arc at the boundary SH. A position indicated by a reference numeral HU is a boundary between the shoulder arc and a contour line of the side surface 224. The contour line of the side surface 224 is in contact with the shoulder arc at the boundary HU.

In the tire 202, the boundary HU is positioned radially inside the shoulder reference point PBG. The boundary HU may be positioned radially outside the shoulder reference point PBG, or the position of the boundary HU may match the position of the shoulder reference point PBG.

In FIG. 8, a length represented by a reference numeral WCM is an axial distance from a first boundary CM to a second boundary CM. The center of the axial distance WCM matches a position of the equatorial plane. A length represented by a reference numeral WMS is an axial distance from a first boundary MS to a second boundary MS. The center of the axial distance WSM matches a position of the equatorial plane. A length represented by a reference numeral WX is the cross-sectional width of the tire 202.

In this tire 202, a ratio (WCM/WX) of the axial distance WCM to the cross-sectional width WX is preferably 25% or more and 40% or less. A ratio (WMS/WX) of the axial distance WMS to the cross-sectional width WX is preferably 45% or more and 60% or less.

In FIG. 8, a straight line LSH is a tangent line in contact with the shoulder arc at the boundary SH. A straight line LHU is a tangent line in contact with the shoulder arc at the boundary HU. A reference numeral PE is an intersection point of the tangent line LSH and the tangent line LHU. In the present invention, the intersection point PE is a reference end of the tread 204. A length represented by a reference numeral WT is an axial distance from a first reference end PE to a second reference end PE. In the present invention, the axial distance WT is a width of the tread 204.

In this tire 202, a ratio (WT/WX) of the width WT of the tread 204 to the cross-sectional width WX is preferably 75% or more and 92% or less.

The contour line of the side surface 224 includes at least one arc. The contour line of the side surface 224 includes an upper arc. The upper arc is an arc including the maximum width position PW and extending from the maximum width position PW toward the shoulder reference point PBG. The upper arc is an outwardly convex arc, and the center of the upper arc is positioned on a straight line passing through the maximum width position PW and extending in the axial direction. In FIG. 8, a position indicated by a reference numeral UG is an outer end of the upper arc.

Figure 9:
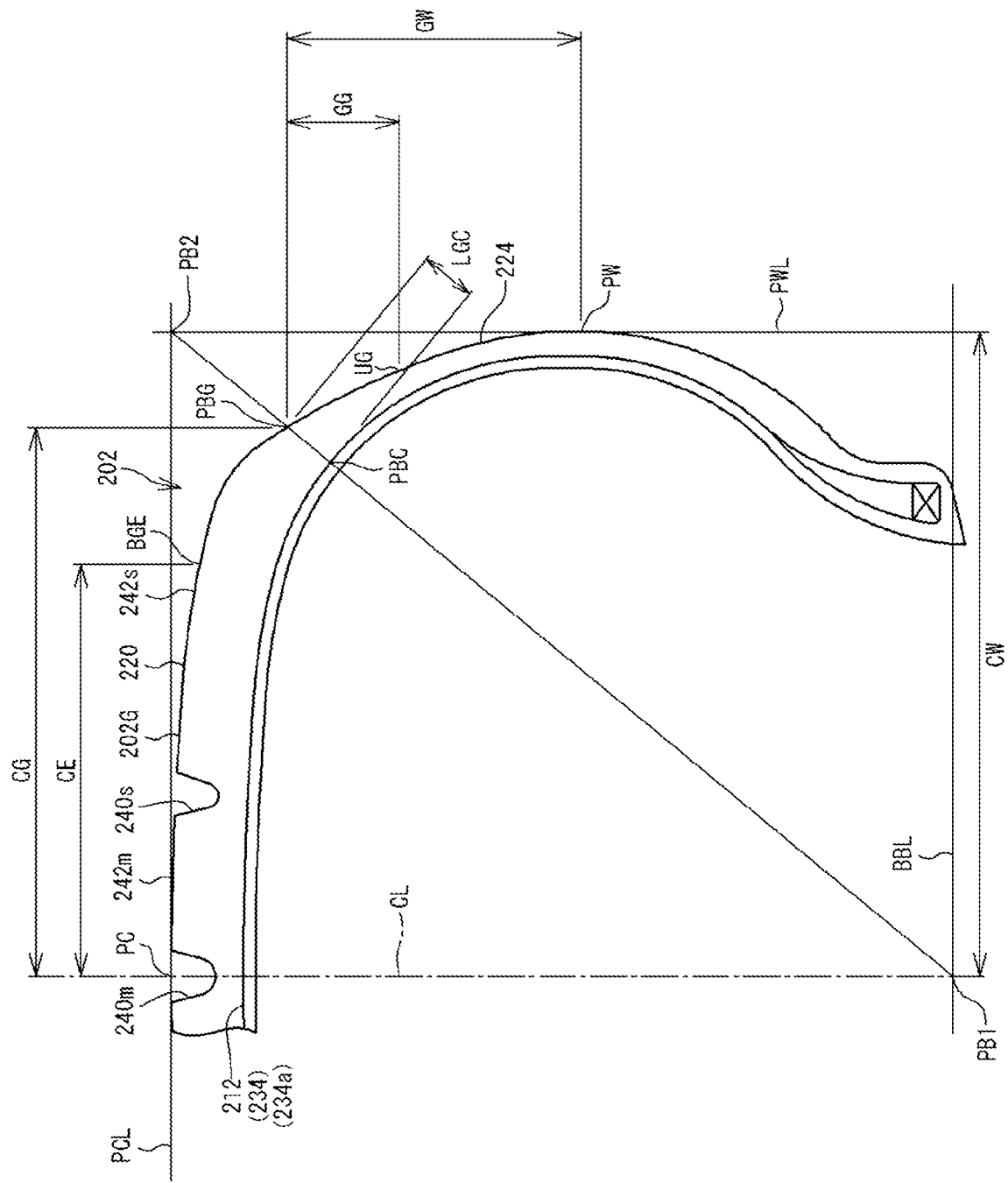
FIG. 9 is a cross-sectional view for describing dimensions of each portion of the tire.

FIG. 9 shows a contour line of the carcass 212 in the meridional cross section of FIG. 6, together with the straight line PCL, the straight line PWL, and the reference line segment in FIG. 7. In the tire 202, the contour line of the carcass 212 is represented by a contour line of an outer surface of the ply main body 234a. In a case where the outer surface of the ply main body 234a cannot be specified, the contour line of the carcass 212 is represented by the carcass cord included in the ply main body 234a.

In FIG. 9, a reference numeral PBC is an intersection point of the reference line segment (or shoulder reference line segment) and the contour line of the carcass 212. A length represented by a reference numeral LGC is a length of a line segment connecting the intersection point PBC and the shoulder reference point PBG. The length LGC is measured along the reference line segment (or shoulder reference line segment). In the present invention, the length LGC is a length of the shoulder line segment from the carcass 212 to the shoulder reference point PBG.

In the tire 202, a ratio (LSh/LBS) of the length LSh of the shoulder line segment to the length LBS of the reference line segment is 85.9% or more and 89.3% or less in the normal state.

Since the ratio (LSh/LBS) is 89.3% or less, the tire 202 is appropriately disposed apart from the wheel house. In the tire 202, the interference with the wheel house is prevented. Since the protruding of the shoulder portion is appropriately maintained, the occurrence of the uneven abrasion is effectively suppressed.

In the tire in the related art, the ratio (LSh/LBS) is less than 85.9%. On the contrary, in the tire 202, the ratio (LSh/LBS) is 85.9% or more, and the percentage of the shoulder line segment occupied in the reference line segment is larger as compared with the tire in the related art. In the tire 202, the clearance G close to the interference limit clearance amount is formed. Stated another way, in the tire 202, the clearance G can be reduced. Since the clearance G is reduced, the sense of unity between the vehicle and the tire 202 is enhanced. The enhancement in the sense of unity can contribute to the improvement in the visual aspect.

Increasing the ratio (LSh/LBS) in the tire involves the modification of the contour line of the tread surface. Specifically, the contour line of the tread surface is modified such that the shoulder portion has an angular shape. In this case, in a case where the contour line of the tread surface is simply modified, the shoulder portion protrudes, and the volume of the shoulder portion is increased. The increase in the volume increases the mass of the tire.

However, in the tire 202, a distance between the contour line of the carcass 212 (also referred to as the carcass line) and the contour line of the tread surface 220, in other words, a length from the carcass 212 to the outer surface of the tire 202 is controlled. Specifically, a ratio (LGC/LSh) of the length LGC of the shoulder line segment from the carcass 212 to the shoulder reference point PBG to the length LSh of the shoulder line segment is 6% or more and 12% or less.

Since the ratio (LGC/LSh) is 6% or more, when the tire 202 is inflated the carcass line can maintain the natural equilibrium shape. A uniform tension acts on the carcass 212. The deformation of the tire 202 is suppressed to a small extent. The tire 202 can maintain good uneven abrasion resistance. From this point of view, the ratio (LGC/LSh) is preferably 7% or more, and more preferably 8% or more.

The ratio (LGC/LSh) is 12% or less, so that the volume of the rubber in the shoulder portion is appropriately maintained. Since the increase in the volume of the shoulder portion is suppressed, the increase in the mass of a tire 202 is suppressed even in a case where the contour line of the tread surface 220 is modified to improve the visual aspect and the shoulder portion is arranged to an angular shape. From this point of view, the ratio (LGC/LSh) is preferably 11% or less, and more preferably 10% or less.

In the tire 202, the ratio (LSh/LBS) is 85.9% or more and 89.3% or less, and the ratio (LGC/LSh) is 6% or more and 12% or less.

The tire 202 can achieve the improvement in the visual aspect while suppressing the increase in the mass. Also, good uneven abrasion resistance is also maintained in the tire 202.

Figure 10:
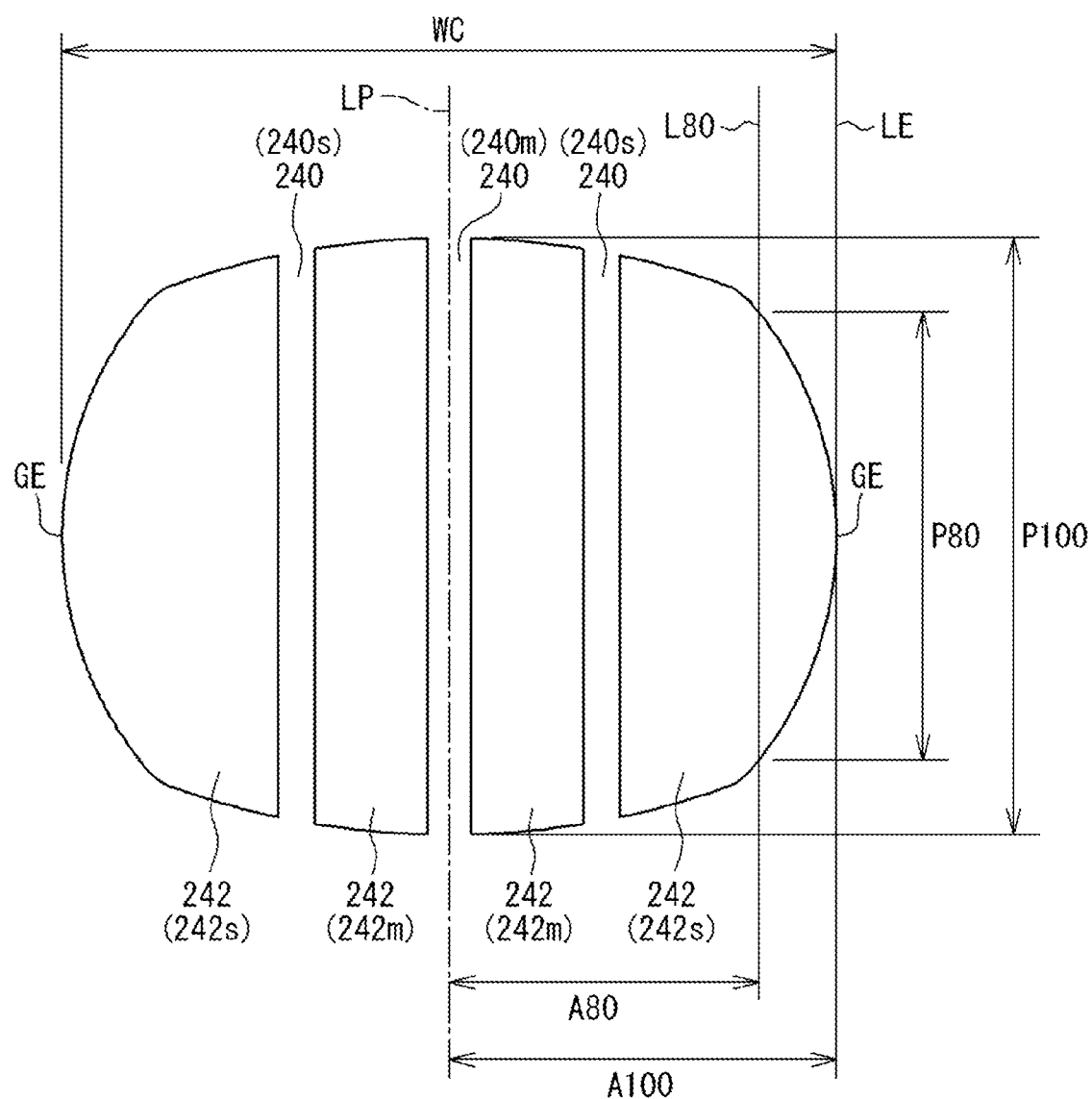
FIG. 10 is a schematic view showing a ground contact surface shape of the tire.

FIG. 10 shows a ground contact surface shape of the tire 202. In FIG. 10, a left-right direction corresponds to the axial direction of the tire 202. An up-down direction corresponds to the circumferential direction of the tire 202.

As described above, the groove 222 is carved in the tread 204. The groove 222 includes a groove (hereinafter, a circumferential groove 240) extending in the circumferential direction. In the tire 202, three circumferential grooves 240 are carved in the tread 204, and four land portions 242 are formed.

Among the three circumferential grooves 240, the circumferential groove 240 positioned on an outer side in the axial direction is a shoulder circumferential groove 240s. The circumferential groove 240 positioned axially inside the shoulder circumferential groove 240s is a middle circumferential groove 240m. The middle circumferential groove 240m of the tire 202 is positioned on the equatorial plane.

Among the four land portions 242, the land portion 242 positioned on an outer side in the axial direction is a shoulder land portion 242s. The land portion 242 positioned axially inside the shoulder land portion 242s is a middle land portion 242m.

The ground contact surface is obtained by applying a predetermined load to the tire 202 in the normal state by using a tire ground contact surface shape measurement device (not shown) and bringing the tire 202 into contact with the plane. By tracing the contour of each of the land portions 242 included in the ground contact surface, the ground contact surface shape shown in FIG. 10 is obtained. In a case of obtaining the ground contact surface, the tire 202 is disposed such that the axial direction of the tire 202 is parallel to the road surface. The load described above is applied to the tire 202 in a direction perpendicular to the road surface.

In FIG. 10, a position indicated by a reference numeral GE is an axially outer end (also referred to as a ground contact end) of the ground contact surface. A length represented by a reference numeral WC is an axial distance (also referred to as a ground contact width) from a first axially outer end GE to a second axially outer end GE of the ground contact surface.

In the present invention, the axially outer end GE of the ground contact surface of the tire 202, which is obtained by applying a load of 70% of the normal load to the tire 202 in the normal state and bringing the tire 202 into contact with the plane, is a reference ground contact end, and the axial distance WC is a reference ground contact width. The position of the outer surface 202G of the tire 202 corresponding to the reference ground contact end GE is a reference ground contact position.

In FIG. 9, a position indicated by a reference numeral BGE is the reference ground contact position described above. A length indicated by a bidirectional arrow CE is an axial distance from the equator PC to the reference ground contact position BGE. A length indicated by a bidirectional arrow CG is an axial distance from the equator PC to the shoulder reference point PBG. A length indicated by a bidirectional arrow CW is an axial distance from the equator PC to the maximum width position PW.

In this tire 202, in the normal state, a ratio (CE/CG) of the axial distance CE to the axial distance CG is preferably 79% or more and 86% or less.

By setting the ratio (CE/CG) to 79% or more, in the tire 202, the clearance G can be effectively reduced. The tire 202 can contribute to the improvement in the visual aspect. From this point of view, the ratio (CE/CG) is more preferably 80% or more, and still more preferably 81% or more.

By setting the ratio (CE/CG) to 86% or less, the reference ground contact position BGE is disposed at an appropriate distance from the shoulder reference point PBG. As a result, the local increase in the ground contact pressure in the shoulder portion (specifically, the shoulder land portion 242s) is suppressed. Good uneven abrasion resistance is maintained in the tire 202. Since the concentration of the distortion on the end portion of the belt 214 is suppressed, good durability is also maintained. From this point of view, the ratio (CE/CG) is more preferably 84% or less, and still more preferably 82% or less.

In this tire 202, in the normal state, a ratio (CW/CG) of the axial distance CW to the axial distance CG is preferably 1.07 or more and 1.13 or less.

By setting the ratio (CW/CG) to 1.07 or more, a change in the contour of the outer surface 202G between the shoulder reference point PBG and the maximum width position PW can be suppressed to a small extent. Since the occurrence of peculiar distortion in the sidewall portion is suppressed, good durability is maintained. From this point of view, the ratio (CW/CG) is more preferably 1.10 or more.

By setting the ratio (CW/CG) to 1.13 or less, the volume of the rubber in the sidewall portion is appropriately maintained. In the tire 202, the increase in the mass is suppressed. From this point of view, the ratio (CW/CG) is more preferably 1.12 or less.

In the tire 202, the boundary HU and the outer end UG are connected by a straight line. The straight line is in contact with the shoulder arc at the boundary HU and is in contact with the upper arc at the outer end UG. The position of the boundary HU and the position of the outer end UG may match each other. In this case, the upper arc is directly connected to the shoulder arc.

As the outer end UG of the upper arc is disposed apart from the shoulder reference point PBG, the volume of the rubber in a region from the shoulder reference point PBG to the maximum width position PW can be reduced. The reduction of the volume of the rubber contributes to the weight saving of the tire 202. From the point of view that the outer end UG can be disposed apart from the shoulder reference point PBG, it is preferable that the boundary HU and the outer end UG are connected by the straight line in the contour line of the outer surface 202G.

In FIG. 9, a length represented by a reference numeral GW is a radial distance from the shoulder reference point PBG to the maximum width position PW. A length represented by a reference numeral GG is a radial distance from the shoulder reference point PBG to the outer end UG of the upper arc.

In this tire 202, in the normal state, a ratio (GG/GW) of the axial distance GG to the axial distance GW is preferably 50% or more and 60% or less.

By setting the ratio (GG/GW) to 50% or more, in the tire 202, the volume of the rubber in the region from the shoulder reference point PBG to the maximum width position PW can be reduced. In the tire 202, the increase in the mass is suppressed. From this point of view, the ratio (GG/GW) is more preferably 55% or more.

By setting the ratio (GG/GW) to 60% or less, the outer end UG is disposed at an appropriate distance from the shoulder reference point PBG. Since the occurrence of peculiar distortion in the sidewall portion is suppressed, good durability is maintained. From this point of view, the ratio (GG/GW) is more preferably 57% or less.

Increasing the ratio (LSh/LBS) in the tire involves the modification of the contour line of the tread surface 220. Therefore, the ground contact pressure of the shoulder portion is increased, and there is a concern that the uneven abrasion occurs. In order to continue to use the tire 202, which has achieved the improvement in the visual aspect while suppressing the increase in the rolling resistance, in the same manner as the tire in the related art, it is necessary to arrange the contour line of the tread surface 220 in consideration of the influence on the uneven abrasion resistance.

In this tire 202, a ratio (Rc/Rm) of the radius Rc of the center arc to the radius Rm of the middle arc is preferably 1.85 or more and 2.00 or less.

By setting the ratio (Rc/Rm) to 1.85 or more, a difference between the radius Rc of the center arc and the radius Rs of the side arc positioned adjacent to the middle arc can be suppressed to a small extent. Since the slippage of the shoulder portion is effectively suppressed, the occurrence of the uneven abrasion is suppressed. Good uneven abrasion resistance is obtained in the tire 202. From this point of view, the ratio (Rc/Rm) is more preferably 1.90 or more.

By setting the ratio (Rc/Rm) to 2.00 or less, the side arc can be formed by an arc having a larger radius Rs. The tread surface 220 can be made closer to a flat surface. The tread surface 220 of the tire 202 can effectively contribute to the formation of the clearance G that is close to the interference limit clearance amount. In the tire 202, the clearance G can be reduced. From this point of view, the ratio (Rc/Rm) is more preferably 1.95 or less.

In this tire 202, a ratio (Rm/Rs) of the radius Rm of the middle arc to the radius Rs of the side arc is preferably 2.08 or more and 2.74 or less.

By setting the ratio (Rm/Rs) to 2.08 or more, the tread surface 220 is formed, which can effectively contribute to the formation of the clearance G that is close to the interference limit clearance amount in consideration of the interference with the wheel house. The tire 202 can effectively enhance the sense of unity with the vehicle. From this point of view, the ratio (Rm/Rs) is more preferably 2.30 or more.

By setting the ratio (Rm/Rs) to 2.74 or less, a difference between the radius Rc of the center arc positioned adjacent to the middle arc and the radius Rs of the side arc can be suppressed to a small extent. Since the slippage of the shoulder portion is effectively suppressed, the occurrence of the uneven abrasion is suppressed. Good uneven abrasion resistance is obtained in the tire 202. From this point of view, the ratio (Rm/Rs) is more preferably 2.50 or less.

In the tire 202, a ratio (Rc/WT) of the radius Rc of the center arc to the width WT of the tread 204 is preferably 3.90 or more and 4.30 or less.

By setting the ratio (Rc/WT) to 3.90 or more, the tread surface 220 can be made closer to a flat surface. The tread surface 220 of the tire 202 can effectively contribute to the formation of the clearance G that is close to the interference limit clearance amount. In the tire 202, the clearance G can be reduced. From this point of view, the ratio (Rc/WT) is more preferably 3.95 or more, and still more preferably 4.00 or more.

By setting the ratio (Rc/WT) to 4.30 or less, the interference between the tire 202 and the wheel house is suppressed. Since the slippage of the shoulder portion is effectively suppressed, the occurrence of the uneven abrasion is suppressed. From this point of view, the ratio (Rc/WT) is more preferably 4.25 or less, and still more preferably 4.20 or less.

In the tire 202, a ratio (Ru/WT) of the radius Ru of the upper arc to the width WT of the tread 204 is preferably 0.38 or more and 0.44 or less.

By setting the ratio (Ru/WT) to 0.38 or more, the tread surface 220 can be made closer to a flat surface. The tread surface 220 of the tire 202 can effectively contribute to the formation of the clearance G that is close to the interference limit clearance amount. In the tire 202, the clearance G can be reduced. From this point of view, the ratio (Ru/WT) is more preferably 0.39 or more, and still more preferably 0.40 or more.

By setting the ratio (Ru/WT) to 0.44 or less, it is possible to suppress the interference of the tire 202 with the wheel house. Since the slippage of the shoulder portion is effectively suppressed, the occurrence of the uneven abrasion is suppressed. From this point of view, the ratio (Rc/WT) is more preferably 0.43 or less, and still more preferably 0.42 or less.

In FIG. 10, a one-point chain line LP is a straight line corresponding to the equator PC of the tire 202 on the ground contact surface. In a case where it is difficult to specify the equator PC on the ground contact surface, an axial center line of the ground contact width WC is used as the straight line corresponding to the equator PC. A bidirectional arrow P100 is a length of an intersection line between the plane including the straight line LP and the ground contact surface. In the tire 202, the length P100 of the intersection line is an equatorial contact length which is measured along the equator PC on the ground contact surface.

In FIG. 10, a solid line LE is a straight line passing through the axially outer end GE of the ground contact surface and being parallel to the straight line LP. A solid line L80 is a straight line that is positioned between the straight line LE and the straight line LP and is parallel to the straight line LE and the straight line LP. A bidirectional arrow A100 represents an axial distance from the straight line LP to the straight line LE. The distance A100 corresponds to half of the ground contact width WC. The bidirectional arrow A80 represents an axial distance from the straight line LP to the straight line L80. In FIG. 10, a ratio of the distance A80 to the distance A100 is set to 80%. In other words, the straight line L80 represents a position corresponding to a width of 80% of the ground contact width WC of the ground contact surface. A bidirectional arrow P80 is a length of an intersection line between the plane including the straight line L80 and the ground contact surface. In the tire 202, the length P80 of the intersection line is a reference ground contact length at the position corresponding to the width of 80% of the ground contact width on the ground contact surface.

In the tire 202, the equatorial contact length P100 and the reference ground contact length P80 are specified on the ground contact surface shown in FIG. 10, and a shape index F represented by a ratio (P100/P80) of the equatorial contact length P100 to the reference ground contact length P80 is obtained.

In this tire 202, the shape index F is preferably 1.05 or more and 1.35 or less.

By setting the shape index F to 1.05 or more, the slippage of the shoulder portion is effectively suppressed, and the occurrence of the uneven abrasion is suppressed.

By setting the shape index F to 1.35 or less, the ground contact surface having an appropriate size is formed. Since the local increase in the ground contact pressure is suppressed, the occurrence of the uneven abrasion is suppressed in this case as well.

In FIG. 6, a length indicated by a reference numeral TC is a thickness of the tread 204 at the end of the belt 214. The thickness TC is measured along a normal line (straight line LTC in FIG. 6) of the belt 214 at the end of the belt 214. The thickness TC is represented by a distance from the inner surface of the tread 204 to the outer surface 202G of the tire 202.

In this tire 202, a ratio (TC/LGC) of the thickness TC of the tread 204 to the length LGC of the shoulder line segment from the carcass 212 to the shoulder reference point PBG is preferably 0.90 or more and 1.10 or less.

By setting the ratio (TC/LGC) to 0.90 or more, in the tire 202, the clearance G can be effectively reduced. The tire 202 can contribute to the improvement in the visual aspect. From this point of view, the ratio (TC/LGC) is more preferably 0.95 or more.

By setting the ratio (TC/LGC) to 1.10 or less, the volume of the rubber in the shoulder portion is appropriately maintained. Since the increase in the volume of the shoulder portion is suppressed, the increase in the mass is suppressed in the tire 202. From this point of view, the ratio (TC/LGC) is preferably 1.05 or less.

As described above, the tire 202 can achieve the improvement in the visual aspect while suppressing the increase in the mass.

Outline of Third Embodiment of Present Invention

Configuration 1

A tire according to an aspect of the present invention is a tire having an outer diameter smaller than a value obtained by subtracting 4 mm from an outer diameter maximum value of new product dimensions defined by a JATMA standard or an ETRTO standard, and having a total width smaller than a value obtained by subtracting 5 mm from a maximum total width of the new product dimensions, the tire including a pair of beads, a carcass that bridges between the pair of beads, a tread that is positioned radially outside the carcass, a pair of sidewalls that are positioned axially outside the carcass, and a pair of clinches that are positioned radially inside the sidewall, in which a protrusion that protrudes outward from the outer surface of the tire and extends in a circumferential direction is provided at a boundary portion between the tread and the sidewall, the tire includes an outer surface including an equator that is an intersection point with an equatorial plane, and a maximum width position at which the tire indicates a maximum width, in a meridional cross section of the tire, an intersection point of a bead baseline and the equatorial plane is a first reference point, an intersection point of a straight line passing through the equator and extending in an axial direction and a straight line passing through the maximum width position and extending in a radial direction is a second reference point, a line segment connecting the first reference point and the second reference point is a reference line segment, an intersection point of the reference line segment and the outer surface of the tire is a shoulder reference point, and a line segment connecting the first reference point and the shoulder reference point is a shoulder line segment, the outer surface of the tire includes a serration region between the shoulder reference point and the maximum width position, the serration region includes a plurality of narrow grooves that extend in the circumferential direction, and a ridge that is positioned between the narrow grooves adjacent to each other, the serration region is positioned radially inside the protrusion, and in a normal state in which the tire is assembled on a normal rim, the internal pressure of the tire is adjusted to a normal internal pressure, and no load is applied to the tire, a ratio of a length of the shoulder line segment to a length of the reference line segment is 85.9% or more and 89.3% or less, and a total of a height of the protrusion and a maximum depth of the narrow groove is 0.5 mm or more and 0.9 mm or less.

By arranging the tire in this way, in the tire, a clearance with the wheel house can be made close to an interference limit clearance amount. Since the clearance is reduced, the sense of unity between the vehicle and the tire is enhanced. The enhancement in the sense of unity can contribute to the improvement in the visual aspect. The air resistance is increased due to the shoulder portion having an angular shape, and a degree of the increase can be suppressed to a small extent in the tire.

The tire can achieve the improvement in the visual aspect while suppressing the increase in the air resistance.

Configuration 2

It is preferable that, in the tire according to Configuration 1, a ratio of a radial width of the serration region to a radial distance from the shoulder reference point to the maximum width position is 10% or more and 50% or less.

By arranging the tire in this way, the serration region can effectively contribute to the discharge of air in a vulcanization step. Since an appearance defect, such as bareness, is unlikely to occur on the outer surface of the tire, the tire can have a good appearance quality. Since the influence of the serration region on the flow of air is suppressed, the tire can effectively suppress the increase in the air resistance.

Configuration 3

It is preferable that, in the tire according to Configuration 1 or Configuration 2, a rim guard that protrudes outward from the outer surface of the tire and extends in the circumferential direction is provided at a boundary portion between the sidewall and the clinch, the rim guard includes a top surface, an outer inclined surface that is positioned radially outside the top surface and is continuous with an outer end of the top surface, and an inner inclined surface that is positioned radially inside the top surface and is continuous with an inner end of the top surface, and in the meridional cross section of the tire, an angle formed by a straight line passing through the outer end and the inner end of the top surface and a tangent line of the outer inclined surface at the outer end of the top surface is 10 degrees or more and 30 degrees or less.

By arranging the tire in this way, the rim guard is formed to protrude from the maximum width position by an appropriate amount. Even in a case where the tires are horizontally stacked in a state in which the tires are assembled on the rims, the interference between the rims is suppressed. Since the aerodynamic force is effectively controlled, the tire can effectively suppress the increase in the air resistance.

Configuration 4

It is preferable that, in the tire according to Configuration 3, the straight line passing through the outer end and the inner end of the top surface is parallel to the equatorial plane.

By arranging the tire in this way, the increase in the air resistance is more effectively suppressed.

Configuration 5

It is preferable that, in the tire according to Configuration 3 or Configuration 4, a length of the line segment connecting the outer end and the inner end of the top surface is a width of the top surface, and the width of the top surface is 4 mm or more and 6 mm or less.

By arranging the tire in this way, even in a case where the tires are horizontally stacked in a state in which the tires are assembled on the rims, the interference between the rims is suppressed. Since the influence of the rim guard on the aerodynamic force is suppressed, the tire can effectively suppress the increase in the air resistance.

Configuration 6

It is preferable that, in the tire according to any one of Configuration 3 to Configuration 5, an axial distance from a rim width baseline to the inner end of the top surface is 12 mm or more and 18 mm or less.

By arranging the tire in this way, even in a case where the tires are horizontally stacked in a state in which the tires are assembled on the rims, the interference between the rims is suppressed. Since the influence of the rim guard on the aerodynamic force is suppressed, the tire can effectively suppress the increase in the air resistance.

Details of Third Embodiment of Present Invention

Figure 11:
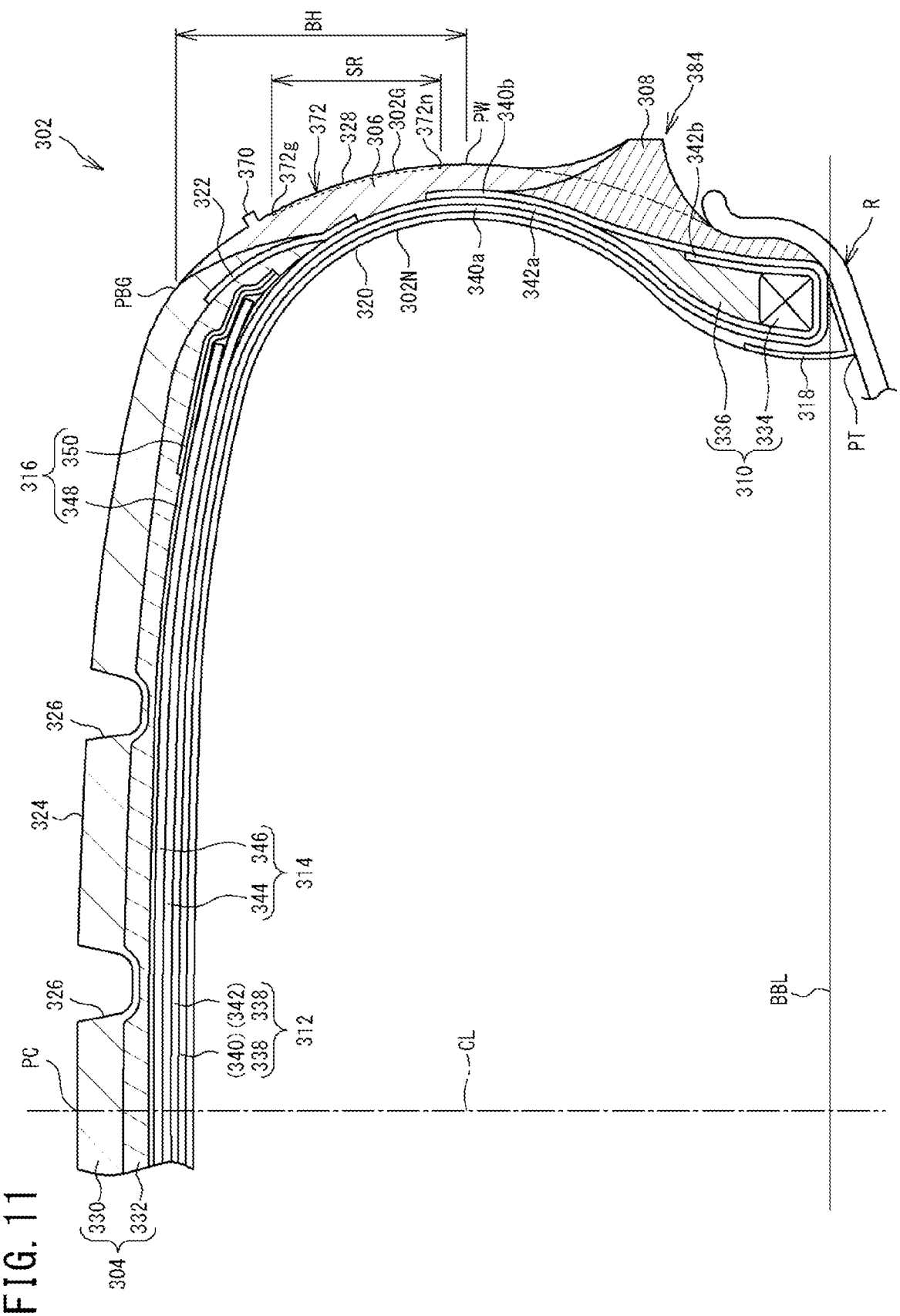
FIG. 11 is a cross-sectional view showing a part of a tire according to still another embodiment of the present invention.

FIG. 11 shows a part of a tire 302 according to the third embodiment. The tire 302 is a pneumatic tire for a passenger vehicle.

FIG. 11 shows a part of a cross section (hereinafter, a meridional cross section) of the tire 302 along a plane including a rotation axis of the tire 302. In FIG. 11, a left-right direction is an axial direction of the tire 302, and an up-down direction is a radial direction of the tire 302. A direction perpendicular to the paper surface in FIG. 11 is a circumferential direction of the tire 302. A one-point chain line CL represents an equatorial plane of the tire 302.

In FIG. 11, the tire 302 is assembled on a rim R (normal rim). An inside of the tire 302 is filled with air, and an internal pressure of the tire 302 is adjusted.

In FIG. 11, a solid line BBL extending in the axial direction is a bead baseline. The bead baseline is a line that defines a rim diameter (see JATMA or the like) of the rim R.

In FIG. 11, a position indicated by a reference numeral PC is an intersection point of an outer surface 302G (specifically, a tread surface which will be described below) of the tire 302 and the equatorial plane. The intersection point PC is an equator of the tire 302. In a case where a groove is positioned on the equatorial plane, the equator PC is specified based on a virtual outer surface obtained on the assumption that there is no groove. The equator PC is a radially outer end of the tire 302.

In FIG. 11, a position represented by a reference numeral PW is an axially outer end (hereinafter referred to as an outer end PW) of the tire 302. In a case where a decoration, such as a pattern or a character, is present on the outer surface, the outer end PW is specified based on a virtual outer surface obtained on the assumption that there is no decoration.

An axial distance from a first outer end PW to a second outer end PW obtained in the normal state is a cross-sectional width of the tire 302 (see JATMA or the like). The outer end PW is also referred to as a maximum width position. The maximum width position is a position at which the tire 302 indicates a maximum width.

In FIG. 11, a position indicated by a reference numeral PT is a toe of the tire 302. The toe PT is a boundary between an outer surface 302G and an inner surface 302N of the tire 302.

The tire 302 includes a tread 304, a pair of sidewalls 306, a pair of clinches 308, a pair of beads 310, a carcass 312, a belt 314, a band 316, a pair of chafers 318, an inner liner 320, and a pair of fixing layers 322.

The tread 304 is in contact with a road surface on a tread surface 324. The tread 304 includes the tread surface 324 that is in contact with the road surface. A groove 326 is carved in the tread 304. The tread 304 is positioned radially outside the carcass 312.

The tread surface 324 is a part of the outer surface 302G of the tire 302. A side surface 328 is continuous with the tread surface 324. The outer surface 302G of the tire 302 includes the tread surface 324 and a pair of side surfaces 328.

The tread surface 324 includes the equator PC, and each of the side surfaces 328 includes a maximum width position PW.

The outer surface 302G includes the equator PC and the maximum width position PW.

The tread 304 includes a cap portion 330 and a base portion 332. The cap portion 330 includes the tread surface 324. The cap portion 330 is made of the crosslinked rubber in which the abrasion resistance and the grip performance are taken into consideration. The base portion 332 is positioned radially inside the cap portion 330. The base portion 332 is entirely covered with the cap portion 330. The base portion 332 is made of the crosslinked rubber having a low heat generation property.

Each of the sidewalls 306 is continuous with the tread 304. The sidewall 306 is positioned radially inside the tread 304. The sidewall 306 is positioned axially outside the carcass 312. The sidewall 306 is made of the crosslinked rubber in consideration of the cut resistance. The sidewall 306 forms a part of the side surface 328.

Each of the clinches 308 is positioned radially inside the sidewall 306. The clinch 308 comes into contact with the rim R. The clinch 308 is made of the crosslinked rubber in which the abrasion resistance is taken into consideration. The clinch 308 forms a part of the sidewall portion.

Each of the beads 310 is positioned axially inside the clinch 308. The bead 310 is positioned radially inside the sidewall 306.

The bead 310 includes a core 334 and an apex 336. The core 334 extends in the circumferential direction. Although not shown, the core 334 includes a wire made of steel. The apex 336 is positioned radially outside the core 334. The apex 336 is tapered radially outward. The apex 336 is made of the crosslinked rubber having high stiffness.

The carcass 312 is positioned inside the tread 304, the pair of sidewalls 306, and the pair of clinches 308. The carcass 312 bridges between the pair of beads 310, that is, between a first bead 310 and a second bead 310 (not shown). The carcass 312 includes at least one carcass ply 338.

The carcass 312 of the tire 302 is formed by two carcass plies 338. Although not shown, each of the carcass plies 338 includes a large number of carcass cords arranged in parallel. These carcass cords intersect with the equatorial plane.

The carcass 312 of the tire 302 has a radial structure. In the tire 302, a cord made of an organic fiber is used as the carcass cord. Examples of the organic fiber include a nylon fiber, a rayon fiber, a polyester fiber, and an aramid fiber.

Among the two carcass plies 338, the carcass ply 338 positioned inside the tread 304 on an inner side in the radial direction is a first carcass ply 340. The carcass ply 338 positioned inside the tread 304 and radially outside the first carcass ply 340 is a second carcass ply 342.

The first carcass ply 340 includes a first ply main body 340a and a pair of first folded-back portions 340b. The first ply main body 340a bridges between the pair of beads 310. Each of the first folded-back portions 340b is continuous with the first ply main body 340a, and is folded back from the inner side to the outer side in the axial direction by each of the beads 310.

The second carcass ply 342 includes a second ply main body 342a and a pair of second folded-back portions 342b. The second ply main body 342a bridges between the pair of beads 310. Each of the second folded-back portions 342b is continuous with the second ply main body 342a, and is folded back from the inner side to the outer side in the axial direction by each of the beads 310.

In the tire 302, an end of the first folded-back portion 340b is positioned radially outside the maximum width position PW. An end of the second folded-back portion 342b is positioned radially inside the maximum width position PW. The end of the second folded-back portion 342b is positioned between an outer end of the apex 336 and the core 334 in the radial direction.

The second folded-back portion 342b is positioned axially inside the first folded-back portion 340b. The end of the second folded-back portion 342b is interposed between the apex 336 and the first folded-back portion 340b.

The belt 314 is positioned radially inside the tread 304. The belt 314 is laminated on the carcass 312. The equatorial plane described above intersects with the belt 314 at the center of an axial width of the belt 314.

In this tire 302, the axial width of the belt 314 is 70% or more and 90% or less of the cross-sectional width of the tire 302.

The belt 314 includes a first layer 344 and a second layer 346. The first layer 344 is positioned radially outside the second ply main body 342a, and is laminated on the second ply main body 342a. The second layer 346 is positioned radially outside the first layer 344, and is laminated on the first layer 344.

As shown in FIG. 11, an end of the second layer 346 is positioned axially inside an end of the first layer 344. The second layer 346 is narrower than the first layer 344. A length from the end of the second layer 346 to the end of the first layer 344 is 3 mm or more and 10 mm or less. The axial width of the belt 314 is represented by the axial width of the wide first layer 344.

Although not shown, each of the first layer 344 and the second layer 346 includes a large number of belt cords arranged in parallel. These belt cords are covered with topping rubber. Each of the belt cords is inclined with respect to the equatorial plane. A material of the belt cord is steel.

The band 316 is positioned between the tread 304 and the belt 314 in the radial direction. The band 316 is laminated on the belt 314.

An end of the band 316 is positioned axially outside an end of the belt 314. A length from the end of the belt 314 to the end of the band 316 is 3 mm or more and 7 mm or Although not shown, the band 316 includes a band cord spirally wound. The band cord is covered with topping rubber. The band cord extends substantially in the circumferential direction. In detail, an angle formed by the band cord with respect to the circumferential direction is 5° or less. The band 316 has a jointless structure.

The band cord is an organic fiber cord. Examples of the organic fiber include a nylon fiber, a rayon fiber, a polyester fiber, and an aramid fiber.

The band 316 includes a full band 348 and a pair of edge bands 350.

The full band 348 is laminated on the belt 314. The full band 348 covers the entire belt 314. Each end of the full band 348 is positioned axially outside the end of the belt 314.

The pair of edge bands 350 are disposed axially apart from each other with the equatorial plane interposed therebetween. Each of the edge bands 350 is laminated on the full band 348. The edge band 350 covers a portion of an end of the full band 348.

The band 316 may be formed by only the full band 348. The band 316 may be formed by only the pair of edge bands 350.

Each of the chafers 318 is positioned radially inside the bead 310. The chafer 318 comes into contact with the rim R. The chafer 318 of the tire 302 is made of a cloth and rubber impregnated in the cloth.

The inner liner 320 is positioned inside the carcass 312. The inner liner 320 forms the inner surface 302N of the tire 302. The inner liner 320 is made of the crosslinked rubber having an excellent air shielding property. The inner liner 320 retains the internal pressure of the tire 302.

The respective fixing layers 322 are disposed axially apart from each other. The fixing layer 322 is positioned axially outside the belt 314. An inner end of the fixing layer 322 is positioned between the cap portion 330 and the base portion 332. An outer end of the fixing layer 322 is positioned between the sidewall 306 and the carcass 312. The fixing layer 322 is made of the crosslinked rubber in which the adhesive force is taken into consideration.

Figure 12:
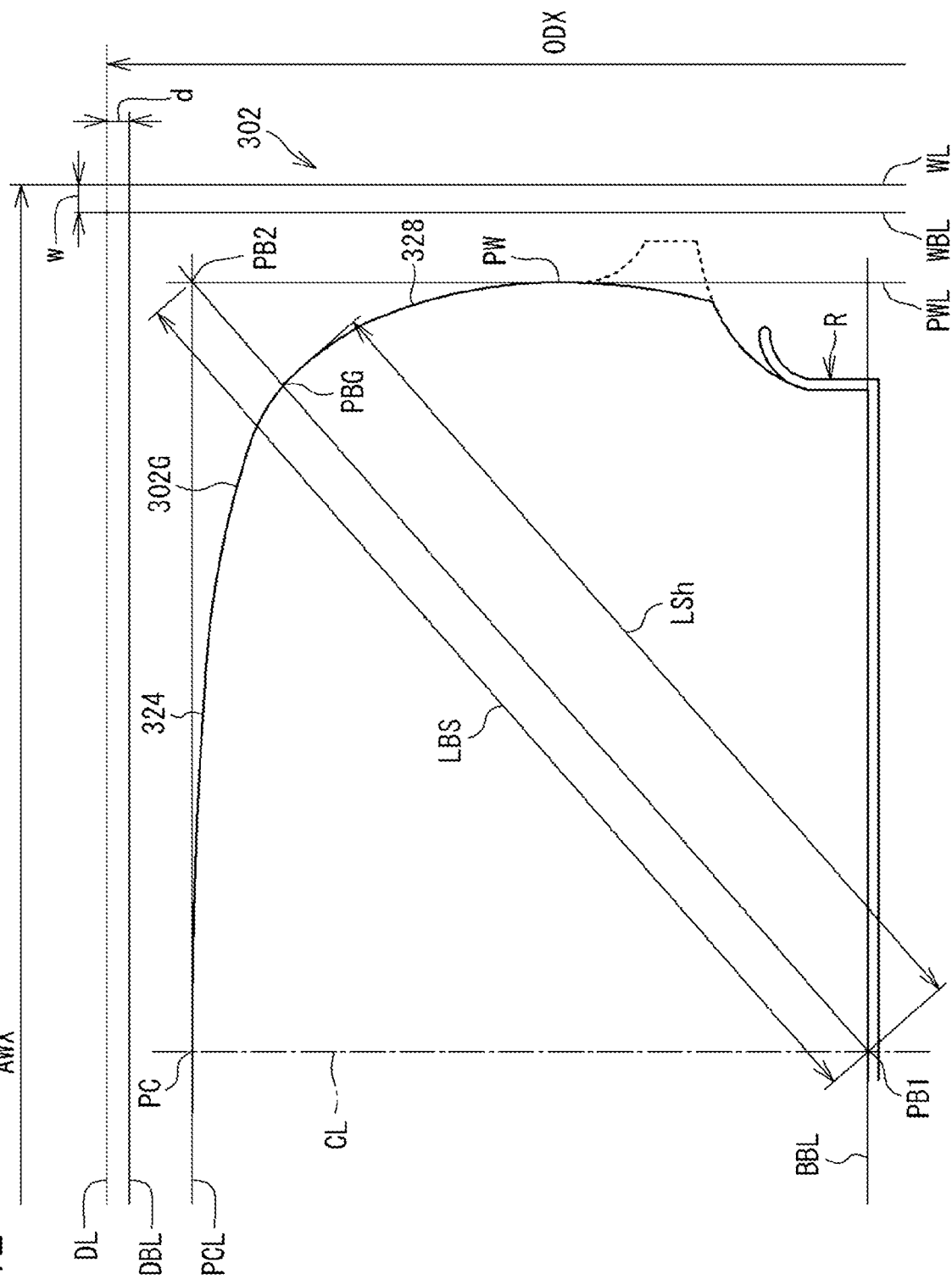
FIG. 12 is a cross-sectional view for describing a reference line segment and a shoulder line segment.

FIG. 12 schematically shows the meridional cross section of the tire 302. FIG. 12 shows a contour line of the outer surface 302G. The contour line is represented by a virtual outer surface obtained on the assumption that there is no decoration, such as a groove, a pattern, or a character. A dotted line in FIG. 12 is the rim guard which will be described below.

Although not described in detail, in the present invention, the contour line of the outer surface 302G is obtained by measuring an outer surface shape of the tire 302 in the normal state by using, for example, a displacement sensor.

In FIG. 12, a length represented by a reference numeral ODX is an outer diameter maximum value of new product dimensions defined in the JATMA standard. A solid line DL extending in the axial direction is a dimension line indicating the outer diameter maximum value ODX. In a case where the designation of the tire 302 is "235/55R19", the outer diameter maximum value ODX of the new product dimensions is 749 mm.

In FIG. 12, a straight line DBL extending in the axial direction is an outer diameter reference line indicating an outer diameter that is smaller than the outer diameter maximum value ODX of the new product dimensions by 4 mm. A bidirectional arrow d is a radial distance from the dimension line DL to the outer diameter reference line DBL. In the present invention, the radial distance d is 2.0 mm. In a case where the designation of the tire 302 is "235/55R19", the radial distance from a first outer diameter reference line DBL to a second outer diameter reference line DBL (not shown) is 745 mm.

As the outer diameter maximum value ODX, an outer diameter maximum value of the new product dimensions defined in the ETRTO standard may be used.

In FIG. 12, a length represented by a reference numeral AWX is a maximum total width of the new product dimensions defined in the JATMA standard. A solid line WL extending in the radial direction is a dimension line indicating the maximum total width AWX. In a case where the designation of the tire 302 is "235/55R19", the maximum total width of the new product dimensions is 255 mm.

In FIG. 12, a straight line WBL extending in the radial direction is a total width reference line indicating a total width that is smaller than the maximum total width AWX of the new product dimensions by 5 mm. A bidirectional arrow w is an axial distance from the dimension line WL to the total width reference line WBL. In the present invention, the axial distance w is 2.5 mm. In a case where the designation of the tire 302 is "235/55R19", an axial distance from a first total width reference line WBL to a second total width reference line WBL (not shown) is 250 mm.

As the maximum total width AWX, a maximum total width of the new product dimensions defined in the ETRTO standard may be used.

The tire 302 is entirely within a region surrounded by the first outer diameter reference line DBL and the second outer diameter reference line DBL, and the first total width reference line WBL and the second total width reference line WBL in the meridional cross section. Stated another way, the tire 302 has an outer diameter smaller than a value obtained by subtracting 4 mm from the outer diameter maximum value of the new product dimensions defined by the JATMA standard or the ETRTO standard, and has a total width smaller than a value obtained by subtracting 5 mm from the maximum total width of the new product dimensions.

In FIG. 12, a position indicated by a reference numeral PB1 is an intersection point of the bead baseline and the equatorial plane. In the present invention, the intersection point PB1 is a first reference point.

In FIG. 12, a solid line PCL is a straight line passing through the equator PC and extending in the axial direction. A solid line PWL is a straight line passing through the maximum width position PW and extending in the radial direction. A position indicated by a reference numeral PB2 is an intersection point of the straight line PCL and the straight line PWL. In the present invention, the intersection point PB2 is a second reference point. A line segment connecting the first reference point PB1 and the second reference point PB2 is a reference line segment, and a length indicated by a reference numeral LBS in FIG. 12 is a length of the reference line segment.

In FIG. 12, a reference numeral PBG is an intersection point of the reference line segment and the outer surface 302G. In the present invention, the intersection point PBG is a shoulder reference point. A line segment connecting the first reference point PB1 and the shoulder reference point PBG is the shoulder line segment, and a length indicated by a reference numeral LSh in FIG. 12 is a length of the shoulder line segment.

In the present invention, a distance from the outer surface 302G of the tire 302 to the wheel house (not shown), which is measured along a straight line passing through the first reference point PB1 and the second reference point PB2, is a clearance G formed between a tire T and a wheel house H of a vehicle B shown in FIG. 40. In a case where the clearance G is less than 22 mm, the tire 302 interferes with the wheel house. Stated another way, the interference limit clearance amount in the vehicle is 22 mm.

Although not described in detail, in the manufacture of the tire, a tire in an uncrosslinked state (hereinafter referred to as a raw tire) is prepared by combining the elements, such as the tread and the sidewall in the uncrosslinked state. The tire is obtained by pressurizing and heating the raw tire in a mold in the vulcanization step. The outer surface of the tire is shaped by a cavity surface of the mold. The inner surface of the tire is shaped, for example, by an outer surface of an inflated bladder.

For example, in a case where the mold is a split mold, the mold includes a tread ring, a pair of side plates, and a pair of bead rings. The tread ring shapes a tread portion. The tread ring is usually formed by a plurality of segments. Each of the side plates shapes a sidewall portion. Each of the bead rings shapes a bead portion.

Figure 13:
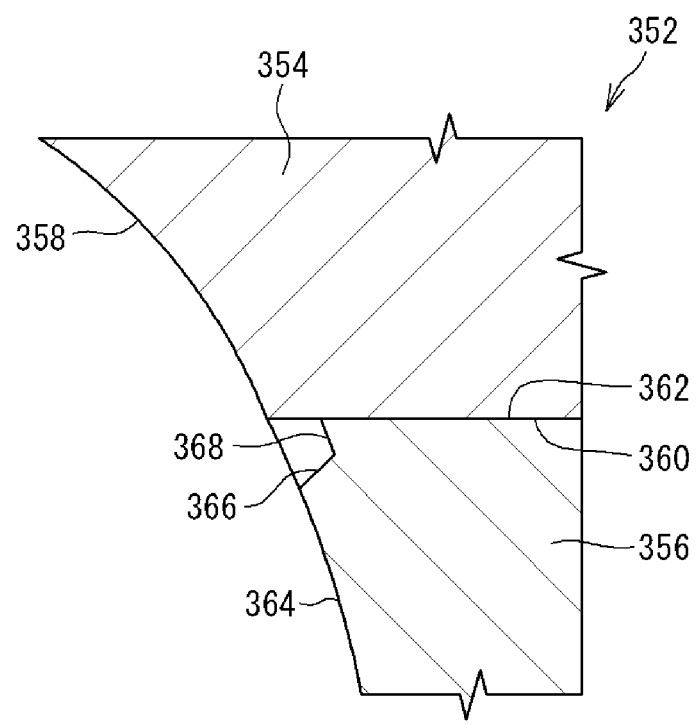
FIG. 13 is a cross-sectional view showing a part of a mold used in manufacturing the tire.

FIG. 13 shows a part of a mold 352 used for manufacturing the tire 302. FIG. 13 shows a part of the tread ring 354 and the side plate 356 of the mold 352. The mold 352 is a split mold.

In the vulcanization step, the raw tire is put into the mold 352. After the raw tire is put, the mold 352 is closed. As a result, a cavity surface 358 is formed. In the closed mold 352, a mating surface 360 of the tread ring 354 and a mating surface 362 of the side plate 356 are abutted against each other. A boundary between the tread ring 354 and the side plate 356 in the closed mold 352 is a split position of the mold 352.

The rubber composition of the raw tire bites into the split position of the mold. The rubber composition biting into the split position forms a burr in the tire. The burr spoils the appearance.

As shown in FIG. 13, a notch 366 is provided at a boundary between the mating surface 362 of the side plate 356 and a molding surface 364. A groove 368 is formed by abutting the tread ring 354 against the side plate 356. During the molding of the tire 302, the rubber composition of the raw tire flows into the groove 368. In the mold 352, the rubber composition is less likely to bite into the split position. The groove 368 contributes to suppressing the occurrence of the burr. A protrusion 370 is formed instead of the burr at a protrusion corresponding to the split position on the outer surface 302G of the tire 302.

In the tire 302, as shown in FIG. 11, the protrusion 370 that protrudes outward from the outer surface 302G of the tire 302 and extends in the circumferential direction is provided at a boundary portion between the tread 304 and the sidewall 306. In the tire 302, the protrusion 370 is positioned radially inside the shoulder reference point PBG. It should be noted that, in the present invention, the boundary portion between the tread 304 and the sidewall 306 means a portion including both the tread 304 and the sidewall 306 as the elements.

Figure 14:
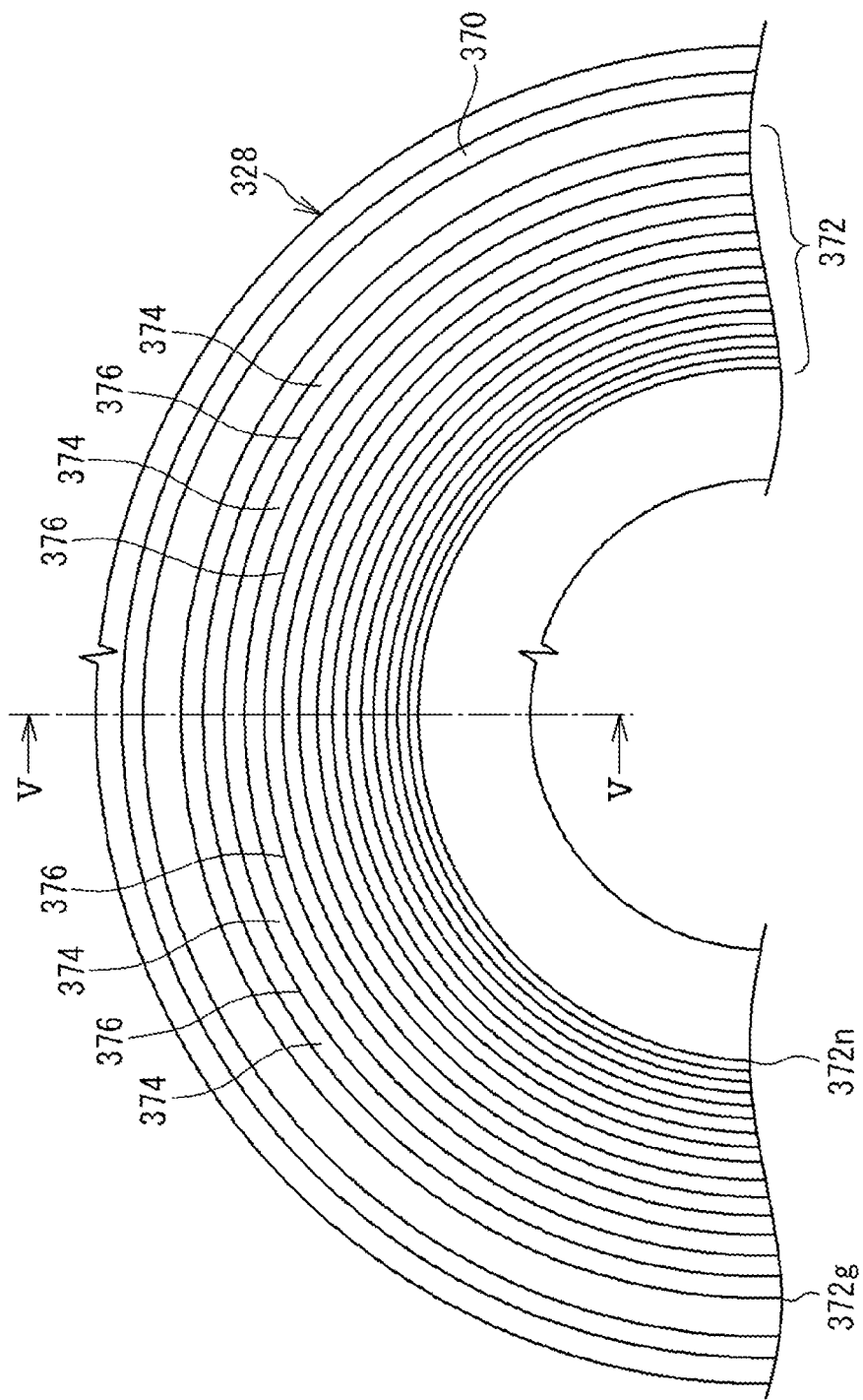
FIG. 14 is a side view showing a side surface of the tire.
Figure 15:
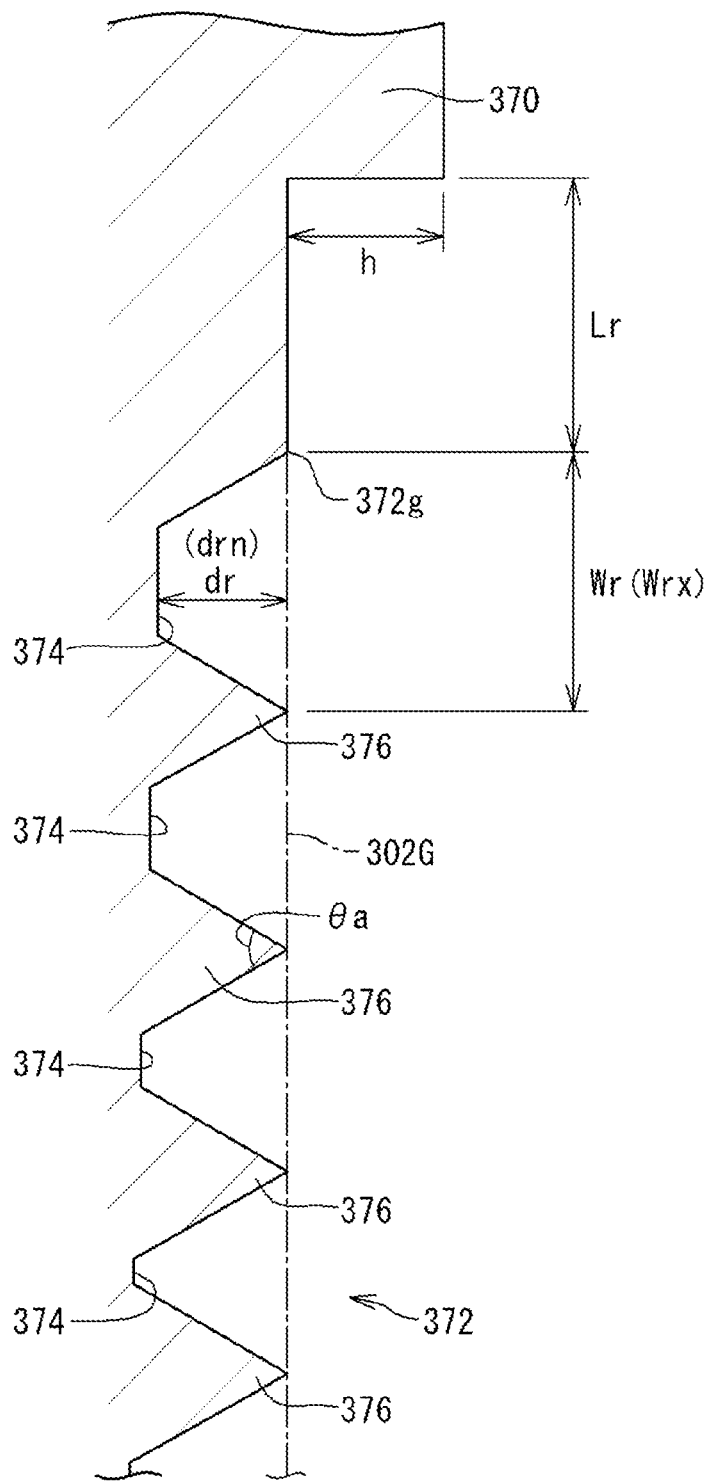
FIG. 15 is a cross-sectional view taken along a line V-V of FIG. 14.

FIG. 14 shows the side surface 328 of the tire 302. A direction perpendicular to the paper surface in FIG. 14 is an axial direction of the tire 302. FIG. 15 shows a cross section of the tire 302 along a line V-V of FIG. 14. On the paper surface of FIG. 15, an upper side is a radial outside of the tire 302, and a lower side is a radial inside of the tire 302.

The outer surface 302G of the tire 302 is provided with a serration region 372. The serration region 372 is a region having a band shape and extending in the circumferential direction about the rotation axis on the side surface 328. The serration region 372 extends continuously in the circumferential direction. The serration region 372 prevents air remaining in the vulcanization step, and contributes to the improvement in the appearance quality.

As shown in FIG. 11, in the tire 302, the serration region 372 is positioned between the shoulder reference point PBG and the maximum width position PW in the radial direction. The outer surface 302G of the tire 302 includes the serration region 372 between the shoulder reference point PBG and the maximum width position PW. The serration region 372 is positioned radially inside the protrusion 370.

As shown in FIGS. 14 and 15, the serration region 372 includes a plurality of narrow grooves 374 and a plurality of ridges 376. The plurality of narrow grooves 374 extend in the circumferential direction. The plurality of narrow grooves 374 are arranged in the radial direction. Stated another way, the plurality of narrow grooves 374 are disposed at different positions in the radial direction. Each of the plurality of narrow grooves 374 has a shape recessed inward from the outer surface 302G of the tire 302. Each of the plurality of ridges 376 is positioned between the narrow grooves 374 adjacent to each other. An outer end 372g of the serration region 372 is the ridge 376 positioned on the outermost side in the radial direction. An inner end 372n of the serration region 372 is the ridge 376 positioned on the innermost side in the radial direction.

The configurations of the narrow groove 374 and the ridge 376 in the serration region 372 are determined as appropriate according to the specifications of the tire 302, except for matters related to a total of a height of the protrusion and a maximum depth of the narrow groove, which will be described below.

A cross-sectional shape of the ridge 376 positioned between the outer end 372g and the inner end 372n of the serration region 372 is tapered outward. The top of the ridge 376 is included in the outer surface 302G of the tire 302. The top may be formed in a plane.

In FIG. 15, an angle represented by a reference numeral θa is an angle formed by two inclined surfaces that form the ridge 376. In the tire 302, the angle θa is 60 degrees or more and 120 degrees or less.

In FIG. 15, a length represented by a reference numeral h is a height of the protrusion 370. The height h is a distance from the outer surface 302G to the top of the protrusion 370. A length represented by a reference numeral Lr is a distance from the top of the protrusion 370 to the outer end 372g of the serration region 372.

The height h of the protrusion 370 and the distance Lr from the protrusion 370 to the serration region 372 are set as appropriate according to the specifications of the tire 302. From the point of view of suppressing the occurrence of the burr, the height h is preferably 0.2 mm or more. From the point of view of suppressing the increase in the air resistance, the height h is preferably 0.6 mm or less. From the point of view of suppressing the appearance defect due to air remaining, the distance Lr is preferably 0.1 mm or more and 10.0 mm or less.

In FIG. 15, a length represented by a reference numeral dr is a depth of the narrow groove 374. The depth dr is a distance from the outer surface 302G to the bottom of the narrow groove 374. A length indicated by a reference numeral Wr is an interval between the ridges 376 adjacent to each other.

In the tire 302, the depth dr of the narrow groove 374 is formed to be gradually deeper from the outer side to the inner side in the radial direction. In two narrow grooves 374 adjacent to each other, the narrow groove 374 positioned on an outer side in the radial direction is shallower than the narrow groove 374 positioned on an inner side in the radial direction. Among the plurality of narrow grooves 374 included in the serration region 372, the narrow groove 374 positioned on the outermost side in the radial direction has a minimum depth drn, and the narrow groove 374 positioned on the innermost side in the radial direction has a maximum depth drx. In this tire 302, the minimum depth drn is set in a range of 20% or more and 60% or less of the maximum depth drx.

In the tire 302, the interval Wr between the ridges 376 adjacent to each other is formed to be gradually narrowed from the outer side to the inner side in the radial direction. For example, in a case of focusing on three ridges 376 arranged in the radial direction, the interval Wr between the ridge 376 positioned on an outer side in the radial direction and the ridge 376 positioned in the middle is wider than the interval Wr between the ridge 376 positioned in the middle and the ridge 376 positioned on an inner side in the radial direction. Therefore, the interval Wr between the ridge 376 forming the outer end 372g of the serration region 372 and the ridge 376 positioned radially inside the ridge 376 is a maximum interval Wrx. The interval Wr between the ridge 376 forming the inner end 372n of the serration region 372 and the ridge 376 positioned radially outside the ridge 376 is a minimum interval Wrn. In this tire 302, the minimum interval Wrn is set in a range of 30% or more and 70% or less of the maximum interval Wrx.

In the tire 302, a ratio (LSh/LBS) of the length LSh of the shoulder line segment to the length LBS of the reference line segment is 85.9% or more and 89.3% or less in the normal state.

Since the ratio (LSh/LBS) is 89.3% or less, the tire 302 is appropriately disposed apart from the wheel house. In the tire 302, the interference with the wheel house is prevented. Since the protruding of the shoulder portion is appropriately maintained, the occurrence of the uneven abrasion is effectively suppressed.

In the tire in the related art, the ratio (LSh/LBS) is less than 85.9%. On the contrary, the ratio (LSh/LBS) of the tire 302 is 85.9% or more. The tire 302 has a larger ratio (LSh/LBS) as compared with the tire in the related art. Since the percentage of the shoulder line segment occupied in the reference line segment is large, in the tire 302, the clearance G close to the interference limit clearance amount is formed. Stated another way, in the tire 302, the clearance G can be reduced.

Since the clearance G is reduced, the sense of unity between the vehicle and the tire 302 is enhanced. The enhancement in the sense of unity can contribute to the improvement in the visual aspect.

Increasing the ratio (LSh/LBS) in the tire involves the modification of the contour line of the tread surface. Specifically, the contour line of the tread surface is modified such that the shoulder portion has an angular shape. As a result, the clearance G is reduced, and the sense of unity between the vehicle B and the tire 302 is enhanced. However, on the contrary, a projection area of the tire 302 when the tire 302 is viewed from the front of the vehicle is increased. The increase in the projection area leads to the increase in the air resistance.

The inventors have made various studies to suppress the increase in the air resistance, have found that, in a case where the shoulder portion is formed with an angular shape to improve the visual aspect, the side surface of the raw tire is likely to come into contact with the cavity surface of the mold, and the discharge of air is promoted as compared with the tire in the related art, and thus the total of the height of the protrusion and the maximum depth of the narrow groove, which is set to 1.0 mm or more in the tire in the related art, can be set small, and have completed the present invention.

In other words, in the tire 302, a total of the height h of the protrusion 370 and the maximum depth drx of the narrow groove 374 is 0.5 mm or more and 0.9 mm or less.

Since the total of the height h of the protrusion 370 and the maximum depth drx of the narrow groove 374 is 0.5 mm or more, the serration region 372 and the protrusion 370 can contribute to the discharge of air in the vulcanization step. An appearance defect, such as bareness, is unlikely to occur on the outer surface 302G of the tire 302. The tire 302 has a good appearance quality.

Since the total of the height h of the protrusion 370 and the maximum depth drx of the narrow groove 374 is 0.9 mm or less, the influence of the serration region 372 and the protrusion 370 on the flow of air is suppressed. Specifically, a force (hereinafter, an aerodynamic force) generated by the flow of air is controlled, and the increase in the air resistance is effectively suppressed. In the tire 302, the air resistance is increased due to the shoulder portion S having an angular shape, and a degree of the increase is suppressed to a small extent.

In the tire 302, the ratio (LSh/LBS) is 85.9% or more and 89.3% or less, and the total of the height h of the protrusion 370 and the maximum depth drx of the narrow groove 374 is 0.5 mm or more and 0.9 mm or less. The tire 302 can achieve the improvement in the visual aspect while suppressing the increase in the air resistance.

In the tire 302, the percentage of the height h of the protrusion 370 occupied in the total of the height h of the protrusion 370 and the maximum depth drx of the narrow groove 374 may be higher than or lower than the percentage of the maximum depth drx of the narrow groove 374. The percentage of the height h of the protrusion 370 occupied in the total may be the same as the percentage of the maximum depth drx of the narrow groove 374. The percentage of the height h of the protrusion 370 occupied in the total is determined as appropriate according to the specifications of the tire 302.

A length indicated by a bidirectional arrow BH in FIG. 11 is a radial distance from the shoulder reference point PBG to the maximum width position PW. A length indicated by a reference numeral SR is a radial width of the serration region 372. The radial width SR is a radial distance from the outer end 372g to the inner end 372n of the serration region 372.

In this tire 302, a ratio (SR/BH) of the radial width SR of the serration region 372 to the radial distance BH from the shoulder reference point PBG to the maximum width position PW is preferably 10% or more and 50% or By setting the ratio (SR/BH) to 10% or more, the serration region 372 can effectively contribute to the discharge of air in the vulcanization step. An appearance defect, such as bareness, is unlikely to occur on the outer surface 302G of the tire 302. The tire 302 can have a good appearance quality. From this point of view, the ratio (SR/BH) is more preferably 25% or more.

By setting the ratio (SR/BH) to 50% or less, the influence of the serration region 372 on the flow of air is suppressed. Specifically, the aerodynamic force is controlled, and the increase in the air resistance is effectively suppressed. From this point of view, the ratio (SR/BH) is more preferably 35% or less.

For example, as shown in FIG. 11, a cross-sectional shape of the protrusion 370 of the tire 302 is rectangular. The cross-sectional shape of the protrusion 370 may be formed to have a tapered shape as shown in FIG. 16.

In this case, a projection area of the protrusion 370 can be reduced. The protrusion 370 can contribute to the reduction of the air resistance. From this point of view, it is preferable that the cross-sectional shape of the protrusion 370 is tapered.

Figure 16:
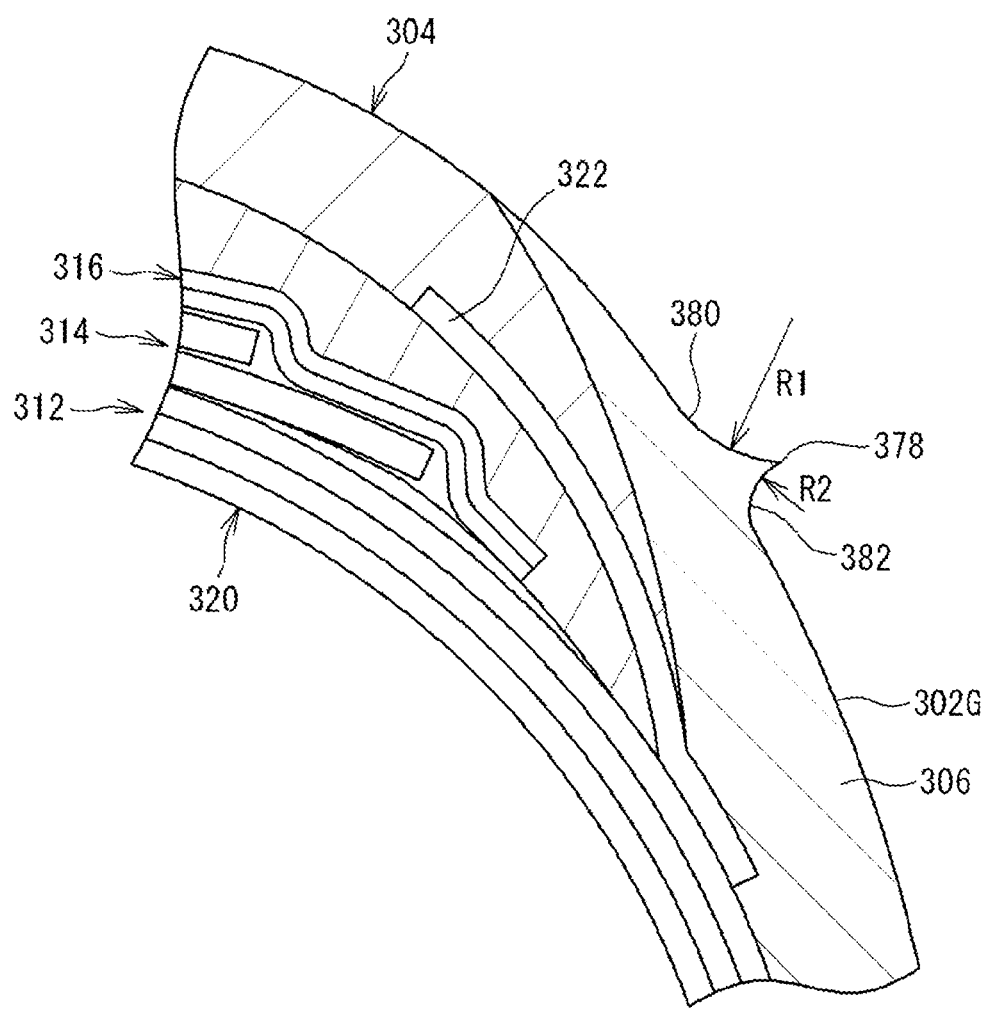
FIG. 16 is a cross-sectional view showing a modification example of a protrusion.

The protrusion 370 shown in FIG. 16 includes a top 378, a first inclined surface 380 positioned radially outside the top 378, and a second inclined surface 382 positioned radially inside the top 378.

In the tire 302, the first inclined surface 380 and the second inclined surface 382 have an inwardly convex shape. A contour line of each of the first inclined surface 380 and the second inclined surface 382 is represented by an arc. In FIG. 16, an arrow indicated by a reference numeral R1 is a radius of an arc (hereinafter, a first arc) as the contour line of the first inclined surface 380. An arrow indicated by a reference numeral R2 is a radius of the arc (hereinafter, a second arc) as the contour line of the second inclined surface 382. The contour line of the first inclined surface 380 is in contact with the contour line of the outer surface 302G of the tire 302 at the outer end thereof. The contour line of the second inclined surface 382 is in contact with the contour line of the outer surface 302G of the tire 302 at the inner end thereof.

It is preferable that, in the tire 302, a radius R1 of the first arc is larger than a radius R2 of the second arc. Therefore, the air flows smoothly. Although the tire 302 has the protrusion 370 for suppressing the occurrence of the burr, the air resistance can be reduced. From this point of view, a ratio (R1/R2) of the radius R1 of the first arc to the radius R2 of the second arc is more preferably 1.2 or more and 2.0 or less.

From the point of view of obtaining a smooth flow of air, the radius R1 of the first arc is preferably 2.0 mm or more. From the point of view of suppressing the influence of the protrusion 370 on the mass of the tire 302, the radius R1 of the first arc is preferably 10 mm or less, and more preferably 5 mm or less.

From the point of view of obtaining a smooth flow of air, the radius R2 of the second arc is preferably 5.0 mm or less, and more preferably 3.0 mm or less. From the point of view that the protrusion 370 can effectively suppress the occurrence of the burr, the radius R2 of the second arc is preferably 1.0 mm or more.

Figure 17:
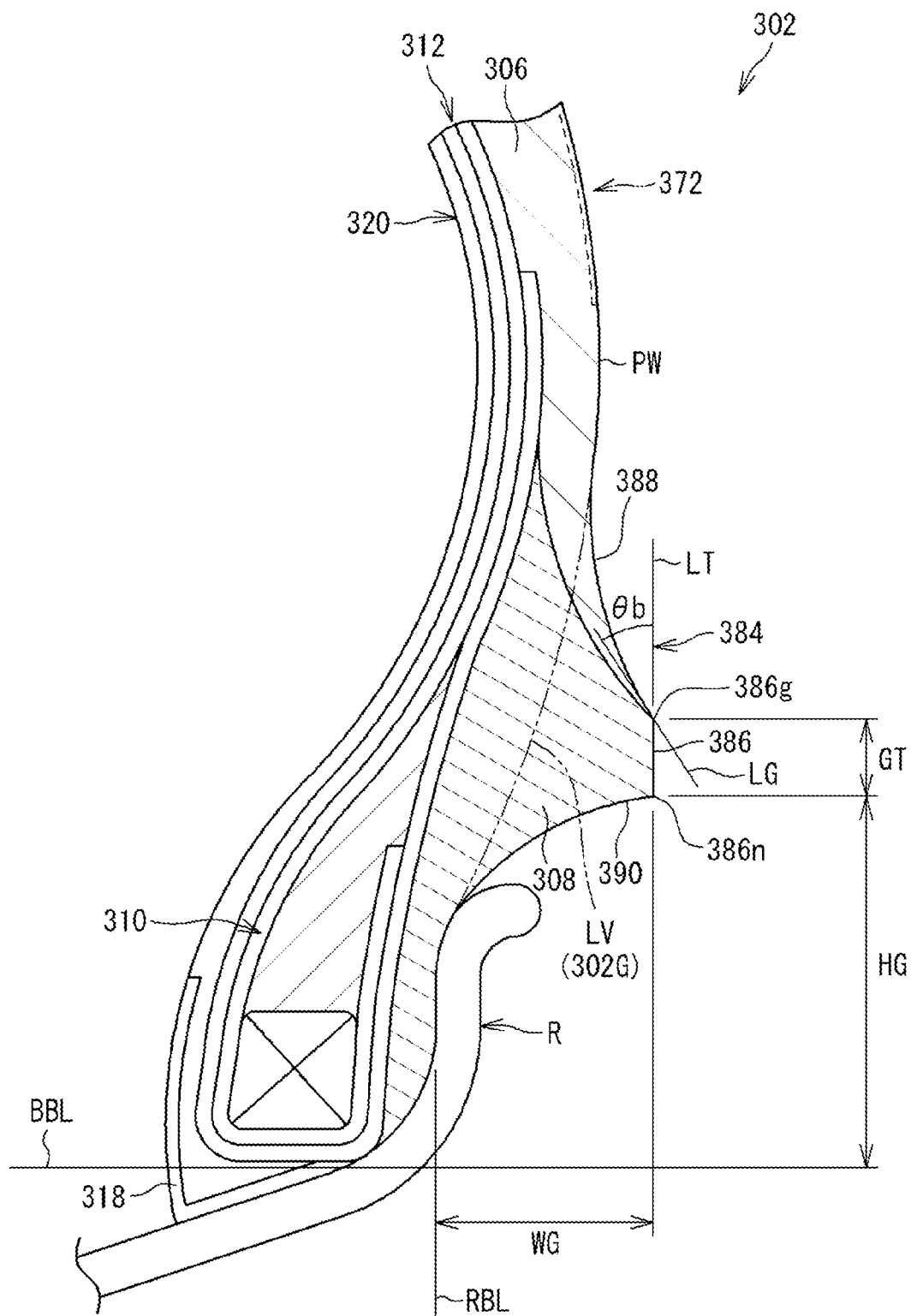
FIG. 17 is a cross-sectional view showing a bead portion of the tire.

FIG. 17 shows a part of the meridional cross section of the tire 302 of FIG. 11. FIG. 17 shows a bead portion of the tire 302.

The tire 302 can include a rim guard 384 that protrudes outward from the outer surface 302G of the tire 302. The rim guard 384 is provided at a boundary portion between the sidewall 306 and the clinch 308. The rim guard 384 extends in the circumferential direction. A two-point chain line LV in FIG. 17 is the outer surface 302G of the tire 302 obtained on the assumption that the rim guard 384 is not provided.

In a case where the tire 302 is assembled on the rim R, the rim guard 384 is positioned radially outside the rim R. As shown in FIG. 17, the rim guard 384 is positioned between the rim R and the maximum width position PW in the radial direction. The rim guard 384 protrudes axially outward from the rim R. The rim guard 384 prevents damage of the rim R.

The rim guard 384 includes a top surface 386, an outer inclined surface 388, and an inner inclined surface 390. The outer inclined surface 388 is positioned radially outside the top surface 386. The outer inclined surface 388 is continuous with an outer end 386g of the top surface 386. The inner inclined surface 390 is positioned radially inside the top surface 386. The inner inclined surface 390 is continuous with an inner end 386n of the top surface 386.

In the tire 302, in the meridional cross section, the rim guard 384 has a shape in which a hem is widened from the top surface 386 of the rim guard 384 toward the outer surface 302G of the tire 302.

In FIG. 17, a length represented by a reference numeral HG is a rim guard height. The rim guard height HG is a radial distance from the bead baseline to the inner end 386n of the top surface 386. The rim guard height HG is determined as appropriate in consideration of a rim guard angle, a rim guard distal end thickness, and a rim guard protrusion length, which will be described below, and is set in a range of 20 mm or more and 40 mm or less.

In FIG. 17, a solid line LT is a straight line passing through the outer end 386g and the inner end 386n of the top surface 386. A solid line LG is a tangent line of a contour line of the outer inclined surface 388 at the outer end 386g of the top surface 386. An angle θb is an angle formed by the straight line LT and the tangent line LG. In the present invention, the angle θb is an angle formed by the straight line LT passing through the outer end 386g and the inner end 386n of the top surface 386 and the tangent line LG of the outer inclined surface 388 at the outer end 386g of the top surface 386 in the meridional cross section of the tire 302. The angle θb is also referred to as the rim guard angle.

In this tire 302, the rim guard angle θb is preferably 10 degrees or more and 30 degrees or less.

By setting the rim guard angle θb to 10 degrees or more, in the tire 302, the rim guard 384 can be formed such that the rim guard 384 protrudes from the maximum width position PW by an appropriate amount. Even in a case where the tires 302 are horizontally stacked in a state in which the tires 302 are assembled on the rims R, the interference between the rims R is suppressed.

By setting the rim guard angle θb to 30 degrees or less, a degree of curvature of the contour line of the outer inclined surface 388 is suppressed to a small extent. The rim guard 384 can effectively control the aerodynamic force. In the tire 302, the increase in the air resistance is effectively suppressed. From this point of view, the rim guard angle θb is more preferably 15 degrees or less.

In this tire 302, in a case where the rim guard angle θb is preferably 10 degrees or more and 30 degrees or less, it is preferable that the straight line LT passing through the outer end 386g and the inner end 386n of the top surface 386 is parallel to the equatorial plane. As a result, the increase in the air resistance is more effectively suppressed.

In FIG. 17, a length indicated by a reference numeral GT is a width of the top surface 386. The width GT of the top surface 386 is a length of a line segment connecting the outer end 386g and the inner end 386n of the top surface 386. The width GT of the top surface 386 is also referred to as the rim guard distal end thickness.

In this tire 302, the width GT of the top surface 386 is preferably 4 mm or more and 6 mm or less.

By setting the width GT of the top surface 386 to 4 mm or more, the distal end portion of the rim guard 384 has required stiffness. Even in a case where the tires 302 are horizontally stacked in a state in which the tires 302 are assembled on the rim R, the distal end portion of the rim guard 384 is less likely to be crushed. In the tire 302, the interference between the rims R is suppressed even in a case where the tires 302 are horizontally stacked.

By setting the width GT of the top surface 386 to 6 mm or less, the influence of the rim guard 384 on the aerodynamic force is suppressed. In the tire 302, the increase in the air resistance is more effectively suppressed.

In FIG. 17, a solid line RBL extending in the radial direction is the rim width baseline. The rim width baseline is a line that defines a rim width (see JATMA or the like) of the rim R.

A length represented by a reference numeral WG is an axial distance from the rim width baseline to the inner end 386n of the top surface 386. The axial distance WG is also referred to as the rim guard protrusion length.

In this tire 302, the rim guard protrusion length WG is preferably 12 mm or more and 18 mm or less.

By setting the rim guard protrusion length WG to 12 mm or more, in the tire 302, the rim guard 384 can be formed such that the rim guard 384 protrudes from the maximum width position PW by an appropriate amount. Even in a case where the tires 302 are horizontally stacked in a state in which the tires 302 are assembled on the rims R, the interference between the rims R is suppressed.

By setting the rim guard protrusion length WG to 18 mm or less, the influence of the rim guard 384 on the aerodynamic force is suppressed. In the tire 302, the increase in the air resistance is more effectively suppressed.

Increasing the ratio (LSh/LBS) in the tire 302 involves the modification of the contour line of the tread surface 324. Therefore, the ground contact pressure of the shoulder portion S is increased, and there is a concern that the uneven abrasion occurs. In order to continue to use the tire 302, which has achieved the improvement in the visual aspect while suppressing the increase in the rolling resistance, in the same manner as the tire in the related art, it is necessary to arrange the contour line of the tread surface 324 in consideration of the influence on the uneven abrasion resistance.

Figure 18:
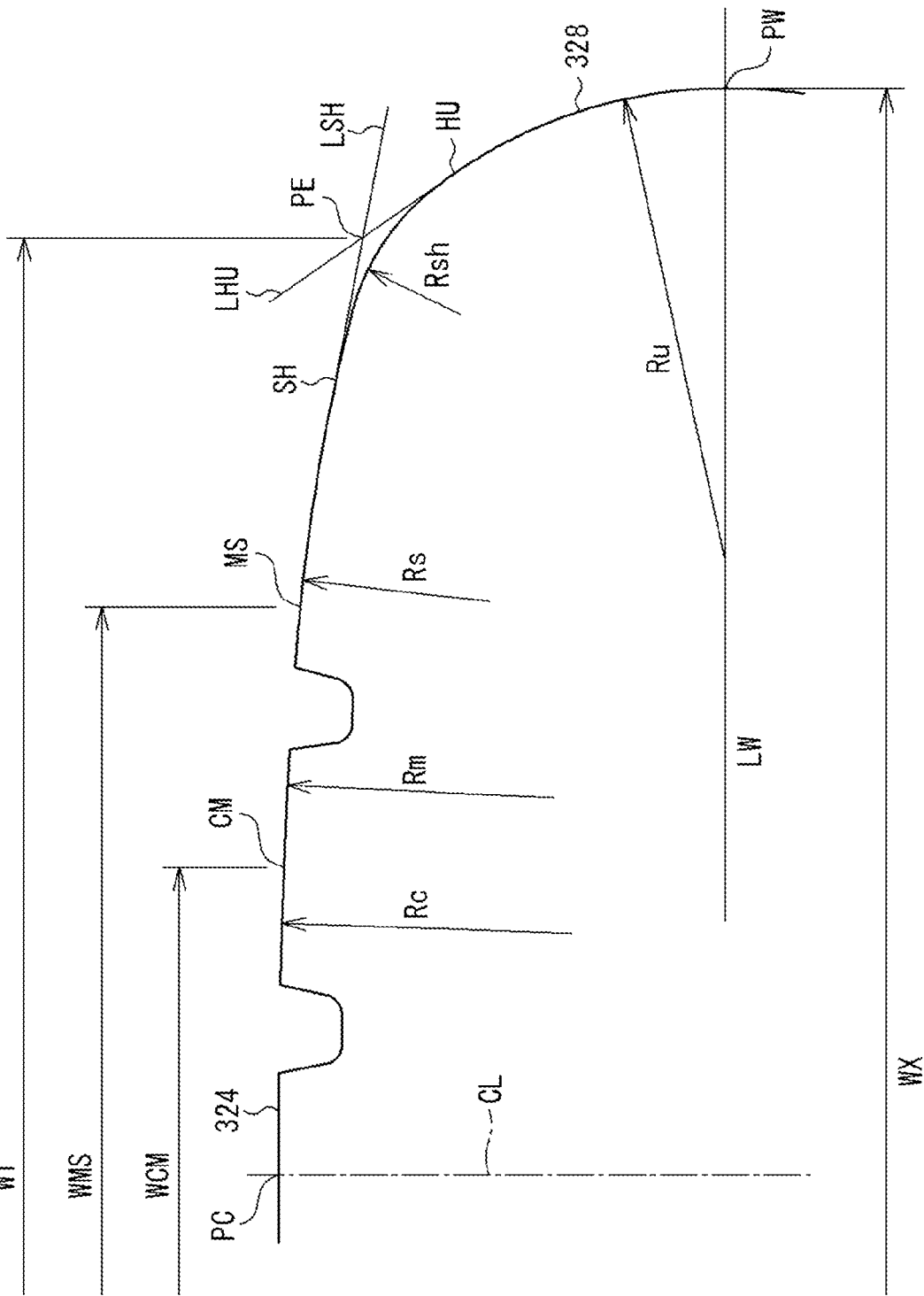
FIG. 18 is a cross-sectional view for describing a contour line of a tread surface.

FIG. 18 shows a part of the contour line shown in FIG. 12.

In the meridional cross section, the contour line of the tread surface 324 is formed by a plurality of arcs arranged in the axial direction. Stated another way, the contour line of the tread surface 324 includes a plurality of arcs arranged in the axial direction.

Among the plurality of arcs, an arc positioned at the center in the axial direction is a center arc. In FIG. 18, an arrow indicated by a reference numeral Rc is a radius of the center arc. The center arc passes through the equator PC. Although not shown, the center of the center arc is positioned on the equatorial plane.

Among the plurality of arcs, an arc positioned on an outer side in the axial direction is a shoulder arc. In FIG. 18, an arrow indicated by a reference numeral Rsh is a radius of the shoulder arc. The shoulder arc has the smallest radius Rsh among the plurality of arcs forming the contour line of the tread surface 324.

The contour line of the tread surface 324 of the tire 302 includes two arcs between the center arc and the shoulder arc. Among these two arcs, an arc positioned on the center arc side is a middle arc, and an arc positioned on the shoulder arc side is a side arc. In FIG. 18, an arrow indicated by a reference numeral Rm is a radius of the middle arc, and an arrow indicated by a reference numeral Rs is a radius of the side arc. The radius Rm of the middle arc is smaller than the radius Rc of the center arc. The radius Rs of the side arc is smaller than the radius Rm of the middle arc.

In the tire 302, the plurality of arcs forming the contour line of the tread surface 324 include the center arc passing through the equator PC, a pair of shoulder arcs each of which is positioned on an outermost side in the axial direction and has the smallest radius Rsh, a pair of middle arcs each of which is positioned adjacent to the center arc and has the radius Rm smaller than the radius Rc of the center arc, and a pair of side arcs each of which is positioned between the middle arc and the shoulder arc and has the radius Rs smaller than the radius Rm of the middle arc. Specifically, the plurality of arcs includes the center arc, the pair of middle arcs, the pair of side arcs, and the pair of shoulder arcs.

In FIG. 18, a position indicated by a reference numeral CM is a boundary between the center arc and the middle arc. The middle arc is in contact with the center arc at the boundary CM. A position indicated by a reference numeral MS is a boundary between the middle arc and the side arc. The side arc is in contact with the middle arc at the boundary MS. A position indicated by a reference numeral SH is a boundary between the side arc and the shoulder arc. The shoulder arc is in contact with the side arc at the boundary SH. A position indicated by a reference numeral HU is a boundary between the shoulder arc and a contour line of the side surface 328. The contour line of the side surface 328 is in contact with the shoulder arc at the boundary HU.

In FIG. 18, a length represented by a reference numeral WCM is an axial distance from a first boundary CM to a second boundary CM. The center of the axial distance WCM matches a position of the equatorial plane. A length represented by a reference numeral WMS is an axial distance from a first boundary MS to a second boundary MS. The center of the axial distance WSM matches a position of the equatorial plane. A length represented by a reference numeral WX is the cross-sectional width of the tire 302.

In this tire 302, a ratio (WCM/WX) of the axial distance WCM to the cross-sectional width WX is preferably 25% or more and 40% or less. A ratio (WMS/WX) of the axial distance WMS to the cross-sectional width WX is preferably 45% or more and 60% or less.

In FIG. 18, a straight line LSH is a tangent line in contact with the shoulder arc at the boundary SH. A straight line LHU is a tangent line in contact with the shoulder arc at the boundary HU. A reference numeral PE is an intersection point of the tangent line LSH and the tangent line LHU. In the present invention, the intersection point PE is a reference end of the tread 304. A length represented by a reference numeral WT is an axial distance from a first reference end PE to a second reference end PE. In the present invention, the axial distance WT is a width of the tread 304.

In this tire 302, a ratio (Rc/Rm) of the radius Rc of the center arc to the radius Rm of the middle arc is preferably 1.85 or more and 2.00 or less.

By setting the ratio (Rc/Rm) to 1.85 or more, a difference between the radius Rc of the center arc and the radius Rs of the side arc positioned adjacent to the middle arc can be suppressed to a small extent. Since the slippage of the shoulder portion S is effectively suppressed, the occurrence of the uneven abrasion is suppressed. Good uneven abrasion resistance is obtained in the tire 302. From this point of view, the ratio (Rc/Rm) is more preferably 1.90 or more.

By setting the ratio (Rc/Rm) to 2.00 or less, the shoulder arc can be formed by an arc having a larger radius Rs. The tread surface 324 can be made closer to a flat surface. The tread surface 324 of the tire 302 can effectively contribute to the formation of the clearance G that is close to the interference limit clearance amount. In the tire 302, the clearance G can be reduced. From this point of view, the ratio (Rc/Rm) is more preferably 1.95 or less.

In this tire 302, a ratio (Rm/Rs) of the radius Rm of the middle arc to the radius Rs of the side arc is preferably 2.08 or more and 2.74 or less.

By setting the ratio (Rm/Rs) to 2.08 or more, the tread surface 324 is formed, which can effectively contribute to the formation of the clearance G that is close to the interference limit clearance amount in consideration of the interference with the wheel house. The tire 302 can effectively enhance the sense of unity with the vehicle. From this point of view, the ratio (Rm/Rs) is more preferably 2.30 or more.

By setting the ratio (Rm/Rs) to 2.74 or less, a difference between the radius Rc of the center arc positioned adjacent to the middle arc and the radius Rs of the side arc can be suppressed to a small extent. Since the slippage of the shoulder portion S is effectively suppressed, the occurrence of the uneven abrasion is suppressed. Good uneven abrasion resistance is obtained in the tire 302. From this point of view, the ratio (Rm/Rs) is more preferably 2.50 or less.

In this tire 302, a ratio (WT/WX) of the width WT of the tread 304 to the cross-sectional width WX is preferably 87% or more and 92% or less.

By setting the ratio (WT/WX) to 87% or more, the ground contact surface having an appropriate size is formed. Since a local increase in the ground contact pressure is suppressed, the occurrence of the uneven abrasion is suppressed. From this point of view, the ratio (WT/WX) is more preferably 88% or more.

By setting the ratio (WT/WX) to 92% or less, the slippage of the shoulder portion S is effectively suppressed. In this case as well, the occurrence of the uneven abrasion is suppressed. From this point of view, the ratio (WT/WX) is more preferably 91% or less.

In this tire 302, a ratio (Rc/WT) of the radius Rc of the center arc to the width WT of the tread 304 is preferably 3.90 or more and 4.30 or less.

By setting the ratio (Rc/WT) to 3.90 or more, the tread surface 324 can be made closer to a flat surface. The tread surface 324 of the tire 302 can effectively contribute to the formation of the clearance G that is close to the interference limit clearance amount. In the tire 302, the clearance G can be reduced. From this point of view, the ratio (Rc/WT) is more preferably 3.95 or more, and still more preferably 4.00 or more.

By setting the ratio (Rc/WT) to 4.30 or less, the interference between the tire 302 and the wheel house is suppressed. Since the slippage of the shoulder portion S is effectively suppressed, the occurrence of the uneven abrasion is suppressed. From this point of view, the ratio (Rc/WT) is more preferably 4.25 or less, and still more preferably 4.20 or less.

In the tire 302, in the contour line of the side surface 328, a portion between the boundary HU and the maximum width position PW is represented by an arc. The contour line of the side surface 328 includes an upper arc that is an arc that is continuous with the shoulder arc and passes through the maximum width position PW. In FIG. 18, an arrow indicated by a reference numeral Ru is a radius of the upper arc. The center of the upper arc is positioned on a straight line LW passing through the maximum width position PW and extending in the axial direction.

In this tire 302, a ratio (Ru/WT) of the radius Ru of the upper arc to the width WT of the tread 304 is preferably 0.22 or more and 0.28 or less.

By setting the ratio (Ru/WT) to 0.22 or more, the tread surface 324 can be made closer to a flat surface. The tread surface 324 of the tire 302 can effectively contribute to the formation of the clearance G that is close to the interference limit clearance amount. In the tire 302, the clearance G can be reduced. From this point of view, the ratio (Ru/WT) is more preferably 0.23 or more, and still more preferably 0.24 or more.

By setting the ratio (Ru/WT) to 0.28 or less, it is possible to suppress the interference of the tire 302 with the wheel house. Since the slippage of the shoulder portion S is effectively suppressed, the occurrence of the uneven abrasion is suppressed. From this point of view, the ratio (Ru/WT) is more preferably 0.27 or less, and still more preferably 0.26 or less.

As described above, the tire 302 can achieve the improvement in the visual aspect while suppressing the increase in the air resistance.

Outline of Fourth Embodiment of Present Invention

Configuration 1

A tire according to an aspect of the present invention is a tire having an outer diameter smaller than a value obtained by subtracting 4 mm from an outer diameter maximum value of new product dimensions defined by a JATMA standard or an ETRTO standard, and having a total width smaller than a value obtained by subtracting 5 mm from a maximum total width of the new product dimensions, the tire including a pair of beads, a carcass that bridges between the pair of beads, a tread that is positioned radially outside the carcass, and a band that is positioned between the carcass and the tread, in which the tread includes a tread surface that is in contact with the road surface, the band includes a band cord that extends substantially in a circumferential direction, the tire includes an outer surface including the tread surface, and a pair of side surfaces continuous with the tread surface, the tread surface includes an equator that is an intersection point with an equatorial plane, each of the side surfaces includes a maximum width position indicating a maximum width of the tire, in a meridional cross section of the tire, an intersection point of a bead baseline and the equatorial plane is a first reference point, an intersection point of a straight line passing through the equator and extending in an axial direction and a straight line passing through the maximum width position and extending in a radial direction is a second reference point, a line segment connecting the first reference point and the second reference point is a reference line segment, an intersection point of the reference line segment and the outer surface of the tire is a shoulder reference point, and a line segment connecting the first reference point and the shoulder reference point is a shoulder line segment, in a normal state in which the tire is assembled on a normal rim, the internal pressure of the tire is adjusted to a normal internal pressure, and no load is applied to the tire, a ratio of a length of the shoulder line segment to a length of the reference line segment is 85.9% or more and 89.3% or less, the band includes a center portion that intersects with the equatorial plane, and a pair of side portions that are positioned axially outside the center portion, and the center portion has stiffness higher than stiffness of the side portion.

By arranging the tire in this way, in the tire, a clearance with the wheel house can be made close to an interference limit clearance amount. Since the clearance is reduced, the sense of unity between the vehicle and the tire is enhanced. The enhancement in the sense of unity can contribute to the improvement in the visual aspect.

The tire is appropriately disposed apart from the wheel house. The tire is prevented from interfering with the wheel house.

The center portion of the band suppresses the outer diameter growth of the crown portion. Since an amount of deformation in the tread portion is appropriately maintained, the increase in the rolling resistance is suppressed.

The tire can achieve the improvement in the visual aspect while suppressing the increase in the rolling resistance.

Configuration 2

It is preferable that, in the tire according to Configuration 1, a ratio of an axial width of the side portion to an axial width of the band is 10% or more and 25% or less.

By arranging the tire in this way, the outer diameter growth of the crown portion is effectively suppressed. In the tire, it is possible to further improve the visual aspect while effectively suppressing the increase in the rolling resistance.

Since the outer diameter growth of the crown portion and the outer diameter growth of the shoulder portion are arranged in a well-balanced manner, it is possible to prevent a ground contact shape from being formed in a distorted shape, such as a butterfly shape. The occurrence of the uneven abrasion is suppressed. Since an amount of deformation in the tread portion is appropriately maintained, the increase in the rolling resistance is suppressed.

Configuration 3

It is preferable that, in the tire according to Configuration 1 or Configuration 2, the ratio of the length of the shoulder line segment to the length of the reference line segment is 88.4% or less, among the band cords included in the band, a band cord included in the center portion is a center band cord, and a band cord included in the side portion is a side band cord, each of the center band cord and the side band cord is a single organic fiber cord, an organic fiber of the single organic fiber cord is a nylon fiber, and an intermediate elongation of the center band cord is smaller than an intermediate elongation of the side band cord.

By arranging the tire in this way, the outer diameter growth of the crown portion is effectively suppressed. In the tire, it is possible to further improve the visual aspect while effectively suppressing the increase in the rolling resistance.

Configuration 4

It is preferable that, in the tire according to Configuration 3, the intermediate elongation of the center band cord is 4.7% or more and 5.2% or less, and the intermediate elongation of the side band cord is 6.4% or more and 7.0% or less.

By arranging the tire in this way, the occurrence of the uneven abrasion is effectively suppressed.

Configuration 5

It is preferable that, in the tire according to Configuration 1 or Configuration 2, the ratio of the length of the shoulder line segment to the length of the reference line segment is more than 88.4%, among the band cords included in the band, a band cord included in the center portion is a center band cord, and a band cord included in the side portion is a side band cord, the center band cord is a composite organic fiber cord, an organic fiber of the composite organic fiber cord is a nylon fiber and an aramid fiber, the side band cord is a single organic fiber cord, an organic fiber of the single organic fiber cord is a nylon fiber, and an intermediate elongation of the center band cord is smaller than an intermediate elongation of the side band cord.

By arranging the tire in this way, in order to improve the visual aspect, the shoulder portion is formed in an angular shape. As a result, even in a case where a flat tread surface is formed, the band effectively suppresses the outer diameter growth of the crown portion. In the tire, it is possible to further improve the visual aspect while effectively suppressing the increase in the rolling resistance.

Configuration 6

It is preferable that, in the tire according to Configuration 5, the intermediate elongation of the center band cord is 3.3% or more and 3.7% or less, and the intermediate elongation of the side band cord is 4.7% or more and 5.2% or less.

By arranging the tire in this way, the occurrence of the uneven abrasion is effectively suppressed.

Configuration 7

It is preferable that, in the tire according to any one of Configuration 1 to Configuration 6, a contour line of the tread surface includes a plurality of arcs arranged in the axial direction, the plurality of arcs include a center arc that is an arc passing through the equator, a pair of shoulder arcs that are arcs each of which is positioned on an outermost side in the axial direction and has a smallest radius, a pair of middle arcs that are arcs each of which is positioned adjacent to the center arc and has a radius smaller than a radius of the center arc, and a pair of side arcs each of which is positioned between the middle arc and the shoulder arc and has a radius smaller than the radius of the middle arc, and a ratio of a radius of the center arc to the radius of the middle arc is 1.85 or more and 2.00 or less.

By arranging the tire in this way, a difference between the radius of the center arc and the radius of the side arc positioned adjacent to the middle arc is suppressed to a small extent. Since the slippage of the shoulder portion is effectively suppressed, the occurrence of the uneven abrasion is suppressed. Good uneven abrasion resistance is obtained in this tire. Since the side arc can be formed by an arc having a larger radius, the tread surface can be made closer to a flat surface. The tread surface of the tire can effectively contribute to the formation of the clearance that is close to the interference limit clearance amount. In the tire, the clearance can be reduced.

Details of Fourth Embodiment of Present Invention

Figure 19:
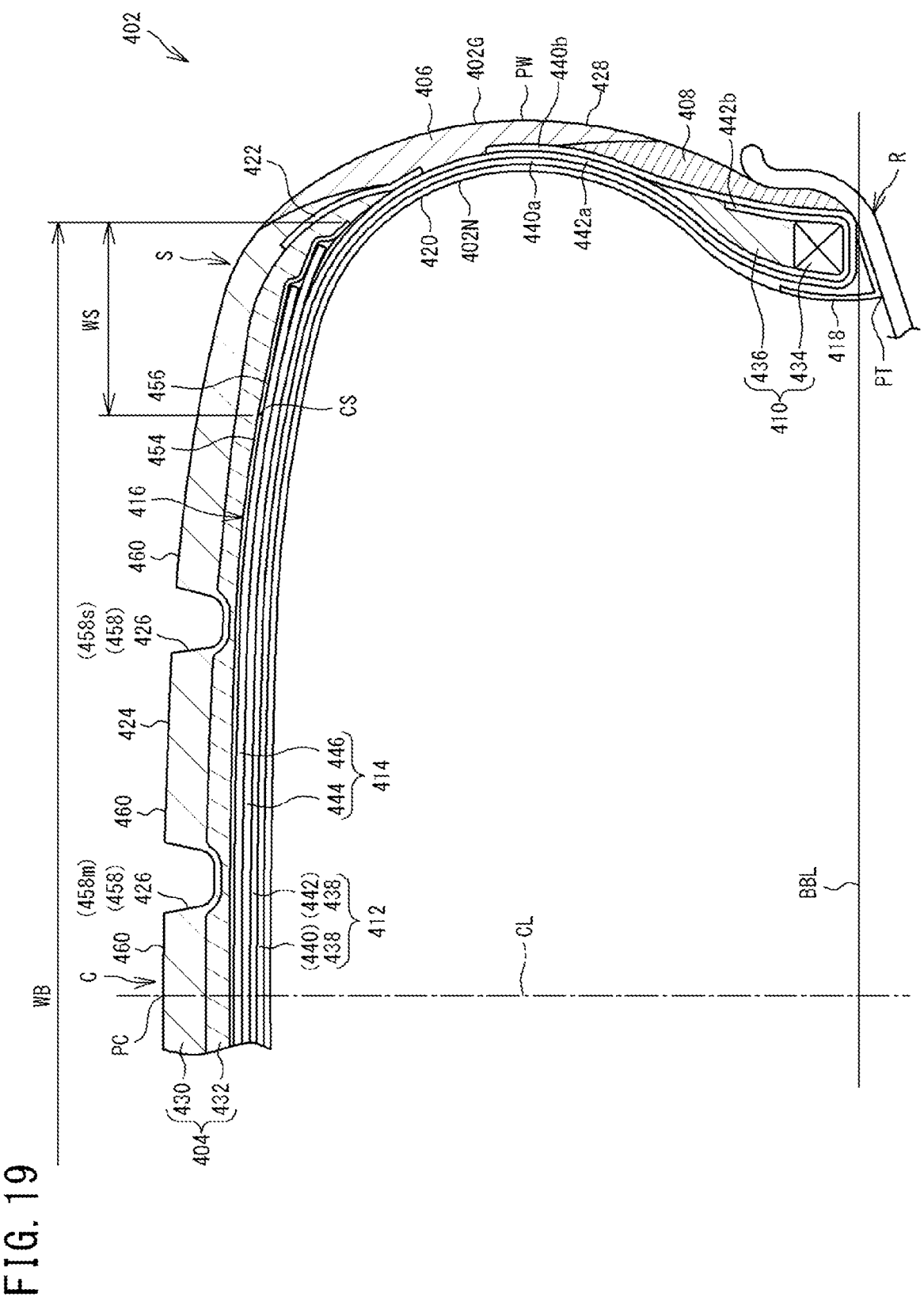
FIG. 19 is a cross-sectional view showing a part of a tire according to still another embodiment of the present invention.

FIG. 19 shows a part of the tire 402 according to the fourth embodiment. The tire 402 is a pneumatic tire for a passenger vehicle.

FIG. 19 shows a part of a cross section (hereinafter, a meridional cross section) of the tire 402 along a plane including a rotation axis of the tire 402. In FIG. 19, a left-right direction is an axial direction of the tire 402, and an up-down direction is a radial direction of the tire 402. A direction perpendicular to the paper surface in FIG. 19 is a circumferential direction of the tire 402. A one-point chain line CL represents an equatorial plane of the tire 402.

In FIG. 19, the tire 402 is assembled on a rim R (normal rim). An inside of the tire 402 is filled with air, and an internal pressure of the tire 402 is adjusted.

In FIG. 19, a solid line BBL extending in the axial direction is a bead baseline. The bead baseline is a line that defines a rim diameter (see JATMA or the like) of the rim R.

In FIG. 19, a position indicated by a reference numeral PC is an intersection point of an outer surface 402G (specifically, a tread surface which will be described below) of the tire 402 and the equatorial plane. The intersection point PC is an equator of the tire 402. In a case where a groove is positioned on the equatorial plane, the equator PC is specified based on a virtual outer surface obtained on the assumption that there is no groove. The equator PC is a radially outer end of the tire 402.

In FIG. 19, a position represented by a reference numeral PW is an axially outer end (hereinafter, an outer end PW) of the tire 402. In a case where a decoration, such as a pattern or a character, is present on the outer surface, the outer end PW is specified based on a virtual outer surface obtained on the assumption that there is no decoration.

An axial distance from a first outer end PW to a second outer end PW obtained in the normal state is a cross-sectional width of the tire 402 (see JATMA or the like). The outer end PW is also referred to as a maximum width position. The maximum width position is a position at which the tire 402 indicates a maximum width. The maximum width obtained in the normal state matches the cross-sectional width.

In FIG. 19, a position indicated by a reference numeral PT is a toe of the tire 402. The toe PT is a boundary between an outer surface 402G and an inner surface 402N of the tire 402.

The tire 402 includes a tread 404, a pair of sidewalls 406, a pair of clinches 408, a pair of beads 410, a carcass 412, a belt 414, a band 416, a pair of chafers 418, an inner liner 420, and a pair of fixing layers 422.

The tread 404 is in contact with a road surface on a tread surface 424. The tread 404 includes the tread surface 24 that is in contact with the road surface. A groove 426 is carved in the tread 404. The tread 404 is positioned radially outside the carcass 412, which will be described below.

The tread surface 424 is a part of the outer surface 402G of the tire 402. A side surface 428 is continuous with the tread surface 424. The outer surface 402G of the tire 402 includes the tread surface 424 and a pair of side surfaces 428. The tread surface 424 includes an equator PC, and each of the side surfaces 428 includes a maximum width position PW.

The tread 404 includes a cap portion 430 and a base portion 432. The cap portion 430 includes the tread surface 424. The cap portion 430 is made of the crosslinked rubber in which the abrasion resistance and the grip performance are taken into consideration. The base portion 432 is positioned radially inside the cap portion 430. The base portion 432 is entirely covered with the cap portion 430. The base portion 432 is made of the crosslinked rubber having a low heat generation property.

Each of the sidewalls 406 is continuous with a tread 404. The sidewall 406 is positioned radially inside the tread 404. The sidewall 406 is positioned axially outside the carcass 412. The sidewall 406 is made of the crosslinked rubber in consideration of the cut resistance. The sidewall 406 forms a part of the side surface 428. Each of the clinches 408 is positioned radially inside the sidewall 406. The clinch 408 comes into contact with the rim R. The clinch 408 is made of the crosslinked rubber in which the abrasion resistance is taken into consideration. The clinch 408 forms a part of the side portion.

Each of the beads 410 is positioned axially inside the clinch 408. The bead 410 is positioned radially inside the sidewall 406.

The bead 410 includes a core 434 and an apex 436. The core 434 extends in the circumferential direction. Although not shown, the core 434 includes a wire made of steel. The apex 436 is positioned radially outside the core 434. The apex 436 is tapered radially outward. The apex 436 is made of the crosslinked rubber having high stiffness.

The carcass 412 is positioned inside the tread 404, the pair of sidewalls 406, and the pair of clinches 408. The carcass 412 bridges between the pair of beads 410, that is, between a first bead 410 and a second bead 410. The carcass 412 includes at least one carcass ply 438.

The carcass 412 of the tire 402 is formed by two carcass plies 438. Although not shown, each of the carcass plies 438 includes a large number of carcass cords arranged in parallel. These carcass cords intersect with the equatorial plane. The carcass 412 of the tire 402 has a radial structure. In the tire 402, a cord made of an organic fiber is used as the carcass cord. Examples of the organic fiber include a nylon fiber, a rayon fiber, a polyester fiber, and an aramid fiber.

Among the two carcass plies 438, the carcass ply 438 positioned inside the tread 404 on an inner side in the radial direction is a first carcass ply 440. The carcass ply 438 positioned inside the tread 404 and radially outside the first carcass ply 440 is a second carcass ply 442.

The first carcass ply 440 includes a first ply main body 440a and a pair of first folded-back portions 440b. The first ply main body 440a bridges between the pair of beads 410. Each of the first folded-back portions 440b is continuous with the first ply main body 440a, and is folded back from the inner side to the outer side in the axial direction by each of the beads 410.

The second carcass ply 442 includes a second ply main body 442a and a pair of second folded-back portions 442b. The second ply main body 442a bridges between the pair of beads 410. Each of the second folded-back portions 442b is continuous with the second ply main body 442a, and is folded back from the inner side to the outer side in the axial direction by each of the beads 410.

In the tire 402, an end of the first folded-back portion 440b is positioned radially outside the maximum width position PW. An end of the second folded-back portion 442b is positioned radially inside the maximum width position PW. The end of the second folded-back portion 442b is positioned between an outer end of the apex 436 and the core 434 in the radial direction.

The second folded-back portion 442b is positioned axially inside the first folded-back portion 440b. The end of the second folded-back portion 442b is interposed between the apex 436 and the first folded-back portion 440b.

The belt 414 is positioned radially inside the tread 404. The belt 414 is laminated on the carcass 412. The equatorial plane described above intersects with the belt 414 at the center of an axial width of the belt 414.

In this tire 402, the axial width of the belt 414 is 85% or more and 90% or less of the cross-sectional width of the tire 402.

The belt 414 includes a first layer 444 and a second layer 446. The first layer 444 is positioned radially outside the second ply main body 442a, and is laminated on the second ply main body 442a. The second layer 446 is positioned radially outside the first layer 444, and is laminated on the first layer 444.

As shown in FIG. 19, an end of the second layer 446 is positioned axailly inside an end of the first layer 444. The second layer 446 is narrower than the first layer 444. A length from the end of the second layer 446 to the end of the first layer 444 is 3 mm or more and 10 mm or less. The axial width of the belt 414 is represented by the axial width of the wide first layer 444.

Although not shown, each of the first layer 444 and the second layer 446 includes a large number of belt cords arranged in parallel. These belt cords are covered with topping rubber. Each of the belt cords is inclined with respect to the equatorial plane. A material of the belt cord is steel.

The band 416 is positioned between the carcass 412 and the tread 404 in the radial direction. The band 416 is laminated on the belt 414 inside the tread 404.

An end of the band 416 is positioned axially outside an end of the belt 414. A length from the end of the belt 414 to the end of the band 416 is 3 mm or more and 7 mm or less.

The aforementioned equatorial plane intersects with the band 416 at the center of an axial width of the band 416. Both ends of the band 416 are disposed to face each other with the equatorial plane interposed therebetween. The band 416 bridges between a first end and a second end. The band 416 is a full band. In the tire 402, a pair of edge bands that cover the ends of the band 416 and are disposed axially apart from each other may be further provided.

In FIG. 19, a length represented by a reference numeral WB is an axial width of the band 416. The axial width WB is an axial distance from a first end to a second end (not shown) of the band 416.

Figure 20:
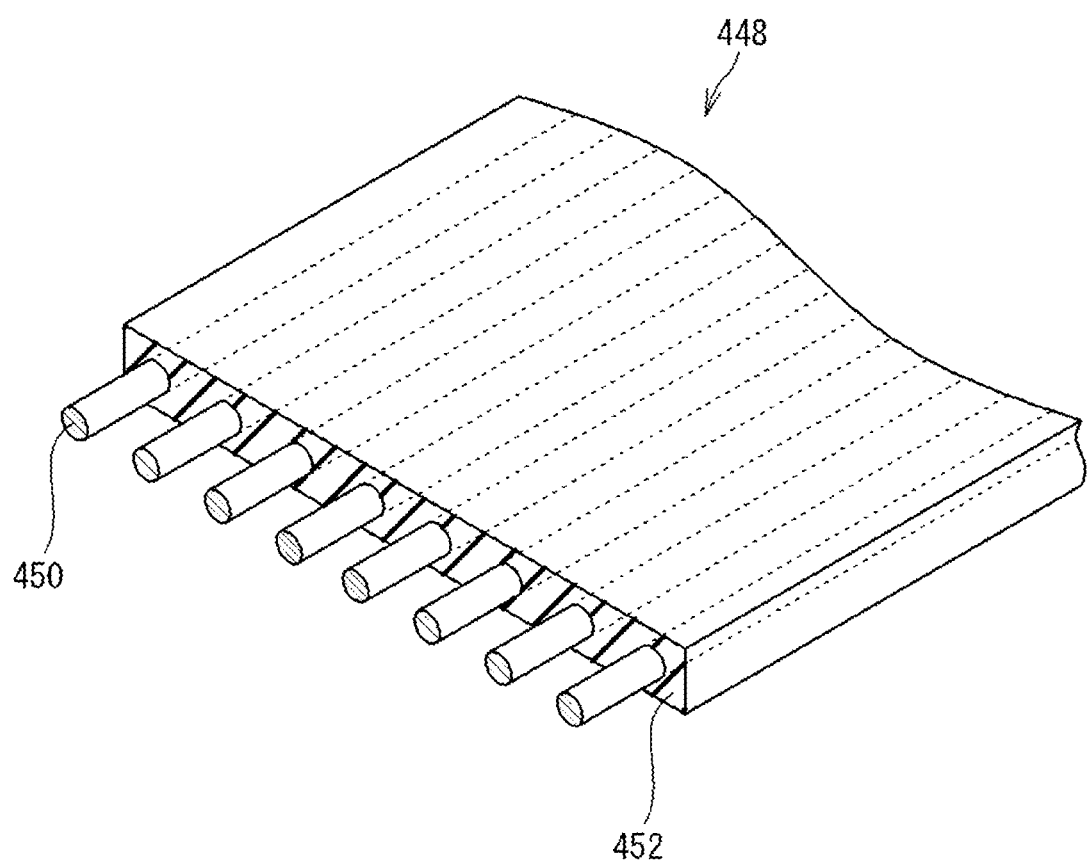
FIG. 20 is a perspective view showing a part of a strip used to form a band.

The band 416 is formed by using a strip 448 shown in FIG. 20. The strip 448 includes a plurality of band cords 450 arranged in parallel. These band cords 450 are covered with topping rubber 452. The strip 448 is band-shaped. In the strip 448, the band cord 450 extends in a length direction of the strip 448.

The strip 448 shown in FIG. 20 includes eight band cords 450. The number of the band cords 450 included in the strip 448 is not limited to eight. The number of the band cords 450 included in the strip 448 is in a range of 2 or more and 15 or less, and is determined as appropriate in consideration of the specifications of the tire 402 and the like.

The band 416 is formed by spirally winding the strip 448. The band 416 includes the band cord 450 spirally wound. In the band 416, the band cord 450 extends substantially in the circumferential direction. In detail, an angle formed by the band cord 450 with respect to the circumferential direction is 5° or less. The band 416 has a jointless structure.

A density of the band cord 450 in the band 416 is 31 ends/5 cm or more and 49 ends/5 cm or less. The density of the band cord 450 is measured on the reference cut surface.

Although not shown, the band cord 450 is formed by twisting filaments composed of organic fibers. The band cord 450 is a twisted wire of the organic fiber filaments, and is also referred to as an organic fiber cord. Examples of the organic fiber include a nylon fiber, a rayon fiber, a polyester fiber, and an aramid fiber.

In the present invention, the organic fiber cord made of the single organic fibers is the single organic fiber cord, and the organic fiber cord made of a combination of two or more types of the organic fibers is the composite organic fiber cord. The composite organic fiber cord is also referred to as a hybrid cord.

The band 416 of the tire 402 includes a center portion 454 and a pair of side portions 456. In detail, the band 416 is formed by the center portion 454 and the pair of side portions 456. In the band 416, the center portion 454 forms an axial central portion thereof. The center portion 454 intersects with the equatorial plane. Each of the side portions 456 is positioned axially outside the center portion 454 of the band 416. The side portion 456 forms an axially outer portion of the band 416.

In FIG. 19, a position indicated by a reference numeral CS is a boundary between the center portion 454 and the side portion 456. The boundary CS is an end of the center portion 454 and an inner end of the side portion 456. The end of the band 416 is an outer end of the side portion 456. In FIG. 19, a length represented by a reference numeral WS is an axial width of the side portion 456. The axial width WS is an axial distance from the outer end to the inner end of the side portion 456.

As described above, the band 416 includes the band cord 450. In the present invention, among the band cords 450 included in the band 416, the band cord 450 included in the center portion 454 is a center band cord, and the band cord 450 included in the side portion 456 is a side band cord.

In the tire 402, a density of the center band cord in the center portion 454 and a density of the side band cord in the side portion 456 are the same. As will be described below, the center band cord and the side band cord are made of the organic fiber cord having intermediate elongations different from each other.

Each of the chafers 418 is positioned radially inside the bead 410. The chafer 418 comes into contact with the rim R. The chafer 418 of the tire 402 is made of a cloth and rubber impregnated in the cloth.

The inner liner 420 is positioned inside the carcass 412. The inner liner 420 forms the inner surface 402N of the tire 402. The inner liner 420 is made of the crosslinked rubber having an excellent air shielding property. The inner liner 420 retains the internal pressure of the tire 402.

The respective fixing layers 422 are disposed axially apart from each other. The fixing layer 422 is positioned axially outside the belt 414. An inner end of the fixing layer 422 is positioned between the cap portion 430 and the base portion 432. An outer end of the fixing layer 422 is positioned between the sidewall 406 and the carcass 412. The fixing layer 422 is made of the crosslinked rubber in which the adhesive force is taken into consideration.

Figure 21:
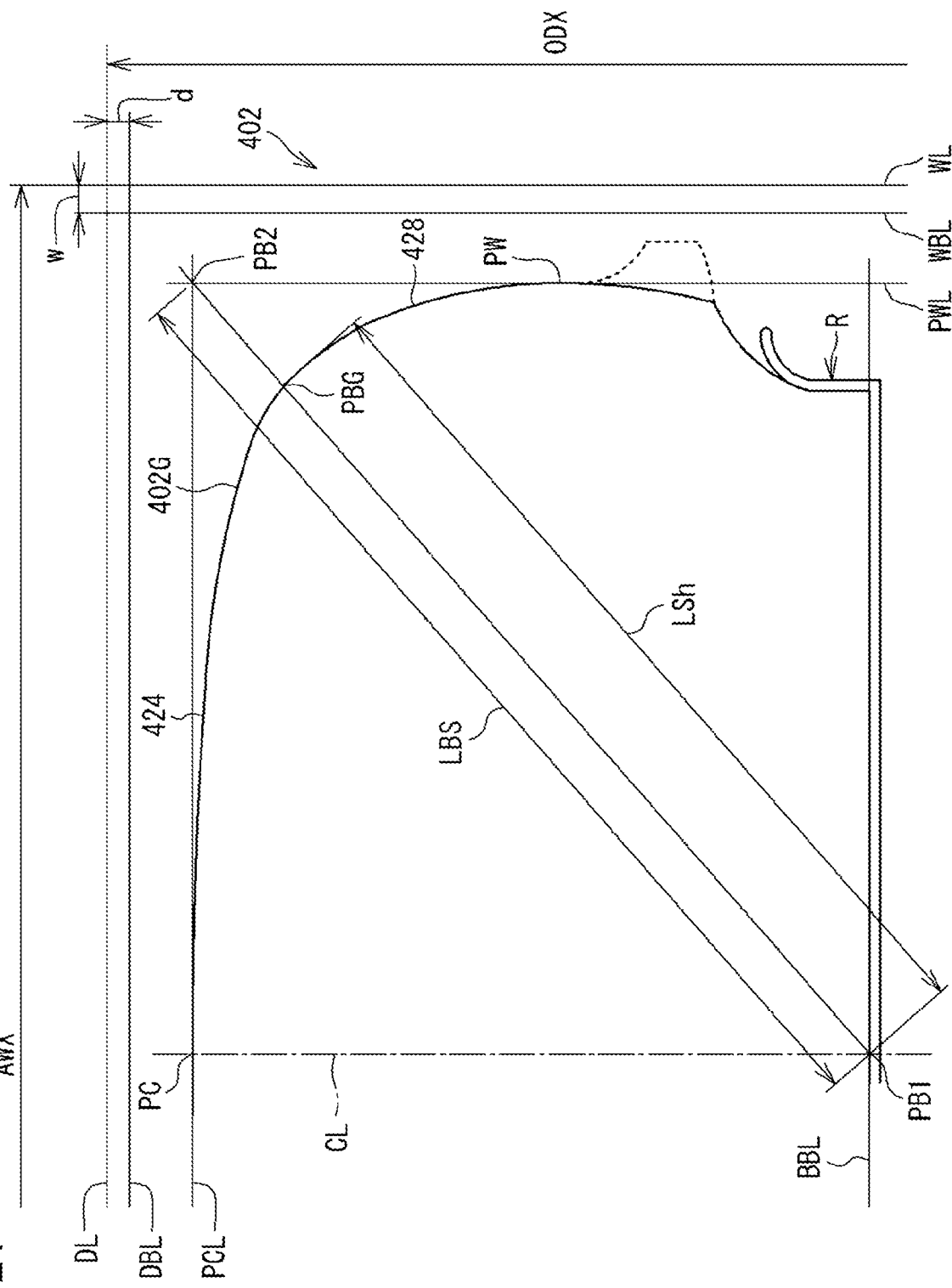
FIG. 21 is a cross-sectional view for describing a reference line segment and a shoulder line segment.

FIG. 21 schematically shows the meridional cross section of the tire 402. FIG. 21 shows a contour line of the outer surface 402G. The contour line is represented by a virtual outer surface obtained on the assumption that there is no decoration, such as a groove, a pattern, or a character. A dotted line in FIG. 21 is a rim protector as an example of the decoration.

Although not described in detail, in the present invention, the contour line of the outer surface 402G is obtained by measuring an outer surface shape of the tire 402 in the normal state by using, for example, a displacement sensor.

In FIG. 21, a length represented by a reference numeral ODX is an outer diameter maximum value of new product dimensions defined in the JATMA standard. A solid line DL extending in the axial direction is a dimension line indicating the outer diameter maximum value ODX. In a case where the designation of the tire 402 is "235/55R19", the outer diameter maximum value ODX of the new product dimensions is 749 mm.

In FIG. 21 a straight line DBL extending in the axial direction is an outer diameter reference line indicating an outer diameter that is smaller than the outer diameter maximum value ODX of the new product dimensions by 4 mm. A bidirectional arrow d is a radial distance from the dimension line DL to the outer diameter reference line DBL. In the present invention, the radial distance d is 2.0 mm. In a case where the designation of the tire 402 is "235/55R19", the radial distance from a first outer diameter reference line DBL to a second outer diameter reference line DBL (not shown) is 745 mm.

As the outer diameter maximum value ODX, an outer diameter maximum value of the new product dimensions defined in the ETRTO standard may be used.

In FIG. 21, a length represented by a reference numeral AWX is a maximum total width of the new product dimensions defined in the JATMA standard. A solid line WL extending in the radial direction is a dimension line indicating the maximum total width AWX. In a case where the designation of the tire 402 is "235/55R19", the maximum total width of the new product dimensions is 255 mm.

In FIG. 21, a straight line WBL extending in the radial direction is a total width reference line indicating a total width that is smaller than the maximum total width AWX of the new product dimensions by 5 mm. A bidirectional arrow w is an axial distance from the dimension line WL to the total width reference line WBL. In the present invention, the axial distance w is 2.5 mm. In a case where the designation of the tire 402 is "235/55R19", an axial distance from a first total width reference line WBL to a second total width reference line WBL (not shown) is 250 mm.

As the maximum total width AWX, a maximum total width of the new product dimensions defined in the ETRTO standard may be used.

The tire 402 is entirely within a region surrounded by the first outer diameter reference line DBL and the second outer diameter reference line DBL, and the first total width reference line WBL and the second total width reference line WBL. Stated another way, the tire 402 has an outer diameter smaller than a value obtained by subtracting 4 mm from the outer diameter maximum value of the new product dimensions defined by the JATMA standard or the ETRTO standard, and has a total width smaller than a value obtained by subtracting 5 mm from the maximum total width of the new product dimensions.

In FIG. 21, a position indicated by a reference numeral PB1 is an intersection point of the bead baseline and the equatorial plane. In the present invention, the intersection point PB1 is a first reference point.

In FIG. 21, a solid line PCL is a straight line passing through the equator PC and extending in the axial direction. A solid line PWL is a straight line passing through the maximum width position PW and extending in the radial direction. A position indicated by a reference numeral PB2 is an intersection point of the straight line PCL and the straight line PWL. In the present invention, the intersection point PB2 is a second reference point. A line segment connecting the first reference point PB1 and the second reference point PB2 is a reference line segment, and a length indicated by a reference numeral LBS in FIG. 21 is a length of the reference line segment.

In FIG. 21, a reference numeral PBG is an intersection point of the reference line segment and the outer surface 402G. In the present invention, the intersection point PBG is a shoulder reference point. A line segment connecting the first reference point PB1 and the shoulder reference point PBG is the shoulder line segment, and a length indicated by a reference numeral LSh in FIG. 21 is a length of the shoulder line segment.

In the present invention, a distance from the outer surface 402G of the tire 402 to the wheel house (not shown), which is measured along a straight line passing through the first reference point PB1 and the second reference point PB2, is a clearance G formed between a tire T and a wheel house H of a vehicle B shown in FIG. 40. In a case where the clearance G is less than 22 mm, the tire 402 interferes with the wheel house. Stated another way, the interference limit clearance amount in the vehicle is 22 mm.

In the tire 402, a ratio (LSh/LBS) of the length LSh of the shoulder line segment to the length LBS of the reference line segment is 85.9% or more and 89.3% or less in the normal state.

Since the ratio (LSh/LBS) is 89.3% or less, the tire 402 is appropriately disposed apart from the wheel house. In the tire 402, the interference with the wheel house is prevented.

In the tire in the related art, the ratio (LSh/LBS) is less than 85.9%. On the contrary, in the tire 402, the ratio (LSh/LBS) is 85.9% or more, and the ratio (LSh/LBS) is larger as compared with the tire in the related art. In the tire 402, the clearance G close to the interference limit clearance amount is formed. Stated another way, in the tire 402, the clearance G can be reduced. Since the clearance G is reduced, the sense of unity between the vehicle and the tire 402 is enhanced. The enhancement in the sense of unity can contribute to the improvement in the visual aspect.

Increasing the ratio (LSh/LBS) in the tire involves the modification of the contour line of the tread surface. Specifically, the contour line of the tread surface is modified such that the shoulder portion has an angular shape. In the tire, the contour line of the tread surface and the contour line of the carcass (also referred to as a carcass line) are set in association with each other. The modification of the contour line of the tread surface involves a change in a contour line of a carcass. As in the contour line of the tread surface, the contour line of the carcass is also modified to an angular shape. Therefore, when the tire is inflated, the tire is deformed such that a crown portion pops out and the shoulder portion retracts. Since an outer diameter growth in the crown portion is promoted, the contour line of the tread surface is rounded, and an effect of improving the visual aspect may not be sufficiently obtained.

In the tire, the deformation and the restoration are repeated. The increase in the outer diameter growth in the crown portion leads to the increase in the amount of deformation in the tread portion. Therefore, the rolling resistance may also be increased.

In the tire 402, the stiffness of the band 416 is controlled by adjusting the density of the band cord 450 in the band 416 and the intermediate elongation of the band cord 450.

The band 416 of the tire 402 is formed such that the center portion 454 has stiffness higher than the stiffness of the side portion 456 by these types of adjustment. In other words, the center portion 454 has stiffness higher than the stiffness of the side portion 456. The center portion 454 suppresses the outer diameter growth of the crown portion C. Since the amount of deformation in the tread portion is appropriately maintained, the increase in the rolling resistance is suppressed.

The tire 402 can achieve the improvement in the visual aspect while suppressing the increase in the rolling resistance.

In this tire 402, a ratio (WS/WB) of the axial width WS of the side portion 456 to the axial width WB of the band 416 is preferably 10% or more and 25% or less.

By setting the ratio (WS/WB) to 10% or more, the outer diameter growth of the crown portion C is effectively suppressed. In the tire 402, it is possible to further improve the visual aspect while effectively suppressing the increase in the rolling resistance. From this point of view, the ratio (WS/WB) is more preferably 15% or more.

By setting the ratio (WS/WB) to 25% or less, the outer diameter growth of the crown portion C and the outer diameter growth of the shoulder portion S are arranged in a well-balanced manner. Since it is possible to prevent a ground contact shape from being formed in a distorted shape, such as a butterfly shape, the occurrence of the uneven abrasion is suppressed. In this case as well, the amount of deformation in the tread portion is appropriately maintained. Therefore, the increase in the rolling resistance is suppressed. From this point of view, the ratio (WS/WB) is more preferably 20% or less.

In the tire 402, in order to improve the visual aspect, the ratio (LSh/LBS) is controlled. As described above, the ratio (LSh/LBS) is 85.9% or more and 89.3% or less. As the ratio (LSh/LBS) is closer to 89.3%, the shoulder portion S has a more angular shape.

In a case where the shoulder portion S is formed to have an angular shape in order to improve the visual aspect, the flattening of the tread surface 24 is promoted. The flattening of the tread surface 24 promotes the outer diameter growth of the crown portion C. As a result of diligent studies on this point, the present inventors have found that the ground contact shape is a rectangular shape or a butterfly shape and the uneven abrasion is likely to occur in a case where a difference in the stiffness between the center portion 454 and the side portion 456 of the band 416, and it is necessary to increase the stiffness of the entire band 416 in a case where the ratio (LSh/LBS) exceeds 88.4%.

Hereinafter, the stiffness control of the band 416 for improving the visual aspect will be described with a case where the ratio (LSh/LBS) is 88.4% or less and a case where the ratio (LSh/LBS) is more than 88.4%.

Case where Ratio (LSh/LBS) is 88.4% or Less

In this case, the flattening of the tread surface 24 is suppressed as compared with a case where the ratio (LSh/LBS) is more than 88.4%, which will be described below. Therefore, in this case, it is preferable to use, as the center band cord and the side band cord, nylon cords that are formed by twisting nylon filaments composed of nylon fibers and have intermediate elongations different from each other. Specifically, it is preferable that each of the center band cord and the side band cord is the single organic fiber cord, the organic fiber of the single organic fiber cord is the nylon fiber, the intermediate elongation of the center band cord is smaller than the intermediate elongation of the side band cord. Accordingly, the outer diameter growth of the crown portion C is effectively suppressed. In the tire 402, it is possible to further improve the visual aspect while effectively suppressing the increase in the rolling resistance. Since the difference in the stiffness between the center portion 454 and the side portion 456 of the band 416 can be appropriately maintained, in the tire 402, the occurrence of the uneven abrasion can be suppressed. From these points of view, a ratio of the intermediate elongation of the center band cord to the intermediate elongation of the side band cord is preferably 0.60 or more, and more preferably 0.73 or more. The ratio is preferably 0.98 or less, and more preferably 0.90 or less.

Moreover, in a case where each of the center band cord and the side band cord is the single organic fiber cord, the organic fiber of the single organic fiber cord is the nylon fiber, the intermediate elongation of the center band cord is smaller than the intermediate elongation of the side band cord, from the point of view that the outer diameter growth of the crown portion C can be effectively suppressed, the intermediate elongation of the center band cord is preferably 4.7% or more and 5.2% or less. Further, from the point of view that the occurrence of the uneven abrasion can also be effectively suppressed, the intermediate elongation of the center band cord is more preferably 4.7% or more and 5.2% or less, and the intermediate elongation of the side band cord is more preferably 6.4% or more and 7.0% or less.

Case where Ratio (LSh/LBS) is More than 88.4%

In this case, the flattening of the tread surface 24 is promoted as compared with a case where the ratio (LSh/LBS) is 88.4% or less described above. Therefore, in this case, it is preferable to use, as the center band cord, the hybrid cord formed by twisting the nylon filaments composed of the nylon fibers and the aramid filaments composed of the aramid fibers, and to use, the side band cord, the nylon cord formed by twisting the nylon filaments composed of the nylon fibers and having the intermediate elongation lower than the intermediate elongation of the hybrid cord. Specifically, it is preferable that the center band cord is the composite organic fiber cord, the organic fiber of the composite organic fiber cord is the nylon fiber and the aramid fiber, the side band cord is the single organic fiber cord, the organic fiber of the single organic fiber cord is the nylon fiber, the intermediate elongation of the center band cord is smaller than the intermediate elongation of the side band cord. As a result, as a whole, the band 416 having the stiffness higher than the stiffness of the entire band 416, which is described in a case where the ratio (LSh/LBS) is 88.4% or less, is formed. Accordingly, in order to improve the visual aspect, the shoulder portion S is formed in an angular shape. As a result, even in a case where a flat tread surface 24 is formed, the band 416 effectively suppresses the outer diameter growth of the crown portion C. In the tire 402, it is possible to further improve the visual aspect while effectively suppressing the increase in the rolling resistance. Since the difference in the stiffness between the center portion 454 and the side portion 456 of the band 416 can be appropriately maintained, in the tire 402, the occurrence of the uneven abrasion can be suppressed. From these points of view, a ratio of the intermediate elongation of the center band cord to the intermediate elongation of the side band cord is preferably 0.51 or more, and more preferably 0.71 or more. The ratio is preferably 0.88 or less, and more preferably 0.82 or less.

Moreover, in a case where the center band cord is the composite organic fiber cord, the organic fiber of the composite organic fiber cord is the nylon fiber and the aramid fiber, the side band cord is the single organic fiber cord, the organic fiber of the single organic fiber cord is the nylon fiber, the intermediate elongation of the center band cord is smaller than the intermediate elongation of the side band cord, from the point of view that the outer diameter growth of the crown portion C can be more effectively suppressed, the intermediate elongation of the center band cord is preferably 3.3% or more and 3.7% or less. Further, from the point of view that the occurrence of the uneven abrasion can also be effectively suppressed, the intermediate elongation of the center band cord is more preferably 3.3% or more and 3.7% or less, and the intermediate elongation of the side band cord is more preferably 4.7% or more and 5.2% or less.

Increasing the ratio (LSh/LBS) in the tire involves the modification of the contour line of the tread surface 24. Therefore, the ground contact pressure of the shoulder portion S is increased, and there is a concern that the uneven abrasion occurs. In order to continue to use the tire 402, which has achieved the improvement in the visual aspect while suppressing the increase in the rolling resistance, in the same manner as the tire in the related art, it is necessary to arrange the contour line of the tread surface 24 in consideration of the influence on the uneven abrasion resistance.

Figure 22:
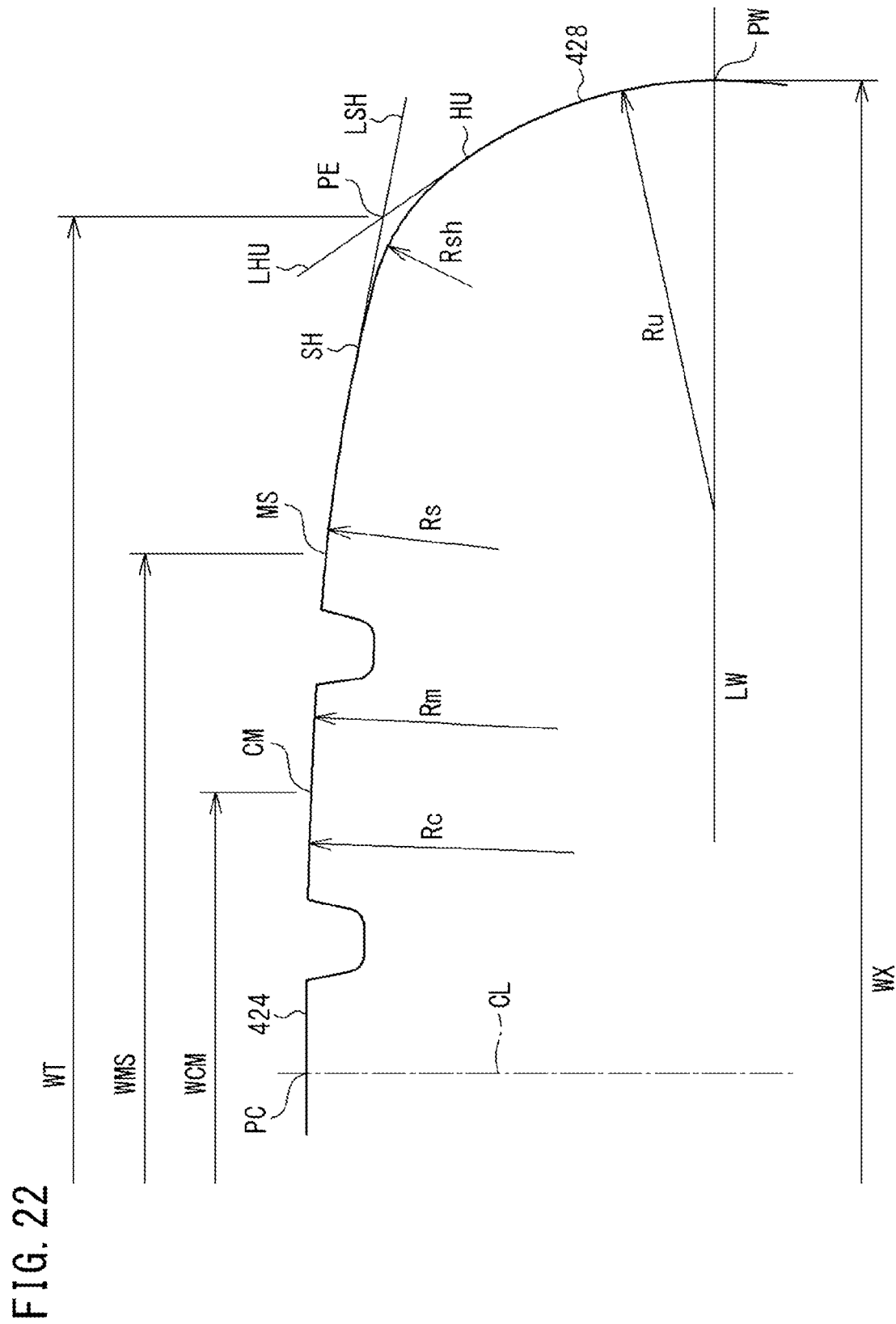
FIG. 22 is a cross-sectional view for describing a contour line of a tread surface.

FIG. 22 shows a part of the contour line shown in FIG. 21.

In the meridional cross section, the contour line of the tread surface 24 is formed by a plurality of arcs arranged in the axial direction. Stated another way, the contour line of the tread surface 24 includes a plurality of arcs arranged in the axial direction.

Among the plurality of arcs, an arc positioned at the center in the axial direction is a center arc. In FIG. 22, an arrow indicated by a reference numeral Rc is a radius of the center arc. The center arc passes through the equator PC. The center of the center arc is positioned on the equatorial plane.

Among the plurality of arcs, an arc positioned on an outer side in the axial direction is a shoulder arc. In FIG. 22, an arrow indicated by a reference numeral Rsh is a radius of the shoulder arc. The shoulder arc has the smallest radius Rsh among the plurality of arcs forming the contour line of the tread surface 24.

The contour line of the tread surface 24 of the tire 402 includes two arcs between the center arc and the shoulder arc. Among these two arcs, an arc positioned on the center arc side is a middle arc, and an arc positioned on the shoulder arc side is a side arc. In FIG. 22, an arrow indicated by a reference numeral Rm is a radius of the middle arc, and an arrow indicated by a reference numeral Rs is a radius of the side arc. The radius Rm of the middle arc is smaller than the radius Rc of the center arc. The radius Rs of the side arc is smaller than the radius Rm of the middle arc.

In the tire 402, the plurality of arcs forming the contour line of the tread surface 24 include the center arc that is an arc passing through the equator PC, a pair of shoulder arcs that are arcs each of which is positioned on an outermost side in the axial direction and has the smallest radius Rsh, a pair of middle arcs that are arcs each of which is positioned adjacent to the center arc and has the radius Rm smaller than the radius Rc of the center arc, and a pair of side arcs each of which is positioned between the middle arc and the shoulder arc and has the radius Rs smaller than the radius Rm of the middle arc. Specifically, the plurality of arcs includes the center arc, the pair of middle arcs, the pair of side arcs, and the pair of shoulder arcs.

In FIG. 22, a position indicated by a reference numeral CM is a boundary between the center arc and the middle arc. The middle arc is in contact with the center arc at the boundary CM. A position indicated by a reference numeral MS is a boundary between the middle arc and the side arc. The side arc is in contact with the middle arc at the boundary MS. A position indicated by a reference numeral SH is a boundary between the side arc and the shoulder arc. The shoulder arc is in contact with the side arc at the boundary SH. A position indicated by a reference numeral HU is a boundary between the shoulder arc and a contour line of the side surface 428. The contour line of the side surface 428 is in contact with the shoulder arc at the boundary HU.

In FIG. 22, a length represented by a reference numeral WCM is an axial distance from a first boundary CM to a second boundary CM. The center of the axial distance WCM matches a position of the equatorial plane. A length represented by a reference numeral WMS is an axial distance from a first boundary MS to a second boundary MS. The center of the axial distance WSM matches a position of the equatorial plane. A length represented by a reference numeral WX is the cross-sectional width of the tire 402.

In this tire 402, a ratio (WCM/WX) of the axial distance WCM to the cross-sectional width WX is preferably 25% or more and 40% or less. A ratio (WMS/WX) of the axial distance WMS to the cross-sectional width WX is preferably 45% or more and 60% or less.

In FIG. 22, a straight line LSH is a tangent line in contact with the shoulder arc at the boundary SH. A straight line LHU is a tangent line in contact with the shoulder arc at the boundary HU. A reference numeral PE is an intersection point of the tangent line LSH and the tangent line LHU. In the present invention, the intersection point PE is a reference end of the tread 404. A length represented by a reference numeral WT is an axial distance from a first reference end PE to a second reference end PE. In the present invention, the axial distance WT is a width of the tread 404.

In this tire 402, a ratio (Rc/Rm) of the radius Rc of the center arc to the radius Rm of the middle arc is preferably 1.85 or more and 2.00 or less.

By setting the ratio (Rc/Rm) to 1.85 or more, a difference between the radius Rc of the center arc and the radius Rs of the side arc positioned adjacent to the middle arc can be suppressed to a small extent. Since the slippage of the shoulder portion S is effectively suppressed, the occurrence of the uneven abrasion is suppressed. Good uneven abrasion resistance is obtained in the tire 402. From this point of view, the ratio (Rc/Rm) is more preferably 1.90 or more.

By setting the ratio (Rc/Rm) to 2.00 or less, the side arc can be formed by an arc having a larger radius Rs. The tread surface 24 can be made closer to a flat surface. The tread surface 24 of the tire 402 can effectively contribute to the formation of the clearance G that is close to the interference limit clearance amount. In the tire 402, the clearance G can be reduced. From this point of view, the ratio (Rc/Rm) is more preferably 1.95 or less.

In this tire 402, a ratio (Rm/Rs) of the radius Rm of the middle arc to the radius Rs of the side arc is preferably 2.08 or more and 2.74 or less.

By setting the ratio (Rm/Rs) to 2.08 or more, the tread surface 24 is formed, which can effectively contribute to the formation of the clearance G that is close to the interference limit clearance amount in consideration of the interference with the wheel house. The tire 402 can effectively enhance the sense of unity with the vehicle. From this point of view, the ratio (Rm/Rs) is more preferably 2.30 or more.

By setting the ratio (Rm/Rs) to 2.74 or less, a difference between the radius Rc of the center arc positioned adjacent to the middle arc and the radius Rs of the side arc can be suppressed to a small extent. Since the slippage of the shoulder portion S is effectively suppressed, the occurrence of the uneven abrasion is suppressed. Good uneven abrasion resistance is obtained in the tire 402. From this point of view, the ratio (Rm/Rs) is more preferably 2.50 or less.

In this tire 402, a ratio (WT/WX) of the width WT of the tread 404 to the cross-sectional width WX is preferably 87% or more and 92% or less.

By setting the ratio (WT/WX) to 87% or more, the ground contact surface having an appropriate size is formed. Since a local increase in the ground contact pressure is suppressed, the occurrence of the uneven abrasion is suppressed. From this point of view, the ratio (WT/WX) is more preferably 88% or more.

By setting the ratio (WT/WX) to 92% or less, the slippage of the shoulder portion S is effectively suppressed. In this case as well, the occurrence of the uneven abrasion is suppressed. From this point of view, the ratio (WT/WX) is more preferably 91% or less.

In this tire 402, a ratio (Rc/WT) of the radius Rc of the center arc to the width WT of the tread 404 is preferably 3.90 or more and 4.30 or less.

By setting the ratio (Rc/WT) to 3.90 or more, the tread surface 24 can be made closer to a flat surface. The tread surface 24 of the tire 402 can effectively contribute to the formation of the clearance G that is close to the interference limit clearance amount. In the tire 402, the clearance G can be reduced. From this point of view, the ratio (Rc/WT) is more preferably 3.95 or more, and still more preferably 4.00 or more.

By setting the ratio (Rc/WT) to 4.30 or less, the interference between the tire 402 and the wheel house is suppressed. Since the slippage of the shoulder portion S is effectively suppressed, the occurrence of the uneven abrasion is suppressed. From this point of view, the ratio (Rc/WT) is more preferably 4.25 or less, and still more preferably 4.20 or less.

In the tire 402, in the contour line of the side surface 428, a portion between the boundary HU and the maximum width position PW is represented by an arc. The contour line of the side surface 428 includes an upper arc that is an arc that is continuous with the shoulder arc and passes through the maximum width position PW. In FIG. 22, an arrow indicated by a reference numeral Ru is a radius of the upper arc. The center of the upper arc is positioned on a straight line LW passing through the maximum width position PW and extending in the axial direction.

In this tire 402, a ratio (Ru/WT) of the radius Ru of the upper arc to the width WT of the tread 404 is preferably 0.22 or more and 0.28 or less.

By setting the ratio (Ru/WT) to 0.22 or more, the tread surface 24 can be made closer to a flat surface. The tread surface 24 of the tire 402 can effectively contribute to the formation of the clearance G that is close to the interference limit clearance amount. In the tire 402, the clearance G can be reduced. From this point of view, the ratio (Ru/WT) is more preferably 0.23 or more, and still more preferably 0.24 or more.

By setting the ratio (Ru/WT) to 0.28 or less, it is possible to suppress the interference of the tire 402 with the wheel house. Since the slippage of the shoulder portion S is effectively suppressed, the occurrence of the uneven abrasion is suppressed. From this point of view, the ratio (Ru/WT) is more preferably 0.27 or less, and still more preferably 0.26 or less.

Figure 23:
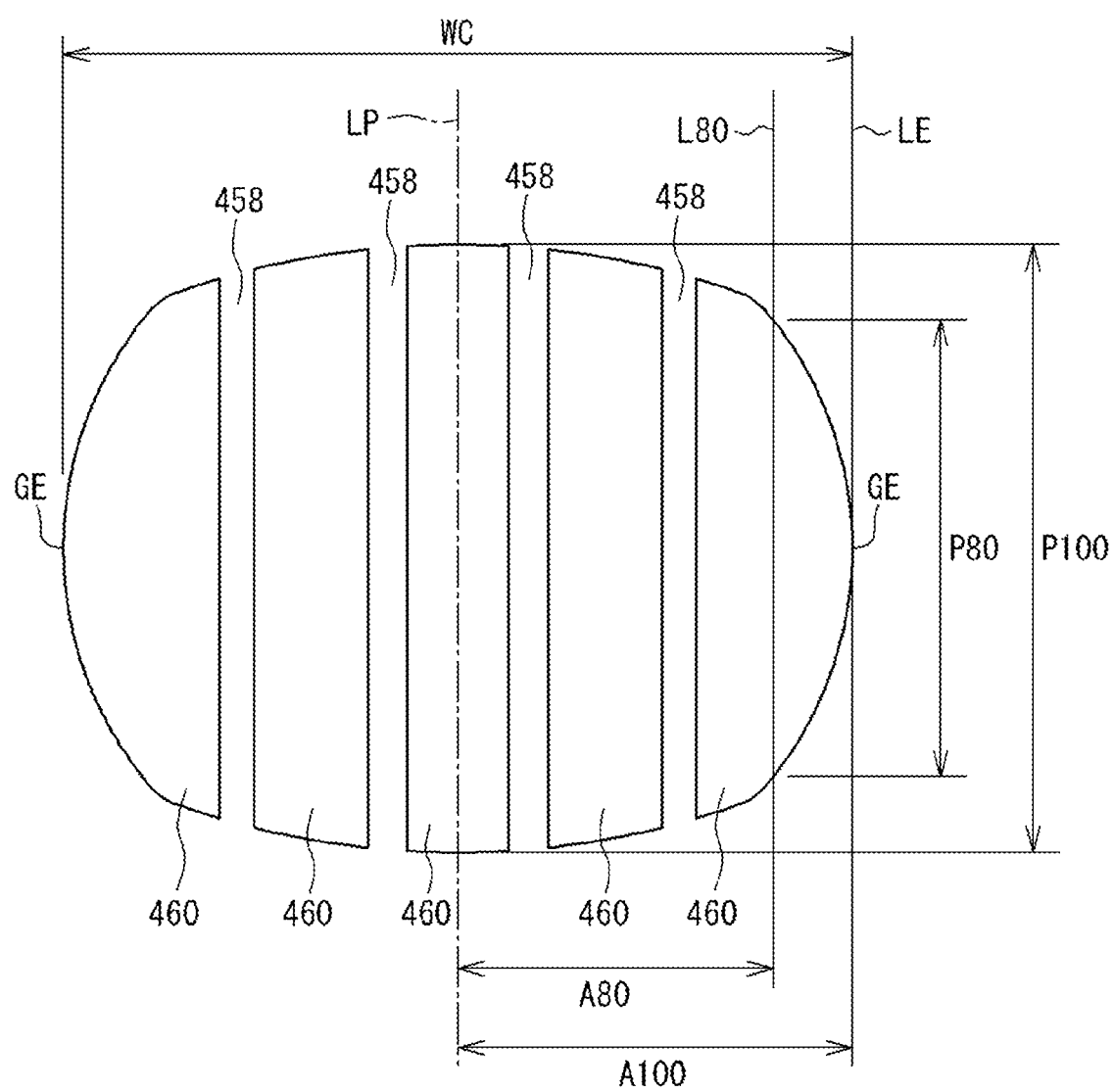
FIG. 23 is a schematic view showing a ground contact surface shape of the tire.

FIG. 23 shows a ground contact surface shape of the tire 402. In FIG. 23, a left-right direction corresponds to the axial direction of the tire 402. An up-down direction corresponds to the circumferential direction of the tire 402.

As described above, the groove 426 is carved in the tread 404. The groove 426 includes a groove (hereinafter, a circumferential groove 458) extending in the circumferential direction. In the tire 402, four circumferential grooves 458 are carved in the tread 404, and five land portions 460 are formed. The ground contact surface shape shown in FIG. 23 includes contours of the five land portions 460.

Among the four circumferential grooves 458, the circumferential groove 458 positioned on an outer side in the axial direction is a shoulder circumferential groove 458s. The circumferential groove 458 positioned axially inside the shoulder circumferential groove 458s is a middle circumferential groove 458m.

The ground contact surface is obtained by applying a load of 70% of the normal load to the tire 402 in the normal state by using a tire ground contact surface shape measurement device (not shown) and bringing the tire 402 into contact with the plane. The ground contact surface shape shown in FIG. 23 is obtained by tracing the contour of each of the land portions 460 included in the ground contact surface. In a case of obtaining the ground contact surface, the tire 402 is disposed such that the axial direction of the tire 402 is parallel to the road surface, and the load described above is applied to the tire 402 in a direction perpendicular to the road surface.

In FIG. 23, a position indicated by a reference numeral GE is an axially outer end (also referred to as a ground contact end) of the ground contact surface. A length represented by a reference numeral WC is an axial distance from a first axially outer end GE to a second axially outer end GE of the ground contact surface. In the present invention, the axial distance WC is a ground contact width of the ground contact surface of the tire 402, which is obtained by applying the load of 70% of the normal load to the tire 402 in the normal state and bringing the tire 402 into contact with the plane.

In this tire 402, a ratio (WC/WX) of the ground contact width WC to the cross-sectional width WX of the tire 402 is preferably 74% or more and 84% or less.

By setting the ratio (WC/WX) to 74% or more, a ground contact surface having an appropriate size is formed. Since a local increase in the ground contact pressure is suppressed, the occurrence of the uneven abrasion is suppressed. From this point of view, the ratio (WC/WX) is more preferably 79% or more.

By setting the ratio (WC/WX) to 84% or less, the slippage of the shoulder portion S is effectively suppressed. In this case as well, the occurrence of the uneven abrasion is suppressed. From this point of view, the ratio (WC/WX) is more preferably 81% or less.

In FIG. 23, a one-point chain line LP is a straight line corresponding to the equator PC of the tire 402 on the ground contact surface. In a case where it is difficult to specify the equator PC on the ground contact surface, an axial center line of the ground contact width WC is used as the straight line corresponding to the equator PC. A bidirectional arrow P100 is a length of an intersection line between the plane including the straight line LP and the ground contact surface. In the tire 402, the length P100 of the intersection line is an equatorial contact length which is measured along the equator PC on the ground contact surface.

In FIG. 23, a solid line LE is a straight line passing through the axially outer end GE of the ground contact surface and being parallel to the straight line LP. A solid line L80 is a straight line that is positioned between the straight line LE and the straight line LP and is parallel to the straight line LE and the straight line LP. A bidirectional arrow A100 represents an axial distance from the straight line LP to the straight line LE. The distance A100 corresponds to half of the ground contact width WC. The bidirectional arrow A80 represents an axial distance from the straight line LP to the straight line L80. In FIG. 23, a ratio of the distance A80 to the distance A100 is set to 80%. In other words, the straight line L80 represents a position corresponding to a width of 80% of the ground contact width WC of the ground contact surface. A bidirectional arrow P80 is a length of an intersection line between the plane including the straight line L80 and the ground contact surface. In the tire 402, the length P80 of the intersection line is a reference ground contact length at the position corresponding to the width of 80% of the ground contact width on the ground contact surface.

In the tire 402, the equatorial contact length P100 and the reference ground contact length P80 are specified on the ground contact surface shown in FIG. 23, and a shape index F represented by a ratio (P100/P80) of the equatorial contact length P100 to the reference ground contact length P80 is obtained.

In this tire 402, the shape index F is preferably 1.05 or more and 1.35 or less.

By setting the shape index F to 1.05 or more, the slippage of the shoulder portion S is effectively suppressed, and the occurrence of the uneven abrasion is suppressed.

By setting the shape index F to 1.35 or less, the ground contact surface having an appropriate size is formed. Since the local increase in the ground contact pressure is suppressed, the occurrence of the uneven abrasion is suppressed in this case as well.

The stiffness of the band 416 is high on an inner side with respect to the boundary CS between the center portion 454 and the side portion 456, and is low on an outer side with respect to the boundary CS. A portion of the circumferential groove in the tread portion has the stiffness lower than the stiffness of other portions. Therefore, in a case where the boundary CS is positioned radially inside the circumferential groove 458, when the tire 402 is inflated, the crown portion C may pop out and the shoulder portion S may greatly retract.

However, in the tire 402, as shown in FIG. 19, the boundary CS between the center portion 454 and the side portion 456 of the band 416 is positioned axially outside the shoulder circumferential groove 458s. The boundary CS is not positioned radially inside the shoulder circumferential groove 458s. As a result, the band 416 can effectively contribute to the suppression of the outer diameter growth of the crown portion C. In the tire 402, in a case where the boundary CS is not positioned radially inside the circumferential groove 458, the boundary CS may be disposed axially inside the shoulder circumferential groove 458s. However, from the points of view that the shoulder portion S can be formed in an angular shape and the visual aspect can be further improved, it is preferable that the boundary CS is positioned axially outside the shoulder circumferential groove 458s. From the point of view that the band 416 can more effectively suppress the outer diameter growth of the crown portion C, it is more preferable that the boundary CS is positioned axially outside the boundary MS between the middle arc and the side arc shown in FIG. 22, and is positioned axially inside the boundary SH between the side arc and the shoulder arc. Stated another way, it is more preferable that the boundary CS is positioned between the boundary MS and the boundary SH in the axial direction.

As described above, the tire 402 can achieve the improvement in the visual aspect while suppressing the increase in the rolling resistance.

Outline of Fifth Embodiment of Present Invention

Configuration 1

A tire according to an aspect of the present invention is a tire having an outer diameter smaller than a value obtained by subtracting 4 mm from an outer diameter maximum value of new product dimensions defined by a JATMA standard or an ETRTO standard, and having a total width smaller than a value obtained by subtracting 5 mm from a maximum total width of the new product dimensions, the tire including an outer surface including a tread surface that is in contact with a road surface, and a pair of side surfaces that are continuous with the tread surface, in which the tread surface includes an equator that is an intersection point with an equatorial plane, each of the side surfaces includes a maximum width position indicating a maximum width of the tire, in a meridional cross section of the tire, an intersection point of a bead baseline and the equatorial plane is a first reference point, an intersection point of a straight line passing through the equator and extending in an axial direction and a straight line passing through the maximum width position and extending in a radial direction is a second reference point, a line segment connecting the first reference point and the second reference point is a reference line segment, an intersection point of the reference line segment and the outer surface of the tire is a shoulder reference point, and a line segment connecting the first reference point and the shoulder reference point is a shoulder line segment, and in a normal state in which the tire is assembled on a normal rim, the internal pressure of the tire is adjusted to a normal internal pressure, and no load is applied to the tire, a ratio of a length of the shoulder line segment to a length of the reference line segment is 85.9% or more and 89.3% or less, and a ratio of a radial distance from the bead baseline to the maximum width position to a cross-sectional height of the tire is 51% or more and 62% or less.

By arranging the tire in this way, in the tire, a clearance with the wheel house can be made close to an interference limit clearance amount. Since the clearance is reduced, the sense of unity between the vehicle and the tire is enhanced. The enhancement in the sense of unity can contribute to the improvement in the visual aspect.

Since the protruding of the shoulder portion is appropriately maintained, the increase in the compressive strain generated in the shoulder portion when the shoulder portion is in contact with the ground is suppressed. Also, since the side surface is formed such that the roundness of the side surface is not excessively gentle in the radially outer portion of the maximum width position of the side surface, the increase in the volume of the rubber in the shoulder portion is suppressed.

In the tire, the shoulder portion protrudes in order to reduce the clearance, but the increase in the compressive strain and the increase in the volume of the rubber at the shoulder portion are suppressed. In the tire, the increase in the rolling resistance is suppressed.

In the tire, the maximum width position is disposed radially outside a position indicating half of the cross-sectional height. Therefore, the tire can be formed such that the roundness of the side surface is gentle in the radially inner portion of the maximum width position. Since the insufficient volume of the rubber in a portion that comes into contact with a flange of the rim is eliminated, the exposure of the carcass cord in this portion is suppressed. The tire has a good appearance quality.

The tire can achieve the improvement in the visual aspect while suppressing the influence on the rolling resistance or the appearance quality.

Configuration 2

It is preferable that, in the tire according to Configuration 1, the tread surface includes a pair of boundary surfaces that are continuous with the side surface, and a main body surface that bridges between the pair of boundary surfaces, and a contour line of the tread surface includes a plurality of arcs, a contour line of each of the boundary surfaces is an arc having a smallest radius among the plurality of arcs, an intersection point of an extension line of a contour line of the main body surface and the reference line segment is a third reference point, and a radial distance from the equator to the third reference point is 9 mm or more and 15 mm or less.

By arranging the tire in this way, in the tire, it is possible to reduce the clearance with the wheel house while suppressing the increase in the compressive strain in the shoulder portion. The tire can achieve the improvement in the visual aspect while suppressing the increase in the rolling resistance.

Configuration 3

It is preferable that, in the tire according to Configuration 2, an angle formed by a line segment connecting the maximum width position and the third reference point with respect to the radial direction is 9.8 degrees or more and 16.7 degrees or less.

By arranging the tire in this way, the increase in the volume of the rubber in the shoulder portion is suppressed. In the tire, the increase in the rolling resistance is effectively suppressed.

Configuration 4

It is preferable that, in the tire according to Configuration 2 or Configuration 3, an intersection point of the bead baseline and a rim width baseline is a fourth reference point, and an angle formed by a line segment connecting the maximum width position and the fourth reference point with respect to the radial direction is 22.2 degrees or less.

By arranging the tire in this way, the insufficient volume of the rubber in a portion that comes into contact with a flange of the rim is effectively eliminated, and thus the exposure of the carcass cord in this portion is sufficiently suppressed. The tire has a good appearance quality.

Details of Fifth Embodiment of Present Invention

Fifth Embodiment (First Version)

Figure 24:
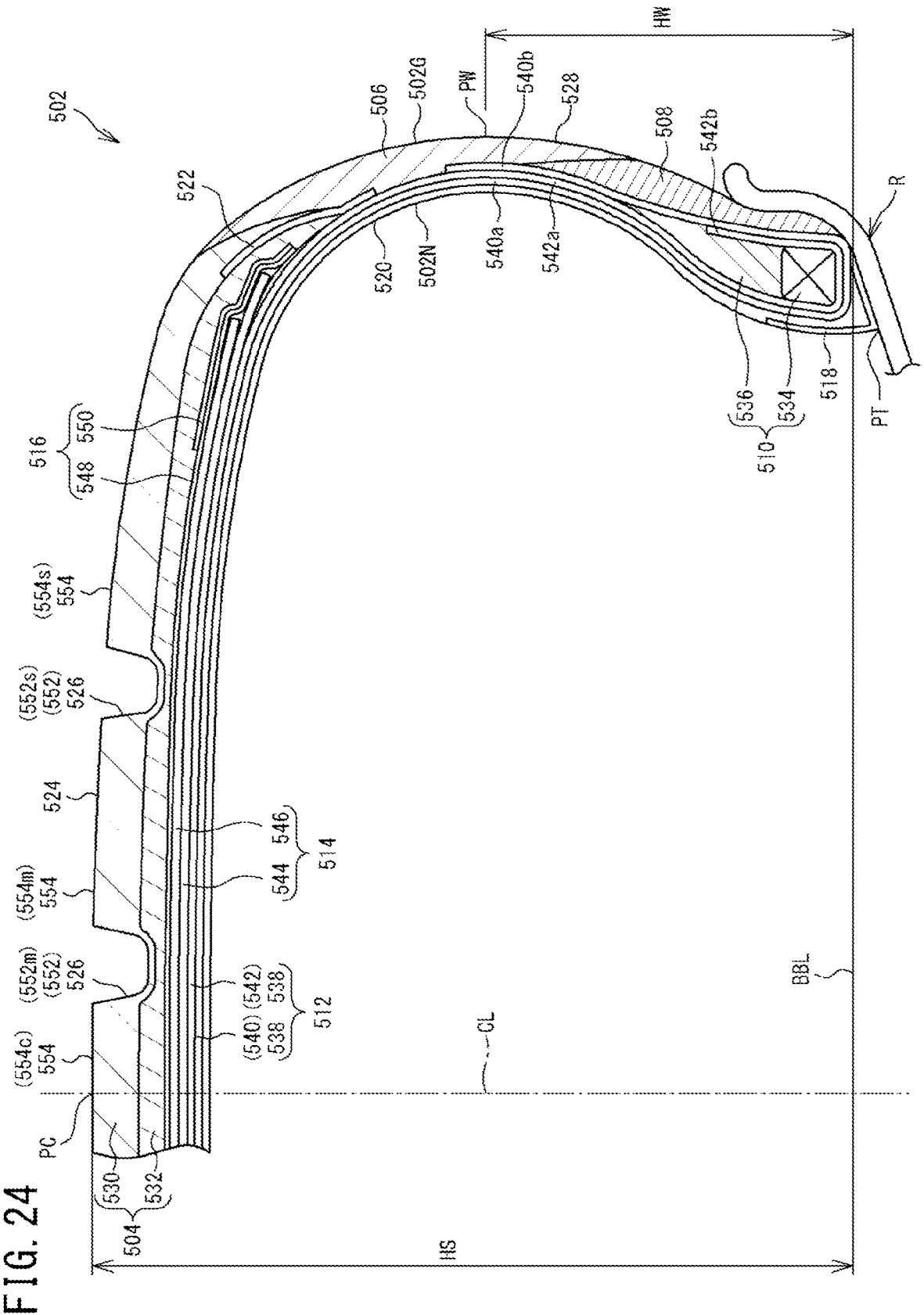
FIG. 24 is a cross-sectional view showing a part of a tire according to still another embodiment of the present invention.

FIG. 24 shows a part of the tire 502 according to the first version of the fifth embodiment. The tire 502 is a pneumatic tire for a passenger vehicle.

FIG. 24 shows a part of a cross section (hereinafter, a meridional cross section) of the tire 502 along a plane including a rotation axis of the tire 502. In FIG. 24, a left-right direction is an axial direction of the tire 502, and an up-down direction is a radial direction of the tire 502. A direction perpendicular to the paper surface in FIG. 24 is a circumferential direction of the tire 502. A one-point chain line CL represents an equatorial plane of the tire 502.

In FIG. 24, the tire 502 is assembled on a rim R (normal rim). An inside of the tire 502 is filled with air, and an internal pressure of the tire 502 is adjusted.

In FIG. 24, a solid line BBL extending in the axial direction is a bead baseline. The bead baseline is a line that defines a rim diameter (see JATMA or the like) of the rim R.

In FIG. 24, a position indicated by a reference numeral PC is an intersection point of an outer surface 502G (specifically, a tread surface which will be described below) of the tire 502 and the equatorial plane. The intersection point PC is an equator of the tire 502. In a case where a groove is positioned on the equatorial plane, the equator PC is specified based on a virtual outer surface obtained on the assumption that there is no groove. The equator PC is a radially outer end of the tire 502.

In FIG. 24, a length represented by a reference numeral HS is a radial distance from the bead baseline to the equator PC. The radial distance HS obtained in the normal state is a cross-sectional height of the tire 502 (see JATMA or the like).

In FIG. 24, a position represented by a reference numeral PW is an axially outer end (hereinafter referred to as an outer end PW) of the tire 502. In a case where a decoration, such as a pattern or a character, is present on the outer surface, the outer end PW is specified based on a virtual outer surface obtained on the assumption that there is no decoration.

An axial distance from a first outer end PW to a second outer end PW obtained in the normal state is a cross-sectional width of the tire 502 (see JATMA or the like). The outer end PW is also referred to as a maximum width position. The maximum width position is a position at which the tire 502 indicates a maximum width.

In FIG. 24, a length represented by a reference numeral HW is a radial distance from the bead baseline to the maximum width position PW.

In FIG. 24, a position indicated by a reference numeral PT is a toe of the tire 502. The toe PT is a boundary between an outer surface 502G and an inner surface 502N of the tire 502.

The tire 502 includes a tread 504, a pair of sidewalls 506, a pair of clinches 508, a pair of beads 510, a carcass 512, a belt 514, a band 516, a pair of chafers 518, an inner liner 520, and a pair of fixing layers 522.

The tread 504 is in contact with a road surface on a tread surface 524. The tread 504 includes the tread surface 524 that is in contact with the road surface. A groove 526 is carved in the tread 504. The tread 504 is positioned radially outside the carcass 512.

The tread surface 524 is a part of the outer surface 502G of the tire 502. A side surface 528 is continuous with the tread surface 524. The outer surface 502G of the tire 502 includes the tread surface 524 and a pair of side surfaces 528.

The tread surface 524 includes the equator PC. Each of the side surfaces 528 includes the maximum width position PW. The outer surface 502G includes the equator PC and the maximum width position PW.

The tread 504 includes a cap portion 530 and a base portion 532. The cap portion 530 includes the tread surface 524. The cap portion 530 is made of the crosslinked rubber in which the abrasion resistance and the grip performance are taken into consideration. The base portion 532 is positioned radially inside the cap portion 530. The base portion 532 is entirely covered with the cap portion 530. The base portion 532 is made of the crosslinked rubber having a low heat generation property.

Each of the sidewalls 506 is continuous with the tread 504. The sidewall 506 is positioned radially inside the tread 504. The sidewall 506 is positioned axially outside the carcass 512. The sidewall 506 is made of the crosslinked rubber in consideration of the cut resistance. The sidewall 506 forms a part of the side surface 528.

Each of the clinches 508 is positioned radially inside the sidewall 506. The clinch 508 comes into contact with the rim R. The clinch 508 is made of the crosslinked rubber in which the abrasion resistance is taken into consideration. The clinch 508 forms a part of the sidewall portion.

Each of the beads 510 is positioned axially inside the clinch 508. The bead 510 is positioned radially inside the sidewall 506.

The bead 510 includes a core 534 and an apex 536. The core 534 extends in the circumferential direction. Although not shown, the core 534 includes a wire made of steel. The apex 536 is positioned radially outside the core 534. The apex 536 is tapered radially outward. The apex 536 is made of the crosslinked rubber having high stiffness.

The carcass 512 is positioned inside the tread 504, the pair of sidewalls 506, and the pair of clinches 508. The carcass 512 bridges between the pair of beads 510, that is, between a first bead 510 and a second bead 510 (not shown). The carcass 512 includes at least one carcass ply 538.

The carcass 512 of the tire 502 is formed by two carcass plies 538. Although not shown, each of the carcass plies 538 includes a large number of carcass cords arranged in parallel. These carcass cords intersect with the equatorial plane. The carcass 512 of the tire 502 has a radial structure. In the tire 502, a cord made of an organic fiber is used as the carcass cord. Examples of the organic fiber include a nylon fiber, a rayon fiber, a polyester fiber, and an aramid fiber.

Among the two carcass plies 538, the carcass ply 538 positioned inside the tread 504 on an inner side in the radial direction is a first carcass ply 540. The carcass ply 538 positioned inside the tread 504 and radially outside the first carcass ply 540 is a second carcass ply 542.

The first carcass ply 540 includes a first ply main body 540a and a pair of first folded-back portions 540b. The first ply main body 540a bridges between the pair of beads 510. Each of the first folded-back portions 540b is continuous with the first ply main body 540*a*, and is folded back from the inner side to the outer side in the axial direction by each of the beads 510.

The second carcass ply 542 includes a second ply main body 542*a* and a pair of second folded-back portions 542*b*. The second ply main body 542*a* bridges between the pair of beads 510. Each of the second folded-back portions 542*b* is continuous with the second ply main body 542*a*, and is folded back from the inner side to the outer side in the axial direction by each of the beads 510.

In the tire 502, an end of the first folded-back portion 540*b* is positioned radially outside the maximum width position PW. An end of the second folded-back portion 542*b* is positioned radially inside the maximum width position PW. The end of the second folded-back portion 542*b* is positioned between an outer end of the apex 536 and the core 534 in the radial direction.

The second folded-back portion 542*b* is positioned axially inside the first folded-back portion 540*b*. The end of the second folded-back portion 542*b* is interposed between the apex 536 and the first folded-back portion 540*b*.

The belt 514 is positioned radially inside the tread 504. The belt 514 is laminated on the carcass 512. The equatorial plane described above intersects with the belt 514 at the center of an axial width of the belt 514.

In this tire 502, the axial width of the belt 514 is 70% or more and 90% or less of the cross-sectional width of the tire 502.

The belt 514 includes a first layer 544 and a second layer 546. The first layer 544 is positioned radially outside the second ply main body 542*a*, and is laminated on the second ply main body 542*a*. The second layer 546 is positioned radially outside the first layer 544, and is laminated on the first layer 544.

As shown in FIG. 24, an end of the second layer 546 is positioned axially inside an end of the first layer 544. The second layer 546 is narrower than the first layer 544. A length from the end of the second layer 546 to the end of the first layer 544 is 3 mm or more and 10 mm or less. The axial width of the belt 514 is represented by the axial width of the wide first layer 544.

Although not shown, each of the first layer 544 and the second layer 546 includes a large number of belt cords arranged in parallel. These belt cords are covered with topping rubber. Each of the belt cords is inclined with respect to the equatorial plane. A material of the belt cord is steel.

The band 516 is positioned between the tread 504 and the belt 514 in the radial direction. The band 516 is laminated on the belt 514.

An end of the band 516 is positioned axially outside an end of the belt 514. A length from the end of the belt 514 to the end of the band 516 is 3 mm or more and 7 mm or less.

Although not shown, the band 516 includes a band cord spirally wound. The band cord is covered with topping rubber. The band cord extends substantially in the circumferential direction. In detail, an angle formed by the band cord with respect to the circumferential direction is 5° or less. The band 516 has a jointless structure.

The band cord is an organic fiber cord. Examples of the organic fiber include a nylon fiber, a rayon fiber, a polyester fiber, and an aramid fiber.

The band 516 includes a full band 548 and a pair of edge bands 550.

The full band 548 is laminated on the belt 514. The full band 548 covers the entire belt 514. Each end of the full band 548 is positioned axially outside the end of the belt 514.

The pair of edge bands 550 are disposed axially apart from each other with the equatorial plane interposed therebetween. Each of the edge bands 550 is laminated on the full band 548. The edge band 550 covers a portion of an end of the full band 548.

The band 516 may be formed by only the full band 548. The band 516 may be formed by only the pair of edge bands 550.

Each of the chafers 518 is positioned radially inside the bead 510. The chafer 518 comes into contact with the rim R. The chafer 518 of the tire 502 is made of a cloth and rubber impregnated in the cloth.

The inner liner 520 is positioned inside the carcass 512. The inner liner 520 forms the inner surface 502N of the tire 502. The inner liner 520 is made of the crosslinked rubber having an excellent air shielding property. The inner liner 520 retains the internal pressure of the tire 502.

The respective fixing layers 522 are disposed axially apart from each other. The fixing layer 522 is positioned axially outside the belt 514. An inner end of the fixing layer 522 is positioned between the cap portion 530 and the base portion 532. An outer end of the fixing layer 522 is positioned between the sidewall 506 and the carcass 512. The fixing layer 522 is made of the crosslinked rubber in which the adhesive force is taken into consideration.

As described above, the groove 526 is carved in the tread 504. The groove 526 includes a groove (hereinafter, a circumferential groove 552) extending in the circumferential direction. In the tire 502, four circumferential grooves 552 are carved in the tread 504, and five land portions 554 are formed.

Among the four circumferential grooves 552, the circumferential groove 552 positioned on an outer side in the axial direction is a shoulder circumferential groove 552*s*. The circumferential groove 552 positioned axially inside the shoulder circumferential groove 552*s* is a middle circumferential groove 552*m*.

Among the five land portions 554, the land portion 554 positioned on an outer side in the axial direction is a shoulder land portion 554*s*. The land portion 554 positioned axially inside the shoulder land portion 554*s* is a middle land portion 554*m*. The land portion 554 positioned axially inside the middle land portion 554*m* is a center land portion 554*c*.

Figure 25:
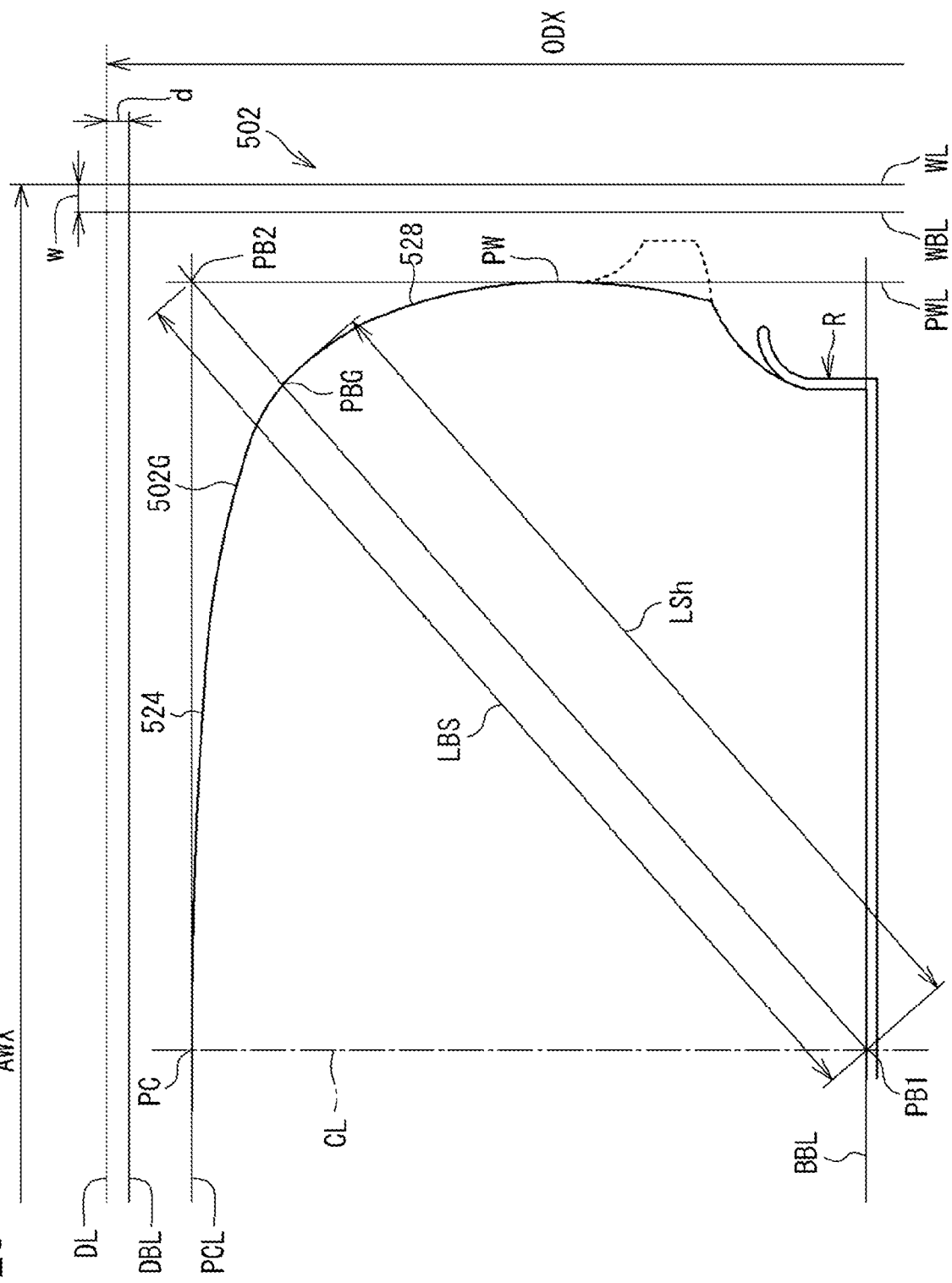
FIG. 25 is a cross-sectional view for describing a reference line segment and a shoulder line segment.

FIG. 25 schematically shows the meridional cross section of the tire 502. FIG. 25 shows a contour line of the outer surface 502G. The contour line is represented by a virtual outer surface obtained on the assumption that there is no decoration, such as a groove, a pattern, or a character. A dotted line in FIG. 25 is a rim guard as an example of the decoration.

Although not described in detail, in the present invention, the contour line of the outer surface 502G is obtained by measuring an outer surface shape of the tire 502 in the normal state by using, for example, a displacement sensor.

In FIG. 25, a length represented by a reference numeral ODX is an outer diameter maximum value of new product dimensions defined in the JATMA standard. A solid line DL extending in the axial direction is a dimension line indicating the outer diameter maximum value ODX. In a case where the designation of the tire 502 is "235/55R19", the outer diameter maximum value ODX of the new product dimensions is 749 mm.

In FIG. 25, a straight line DBL extending in the axial direction is an outer diameter reference line indicating an outer diameter that is smaller than the outer diameter maximum value ODX of the new product dimensions by 4 mm. A bidirectional arrow d is a radial distance from the dimension line DL to the outer diameter reference line DBL. In the present invention, the radial distance d is 2.0 mm. In a case where the designation of the tire 502 is "235/55R19", the radial distance from a first outer diameter reference line DBL to a second outer diameter reference line DBL (not shown) is 745 mm.

As the outer diameter maximum value ODX, an outer diameter maximum value of the new product dimensions defined in the ETRTO standard may be used.

In FIG. 25, a length represented by a reference numeral AWX is a maximum total width of the new product dimensions defined in the JATMA standard. A solid line WL extending in the radial direction is a dimension line indicating the maximum total width AWX. In a case where the designation of the tire 502 is "235/55R19", the maximum total width of the new product dimensions is 255 mm.

In FIG. 25, a straight line WBL extending in the radial direction is a total width reference line indicating a total width that is smaller than the maximum total width AWX of the new product dimensions by 5 mm. A bidirectional arrow w is an axial distance from the dimension line WL to the total width reference line WBL. In the present invention, the axial distance w is 2.5 mm. In a case where the designation of the tire 502 is "235/55R19", an axial distance from a first total width reference line WBL to a second total width reference line WBL (not shown) is 250 mm.

As the maximum total width AWX, a maximum total width of the new product dimensions defined in the ETRTO standard may be used.

The tire 502 is entirely within a region surrounded by the first outer diameter reference line DBL and the second outer diameter reference line DBL, and the first total width reference line WBL and the second total width reference line WBL in the meridional cross section. Stated another way, the tire 502 has an outer diameter smaller than a value obtained by subtracting 4 mm from the outer diameter maximum value of the new product dimensions defined by the JATMA standard or the ETRTO standard, and has a total width smaller than a value obtained by subtracting 5 mm from the maximum total width of the new product dimensions.

In FIG. 25, a position indicated by a reference numeral PB1 is an intersection point of the bead baseline and the equatorial plane. In the present invention, the intersection point PB1 is a first reference point.

In FIG. 25, a solid line PCL is a straight line passing through the equator PC and extending in the axial direction. A solid line PWL is a straight line passing through the maximum width position PW and extending in the radial direction. A position indicated by a reference numeral PB2 is an intersection point of the straight line PCL and the straight line PWL. In the present invention, the intersection point PB2 is a second reference point. A line segment connecting the first reference point PB1 and the second reference point PB2 is a reference line segment, and a length indicated by a reference numeral LBS in FIG. 25 is a length of the reference line segment.

In FIG. 25, a reference numeral PBG is an intersection point of the reference line segment and the outer surface 502G. In the present invention, the intersection point PBG is a shoulder reference point. A line segment connecting the first reference point PB1 and the shoulder reference point PBG is the shoulder line segment, and a length indicated by a reference numeral LSh in FIG. 25 is a length of the shoulder line segment.

In the present invention, a distance from the outer surface 502G of the tire 502 to the wheel house (not shown), which is measured along a straight line passing through the first reference point PB1 and the second reference point PB2, is a clearance G formed between a tire T and a wheel house H of a vehicle B shown in FIG. 40. In a case where the clearance G is less than 22 mm, the tire 502 interferes with the wheel house. Stated another way, the interference limit clearance amount in the vehicle is 22 mm.

Figure 26:
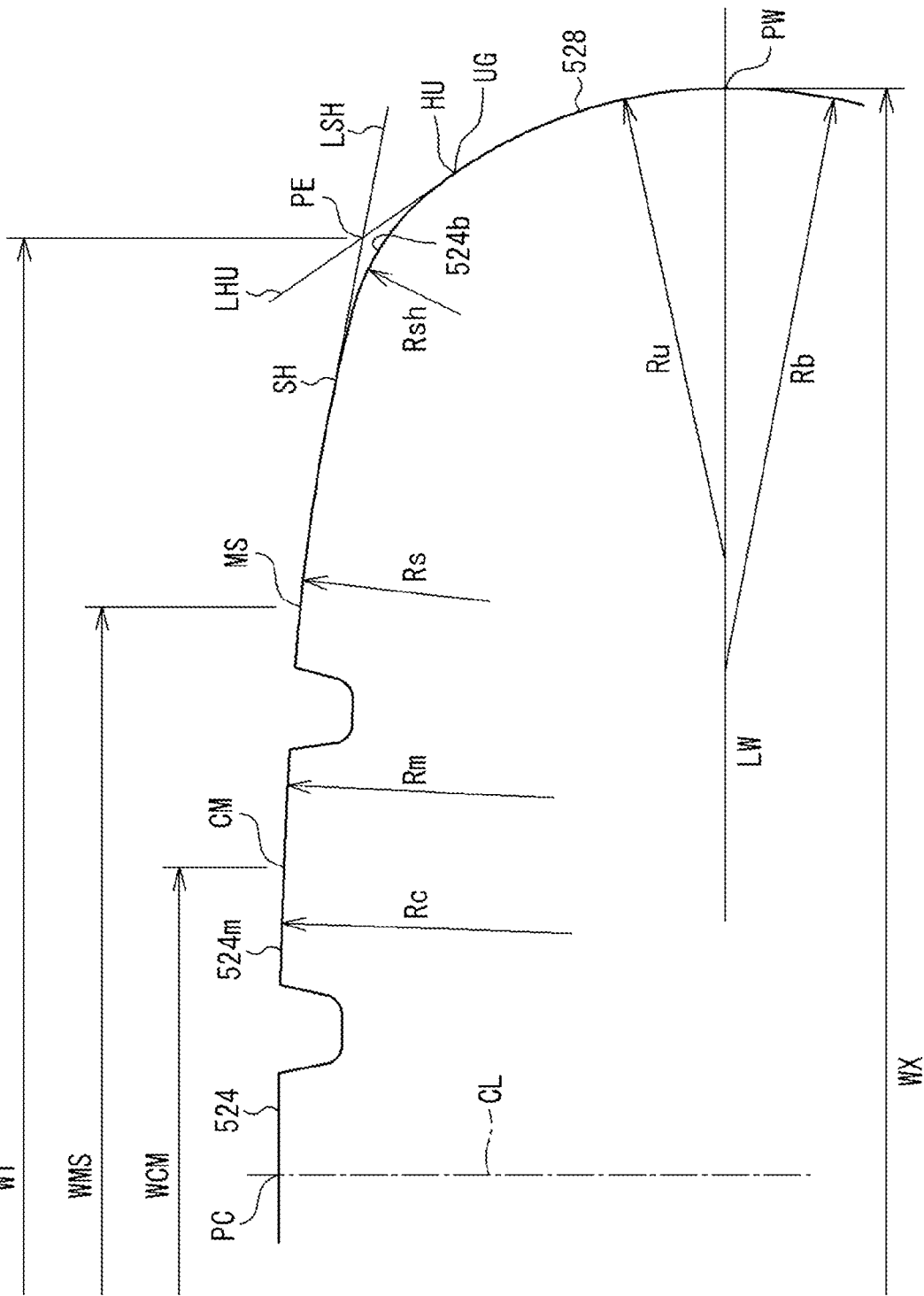
FIG. 26 is a cross-sectional view for describing a contour line of a tread surface.

FIG. 26 shows a part of the contour line shown in FIG. 25.

In the meridional cross section, the contour line of the tread surface 524 is formed by a plurality of arcs arranged in the axial direction. Stated another way, the contour line of the tread surface 524 includes a plurality of arcs arranged in the axial direction.

Among the plurality of arcs, an arc positioned at the center in the axial direction is a center arc. In FIG. 26, an arrow indicated by a reference numeral Rc is a radius of the center arc. The center arc passes through the equator PC. Although not shown, the center of the center arc is positioned on the equatorial plane.

Among the plurality of arcs, an arc positioned on an outer side in the axial direction is a shoulder arc. In FIG. 26, an arrow indicated by a reference numeral Rsh is a radius of the shoulder arc. The shoulder arc has the smallest radius Rsh among the plurality of arcs forming the contour line of the tread surface 524.

The contour line of the tread surface 524 of the tire 502 includes two arcs between the center arc and the shoulder arc. Among these two arcs, an arc positioned on the center arc side is a middle arc, and an arc positioned on the shoulder arc side is a side arc. In FIG. 26, an arrow indicated by a reference numeral Rm is a radius of the middle arc, and an arrow indicated by a reference numeral Rs is a radius of the side arc. The radius Rm of the middle arc is smaller than the radius Rc of the center arc. The radius Rs of the side arc is smaller than the radius Rm of the middle arc.

In the tire 502, the plurality of arcs forming the contour line of the tread surface 524 include the center arc passing through the equator PC, a pair of shoulder arcs each of which is positioned on an outermost side in the axial direction and has the smallest radius Rsh, a pair of middle arcs each of which is positioned adjacent to the center arc and has the radius Rm smaller than the radius Rc of the center arc, and a pair of side arcs each of which is positioned between the middle arc and the shoulder arc and has the radius Rs smaller than the radius Rm of the middle arc. Specifically, the plurality of arcs includes the center arc, the pair of middle arcs, the pair of side arcs, and the pair of shoulder arcs.

In FIG. 26, a position indicated by a reference numeral CM is a boundary between the center arc and the middle arc. The middle arc is in contact with the center arc at the boundary CM. A position indicated by a reference numeral MS is a boundary between the middle arc and the side arc. The side arc is in contact with the middle arc at the boundary MS. A position indicated by a reference numeral SH is a boundary between the side arc and the shoulder arc. The shoulder arc is in contact with the side arc at the boundary SH. A position indicated by a reference numeral HU is a boundary between the shoulder arc and a contour line of the side surface 528. The contour line of the side surface 528 is in contact with the shoulder arc at the boundary HU.

In FIG. 26, a length represented by a reference numeral WCM is an axial distance from a first boundary CM to a second boundary CM. The center of the axial distance WCM matches a position of the equatorial plane. A length represented by a reference numeral WMS is an axial distance from a first boundary MS to a second boundary MS. The center of the axial distance WSM matches a position of the equatorial plane. A length represented by a reference numeral WX is the cross-sectional width of the tire 502.

In this tire 502, a ratio (WCM/WX) of the axial distance WCM to the cross-sectional width WX is preferably 25% or more and 40% or less. A ratio (WMS/WX) of the axial distance WMS to the cross-sectional width WX is preferably 45% or more and 60% or less.

In FIG. 26, a straight line LSH is a tangent line in contact with the shoulder arc at the boundary SH. A straight line LHU is a tangent line in contact with the shoulder arc at the boundary HU. A reference numeral PE is an intersection point of the tangent line LSH and the tangent line LHU. In the present invention, the intersection point PE is a reference end of the tread 504. A length represented by a reference numeral WT is an axial distance from a first reference end PE to a second reference end PE. In the present invention, the axial distance WT is a width of the tread 504.

In the tire 502, in the contour line of the side surface 528, a portion between the boundary HU and the maximum width position PW is represented by an arc. The contour line of the side surface 528 includes an upper arc that is an arc that is continuous with the shoulder arc and passes through the maximum width position PW. In FIG. 26, an arrow indicated by a reference numeral Ru is a radius of the upper arc. The center of the upper arc is positioned on a straight line LW passing through the maximum width position PW and extending in the axial direction. In FIG. 26, a position indicated by a reference numeral UG is an outer end of the upper arc.

In this tire 502, the shoulder arc and the upper arc may be connected by a straight line. In this case, the straight line is drawn to be in contact with the shoulder arc at the boundary HU and is in contact with the upper arc at the outer end UG. From the point of view that the volume of the rubber in a buttress can be reduced, it is preferable that the boundary HU and the outer end UG are connected by the straight line in the contour line of the outer surface 502G.

In the tire 502, in the contour line of the side surface 528, a radially inner portion of the maximum width position PW includes a lower arc that is an arc continuous with the upper arc at the maximum width position PW. In FIG. 26, the arrow indicated by the reference numeral Rb is a radius of the lower arc. The center of the lower arc is positioned on a straight line LW passing through the maximum width position PW and extending in the axial direction.

As described above, in the tire 502, the contour line of the tread surface 524 includes the plurality of arcs. The contour line of the side surface 528 is continuous with the shoulder arc. In the present invention, on the tread surface 524, a surface of which a contour line is represented by the shoulder arc is a boundary surface. A portion other than the boundary surface is a main body surface.

In the tire 502, the tread surface 524 includes a pair of boundary surfaces 524b that are continuous with the side surface 528, and a main body surface 524m that bridges between the pair of boundary surfaces 524b. The contour line of the tread surface 524 includes the plurality of arcs, and a contour line of each of the boundary surfaces 524b is an arc having the smallest radius among the plurality of arcs included in the tread surface 524, that is, the shoulder arc. A contour line of the main body surface 524m of the tire 502 includes a center arc, a pair of middle arcs, and a pair of side arcs.

In the tire 502, a ratio (LSh/LBS) of the length LSh of the shoulder line segment to the length LBS of the reference line segment is 85.9% or more and 89.3% or less in the normal state.

Since the ratio (LSh/LBS) is 89.3% or less, the tire 502 is appropriately disposed apart from the wheel house. In the tire 502, the interference with the wheel house is prevented. Since the protruding of the shoulder portion is appropriately maintained, the increase in the compressive strain generated in the shoulder portion when the shoulder portion is in contact with the ground is suppressed. Also, since the side surface 528 is formed such that the roundness of the side surface 528 is not excessively gentle in the radially outer portion of the maximum width position PW of the side surface 528, the increase in the volume of the rubber in the shoulder portion is suppressed.

In the tire, the shoulder portion protrudes in order to reduce the clearance, but the increase in the compressive strain and the increase in the volume of the rubber at the shoulder portion are suppressed. In the tire, the increase in the rolling resistance is suppressed.

In the tire in the related art, the ratio (LSh/LBS) is less than 85.9%. On the contrary, in the tire 502, the ratio (LSh/LBS) is 85.9% or more, and the percentage of the shoulder line segment occupied in the reference line segment is larger as compared with the tire in the related art. In the tire 502, the clearance G close to the interference limit clearance amount is formed. Stated another way, in the tire 502, the clearance G can be reduced. Since the clearance G is reduced, the sense of unity between the vehicle and the tire 502 is enhanced. The enhancement in the sense of unity can contribute to the improvement in the visual aspect.

In the tire 502, in the normal state, a ratio (HW/HS) of the radial distance HW from the bead baseline to the maximum width position to the cross-sectional height HS of the tire 502 is 51% or more and 62% or less.

Since the ratio (HW/HS) is 51% or more, the tire 502 can be formed such that the roundness of the side surface 528 is gentle in the radially inner portion of the maximum width position PW. Since the insufficient volume of the rubber in a portion that comes into contact with a flange of the rim R is eliminated, the exposure of the carcass cord in this portion is suppressed. The tire 502 has a good appearance quality.

Since the ratio (HW/HS) is 62% or less, the increase in the volume of the rubber in the shoulder portion is suppressed. In the tire 502, the increase in the rolling resistance is effectively suppressed.

In the tire 502, the ratio (LSh/LBS) is 85.9% or more and 89.3% or less, and the ratio (HW/HS) is 51% or more and 62% or less.

The tire 502 can achieve the improvement in the visual aspect while suppressing the influence on the rolling resistance or the appearance quality.

Figure 27:
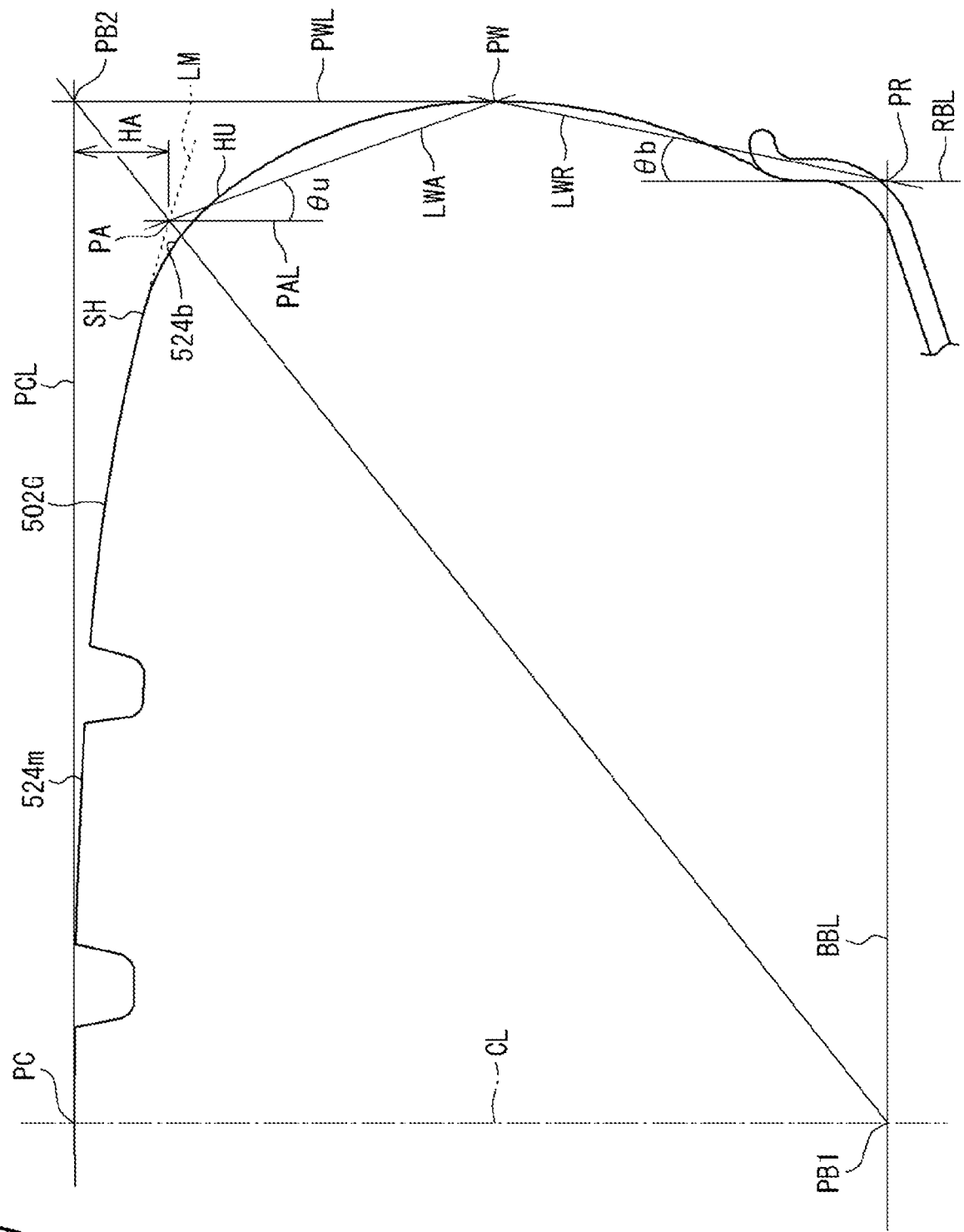
FIG. 27 is a cross-sectional view for describing a contour line of an outer surface of the tire.

FIG. 27 shows a contour line of the outer surface 502G of the tire 502. The dotted line LM is an extension line of the contour line of the main body surface 524m. In the tire 502, the boundary SH is an outer end of the side arc. The extension line LM is a line extending the side arc from the outer end SH. A circle including the extension line is the same as a circle including the side arc.

A position indicated by a reference numeral PA is an intersection point of the extension line LM and the reference line segment. In the present invention, the intersection point PA is a third reference point. A length represented by a reference numeral HA is a radial distance from the equator PC to the third reference point PA.

In this tire 502, the radial distance HA is preferably 9 mm or more and 15 mm or less.

By setting the radial distance HA to 9 mm or more, the protruding of the shoulder portion is appropriately maintained. In the tire 502, the increase in the compressive strain generated in the shoulder portion when the tire is in contact with the ground is suppressed, and thus the increase in the rolling resistance is suppressed.

Since the radial distance HA is set to 15 mm or less, the clearance G is reduced, so that the sense of unity between the vehicle and the tire 502 is enhanced. The tire 502 can effectively contribute to the improvement in the visual aspect. From this point of view, the radial distance HA is more preferably 13 mm or less.

In FIG. 27, the solid line represented by the reference numeral LWA is a line segment connecting the maximum width position PW and the third reference point PA. A solid line represented by a reference numeral PAL is a straight line passing through the third reference point PA and extending in the radial direction. An angle represented by a reference numeral θu is an angle formed by the line segment LWA and the straight line PAL. In the present invention, the angle θu is an angle formed by the line segment LWA connecting the maximum width position PW and the third reference point PA with respect to the radial direction.

In this tire 502, the angle θu is preferably 9.8 degrees or more and 16.7 degrees or less.

By setting the angle θu to 9.8 degrees or more, the protruding of the shoulder portion is appropriately maintained. In the tire 502, the increase in the compressive strain generated in the shoulder portion when the tire is in contact with the ground is suppressed, and thus the increase in the rolling resistance is suppressed. From this point of view, the angle θu is more preferably 9.9 degrees or more.

By setting the angle θu to 16.7 degrees or less, the clearance G is reduced, so that the sense of unity between the vehicle and the tire 502 is enhanced. The tire 502 can effectively contribute to the improvement in the visual aspect. From this point of view, the angle θu is more preferably 15.9 degrees or less, and still more preferably 13.1 degrees or less.

In FIG. 27, a solid line RBL extending in the radial direction is the rim width baseline. The rim width baseline is a line that defines a rim width (see JATMA or the like) of the rim R. A position indicated by a reference numeral PR is an intersection point of the bead baseline and the rim width baseline. In the present invention, the intersection point PR is a fourth reference point.

A solid line represented by a reference numeral LWR is a line segment connecting the maximum width position PW and the fourth reference point PR. An angle represented by a reference numeral θb is an angle formed by the line segment LWR and the rim width baseline. In the present invention, the angle θb is an angle formed by the line segment LWR connecting the maximum width position PW and the fourth reference point PR with respect to the radial direction.

In this tire 502, the angle θb is preferably 22.2 degrees or less. Accordingly, the roundness of the side surface 528 can be formed to be gentle in the radially inner portion of the maximum width position PW. Since the insufficient volume of the rubber in a portion that comes into contact with a flange of the rim R is eliminated, the exposure of the carcass cord in this portion is suppressed. The tire has a good appearance quality. From this point of view, the angle θb is more preferably 21.9 degrees or less. From the point of view of suppressing an excessive increase in the stiffness of the sidewall portion, the angle θb is preferably 10.0 degrees or more, and more preferably 20.0 degrees or more.

In the tire 502, in order to improve the visual aspect, the tread portion is formed such that the shoulder portion has an angular shape. When the shoulder portion protrudes, the ground contact pressure of the shoulder portion is increased, and there is a concern that uneven abrasion occurs. In the tire 502, in order to achieve the improvement in the visual aspect while suppressing the influence on the rolling resistance or the appearance quality, the influence on the uneven abrasion resistance is taken into consideration. For this reason, in the tire 502, it is preferable that the contour line of the tread surface is arranged as follows.

In this tire 502, a ratio (Rc/Rm) of the radius Rc of the center arc to the radius Rm of the middle arc is preferably 1.85 or more and 2.00 or less.

By setting the ratio (Rc/Rm) to 1.85 or more, a difference between the radius Rc of the center arc and the radius Rs of the side arc positioned adjacent to the middle arc can be suppressed to a small extent. Since the slippage of the shoulder portion is effectively suppressed, the occurrence of the uneven abrasion is suppressed. Good uneven abrasion resistance is obtained in the tire 502. From this point of view, the ratio (Rc/Rm) is more preferably 1.90 or more.

By setting the ratio (Rc/Rm) to 2.00 or less, the side arc can be formed by an arc having a larger radius Rs. The tread surface 524 can be made closer to a flat surface. The tread surface 524 of the tire 502 can effectively contribute to the formation of the clearance G that is close to the interference limit clearance amount. In the tire 502, the clearance G can be reduced. From this point of view, the ratio (Rc/Rm) is more preferably 1.95 or less.

In this tire 502, a ratio (Rm/Rs) of the radius Rm of the middle arc to the radius Rs of the side arc is preferably 2.08 or more and 2.74 or less.

By setting the ratio (Rm/Rs) to 2.08 or more, the tread surface 524 is formed, which can effectively contribute to the formation of the clearance G that is close to the interference limit clearance amount in consideration of the interference with the wheel house. The tire 502 can effectively enhance the sense of unity with the vehicle. From this point of view, the ratio (Rm/Rs) is more preferably 2.30 or more.

By setting the ratio (Rm/Rs) to 2.74 or less, a difference between the radius Rc of the center arc positioned adjacent to the middle arc and the radius Rs of the side arc can be suppressed to a small extent. Since the slippage of the shoulder portion is effectively suppressed, the occurrence of the uneven abrasion is suppressed. Good uneven abrasion resistance is obtained in the tire 502. From this point of view, the ratio (Rm/Rs) is more preferably 2.50 or less.

In this tire 502, a ratio (WT/WX) of the width WT of the tread 504 to the cross-sectional width WX is preferably 87% or more and 92% or less.

By setting the ratio (WT/WX) to 87% or more, the ground contact surface having an appropriate size is formed. Since a local increase in the ground contact pressure is suppressed, the occurrence of the uneven abrasion is suppressed. From this point of view, the ratio (WT/WX) is more preferably 88% or more.

By setting the ratio (WT/WX) to 92% or less, the slippage of the shoulder portion is effectively suppressed. In this case as well, the occurrence of the uneven abrasion is suppressed. From this point of view, the ratio (WT/WX) is more preferably 91% or less.

In this tire 502, a ratio (Rc/WT) of the radius Rc of the center arc to the width WT of the tread 504 is preferably 3.90 or more and 4.30 or less.

By setting the ratio (Rc/WT) to 3.90 or more, the tread surface 524 can be made closer to a flat surface. The tread surface 524 of the tire 502 can effectively contribute to the formation of the clearance G that is close to the interference limit clearance amount. In the tire 502, the clearance G can be reduced. From this point of view, the ratio (Rc/WT) is more preferably 3.95 or more, and still more preferably 4.00 or more.

By setting the ratio (Rc/WT) to 4.30 or less, the interference between the tire 502 and the wheel house is suppressed. Since the slippage of the shoulder portion is effectively suppressed, the occurrence of the uneven abrasion is suppressed. From this point of view, the ratio (Rc/WT) is more preferably 4.25 or less, and still more preferably 4.20 or less.

In this tire 502, a ratio (Ru/WT) of the radius Ru of the upper arc to the width WT of the tread 504 is preferably 0.22 or more and 0.28 or less.

By setting the ratio (Ru/WT) to 0.22 or more, the tread surface 524 can be made closer to a flat surface. The tread surface 524 of the tire 502 can effectively contribute to the formation of the clearance G that is close to the interference limit clearance amount. In the tire 502, the clearance G can be reduced. From this point of view, the ratio (Ru/WT) is more preferably 0.23 or more, and still more preferably 0.24 or more.

By setting the ratio (Ru/WT) to 0.28 or less, it is possible to suppress the interference of the tire 502 with the wheel house. Since the slippage of the shoulder portion is effectively suppressed, the occurrence of the uneven abrasion is suppressed. From this point of view, the ratio (Ru/WT) is more preferably 0.27 or less, and still more preferably 0.26 or less.

Figure 28:
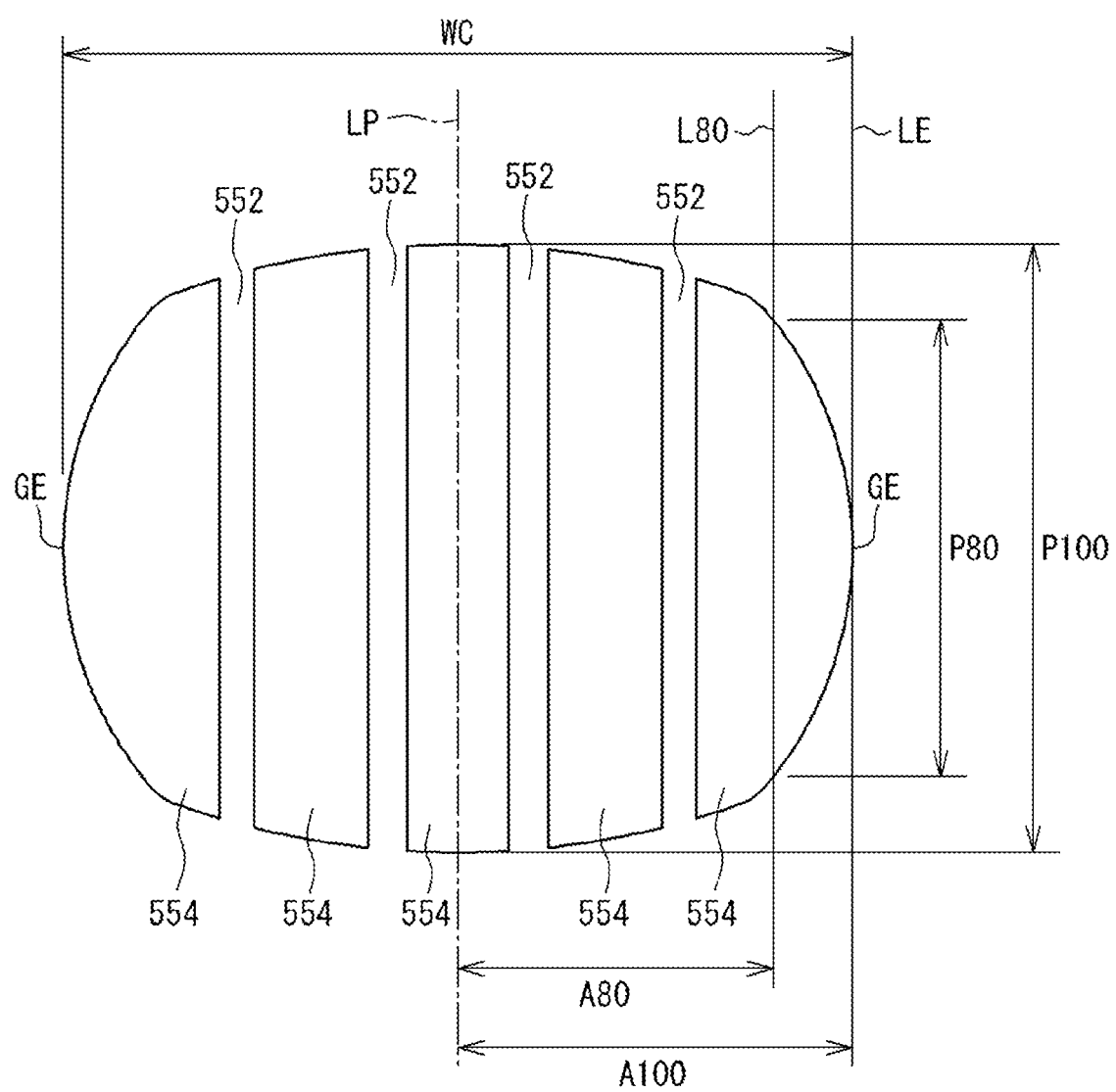
FIG. 28 is a schematic view showing a ground contact surface shape of the tire.

FIG. 28 shows a ground contact surface shape of the tire 502. In FIG. 28, a left-right direction corresponds to the axial direction of the tire 502. An up-down direction corresponds to the circumferential direction of the tire 502. The ground contact surface shape shown in FIG. 28 includes contours of the five land portions 554.

The ground contact surface is obtained by applying a load of 70% of the normal load to the tire 502 in the normal state by using a tire ground contact surface shape measurement device (not shown) and bringing the tire 502 into contact with the plane. The ground contact surface shape shown in FIG. 28 is obtained by tracing the contour of each of the land portions 554 included in the ground contact surface. In a case of obtaining the ground contact surface, the tire 502 is disposed such that the axial direction of the tire 502 is parallel to the road surface, and the load described above is applied to the tire 502 in a direction perpendicular to the road surface.

In FIG. 28, a position indicated by a reference numeral GE is an axially outer end of the ground contact surface. A length represented by a reference numeral WC is an axial distance from a first axially outer end GE to a second axially outer end GE of the ground contact surface. In the present invention, the axial distance WC is a ground contact width of the ground contact surface of the tire 502, which is obtained by applying the load of 70% of the normal load to the tire 502 in the normal state and bringing the tire 502 into contact with the plane.

In this tire 502, a ratio (WC/WX) of the ground contact width WC to the cross-sectional width WX of the tire 502 is preferably 74% or more and 84% or less.

By setting the ratio (WC/WX) to 74% or more, a ground contact surface having an appropriate size is formed. Since a local increase in the ground contact pressure is suppressed, the occurrence of the uneven abrasion is suppressed. From this point of view, the ratio (WC/WX) is more preferably 79% or more.

By setting the ratio (WC/WX) to 84% or less, the slippage of the shoulder portion S is effectively suppressed. In this case as well, the occurrence of the uneven abrasion is suppressed. From this point of view, the ratio (WC/WX) is more preferably 81% or less.

In FIG. 28, a one-point chain line LP is a straight line corresponding to the equator PC of the tire 502 on the ground contact surface. In a case where it is difficult to specify the equator PC on the ground contact surface, an axial center line of the ground contact width WC is used as the straight line corresponding to the equator PC. A bidirectional arrow P100 is a length of an intersection line between the plane including the straight line LP and the ground contact surface. In the tire 502, the length P100 of the intersection line is an equatorial contact length which is measured along the equator PC on the ground contact surface.

In FIG. 28, a solid line LE is a straight line passing through the axially outer end PE of the ground contact surface and being parallel to the straight line LP. A solid line L80 is a straight line that is positioned between the straight line LE and the straight line LP and is parallel to the straight line LE and the straight line LP. A bidirectional arrow A100 represents an axial distance from the straight line LP to the straight line LE. The distance A100 corresponds to half of the ground contact width WC. The bidirectional arrow A80 represents an axial distance from the straight line LP to the straight line L80. In FIG. 27, a ratio of the distance A80 to the distance A100 is set to 80%. In other words, the straight line L80 represents a position corresponding to a width of 80% of the ground contact width WC of the ground contact surface. A bidirectional arrow P80 is a length of an intersection line between the plane including the straight line L80 and the ground contact surface. In the tire 502, the length P80 of the intersection line is a reference ground contact length at the position corresponding to the width of 80% of the ground contact width on the ground contact surface.

In the tire 502, the equatorial contact length P100 and the reference ground contact length P80 are specified on the ground contact surface shown in FIG. 28, and a shape index F represented by a ratio (P100/P80) of the equatorial contact length P100 to the reference ground contact length P80 is obtained.

In this tire 502, the shape index F is preferably 1.05 or more and 1.35 or less.

By setting the shape index F to 1.05 or more, the slippage of the shoulder portion is effectively suppressed, and the occurrence of the uneven abrasion is suppressed.

By setting the shape index F to 1.35 or less, the ground contact surface having an appropriate size is formed. Since the local increase in the ground contact pressure is suppressed, the occurrence of the uneven abrasion is suppressed in this case as well.

Figure 29:
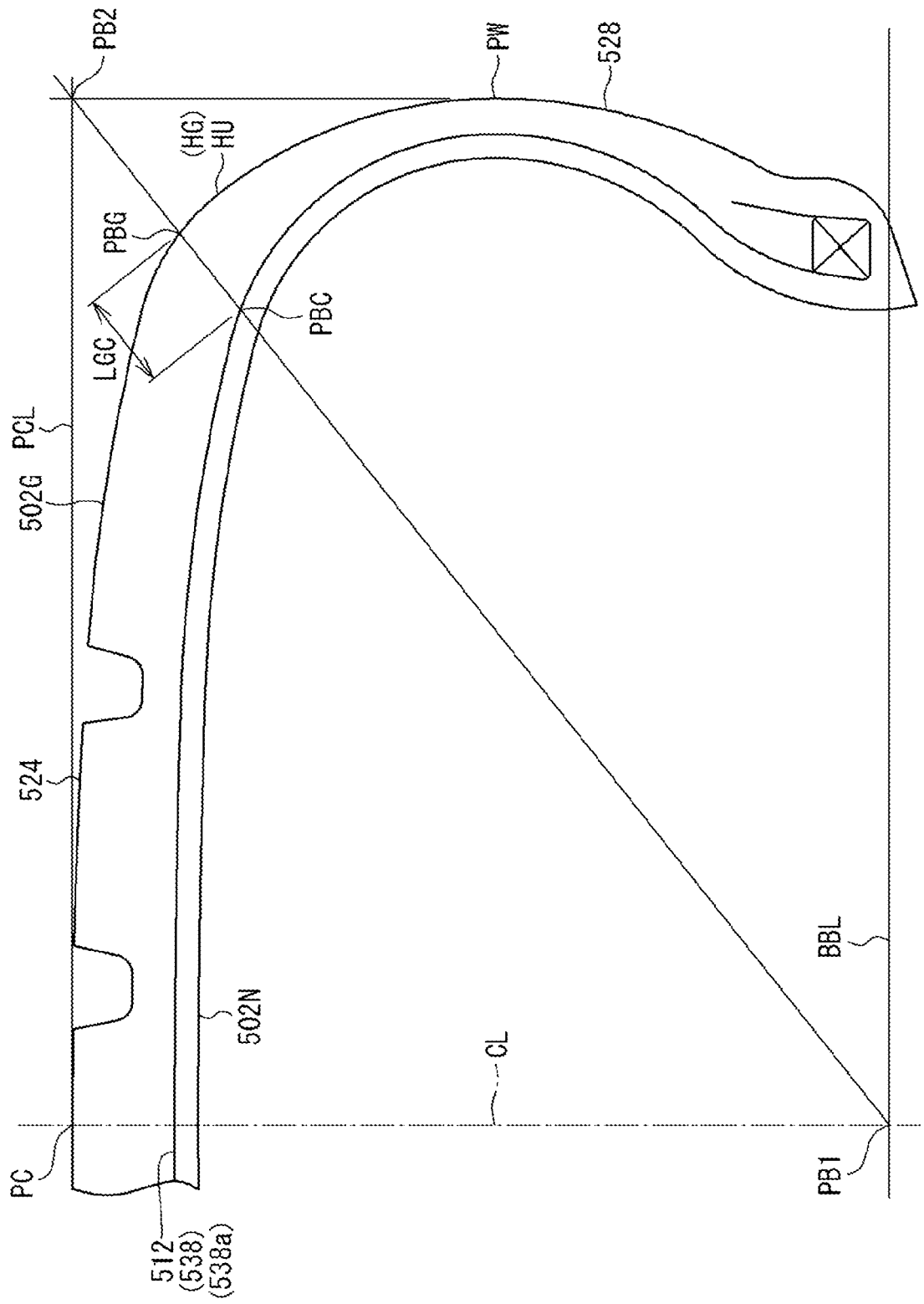
FIG. 29 is a cross-sectional view for describing a length from a carcass to the outer surface of the tire.

In FIG. 29, a reference numeral PBC is an intersection point of the reference line segment (or shoulder reference line segment) and the contour line of the carcass 512. A length represented by a reference numeral LGC is a length of a line segment connecting the intersection point PBC and the shoulder reference point PBG. The length LGC is measured along the reference line segment (or shoulder reference line segment). In the present invention, the length LGC is a length of the shoulder line segment from the carcass 512 to the shoulder reference point PBG.

As described above, in the tire 502, in order to improve the visual aspect, the tread portion is formed such that the shoulder portion has an angular shape. In a case where the shoulder portion protrudes, the volume of the shoulder portion is increased, as described above. The increase in the volume increases the mass of the tire 502. There is concern that the increase in the mass may lead to the increase in the rolling resistance. In the tire 502, in order to achieve the improvement in the visual aspect while suppressing the influence on the rolling resistance or the appearance quality, it is preferable that a distance between the contour line of the carcass 512 (also referred to as the carcass line) and the contour line of the tread surface 524, in other words, a length from the carcass 512 to the outer surface of the tire 502 is controlled. Specifically, a ratio (LGC/LSh) of the length LGC of the shoulder line segment from the carcass 512 to the shoulder reference point PBG to the length LSh of the shoulder line segment is preferably 6% or more and 12% or less.

By setting the ratio (LGC/LSh) to 6% or more, when the tire 502 is inflated, the carcass line can maintain the natural equilibrium shape. Since a uniform tension acts on the carcass 512, the deformation of the tire 502 is suppressed to a small extent. In the tire 502, the increase in the compressive strain generated in the shoulder portion when the tire is in contact with the ground is suppressed. From this point of view, the ratio (LGC/LSh) is preferably 7% or more, and more preferably 8% or more.

By setting the ratio (LGC/LSh) to 12% or less, the volume of the rubber in the shoulder portion is appropriately maintained. Since the increase in the volume of the shoulder portion is suppressed, the increase in the mass of a tire 502 is suppressed even in a case where the contour line of the tread surface 524 is modified to improve the visual aspect and the shoulder portion is arranged to an angular shape. In the tire 502, the increase in the rolling resistance is effectively suppressed. From this point of view, the ratio (LGC/LSh) is preferably 11% or less, and more preferably 10% or less.

The tire 502 described above is manufactured in the following manner. Although not described in detail, in the manufacture of the tire 502, the unvulcanized rubber is prepared for the elements that form the tire 502, such as the tread 504, the sidewall 506, and the bead 510.

In the manufacture of the tire 502, in a rubber molding machine (not shown), such as an extruder, a shape of the unvulcanized rubber is arranged to prepare a premolded body of the tire component. In a tire molding machine (not shown), the tire 502 in an unvulcanized state (hereinafter, also referred to as a raw tire) is prepared by combining the premolded bodies, such as the tread 504, the sidewall 506, and the bead 510.

In the manufacture of the tire 502, the raw tire is put into a mold of a vulcanizer (not shown). The tire 502 is obtained by pressurizing and heating the raw tire in the mold. The tire 502 is a vulcanized molded product of the raw tire.

A method of manufacturing the tire 502 includes a step of preparing the raw tire, and a step of pressurizing and heating the raw tire by using the mold. It should be noted that, although not described in detail, in the manufacture of the tire 502, vulcanization conditions, such as temperature, pressure, and time, are not limited, and general vulcanization conditions are adopted.

Figure 30:
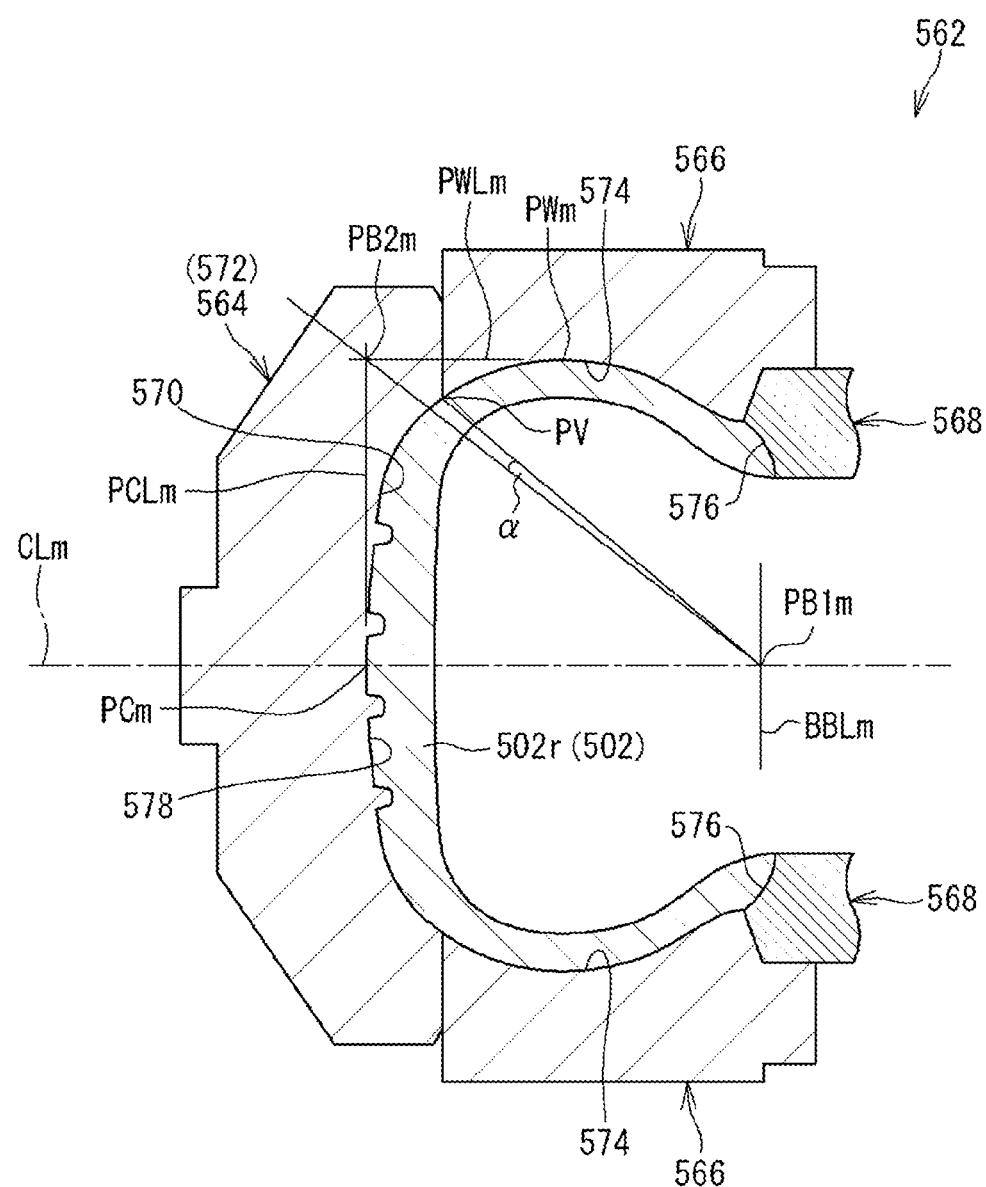
FIG. 30 is a cross-sectional view showing a part of a mold used for manufacturing the tire.

FIG. 30 shows a part of a cross section of a mold 562 for the tire along the plane including the rotation axis of the tire 502. In FIG. 30, a left-right direction is the radial direction of the tire 502, and an up-down direction is the axial direction of the tire 502. A direction perpendicular to the paper surface is a circumferential direction of the tire 502. A one-point chain line CL is the equatorial plane of the tire 502. Hereinafter, for convenience of description, a dimension of the mold 562 is represented by a dimension of the tire 502.

The mold 562 includes a tread ring 564, a pair of side plates 566, and a pair of bead rings 568. In FIG. 30, the mold 562 is in a state in which the tread ring 564, the pair of side plates 566, and the pair of bead rings 568 are combined, that is, in a closed state. The mold 562 is a split mold.

The tread ring 564 forms a radially outer portion of the mold 562. The tread ring 564 is provided with a tread formation surface 570 on an inner surface thereof. The tread formation surface 570 shapes the tread surface 524 of the tire 502. The tread ring 564 of the mold 562 is formed by a large number of segments 572. These segments 572 are disposed in a ring shape.

Each of the side plates 566 is positioned radially inside the tread ring 564. The side plate 566 is continuous with an end of the tread ring 564. The side plate 566 includes a sidewall formation surface 574 on an inner surface thereof. The sidewall formation surface 574 shapes the side surface 528 of the tire 502.

Each of the bead rings 568 is positioned radially inside the side plate 566. The bead ring 568 is continuous with an end of the side plate 566. The bead ring 568 includes a bead formation surface 576 on an inner surface thereof. The bead formation surface 576 shapes a portion of the bead 510 of the tire 502, specifically, a portion fitted into the rim R.

In the mold 562, a large number of segments 572, the pair of side plates 566, and the pair of bead rings 568 are combined to form a cavity surface 578 that shapes the outer surface of the tire 502. The cavity surface 578 is formed by the tread formation surface 570, a pair of sidewall formation surfaces 574, and a pair of bead formation surfaces 576.

Although not shown, a raw tire 502r is pressed against the cavity surface 578 of the mold 562 by an inflated bladder in a pressurizing and heating step (hereinafter referred to as a vulcanization step). As a result, the outer surface of the tire 502 is shaped.

As described above, in the tire 502, in order to improve the visual aspect, the tread portion is formed such that the shoulder portion has an angular shape.

In the vulcanization step, the bladder presses the raw tire 502r against the cavity surface 578, but a portion with which the shoulder portion of the raw tire 502r comes into contact is positioned deeper than a portion with which the crown portion comes into contact, and thus this shoulder portion is pressed against to the cavity surface 578 by the bladder with a slightly weaker force than the crown portion. In order to sufficiently vulcanize the shoulder portion, it is necessary to set the vulcanization time longer than the vulcanization time of the crown portion or the bead portion. In a case where the segment 572, the side plate 566, and the bead ring 568 are made of the same material, there is a concern that the vulcanization proceeds excessively in the crown portion or the bead portion, and the performance, such as the rolling resistance, is deteriorated.

In the mold 562, the side plate 566 has the thermal conductivity higher than the thermal conductivity of the segment 572. Heat is effectively supplied to the shoulder portion through the side plate 566. Since the vulcanization is promoted in the shoulder portion, over-vulcanization in the crown portion is prevented. With the mold 562, the increase in the rolling resistance due to the over-vulcanization is suppressed. From this point of view, it is preferable that the side plate 566 has the thermal conductivity higher than the thermal conductivity of the segment 572. Specifically, a ratio of the thermal conductivity of the side plate 566 to the thermal conductivity of the segment 572 is preferably 2.0 or more, and more preferably 2.5 or more. The ratio is preferably 4.0 or less, and more preferably 3.5 or less.

In the mold 562, the side plate 566 has the thermal conductivity higher than the thermal conductivity of the bead ring 568. Heat is effectively supplied to the shoulder portion through the side plate 566. Since the vulcanization is promoted in the shoulder portion, over-vulcanization in the bead portion is prevented. With the mold 562, the increase in the rolling resistance due to the over-vulcanization is suppressed. From this point of view, it is preferable that the side plate 566 has the thermal conductivity higher than the thermal conductivity of the bead ring 568. Specifically, a ratio of the thermal conductivity of the side plate 566 to the thermal conductivity of the bead ring 568 is preferably 2.0 or more, and more preferably 2.5 or more. The ratio is preferably 4.0 or less, and more preferably 3.5 or less.

In the mold 562, as described above, the shoulder portion of the raw tire 502r is pressed against the cavity surface 578 by the bladder with a slightly weak force. In the vulcanization step, there is a concern that air remains between the cavity surface 578 and the shoulder portion.

In FIG. 30, a position indicated by a reference numeral PV represents a boundary between the segment 572 and the side plate 566 on the cavity surface 578. The boundary PV is a split position of the mold 562.

In the mold 562, the boundary PV between the segment 572 and the side plate 566 is provided at a portion with which the shoulder portion comes into contact. The boundary PV, that is, the split position functions as a discharge route of air. In the mold 562, air is effectively discharged even at the portion with which the shoulder portion comes into contact. With the mold 562, the tire 502 having excellent appearance quality is obtained. From this point of view, it is preferable that the split position between the segment 572 and the side plate 566 is provided at the portion with which the shoulder portion comes into contact.

In FIG. 30, a reference numeral CLm is an equatorial plane of the mold 562. The equatorial line CLm corresponds to the equatorial plane CL shown in FIG. 24. A reference numeral BBLm is a baseline of the mold 562. The baseline BBLm corresponds to the bead baseline BBL shown in FIG. 24. A reference numeral PCm is an equator of the cavity surface 578. The equator PCm corresponds to the equator PC shown in FIG. 24. A reference numeral PWm is a maximum width position of the cavity surface 578. The maximum width position PWm corresponds to the maximum width position PW shown in FIG. 24. A reference numeral PB1$m$ is an intersection point of the equatorial plane CLm and the baseline BBLm. The intersection point PB1$m$ corresponds to the first reference point PB1, and is also referred to as a first mold reference point. A reference numeral PB2$m$ is an intersection point of a straight line PCLm passing through the equator PCm and extending in the axial direction and a straight line PWLm passing through the maximum width position PWm and extending in the radial direction. The intersection point PB2$m$ corresponds to the second reference point PB2, and is also referred to as a second mold reference point.

An angle represented by a reference numeral α represents an angle formed by a straight line passing through the first reference point PB1 and the second reference point PB2$m$ and a straight line passing through the first reference point PB1$m$ and the boundary PV. In a case where the boundary PV is positioned on the equator PCm side with respect to the straight line passing through the first reference point PB1$m$ and the second reference point PB2, the angle α is represented as positive. In a case where the boundary PV is positioned on the maximum width position PWm side with respect to the straight line passing through the first reference point PB1$m$ and the second reference point PB2$m$, the angle α is represented as negative.

In the mold 562, from the point of view that the boundary PV between the segment 572 and the side plate 566 can effectively function as a discharge route of air, the angle α is preferably −5 degrees or more and 5 degrees or less, and more preferably −3 degrees or more and 3 degrees or less.

Fifth Embodiment (Second Version)

Figure 31:
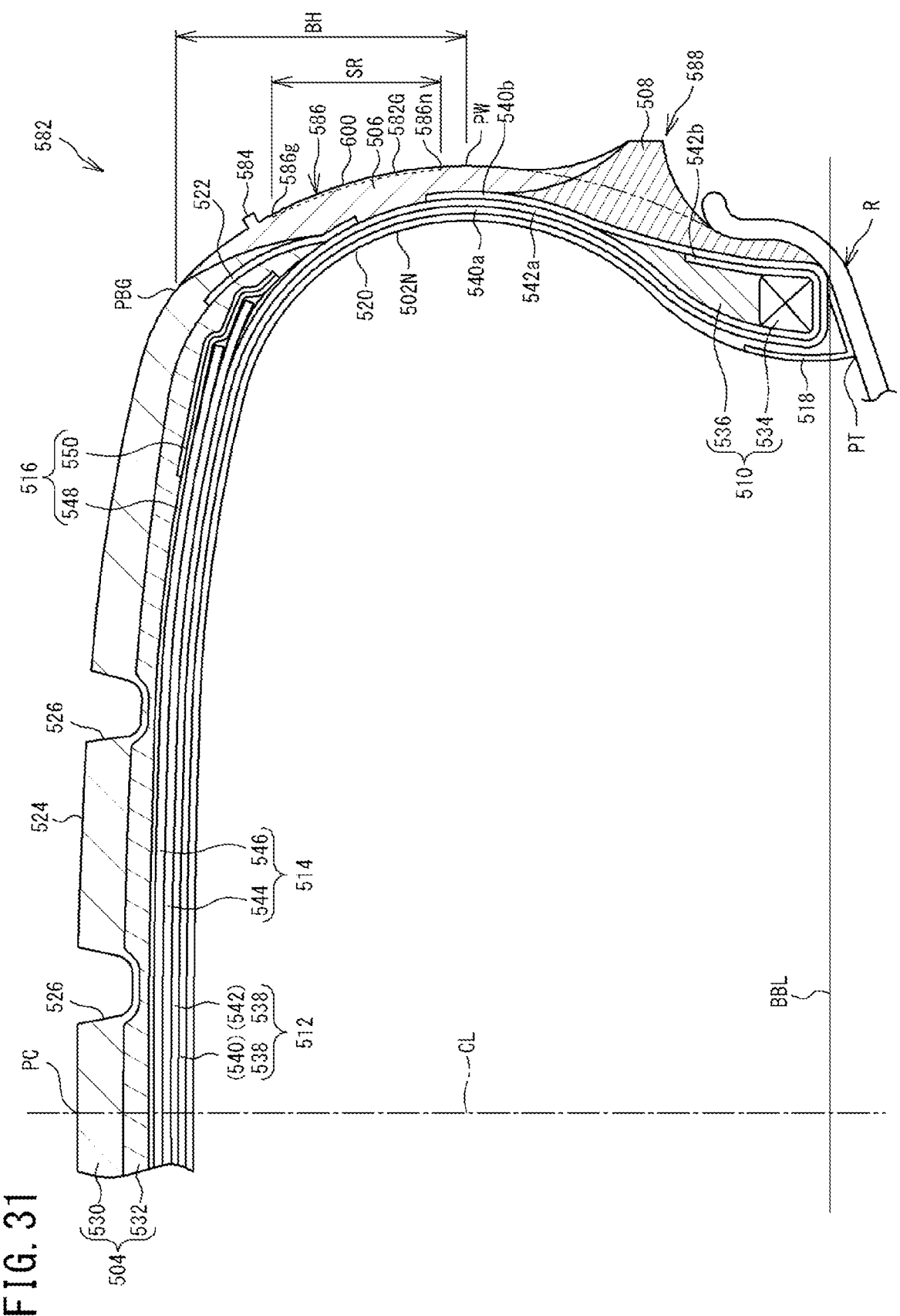
FIG. 31 is a cross-sectional view showing a part of a tire according to still another embodiment of the present invention.

FIG. 31 shows a part of a tire 582 according to the second version of the fifth embodiment. The tire 582 is a pneumatic tire for a passenger vehicle.

The tire 582 has the same configuration as the configuration of the tire 502 shown in FIG. 24, except that a protrusion 584, a serration region 586, and a rim guard 588 are provided on an outer surface 582G of the tire 582. Therefore, in FIG. 31, the same elements as the elements of the tire 502 in FIG. 24 are designated by the same reference numerals, and the description thereof will be omitted. Any one of the protrusion 584, the serration region 586, and the rim guard 588 may be provided on the outer surface 582G of the tire 582.

As in the tire 502 shown in FIG. 24, the tire 582 is also obtained by pressurizing and heating the raw tire in a mold in the vulcanization step.

Figure 32:
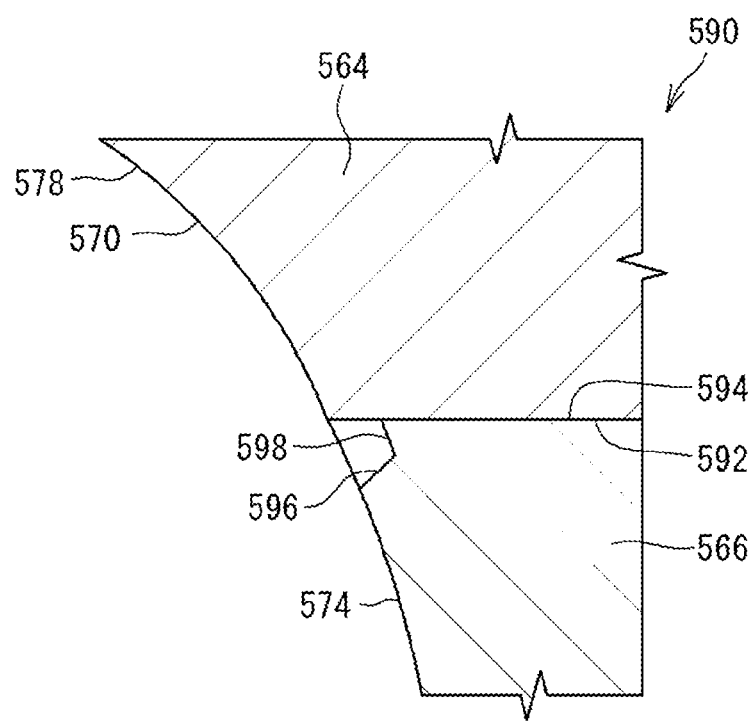
FIG. 32 is a cross-sectional view showing a part of a mold used in manufacturing the tire of FIG. 31.

FIG. 32 shows a part of a mold 590 used for manufacturing the tire 582. The mold 590 used for the manufacture of the tire 582 also has the same configuration as the configuration of the mold 562 shown in FIG. 30. Therefore, in FIG. 32, the same elements as the elements of the mold 562 in FIG. 30 are designated by the same reference numerals, and the description thereof will be omitted. FIG. 32 shows a part of the tread ring 564 and the side plate 566 of the mold 590.

In the vulcanization step, the raw tire is put into the mold 590. After the raw tire is put, the mold 590 is closed. As a result, a cavity surface 578 is formed. In the closed mold 590, a mating surface 592 of the tread ring 564 and a mating surface 594 of the side plate 566 are abutted against each other. As a result, a boundary (that is, a split position) between the tread ring 564 and the side plate 566 in the mold 590 is formed.

The rubber composition of the raw tire bites into the split position of the mold. The rubber composition biting into the split position forms a burr in the tire. The burr spoils the appearance.

In the mold 590, as shown in FIG. 32, a notch 596 is provided at a boundary between the mating surface 594 of the side plate 566 and the sidewall formation surface 574. A groove 598 is formed by abutting the tread ring 564 against the side plate 566. During the molding of the tire 582, the rubber composition of the raw tire flows into the groove 598. In the mold 590, the rubber composition is less likely to bite into the split position. The groove 598 contributes to suppressing the occurrence of the burr. The protrusion 584 is formed instead of the burr at a position corresponding to the split position between the tread ring 564 and the side plate 566, on the outer surface 582G of the tire 582.

In the tire 582, as shown in FIG. 31, the protrusion 584 that protrudes outward from the outer surface 582G of the tire 582 and extends in the circumferential direction is provided at a boundary portion between the tread 504 and the sidewall 506. In the tire 582, the protrusion 584 is positioned radially inside the shoulder reference point PBG. It should be noted that, in the present invention, the boundary portion between the tread 504 and the sidewall 506 means a portion including both the tread 504 and the sidewall 506 as the elements, and corresponds to a portion called a buttress.

Figure 33:
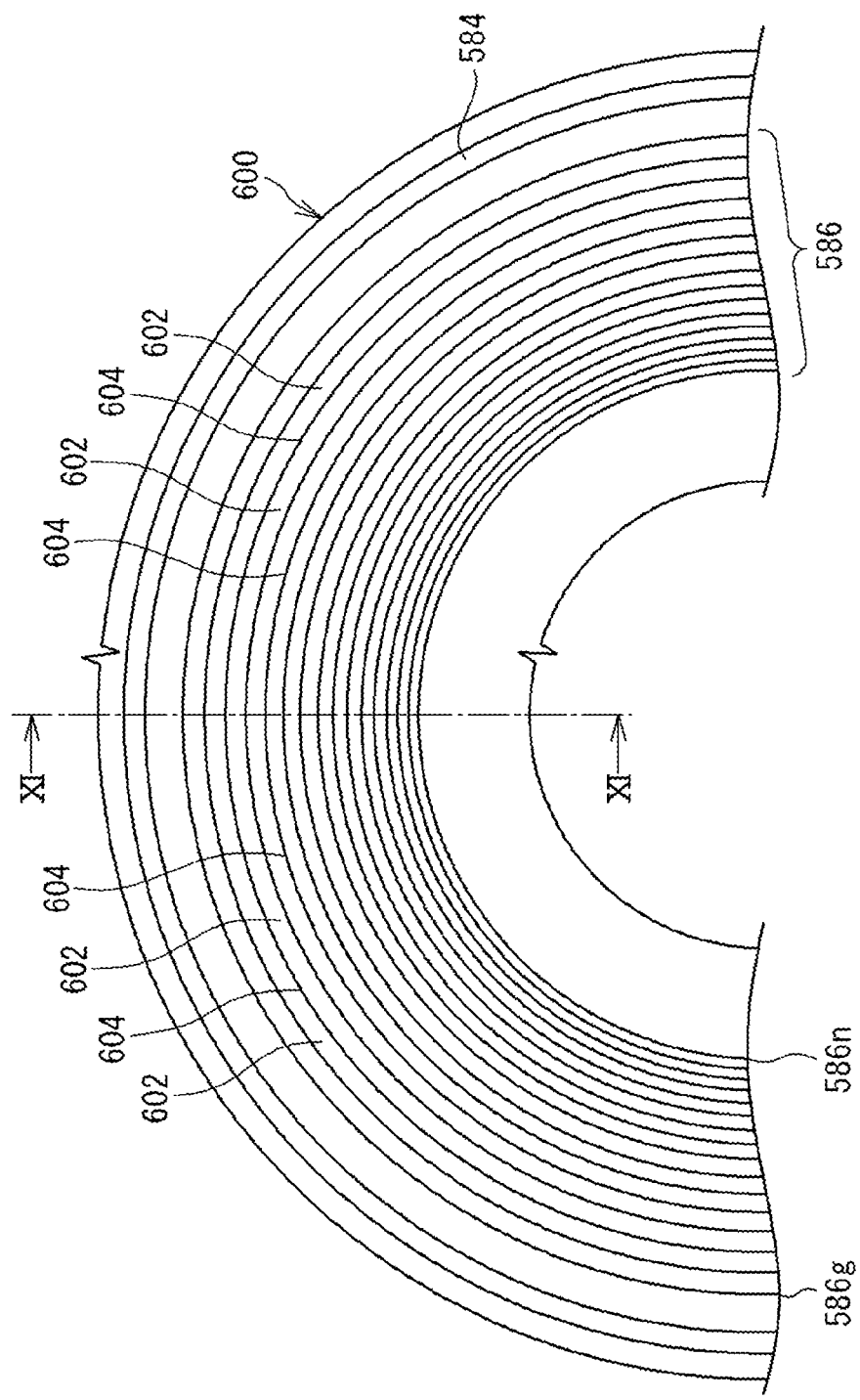
FIG. 33 is a side view showing a side surface of the tire.
Figure 34:
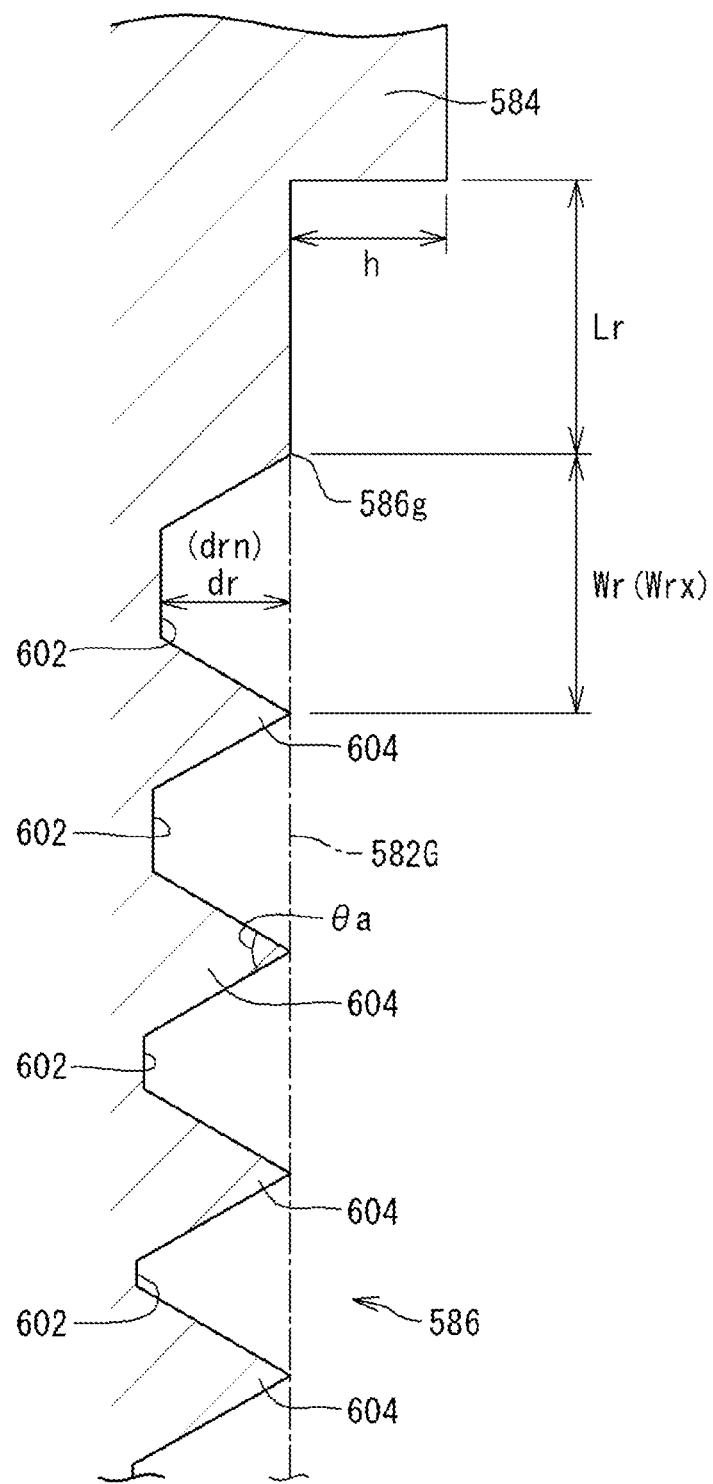
FIG. 34 is a cross-sectional view taken along a line XI-XI of FIG. 33.

FIG. 33 shows a side surface 600 of the tire 582. A direction perpendicular to the paper surface in FIG. 33 is an axial direction of the tire 582. FIG. 34 shows a cross section of the tire 582 along a line XI-XI of FIG. 33. On the paper surface of FIG. 34, an upper side is a radially outside of the tire 582, and a lower side is a radial inside of the tire 582.

As described above, the outer surface 582G of the tire 582 is provided with the serration region 586. The serration region 586 is a region having a band shape and extending in the circumferential direction about the rotation axis on the side surface 600. The serration region 586 extends continuously in the circumferential direction. The serration region 586 prevents air remaining in the vulcanization step, and contributes to the improvement in the appearance quality.

As shown in FIG. 31, in the tire 582, the serration region 586 is positioned between the shoulder reference point PBG and the maximum width position PW in the radial direction. The outer surface 582G of the tire 582 includes the serration region 586 between the shoulder reference point PBG and the maximum width position PW. The serration region 586 is positioned radially inside the protrusion 584.

As shown in FIGS. 33 and 34, the serration region 586 includes a plurality of narrow grooves 602 and a plurality of ridges 604. The plurality of narrow grooves 602 extend in the circumferential direction. The plurality of narrow grooves 602 are arranged in the radial direction. Stated another way, the plurality of narrow grooves 602 are disposed at different positions in the radial direction. Each of the plurality of narrow grooves 602 has a shape recessed inward from the outer surface 582G of the tire 582. Each of the plurality of ridges 604 is positioned between the narrow grooves 602 adjacent to each other. An outer end 586g of the serration region 586 is the ridge 604 positioned on the outermost side in the radial direction. An inner end 586n of the serration region 586 is the ridge 604 positioned on the innermost side in the radial direction.

The configurations of the narrow groove 602 and the ridge 604 in the serration region 586 are determined as appropriate according to the specifications of the tire 582, except for matters related to a total of a height of the protrusion 584 and a maximum depth of the narrow groove 602, which will be described below.

A cross-sectional shape of the ridge 604 positioned between the outer end 586g and the inner end 586n of the serration region 586 is tapered outward. The top of the ridge 604 is included in the outer surface 582G of the tire 582. The top may be formed in a plane.

In FIG. 34, an angle represented by a reference numeral θa is an angle formed by two inclined surfaces that form the ridge 604. In the tire 502, the angle θa is 60 degrees or more and 120 degrees or less.

In FIG. 34, a length represented by a reference numeral h is a height of the protrusion 584. The height h is a distance from the outer surface 582G to the top of the protrusion 584. A length represented by a reference numeral Lr is a distance from the top of the protrusion 584 to the outer end 586g of the serration region 586.

The height h of the protrusion 584 and the distance Lr from the protrusion 584 to the serration region 586 are set as appropriate according to the specifications of the tire 582. From the point of view of suppressing the occurrence of the burr, the height h is preferably 0.2 mm or more. From the point of view of suppressing the increase in the air resistance, the height h is preferably 0.6 mm or less. From the point of view of suppressing the appearance defect due to air remaining, the distance Lr is preferably 0.1 mm or more and 10.0 mm or less.

In FIG. 34, a length represented by a reference numeral dr is a depth of the narrow groove 602. The depth dr is a distance from the outer surface 582G to the bottom of the narrow groove 602. A length represented by a reference numeral Wr is an interval between the ridges 604 adjacent to each other.

In the tire 502, the depth dr of the narrow groove 602 is formed to gradually be deeper from the outer side to the inner side in the radial direction. In two narrow grooves 602 adjacent to each other, the narrow groove 602 positioned on an outer side in the radial direction is shallower than the narrow groove 602 positioned on an inner side in the radial direction. Among the plurality of narrow grooves 602 included in the serration region 586, the narrow groove 602 positioned on the outermost side in the radial direction has a minimum depth drn, and the narrow groove 602 positioned on the innermost side in the radial direction has a maximum depth drx. In this tire 582, the minimum depth drn is set in a range of 20% or more and 60% or less of the maximum depth drx.

In the tire 582, the interval Wr between the ridges 604 adjacent to each other is formed to be gradually narrowed from the outer side to the inner side in the radial direction. For example, in a case of focusing on three ridges 604 arranged in the radial direction, the interval Wr between the ridge 604 positioned on an outer side in the radial direction and the ridge 604 positioned in the middle is wider than the interval Wr between the ridge 604 positioned in the middle and the ridge 604 positioned on an inner side in the radial direction. Therefore, the interval Wr between the ridge 604 forming the outer end 586g of the serration region 586 and the ridge 604 positioned radially inside the ridge 604 is a maximum interval Wrx. The interval Wr between the ridge 604 forming the inner end 586n of the serration region 586 and the ridge 604 positioned radially outside the ridge 604 is a minimum interval Wrn. In this tire 582, the minimum interval Wrn is set in a range of 30% or more and 70% or less of the maximum interval Wrx.

In the tire 582 as well, as in the tire 502 shown in FIG. 24, in order to improve the visual aspect, the tread portion is formed such that the shoulder portion has an angular shape.

As a result, the clearance G is reduced, and the sense of unity between the vehicle B and the tire 582 is enhanced. However, on the contrary, a projection area of the tire 582 when the tire 582 is viewed from the front of the vehicle is increased. The increase in the projection area leads to the increase in the air resistance.

By the way, as described above, the serration region contributes to the discharge of air in the vulcanization step. In the related art, from the point of view of promoting the discharge of air, the serration region is formed such that the total of the height of the protrusion and the maximum depth of the narrow groove is 1.0 mm or more.

However, in the tire 582, since the shoulder portion is formed to have an angular shape, the side surface of the raw tire is more likely to contact with the cavity surface of the mold than in the tire in the related art, and the discharge of air is promoted. Therefore, even in a case where the total of the height of the protrusion and the maximum depth of the narrow groove is set to be smaller than the total in the tire in the related art, air is sufficiently discharged in the vulcanization step. A serration region in which the total of the height of the protrusion and the maximum depth of the narrow groove is small can contribute to the reduction of the air resistance.

In other words, in the tire 582, a total of the height h of the protrusion 584 and the maximum depth drx of the narrow groove 602 is preferably 0.9 mm or less.

By setting the total of the height h of the protrusion 584 and the maximum depth drx of the narrow groove 602 to 0.9 mm or less, the influence of the serration region 586 and the protrusion 584 on the flow of air is suppressed. Specifically, a force (hereinafter, an aerodynamic force) generated by the flow of air is controlled, and the increase in the air resistance is effectively suppressed. In the tire 582, the air resistance is increased due to the shoulder portion having an angular shape, and a degree of the increase is suppressed to a small extent.

In the tire 582, a total of the height h of the protrusion 584 and the maximum depth drx of the narrow groove 602 is preferably 0.5 mm or more.

By setting the total of the height h of the protrusion 584 and the maximum depth drx of the narrow groove 602 to 0.5 mm or more, the serration region 586 and the protrusion 584 can contribute to the discharge of air in the vulcanization step. An appearance defect, such as bareness, is unlikely to occur on the outer surface 582G of the tire 582. The tire 582 has a good appearance quality.

In the tire 582, the percentage of the height h of the protrusion 584 occupied in the total of the height h of the protrusion 584 and the maximum depth drx of the narrow groove 602 may be higher than or lower than the percentage of the maximum depth drx of the narrow groove 602. The percentage of the height h of the protrusion 584 occupied in the total may be the same as the percentage of the maximum depth drx of the narrow groove 602. The percentage of the height h of the protrusion 584 occupied in the total is determined as appropriate according to the specifications of the tire 582.

A length indicated by a bidirectional arrow BH in FIG. 31 is a radial distance from the shoulder reference point PBG to the maximum width position PW. A length indicated by a reference numeral SR is a radial width of the serration region 586. The radial width SR is a radial distance from the outer end 586g to the inner end 586n of the serration region 586.

In this tire 582, a ratio (SR/BH) of the radial width SR of the serration region 586 to the radial distance BH from the shoulder reference point PBG to the maximum width position PW is preferably 10% or more and 50% or less.

By setting the ratio (SR/BH) to 10% or more, the serration region 586 can effectively contribute to the discharge of air in the vulcanization step. An appearance defect, such as bareness, is unlikely to occur on the outer surface 502G of the tire 582. The tire 582 can have a good appearance quality. From this point of view, the ratio (SR/BH) is more preferably 25% or more.

By setting the ratio (SR/BH) to 50% or less, the influence of the serration region 586 on the flow of air is suppressed. Specifically, the aerodynamic force is easily controlled, and the increase in the air resistance is effectively suppressed. From this point of view, the ratio (SR/BH) is more preferably 35% or less.

For example, as shown in FIG. 31, a cross-sectional shape of the protrusion 584 of the tire 582 is rectangular. The cross-sectional shape of the protrusion 584 may be formed to have a tapered shape as shown in FIG. 35.

In this case, a projection area of the protrusion 584 can be reduced. The protrusion 584 can contribute to the reduction of the air resistance. From this point of view, it is preferable that the cross-sectional shape of the protrusion 584 is tapered.

Figure 35:
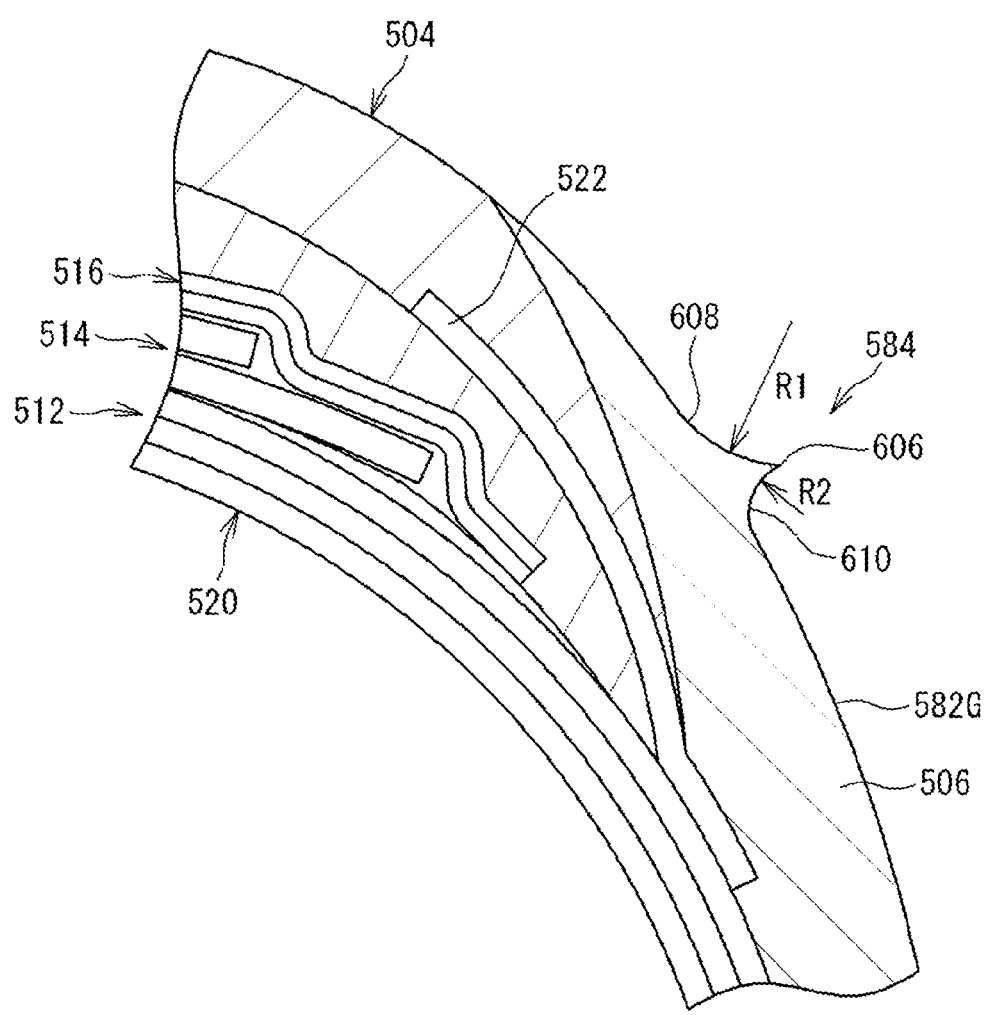
FIG. 35 is a cross-sectional view showing a modification example of a protrusion.

The protrusion 584 shown in FIG. 35 has a top 606, a first inclined surface 608 positioned radially outside the top 606, and a second inclined surface 610 positioned radially inside the top 606.

In the tire 582, the first inclined surface 608 and the second inclined surface 610 have an inwardly convex shape. A contour line of each of the first inclined surface 608 and the second inclined surface 610 is represented by an arc. In FIG. 35, an arrow indicated by a reference numeral R1 is a radius of an arc (hereinafter, a first arc) as the contour line of the first inclined surface 608. An arrow indicated by a reference numeral R2 is a radius of the arc (hereinafter, a second arc) as the contour line of the second inclined surface 610. The contour line of the first inclined surface 608 is in contact with the contour line of the outer surface 582G of the tire 582 at the outer end thereof. The contour line of the second inclined surface 610 is in contact with the contour line of the outer surface 582G of the tire 582 at the inner end thereof.

It is preferable that, in the tire 582, a radius R1 of the first arc is larger than a radius R2 of the second arc. Therefore, the air flows smoothly. Although the tire 582 has the protrusion 584 for suppressing the occurrence of the burr, the air resistance can be reduced. From this point of view, a ratio (R1/R2) of the radius R1 of the first arc to the radius R2 of the second arc is more preferably 1.2 or more and 2.0 or less.

From the point of view of obtaining a smooth flow of air, the radius R1 of the first arc is preferably 2.0 mm or more. From the point of view of suppressing the influence of the protrusion 584 on the mass of the tire 582, the radius R1 of the first arc is preferably 10 mm or less, and more preferably 5 mm or less.

From the point of view of obtaining a smooth flow of air, the radius R2 of the second arc is preferably 5.0 mm or less, and more preferably 3.0 mm or less. From the point of view that the protrusion 584 can effectively suppress the occurrence of the burr, the radius R2 of the second arc is preferably 1.0 mm or more.

Figure 36:
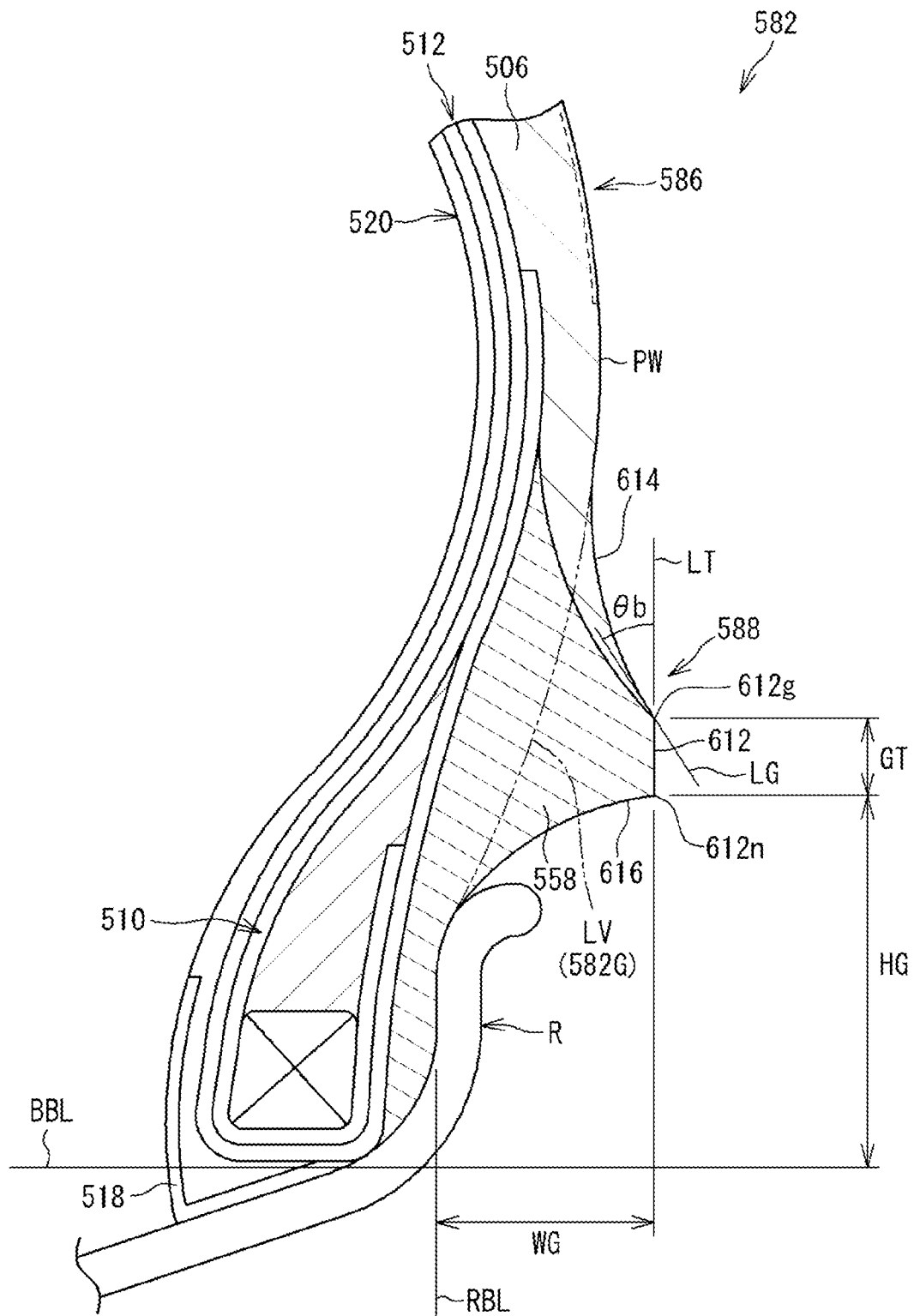
FIG. 36 is a cross-sectional view showing a bead portion of the tire.

FIG. 36 shows a part of a meridional cross section of the tire 582 of FIG. 31. FIG. 36 shows a bead portion of the tire 582.

As described above, the tire 582 includes the rim guard 588. The rim guard 588 protrudes outward from the outer surface 582G of the tire 582. The rim guard 588 is provided at a boundary portion between the sidewall 506 and the clinch 508. The rim guard 588 extends in the circumferential direction. A two-point chain line LV in FIG. 36 is the outer surface 582G of the tire 582 obtained on the assumption that the rim guard 588 is not provided.

In a case where the tire 582 is assembled on the rim R, the rim guard 588 is positioned radially outside the rim R. As shown in FIG. 36, the rim guard 588 is positioned between the rim R and the maximum width position PW in the radial direction. The rim guard 588 protrudes axially outward from the rim R. The rim guard 588 prevents damage of the rim R.

The rim guard 588 includes a top surface 612, an outer inclined surface 614, and an inner inclined surface 616. The outer inclined surface 614 is positioned radially outside the top surface 612. The outer inclined surface 614 is continuous with an outer end 612g of the top surface 612. The inner inclined surface 616 is positioned radially inside the top surface 612. The inner inclined surface 616 is continuous with an inner end 612n of the top surface 612.

In the tire 582, in the meridional cross section, the rim guard 588 has a shape in which a hem is widened from the top surface 612 of the rim guard 588 toward the outer surface 582G of the tire 582.

In FIG. 36, a length represented by a reference numeral HG is a rim guard height. The rim guard height HG is a radial distance from the bead baseline to the inner end 612n of the top surface 612. The rim guard height HG is determined as appropriate in consideration of a rim guard angle, a rim guard distal end thickness, and a rim guard protrusion length, which will be described below, and is set in a range of 20 mm or more and 40 mm or less.

In FIG. 36, a solid line LT is a straight line passing through the outer end 612g and the inner end 612n of the top surface 612. A solid line LG is a tangent line of a contour line of the outer inclined surface 614 at the outer end 612g of the top surface 612. An angle θb is an angle formed by the straight line LT and the tangent line LG. In the present invention, the angle θb is an angle formed by the straight line LT passing through the outer end 612g and the inner end 612n of the top surface 612 and the tangent line LG of the outer inclined surface 614 at the outer end 612g of the top surface 612 in the meridional cross section of the tire 582. The angle θb is also referred to as the rim guard angle.

In this tire 582, the rim guard angle θb is preferably 10 degrees or more and 30 degrees or less.

By setting the rim guard angle θb to 10 degrees or more, in the tire 582, the rim guard 588 can be formed such that the rim guard 588 protrudes from the maximum width position PW by an appropriate amount. Even in a case where the tires 582 are horizontally stacked in a state in which the tires 582 are assembled on the rims R, the interference between the rims R is suppressed.

By setting the rim guard angle θb to 30 degrees or less, a degree of curvature of the contour line of the outer inclined surface 614 is suppressed to a small extent. The rim guard 588 can effectively control the aerodynamic force. In the tire 582, the increase in the air resistance is effectively suppressed. From this point of view, the rim guard angle θb is more preferably 15 degrees or less.

In this tire 582, in a case where the rim guard angle θb is preferably 10 degrees or more and 30 degrees or less, it is preferable that the straight line LT passing through the outer end 612g and the inner end 612n of the top surface 612 is parallel to the equatorial plane. As a result, the increase in the air resistance is more effectively suppressed.

In FIG. 36, a length indicated by a reference numeral GT is a width of the top surface 612. The width GT of the top surface 612 is a length of a line segment connecting the outer end 612g and the inner end 612n of the top surface 612. The width GT of the top surface 612 is also referred to as the rim guard distal end thickness.

In this tire 582, the width GT of the top surface 612 is preferably 4 mm or more and 6 mm or less.

By setting the width GT of the top surface 612 to 4 mm or more, the distal end portion of the rim guard 588 has required stiffness. Even when the tires 582 are horizontally stacked in a state in which the tires 582 are assembled on the rim R, the distal end portion of the rim guard 588 is less likely to be crushed. In the tire 582, the interference between the rims R is suppressed even in a case where the tires 582 are horizontally stacked.

By setting the width GT of the top surface 612 to 6 mm or less, the influence of the rim guard 588 on the aerodynamic force is suppressed. In the tire 582, the increase in the air resistance can be more effectively suppressed.

In FIG. 36, a solid line RBL extending in the radial direction is the rim width baseline. A length represented by a reference numeral WG is an axial distance from the rim width baseline to the inner end 612n of the top surface 612. The axial distance WG is also referred to as the rim guard protrusion length.

In this tire 582, the rim guard protrusion length WG is preferably 12 mm or more and 18 mm or less.

By setting the rim guard protrusion length WG to 12 mm or more, in the tire 582, the rim guard 588 can be formed such that the rim guard 588 protrudes from the maximum width position PW by an appropriate amount. Even in a case where the tires 582 are horizontally stacked in a state in which the tires 582 are assembled on the rims R, the interference between the rims R is suppressed.

By setting the rim guard protrusion length WG to 18 mm or less, the influence of the rim guard 588 on the aerodynamic force is suppressed. In the tire 582, the increase in the air resistance is more effectively suppressed.

Fifth Embodiment (Third Version)

Figure 37:
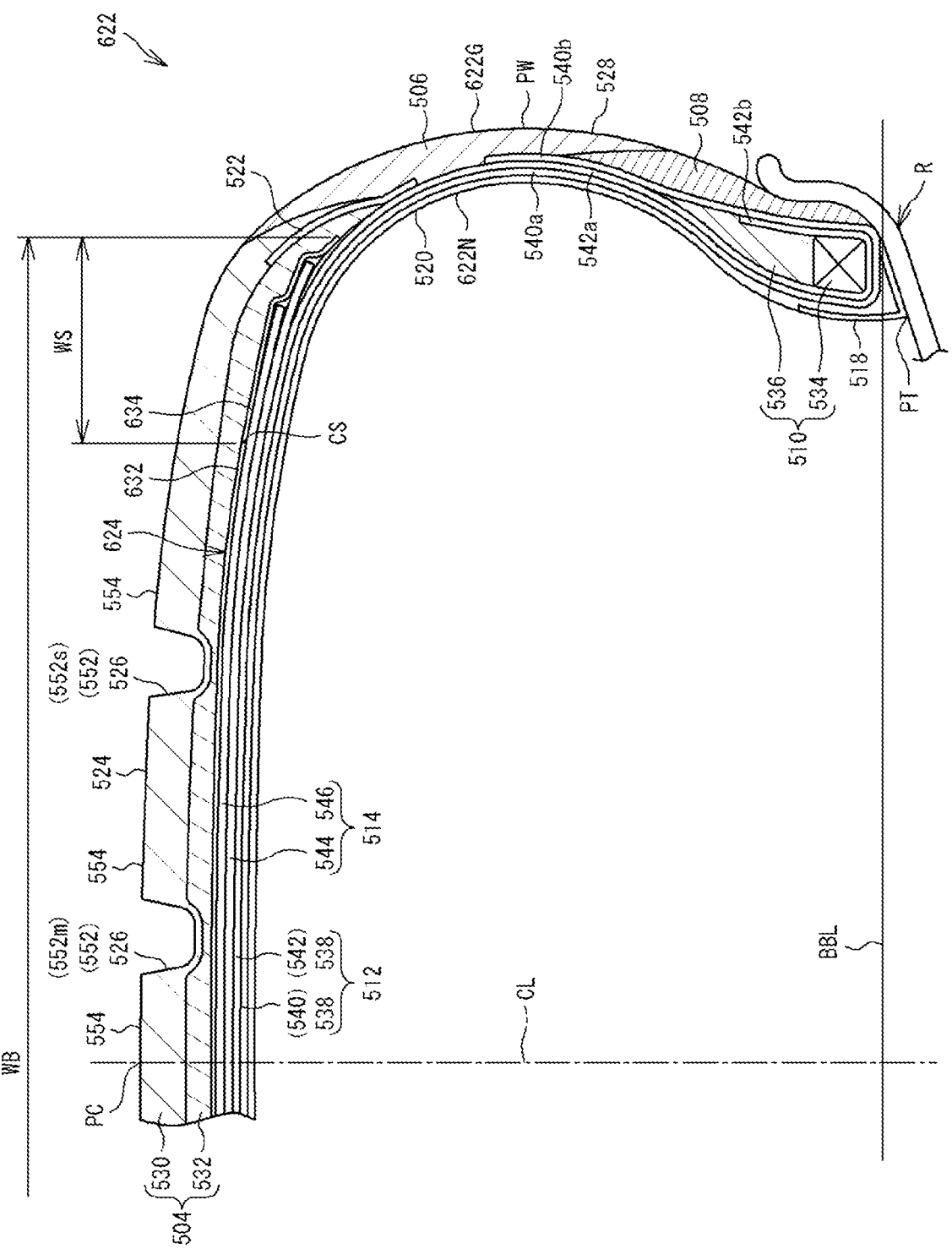
FIG. 37 is a cross-sectional view showing a part of a tire according to still another embodiment of the present invention.

FIG. 37 shows a part of a tire 622 according to the third version of the fifth embodiment. The tire 622 is a pneumatic tire for a passenger vehicle.

The tire 622 has the same configuration as the configuration of the tire 502 shown in FIG. 24 except for a band 624. Therefore, in FIG. 37, the same elements as the elements of the tire 502 in FIG. 24 are designated by the same reference numerals, and the description thereof will be omitted.

The band 624 is positioned between the carcass 512 and the tread 504 in the radial direction. The band 624 is laminated on the belt 514 inside the tread 504.

An end of the band 624 is positioned axially outside an end of the belt 514. A length from the end of the belt 514 to the end of the band 624 is 3 mm or more and 7 mm or less.

The equatorial plane intersects with the band 624 at the center of an axial width of the band 624. Both ends of the band 624 are disposed to face each other with the equatorial plane interposed therebetween. The band 624 bridges between a first end and a second end. The band 624 is a full band. In the tire 502, a pair of edge bands that cover the ends of the band 624 and are disposed axially apart from each other may be further provided.

In FIG. 37, a length represented by a reference numeral WB is an axial width of the band 624. The axial width WB is an axial distance from a first end to a second end (not shown) of the band 624.

Figure 38:
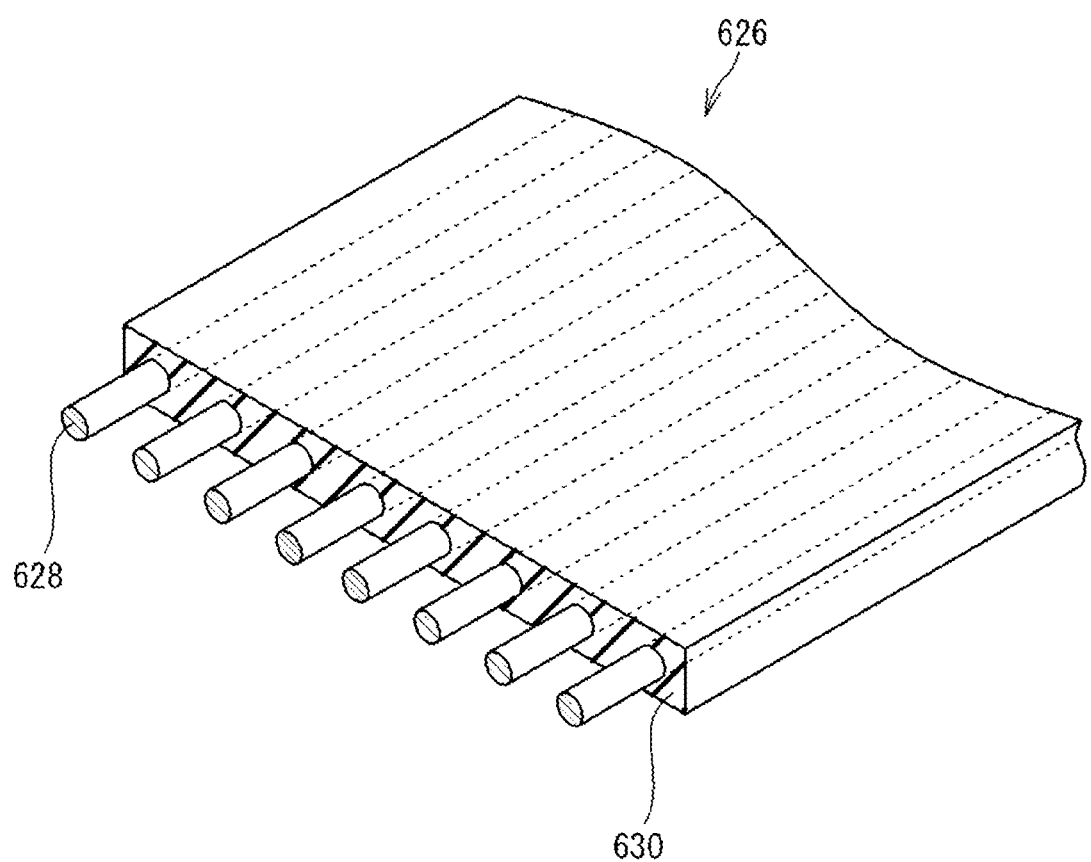
FIG. 38 is a perspective view showing a part of a strip used to form a band.
Figure 39:
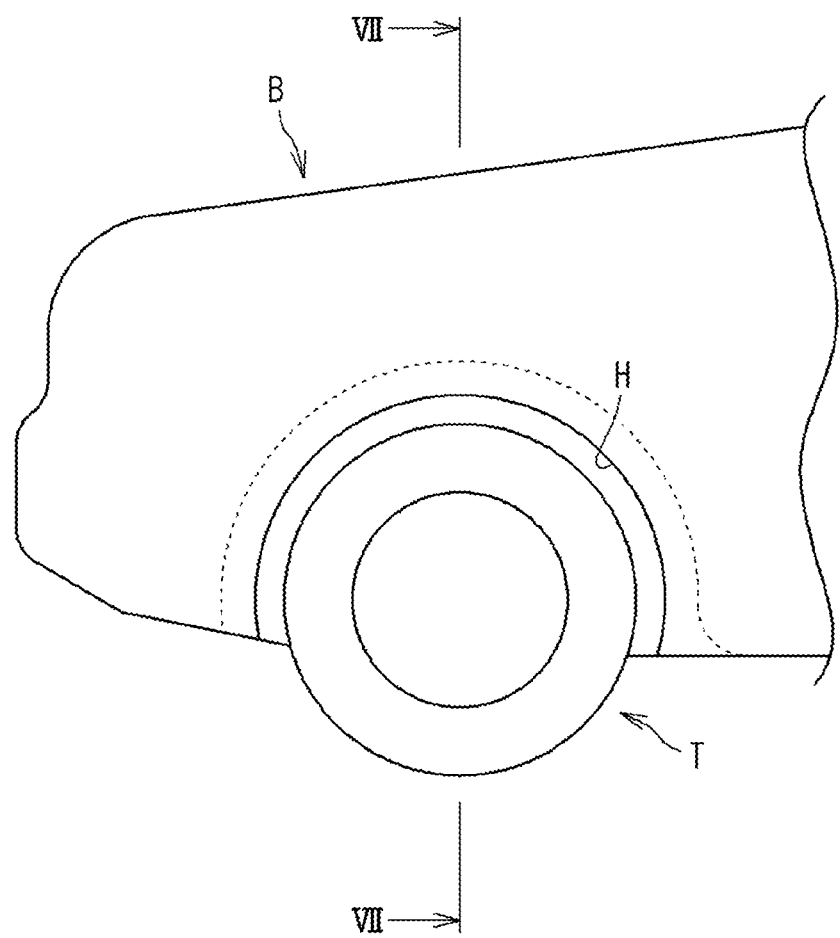
FIG. 39 is a side view showing a front portion of a vehicle on which the tire is mounted.

The band 624 is formed by using a strip 626 shown in FIG. 38. The strip 626 includes a plurality of band cords 628 arranged in parallel. These band cords 628 are covered with topping rubber 630. The strip 626 is band-shaped. In the strip 626, the band cord 628 extends in a length direction of the strip 626.

The strip 626 shown in FIG. 38 includes eight band cords 628. The number of the band cords 628 included in the strip 626 is not limited to eight. The number of the band cords 628 included in the strip 626 is in a range of 2 or more and 15 or less, and is determined as appropriate in consideration of the specifications of the tire 622 and the like.

The band 624 is formed by spirally winding the strip 626. The band 624 includes the band cord 628 spirally wound. In the band 624, the band cord 628 extends substantially in the circumferential direction. In detail, an angle formed by the band cord 628 with respect to the circumferential direction is 5° or less. The band 624 has a jointless structure.

A density of the band cord 628 in the band 624 is 31 ends/5 cm or more and 49 ends/5 cm or less. The density of the band cord 628 is measured on the reference cut surface.

Although not shown, the band cord 628 is formed by twisting filaments composed of organic fibers. The band cord 628 is a twisted wire of the organic fiber filaments, and is also referred to as an organic fiber cord. Examples of the organic fiber include a nylon fiber, a rayon fiber, a polyester fiber, and an aramid fiber.

In the present invention, the organic fiber cord made of the single organic fibers is the single organic fiber cord, and the organic fiber cord made of a combination of two or more types of the organic fibers is the composite organic fiber cord. The composite organic fiber cord is also referred to as a hybrid cord.

The band 624 of the tire 622 includes a center portion 632 and a pair of side portions 634. In detail, the band 624 is formed by the center portion 632 and the pair of side portions 634. In the band 624, the center portion 632 forms an axial central portion thereof. The center portion 632 intersects with the equatorial plane. Each of the side portions 634 is positioned axially outside the center portion 632 of the band 624. The side portion 634 forms an axially outer portion of the band 624.

In FIG. 37, a position indicated by a reference numeral CS is a boundary between the center portion 632 and the side portion 634. The boundary CS is an end of the center portion 632 and an inner end of the side portion 634. The end of the band 624 is an outer end of the side portion 634. In FIG. 37, a length represented by a reference numeral WS is an axial width of the side portion 634. The axial width WS is an axial distance from the outer end to the inner end of the side portion 634.

As described above, the band 624 includes the band cord 628. In the present invention, among the band cords 628 included in the band 624, the band cord 628 included in the center portion 632 is a center band cord, and the band cord 628 included in the side portion 634 is a side band cord.

In the tire 502, a density of the center band cord in the center portion 632 and a density of the side band cord in the side portion 634 are the same. As will be described below, the center band cord and the side band cord are made of the organic fiber cord having intermediate elongations different from each other.

In the tire 582 as well, as in the tire 502 shown in FIG. 24, in order to improve the visual aspect, the tread portion is formed such that the shoulder portion has an angular shape.

As a result, the clearance G is reduced, and the sense of unity between the vehicle B and the tire 582 is enhanced.

By the way, forming the tread portion such that the shoulder portion has an angular shape involves the modification of the contour line of the tread surface. In the tire, the contour line of the tread surface and the contour line of the carcass (also referred to as a carcass line) are set in association with each other. The modification of the contour line of the tread surface involves a change in a contour line of a carcass. As in the contour line of the tread surface, in a case where the contour line of the carcass is also modified to an angular shape, when the tire is inflated, the tire is deformed such that a crown portion pops out and the shoulder portion retracts. In this case, since an outer diameter growth in the crown portion is promoted, the contour line of the tread surface is rounded, and an effect of improving the visual aspect may not be sufficiently obtained.

In the tire, the deformation and the restoration are repeated. The increase in the outer diameter growth in the crown portion leads to the increase in the amount of deformation in the tread portion. Therefore, the rolling resistance may also be increased.

In the tire 622, the stiffness of the band 624 is controlled by adjusting the density of the band cord 628 in the band 624 and the intermediate elongation of the band cord 628.

The band 624 of the tire 622 is formed such that the center portion 632 has stiffness higher than the stiffness of the side portion 634 by these types of adjustment. In other words, the center portion 632 has stiffness higher than the stiffness of the side portion 634. The center portion 632 suppresses the outer diameter growth of the crown portion. Since the amount of deformation in the tread portion is appropriately maintained, the increase in the rolling resistance is suppressed. From this point of view, it is preferable that the center portion 632 has the stiffness higher than the stiffness of the side portion 634.

In this tire 622, a ratio (WS/WB) of the axial width WS of the side portion 634 to the axial width WB of the band 624 is preferably 10% or more and 25% or less.

By setting the ratio (WS/WB) to 10% or more, the outer diameter growth of the crown portion is effectively suppressed. In the tire 622, it is possible to further improve the visual aspect while effectively suppressing the increase in the rolling resistance. From this point of view, the ratio (WS/WB) is more preferably 15% or more.

By setting the ratio (WS/WB) to 25% or less, the outer diameter growth of the crown portion and the outer diameter growth of the shoulder portion are arranged in a well-balanced manner. Since it is possible to prevent a ground contact shape from being formed in a distorted shape, such as a butterfly shape, the occurrence of the uneven abrasion is suppressed. In this case as well, the amount of deformation in the tread portion is appropriately maintained. Therefore, the increase in the rolling resistance is suppressed. From this point of view, the ratio (WS/WB) is more preferably 20% or less.

As in the tire 502 shown in FIG. 24, in the tire 622, in order to improve the visual aspect, the ratio (LSh/LBS) is controlled. In the tire 622 as well, the ratio (LSh/LBS) is 85.9% or more and 89.3% or less. As the ratio (LSh/LBS) is closer to 89.3%, the shoulder portion has a more angular shape.

In a case where the shoulder portion is formed to have an angular shape in order to improve the visual aspect, the flattening of the tread surface 524 is promoted. The flattening of the tread surface 524 promotes the outer diameter growth of the crown portion.

However, in the tire 622, based on the finding that the ground contact shape is a rectangular shape or a butterfly shape and the uneven abrasion is likely to occur in a case where a difference in the stiffness between the center portion 632 and the side portion 634 of the band 624, and the finding that it is necessary to increase the stiffness of the entire band 624 in a case where the ratio (LSh/LBS) exceeds 88.4%, it is preferable that the stiffness of the band 624 for improving the visual aspect is control in a case where the ratio (LSh/LBS) is 88.4% or less and a case where the ratio (LSh/LBS) is more than 88.4%.

Case Where Ratio (LSh/LBS) Is 88.4% Or Less

In this case, the flattening of the tread surface 524 is suppressed as compared with a case where the ratio (LSh/LBS) is more than 88.4%, which will be described below. Therefore, in this case, it is preferable to use, as the center band cord and the side band cord, nylon cords that are formed by twisting nylon filaments composed of nylon fibers and have intermediate elongations different from each other. Specifically, it is preferable that each of the center band cord and the side band cord is the single organic fiber cord, the organic fiber of the single organic fiber cord is the nylon fiber, the intermediate elongation of the center band cord is smaller than the intermediate elongation of the side band cord. Accordingly, the outer diameter growth of the crown portion is effectively suppressed. In the tire 622, it is possible to further improve the visual aspect while effectively suppressing the increase in the rolling resistance. Since the difference in the stiffness between the center portion 632 and the side portion 634 of the band 624 can be appropriately maintained, in the tire 622, the occurrence of the uneven abrasion can be suppressed. From these points of view, a ratio of the intermediate elongation of the center band cord to the intermediate elongation of the side band cord is preferably 0.60 or more, and more preferably 0.73 or more. The ratio is preferably 0.98 or less, and more preferably 0.90 or less.

Moreover, in a case where each of the center band cord and the side band cord is the single organic fiber cord, the organic fiber of the single organic fiber cord is the nylon fiber, the intermediate elongation of the center band cord is smaller than the intermediate elongation of the side band cord, from the point of view that the outer diameter growth of the crown portion can be more effectively suppressed, the intermediate elongation of the center band cord is preferably 4.7% or more and 5.2% or less. Further, from the point of view that the occurrence of the uneven abrasion can also be effectively suppressed, the intermediate elongation of the center band cord is more preferably 4.7% or more and 5.2% or less, and the intermediate elongation of the side band cord is more preferably 6.4% or more and 7.0% or less.

Case Where Ratio (LSh/LBS) Is More Than 88.4%

In this case, the flattening of the tread surface 524 is promoted as compared with a case where the ratio (LSh/LBS) is 88.4% or less described above. Therefore, in this case, it is preferable to use, as the center band cord, the hybrid cord formed by twisting the nylon filaments composed of the nylon fibers and the aramid filaments composed of the aramid fibers, and to use, the side band cord, the nylon cord formed by twisting the nylon filaments composed of the nylon fibers and having the intermediate elongation lower than the intermediate elongation of the hybrid cord. Specifically, it is preferable that the center band cord is the composite organic fiber cord, the organic fiber of the composite organic fiber cord is the nylon fiber and the aramid fiber, the side band cord is the single organic fiber cord, the organic fiber of the single organic fiber cord is the nylon fiber, the intermediate elongation of the center band cord is smaller than the intermediate elongation of the side band cord. As a result, as a whole, the band 624 having the stiffness higher than the stiffness of the entire band 624, which is described in a case where the ratio (LSh/LBS) is 88.4% or less, is formed. Accordingly, in order to improve the visual aspect, the shoulder portion is formed in an angular shape. As a result, even in a case where a flat tread surface 524 is formed, the band 624 effectively suppresses the outer diameter growth of the crown portion. In the tire 622, it is possible to further improve the visual aspect while effectively suppressing the increase in the rolling resistance. Since the difference in the stiffness between the center portion 632 and the side portion 634 of the band 624 can be appropriately maintained, in the tire 622, the occurrence of the uneven abrasion can be suppressed. From these points of view, a ratio of the intermediate elongation of the center band cord to the intermediate elongation of the side band cord is preferably 0.51 or more, and more preferably 0.71 or more. The ratio is preferably 0.88 or less, and more preferably 0.82 or less.

Moreover, in a case where the center band cord is the composite organic fiber cord, the organic fiber of the composite organic fiber cord is the nylon fiber and the aramid fiber, the side band cord is the single organic fiber cord, the organic fiber of the single organic fiber cord is the nylon fiber, the intermediate elongation of the center band cord is smaller than the intermediate elongation of the side band cord, from the point of view that the outer diameter growth of the crown portion can be more effectively suppressed, the intermediate elongation of the center band cord is preferably 3.3% or more and 3.7% or less. Further, from the point of view that the occurrence of the uneven abrasion can also be effectively suppressed, the intermediate elongation of the center band cord is more preferably 3.3% or more and 3.7% or less, and the intermediate elongation of the side band cord is more preferably 4.7% or more and 5.2% or less.

The stiffness of the band 624 is high on an inner side with respect to the boundary CS between the center portion 632 and the side portion 634, and is low on an outer side with respect to the boundary CS. A portion of the circumferential groove in the tread portion has the stiffness lower than the stiffness of other portions. Therefore, in a case where the boundary CS is positioned radially inside the circumferential groove 552, when the tire 622 is inflated, the crown portion may pop out and the shoulder portion may greatly retract.

However, in the tire 622, as shown in FIG. 37, the boundary CS between the center portion 632 and the side portion 634 of the band 624 is positioned axially outside the shoulder circumferential groove 552s. The boundary CS is not positioned radially inside the shoulder circumferential groove 552s. As a result, the band 624 can effectively contribute to the suppression of the outer diameter growth of the crown portion. In the tire 622, in a case where the boundary CS is not positioned radially inside the circumferential groove 552, the boundary CS may be disposed axially inside the shoulder circumferential groove 552s. However, from the points of view that the shoulder portion can be formed in an angular shape and the visual aspect can be further improved, it is preferable that the boundary CS is positioned axially outside the shoulder circumferential groove 552s. From the point of view that the band 624 can more effectively suppress the outer diameter growth of the crown portion, it is more preferable that the boundary CS is positioned axially outside the boundary MS between the middle arc and the side arc shown in FIG. 26, and is positioned axially inside the boundary SH between the side arc and the shoulder arc. Stated another way, it is more preferable that the boundary CS is positioned between the boundary MS and the boundary SH in the axial direction.

As described above, the tire 502, the tire 582, and the tire 622 can achieve the improvement in the visual aspect while suppressing the influence on the rolling resistance or the appearance quality.

As described above, according to the present invention, it is possible to obtain the tire that can achieve the improvement in the visual aspect. According to the present invention, it is possible to obtain the tire that can achieve the improvement in the visual aspect while suppressing the increase in the mass. According to the present invention, it is possible to obtain the tire that can achieve the improvement in the visual aspect while suppressing the increase in the air resistance. According to the present invention, it is possible to obtain the tire that can achieve the improvement in the visual aspect while suppressing the increase in the rolling resistance. According to the present invention, it is possible to obtain the tire that can achieve the improvement in the visual aspect while suppressing the influence on the rolling resistance or the appearance quality.

EXAMPLES

Hereinafter, the present invention will be described in further detail with reference to Examples and the like, but the present invention is not limited to only such Examples.

Experiment A

Example 1

The pneumatic tire (tire size=235/55R19) for the passenger vehicle having the basic configuration shown in FIG. 1 was obtained.

The ratio (LSh/LBS), the ratio (Rc/Rm), and the ratio (Rm/Rs) were set as shown in Table 1 below.

The length LSh of the shoulder line segment and the length LBS of the reference line segment were controlled as shown in Table 1 by setting the radius Rc of the center arc, the radius Rm of the middle arc, and the radius Rs of the side arc as shown in Table 1, and adjusting the positions of the boundary CM and the boundary MS.

The ratio (WC/WX) of the ground contact width WC of the ground contact surface to the cross-sectional width WX was 80%.

Example 2 and Comparative Examples 1 to 2

The tires of Example 2 and Comparative Examples 1 to 2 were obtained by adjusting the positions of the boundary CM between the center arc and the middle arc and the boundary MS between the middle arc and the side arc, and controlling the length LSh and the length LBS as shown in Table 1 below.

Examples 3 to 4 and Comparative Examples 3 to 4

The tires of Examples 3 to 4 and Comparative Examples 3 to 4 were obtained by setting the radius Rm of the middle arc as shown in Table 2 below, adjusting the positions of the boundary CM and the boundary MS, and controlling the length LSh as shown in Table 2.

When the ratio (WC/WX) was measured for Comparative Example 4 among Examples 3 to 4 and Comparative Examples 3 to 4, the ratio (WC/WX) was 73%.

Examples 5 to 8

The tires of Examples 5 to 8 were obtained by setting the radius Rs of the side arc as shown in Table 3 below, adjusting the positions of the boundary CM and the boundary MS, and controlling the length LSh as shown in Table 3.

When the ratio (WC/WX) was measured for Example 5 among Examples 5 to 8, the ratio (WC/WX) was 86%.

Visual Aspect

A trial tire was assembled on the rim (size=19×7.5 J), and was filled with air to set the internal pressure of 250 kPa. The tire was mounted on a test vehicle. An amount of the clearance G (see FIG. 40) was measured in a state in which one driver was on board and the vehicle was stationary, and a ratio of the amount of the clearance G to the interference limit clearance amount was calculated. Table 1 below shows the results as an index. As the index is closer to 100, the visual aspect is more excellent. A case where the index is less than 100 means that the clearance is small and the tire is likely to interfere with the wheel house, and a case where the index is more than 100 means that the clearance is large, which is disadvantageous in the visual aspect.

Uneven Abrasion Resistance

The trial tire was assembled on the rim (size=19×7.5 J), and was filled with air to adjust the internal pressure to 250 kPa. The tire was mounted on an abrasion energy measurement device. By setting a camber angle to 0° and a slip angle to 0°, the abrasion energy of the tire was measured. A ratio (Ec/Es) as an index of the uneven abrasion resistance was obtained from the abrasion energy Ec on the equatorial plane and the abrasion energy Es at the ground contact end. Table 1 below shows the results as an index with Comparative Example 1 as 100. As the numerical value is larger, the uneven abrasion resistance is more excellent.

Comprehensive Evaluation

Comprehensive evaluation was performed based on the indexes of the visual aspect and the uneven abrasion resistance. Since the visual aspect is more excellent as the index is closer to 100, an index for the comprehensive evaluation was obtained by subtracting an absolute value of a difference between the index of the visual aspect and 100 from the index of the uneven abrasion resistance. Tables 1 to 3 below show the results. As the numerical value is larger, the visual aspect and the uneven abrasion resistance are arranged in a more well-balanced manner

TABLE 1

|  | Comparative example 1 | Example 1 | Example 2 | Comparative example 2 |
| --- | --- | --- | --- | --- |
| LSh [mm] | 150.0 | 155.7 | 157.2 | 160.0 |
| LBS [mm] | 175.7 | 177.7 | 176.0 | 177.7 |
| LSh/LBS [%] | 85.4 | 87.6 | 89.3 | 90.0 |
| Rc [mm] | 100 | 100 | 100 | 100 |
| Rm [mm] | 52 | 52 | 52 | 52 |
| Rs [mm] | 22 | 22 | 22 | 22 |
| Rc/Rm [—] | 1.92 | 1.92 | 1.92 | 1.92 |
| Rm/Rs [—] | 2.36 | 2.36 | 2.36 | 2.36 |
| Visual aspect | 117 | 100 | 85 | 80 |
| Uneven abrasion resistance | 100 | 125 | 105 | 65 |
| Comprehensive evaluation | 83 | 125 | 90 | 45 |

TABLE 2

|  | Comparative example 3 | Example 3 | Example 4 | Comparative example 4 |
| --- | --- | --- | --- | --- |
| LSh [mm] | 155.7 | 155.7 | 155.7 | 154.2 |
| LBS [mm] | 177.7 | 177.7 | 177.7 | 177.7 |
| LSh/LBS [%] | 87.6 | 87.6 | 87.6 | 86.8 |
| Rc [mm] | 100 | 100 | 100 | 100 |
| Rm [mm] | 58 | 54 | 50 | 46 |
| Rs [mm] | 22 | 22 | 22 | 22 |
| Rc/Rm [—] | 1.72 | 1.85 | 2.00 | 2.17 |
| Rm/Rs [—] | 2.64 | 2.45 | 2.27 | 2.09 |

TABLE 2-continued

|  | Comparative example 3 | Example 3 | Example 4 | Comparative example 4 |
|---|---|---|---|---|
| Visual aspect | 100 | 100 | 100 | 107 |
| Uneven abrasion resistance | 85 | 110 | 110 | 90 |
| Comprehensive evaluation | 85 | 110 | 110 | 83 |

TABLE 3

|  | Example 5 | Example 6 | Example 7 | Example 8 |
|---|---|---|---|---|
| LSh [mm] | 157.2 | 155.7 | 155.7 | 154.2 |
| LBS [mm] | 177.7 | 177.7 | 177.7 | 177.7 |
| LSh/LBS [%] | 88.5 | 87.6 | 87.6 | 86.8 |
| Rc [mm] | 100 | 100 | 100 | 100 |
| Rm [mm] | 52 | 52 | 52 | 52 |
| Rs [mm] | 28 | 25 | 19 | 16 |
| Rc/Rm [—] | 1.92 | 1.92 | 1.92 | 1.92 |
| Rm/Rs [—] | 1.86 | 2.08 | 2.74 | 3.25 |
| Visual aspect | 93 | 100 | 100 | 107 |
| Uneven abrasion resistance | 95 | 110 | 110 | 95 |
| Comprehensive evaluation | 88 | 110 | 110 | 88 |

As shown in Tables 1 to 3, in Examples, the improvement in the visual aspect was achieved while suppressing the deterioration in the uneven abrasion resistance. From this evaluation result, the superiority of the present invention is obvious.

Experiment B

Example 201

The pneumatic tire (tire size=195/65R15) for the passenger vehicle having the basic configuration shown in FIG. 6 was obtained.

The ratio (LSh/LBS), the ratio (LGC/LSh), the ratio (CE/CG), ratio (CW/CG), and the ratio (GG/GW) were as shown in Table 4 below.

LSh is the length of the shoulder line segment. LBS is the length of the reference line segment. LGC is the length of the shoulder line segment from the carcass to the shoulder reference point. CE is the axial distance from the equator to the reference ground contact position. CG is the axial distance from the equator to the shoulder reference point. CW is the axial distance from the equator to the maximum width position. GG is the radial distance from the shoulder reference point to the outer end of the upper arc. GW is the radial distance from the shoulder reference point to the maximum width position.

The length LBS was 163 mm. The outer diameter of the tire was 637 mm. The cross-sectional width of the tire was 203 mm. The axial distance CG was 90 mm. The radial distance GW was 60.4 mm.

Examples 202 to 206 and Comparative Examples 201 to 203

The tires of Examples 202 to 206 and Comparative Examples 201 to 203 were obtained in the same manner as in Example 201 except that the ratio (LSh/LBS), the ratio (LGC/LSh), the ratio (CE/CG), the ratio (CW/CG), and the ratio (GG/GW) were set as shown in Table 4 below.

Visual Aspect

A trial tire was assembled on the rim (size=15×6.5 J), and was filled with air to set the internal pressure of 250 kPa. The tire was mounted on a test vehicle. An amount of the clearance G (see FIG. 40) was measured in a state in which one driver was on board and the vehicle was stationary, and a ratio of the amount of the clearance G to the interference limit clearance amount was calculated. Table 4 below shows the results as an index. As the index is closer to 100, the visual aspect is more excellent. A case where the index is less than 100 means that the clearance is small and the tire is likely to interfere with the wheel house, and a case where the index is more than 100 means that the clearance is large, which is disadvantageous in the visual aspect.

Uneven Abrasion Resistance

The trial tire was assembled on the rim (size=15×6.5 J), and was filled with air to adjust the internal pressure to 250 kPa. The tire was mounted on an abrasion energy measurement device. By setting a camber angle to 0° and a slip angle to 0°, the abrasion energy of the tire was measured. A ratio (Ec/Es) as an index of the uneven abrasion resistance was obtained from the abrasion energy Ec on the equatorial plane and the abrasion energy Es at the ground contact end. Table 4 below shows the results as an index with Comparative Example 201 as 100. As the numerical value is larger, the uneven abrasion resistance is more excellent.

Mass

The mass of the trial tire was measured. Table 4 below shows the results as an index with Comparative Example 201 as 100. As the numerical value is smaller, the weight is lighter.

Durability

A trial tire was assembled on the rim (size=15×6.5 J), and was filled with air to set the internal pressure of 250 kPa. The tire was mounted on a drum type traveling testing machine. A longitudinal load of 4.24 kN was applied to the tire, and the tire was made to travel on a drum (radius=1.7 m) at speed of 80 km/h. A traveling distance until damage to the tire was confirmed was measured. Table 4 below shows the results as an index with Comparative Example 201 as 100. As the numerical value is larger, the durability is more excellent.

TABLE 4

|  | Comparative example 201 | Comparative example 202 | Example 202 | Example 201 | Example 203 | Comparative example 203 | Example 204 | Example 205 | Example 206 |
|---|---|---|---|---|---|---|---|---|---|
| LSh/LBS [%] | 83.4 | 89.0 | 89.0 | 89.0 | 89.0 | 89.0 | 89.0 | 89.0 | 89.0 |
| LGC/LSh [%] | 6 | 5 | 6 | 9 | 12 | 13 | 9 | 9 | 9 |
| CE/CG [%] | 85.6 | 85.6 | 85.6 | 85.6 | 85.6 | 85.6 | 81.1 | 81.1 | 81.1 |
| CW/CG [—] | 1.13 | 1.13 | 1.13 | 1.13 | 1.13 | 1.13 | 1.13 | 1.11 | 1.11 |
| GG/GW [%] | 60 | 60 | 60 | 60 | 60 | 60 | 60 | 60 | 57 |
| Visual aspect | 150 | 100 | 100 | 100 | 100 | 100 | 100 | 100 | 100 |
| Uneven abrasion resistance | 100 | 80 | 90 | 100 | 100 | 100 | 100 | 100 | 100 |

TABLE 4-continued

|  | Comparative example 201 | Comparative example 202 | Example 202 | Example 201 | Example 203 | Comparative example 203 | Example 204 | Example 205 | Example 206 |
|---|---|---|---|---|---|---|---|---|---|
| Mass | 100 | 85 | 90 | 100 | 105 | 110 | 85 | 80 | 70 |
| Durability | 100 | 100 | 100 | 100 | 100 | 100 | 100 | 100 | 100 |

As shown in Table 4, in Examples, the improvement in the visual aspect was achieved while suppressing the increase in the mass. From this evaluation result, the superiority of the present invention is obvious.

Experiment C

Example 301

The pneumatic tire (tire size=235/55R19) for the passenger vehicle having the basic configuration shown in FIG. 11 was obtained.

The ratio (LSh/LBS), Total, the ratio (SR/BH), the angle θb, the width GT, and the distance WG were as shown in Table 5 below.

LSh is the length of the shoulder line segment. LBS is the length of the reference line segment. Total is the total of the height h of the protrusion and the maximum depth drx of the narrow groove. The angle θb is the angle formed by the straight line passing through the outer end and the inner end of the top surface and the tangent line of the outer inclined surface at the outer end of the top surface in the meridional cross section. The width GT is the width of the top surface. The distance WG is the axial distance from the rim width baseline to the inner end of the top surface.

In Example 301, the rim guard is formed such that the straight line passing through the outer end and the inner end of the top surface is parallel to the equatorial plane.

Examples 302 to 307 and Comparative Examples 301 to 302

The tires of Examples 302 to 307 and Comparative Examples 301 to 302 were obtained in the same manner as in Example 301 except that the ratio (LSh/LBS), Total, the ratio (SR/BH), the angle θb, the width GT, and the distance WG were set as shown in Table 5 below.

Visual Aspect

A trial tire was assembled on the rim (size=19×7.5 J), and was filled with air to set the internal pressure of 250 kPa. The tire was mounted on a test vehicle. An amount of the clearance G (see FIG. 40) was measured in a state in which one driver was on board and the vehicle was stationary, and a ratio of the amount of the clearance G to the interference limit clearance amount was calculated. Table 5 below shows the results as an index. As the index is closer to 100, the visual aspect is more excellent. A case where the index is less than 100 means that the clearance is small and the tire is likely to interfere with the wheel house, and a case where the index is more than 100 means that the clearance is large, which is disadvantageous in the visual aspect.

Aerodynamic Force

A trial tire was assembled on the rim (size=19×7.5 J), and was filled with air to set the internal pressure of 250 kPa. The tire was mounted on a test vehicle. The test vehicle was made to travel for 50 laps at speed of 100 km/h on a test course formed by asphalt in a state in which one driver was on board. A traveling distance per liter of fuel was calculated from the fuel consumption due to traveling. Table 5 below shows the results as an index with Comparative Example 301 as 100. As the numerical value is larger, the increase in the air resistance is more suppressed.

Appearance

The appearances of 100 trial tires were observed, the presence or absence of the occurrence of the bareness was confirmed, and a non-defective product rate was obtained. Table 5 below shows the results as an index with Comparative Example 301 as 100. As the numerical value is larger, the occurrence of the bareness is more suppressed.

Comprehensive Evaluation

Comprehensive evaluation was performed based on the indexes of the visual aspect, the aerodynamic force, and the appearance. An index for the comprehensive evaluation was obtained by subtracting an absolute value of a difference between the index of the visual aspect and 100 from a total value of the indexes of the aerodynamic force and the appearance. Table 5 below shows the results. As the numerical value is larger, the visual aspect, the aerodynamic force, and the appearance are arranged in a more well-balanced manner.

TABLE 5

|  | Comparative example 301 | Comparative example 302 | Example 302 | Example 303 | Example 301 | Example 304 | Example 305 | Example 306 | Example 307 |
|---|---|---|---|---|---|---|---|---|---|
| LSh/LBS [%] | 85.4 | 82.5 | 87.6 | 87.6 | 87.6 | 87.6 | 87.6 | 87.6 | 87.6 |
| Total [mm] | 1.1 | 1.1 | 0.5 | 0.7 | 0.7 | 0.7 | 0.7 | 0.7 | 0.7 |
| SR/BH [%] | 30 | 30 | 30 | 10 | 30 | 50 | 30 | 30 | 30 |
| θb [°] | 10 | 10 | 10 | 10 | 10 | 10 | 30 | 10 | 10 |
| GT [mm] | 4 | 4 | 4 | 4 | 4 | 4 | 4 | 6 | 4 |
| WG [mm] | 12 | 12 | 12 | 12 | 12 | 12 | 12 | 12 | 18 |
| Visual aspect | 117 | 140 | 100 | 100 | 100 | 100 | 100 | 100 | 100 |
| Aerodynamic force | 100 | 120 | 110 | 110 | 105 | 90 | 95 | 95 | 95 |
| Appearance | 100 | 100 | 90 | 80 | 98 | 100 | 98 | 98 | 98 |
| Comprehensive evaluation | 183 | 180 | 200 | 190 | 203 | 190 | 193 | 193 | 193 |

As shown in Table 5, in Examples, the improvement in the visual aspect was achieved while suppressing the increase in the air resistance. From this evaluation result, the superiority of the present invention is obvious.

Experiment D

Example 401

The pneumatic tire (tire size=235/55R19) for the passenger vehicle having the basic configuration shown in FIG. 19 was obtained.

The ratio (LSh/LBS) of the length LSh of the shoulder line segment to the length LBS of the reference line segment and the ratio (WS/WB) of the axial width WS of the side portion to the axial width WB of the band were as shown in Table 6 below.

The single organic fiber cord made of the nylon fibers was used as the center band cord. This fact is represented by [N} in the column of type in Table 6. The intermediate elongation of the center band cord was 4.9%.

The single organic fiber cord made of the nylon fiber was used as the side band cord. The intermediate elongation of the side band cord was 6.7%.

The density of the center band cord in the center portion was set to be the same density as the density of the side band cord in the side portion.

Comparative Example 401

The band of Comparative Example 401 is the band in the related art. The band was formed by spirally winding the strip including the single organic fiber cord (intermediate elongation=4.9%) made of the nylon fibers. The band is made of a single element, and the center portion and the side portion are not formed as in Example 401. The density of the band cord in the band was set to be the same density as the density of the band cord in the band of Example 401.

The ratio (LSh/LBS) of Comparative Example 401 was 85.4%.

Comparative Example 402

The tire of Comparative Example 402 was obtained in the same manner as in Example 401 except that the single organic fiber cord (intermediate elongation=6.7%) made of the nylon fibers was used as the center band cord, and the single organic fiber cord (intermediate elongation=4.9%) made of the nylon fiber was used as the side band cord.

The ratio (LSh/LBS) of Comparative Example 402 was 90.0%.

Example 402

The tire of Example 402 was obtained in the same manner as in Example 401 except that the composite organic fiber cord (intermediate elongation=3.5%) made of the nylon fibers and the aramid fibers was used as the center band cord, and the single organic fiber cord (intermediate elongation=4.9%) made of the nylon fiber was used as the side band cord.

The ratio (LSh/LBS) of Example 402 was 89.3%.
Visual Aspect

A trial tire was assembled on the rim (size=19×7.5 J), and was filled with air to set the internal pressure of 250 kPa. The tire was mounted on a test vehicle. An amount of the clearance G (see FIG. 40) was measured in a state in which one driver was on board and the vehicle was stationary, and a ratio of the amount of the clearance G to the interference limit clearance amount was calculated. Table 6 below shows the results as an index. As the index is closer to 100, the visual aspect is more excellent. A case where the index is less than 100 means that the clearance is small and the tire is likely to interfere with the wheel house, and a case where the index is more than 100 means that the clearance is large, which is disadvantageous in the visual aspect.
Uneven Abrasion Resistance The trial tire was assembled on the rim (size=19×7.5 J), and was filled with air to adjust the internal pressure to 250 kPa. The tire was mounted on an abrasion energy measurement device. By setting a camber angle to 0° and a slip angle to 0°, the abrasion energy of the tire was measured. A ratio (Ec/Es) as an index of the uneven abrasion resistance was obtained from the abrasion energy Ec on the equatorial plane and the abrasion energy Es at the ground contact end. Table 6 below shows the results as an index with Comparative Example 401 as 100. As the numerical value is larger, the uneven abrasion resistance is more excellent.
Rolling Resistance By using a rolling resistance testing machine, a rolling resistance coefficient (RRC) when the trial tire was made to travel on the drum at speed of 80 km/h under the following conditions was measured. The column "RRC" in Table 6 below shows the results as an index with Comparative Example 401 as 100. As the numerical value is larger, the rolling resistance of the tire is lower.
Rim: 19×7.5 J
Internal pressure: 210 kPa
Longitudinal load: 6.47 kN

TABLE 6

| | | Comparative example 401 | Comparative example 402 | Example 401 | Example 402 |
|---|---|---|---|---|---|
| LSh/LBS [%] | | 85.4 | 90.0 | 88.4 | 89.3 |
| WS/WB [%] | | — | 20 | 20 | 20 |
| Center band cord | Type | — | N | N | N/A |
| | Intermediate elongation [%] | — | 6.7 | 4.9 | 3.5 |
| Side band cord | Type | — | N | N | N |
| | Intermediate elongation [%] | — | 4.9 | 6.7 | 4.9 |
| Visual aspect | | 117 | 95 | 100 | 100 |
| Uneven abrasion resistance | | 100 | 125 | 125 | 125 |
| RRC | | 100 | 85 | 115 | 110 |

As shown in Table 6, in Examples, the improvement in the visual aspect was achieved while suppressing the increase in the rolling resistance. From this evaluation result, the superiority of the present invention is obvious.

Experiment E

Example 501

The pneumatic tire (tire size=235/55R19) for the passenger vehicle having the basic configuration shown in FIG. 24 was obtained.

The ratio (LSh/LBS) of the length LSh of the shoulder line segment to the length LBS of the reference line segment, the ratio (HW/HS) of the radial distance HW from the bead baseline to the maximum width position PW to the cross-sectional height HS of the tire, the radial distance HA from the equator to the third reference point PA, the angle θu formed by the line segment connecting the maximum width position PW and the third reference point PA with respect to the radial direction, the angle θb formed by the line segment connecting the maximum width position PW and the fourth reference point PR with respect to the radial direction were shown as Table 7 below.

Examples 502 to 504 and Comparative Examples 501 to 504

The tires of Examples 502 to 504 and Comparative Examples 501 to 504 were obtained in the same manner as in Example 501 except that the ratio (LSh/LBS), the ratio (HW/HS), the radial distance HA, the angle θu, and the angle θb were set as shown in Table 7 below. Comparative Example 501 is the tire in the related art.

Visual Aspect

A trial tire was assembled on the rim (size=19×7.5 J), and was filled with air to set the internal pressure of 250 kPa. The tire was mounted on a test vehicle. An amount of the clearance G (see FIG. 40) was measured in a state in which one driver was on board and the vehicle was stationary, and a ratio of the amount of the clearance G to the interference limit clearance amount was calculated. Table 7 below shows the results as an index. As the index is closer to 100, the visual aspect is more excellent. A case where the index is less than 100 means that the clearance is small and the tire is likely to interfere with the wheel house, and a case where the index is more than 100 means that the clearance is large, which is disadvantageous in the visual aspect.

Rolling Resistance

By using a rolling resistance testing machine, a rolling resistance coefficient (RRC) when the trial tire was made to travel on the drum at speed of 80 km/h under the following conditions was measured. The column "RRC" in Table 7 below shows the results as an index with Comparative Example 501 as 100. As the numerical value is larger, the rolling resistance of the tire is lower.
Rim: 19×7.5 J
Internal pressure: 210 kPa
Longitudinal load: 6.47 kN Appearance Quality The appearances of the trial tires (100 trial tires) were observed, and a status of the occurrence of the exposure of the carcass cord at the contact portion with the flange was confirmed. The column "Appearance quality" in Table 7 below shows the results as [B] in a case where an occurrence rate is 5% or more, and as [G] in a case where the occurrence rate is less than 5%.

As shown in Table 7, in Examples, the improvement in the visual aspect was achieved while suppressing the influence on the rolling resistance or the appearance quality. From this evaluation result, the superiority of the present invention is obvious.

The technique for improving the visual aspect described above can also be applied to various tires.

It should be understood that the invention is not limited to the above-described embodiment, but may be modified into various forms on the basis of the spirit of the invention. Additionally, the modifications are included in the scope of the invention.

What is claimed is:

1. A tire comprising:
a pair of beads;
a carcass that bridges between the pair of beads;
a tread that is positioned radially outside the carcass;
a band that is positioned between the carcass and the tread;
an outer surface having a tread surface that is in contact with a road surface, and a pair of side surfaces that are continuous with the tread surface,
a pair of sidewalls that are positioned axially outside the carcass; and
a pair of clinches that are positioned radially inside the sidewall,
wherein the tread includes the tread surface,
the tread surface includes an equator that is an intersection point with an equatorial plane,
the band includes a band cord that extends substantially in a circumferential direction,
the band includes a center portion that intersects with the equatorial plane, and a pair of side portions that are positioned axially outside the center portion,
the center portion has a stiffness higher than a stiffness of the side portions,
each of the side surfaces includes a maximum width position indicating a maximum width of the tire,
in a meridional cross section of the tire,
an intersection point of a bead baseline and the equatorial plane is a first reference point,
an intersection point of a straight line passing through the equator and extending in an axial direction and a straight line passing through the maximum width position and extending in a radial direction is a second reference point,
a line segment connecting the first reference point and the second reference point is a reference line segment,

TABLE 7

| | Comparative example 501 | Comparative example 502 | Comparative example 503 | Example 502 | Example 503 | Example 501 | Example 504 | Comparative example 504 |
|---|---|---|---|---|---|---|---|---|
| LSh/LBS [%] | 82.2 | 83.6 | 83.6 | 85.9 | 86.6 | 87.7 | 88.1 | 90.3 |
| HW/HS [%] | 49 | 51 | 55 | 55 | 56 | 56 | 55 | 55 |
| θb [°] | 21.4 | 23.4 | 21.9 | 21.9 | 20.7 | 21.6 | 21.9 | 21.9 |
| HA [mm] | 17 | 15 | 15 | 12 | 12 | 9 | 9 | 6 |
| θu [°] | 14.2 | 15.9 | 17.7 | 13.1 | 11.0 | 9.9 | 9.0 | 5.3 |
| Visual aspect | 143 | 130 | 130 | 112 | 106 | 100 | 99 | 89 |
| RRC | 100 | 101 | 101 | 104 | 104 | 101 | 101 | 98 |
| Appearance quality | G | B | G | G | G | G | G | G | an intersection point of the reference line segment and the outer surface of the tire is a shoulder reference point, and a line segment connecting the first reference point and the shoulder reference point is a shoulder line segment, a contour line of the tread surface is formed by a plurality of arcs arranged in the axial direction, the plurality of arcs include a center arc that is an arc passing through the equator, a pair of shoulder arcs each of which is positioned on an outermost side in the axial direction and has a smallest radius, a pair of middle arcs each of which is positioned adjacent to the center arc and has a radius smaller than a radius of the center arc, and a pair of side arcs each of which is positioned between the middle arc and the shoulder arc and has a radius smaller than the radius of the middle arc, a protrusion that protrudes outward from the outer surface of the tire and extends in a circumferential direction is provided at a boundary portion between the tread and the sidewall, the outer surface of the tire includes a serration region between the shoulder reference point and the maximum width position, the serration region includes a plurality of narrow grooves that extend in the circumferential direction, and a ridge that is positioned between the narrow grooves adjacent to each other, the serration region is positioned radially inside the protrusion, and a total of a height of the protrusion and a maximum depth of the narrow groove is 0.5 mm or more and 0.9 mm or less, a ratio of a length of the shoulder line segment to a length of the reference line segment is 85.9% or more and 89.3% or less, and a ratio of the radius of the center arc to the radius of the middle arc is 1.85 or more and 2.00 or less.

2. The tire according to claim 1,
wherein a ratio of the radius of the middle arc to the radius of the side arc is 2.08 or more and 2.74 or less.

3. The tire according to claim 1,
wherein a ratio of a ground contact width of a ground contact surface of the tire to a cross-sectional width of the tire is 74% or more and 84% or less.

4. The tire according to claim 1, wherein a ratio of a length of the shoulder line segment from the carcass to the shoulder reference point to the length of the shoulder line segment is 6% or more and 12% or less.

5. The tire according to claim 4,
wherein an axially outer end of a ground contact surface is a reference ground contact end, and a position corresponding to the reference ground contact end on the outer surface of the tire is a reference ground contact position, and a ratio of an axial distance from the equator to the reference ground contact position to an axial distance from the equator to the shoulder reference point is 79% or more and 86% or less.

6. The tire according to claim 4,
wherein a ratio of an axial distance from the equator to the maximum width position to an axial distance from the equator to the shoulder reference point is 1.07 or more and 1.13 or less.

7. The tire according to claim 4,
wherein a contour line of the side surface includes an upper arc, the upper arc is an arc that extends from the maximum width position toward the shoulder reference point, and a ratio of a radial distance from the shoulder reference point to an outer end of the upper arc to a radial distance from the shoulder reference point to the maximum width position is 50% or more and 60% or less.

8. The tire according to claim 1,
wherein a ratio of a radial width of the serration region to a radial distance from the shoulder reference point to the maximum width position is 10% or more and 50% or less.

9. The tire according to claim 1,
wherein a rim guard that protrudes outward from the outer surface of the tire and extends in the circumferential direction is provided at a boundary portion between the sidewall and the clinch, the rim guard includes a top surface, an outer inclined surface that is positioned radially outside the top surface and is continuous with an outer end of the top surface, and an inner inclined surface that is positioned radially inside the top surface and is continuous with an inner end of the top surface, and in the meridional cross section of the tire, an angle formed by a straight line passing through the outer end and the inner end of the top surface and a tangent line of the outer inclined surface at the outer end of the top surface is 10 degrees or more and 30 degrees or less.

10. The tire according to claim 9,
wherein an axial distance from a rim width baseline to the inner end of the top surface is 12 mm or more and 18 mm or less.

11. The tire according to claim 1,
wherein a ratio of an axial width of the side portion to an axial width of the band is 10% or more and 25% or less.

12. The tire according to claim 1,
wherein a ratio of a radial distance from the bead baseline to the maximum width position to a cross-sectional height of the tire is 51% or more and 62% or less.

13. The tire according to claim 12,
wherein the tread surface includes a pair of boundary surfaces that are continuous with the side surface, and a main body surface that bridges between the pair of boundary surfaces, a contour line of each of the boundary surfaces is the shoulder arc, an intersection point of an extension line of a contour line of the main body surface and the reference line segment is a third reference point, and a radial distance from the equator to the third reference point is 9 mm or more and 15 mm or less.

14. The tire according to claim 13,
wherein an angle formed by a line segment connecting the maximum width position and the third reference point with respect to the radial direction is 9.8 degrees or more and 16.7 degrees or less.

15. The tire according to claim 12,
wherein an intersection point of the bead baseline and a rim width baseline is a fourth reference point, and an angle formed by a line segment connecting the maximum width position and the fourth reference point with respect to the radial direction is 22.2 degrees or less.

* * * * *